Oct. 24, 1939.     C. SMITH     2,176,933
CALCULATING AND ACCOUNTING MACHINE
Original Filed March 30, 1933     49 Sheets-Sheet 1
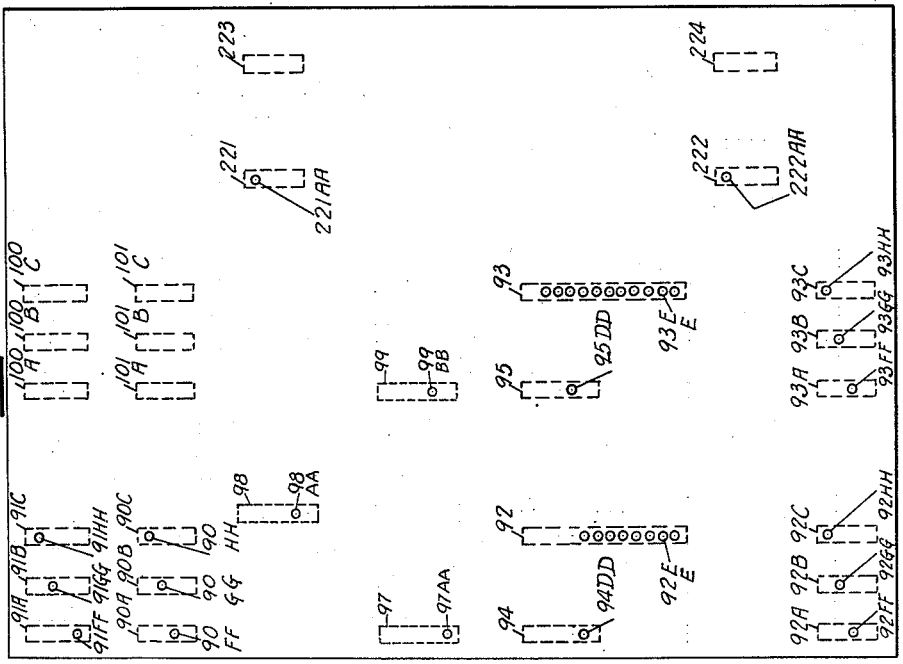
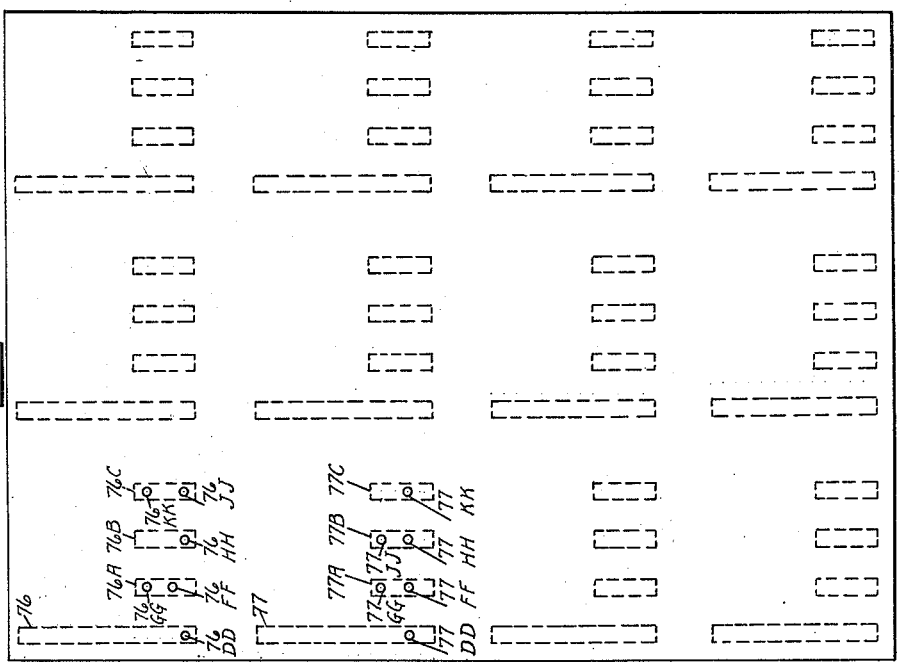
INVENTOR.
Clyde Smith

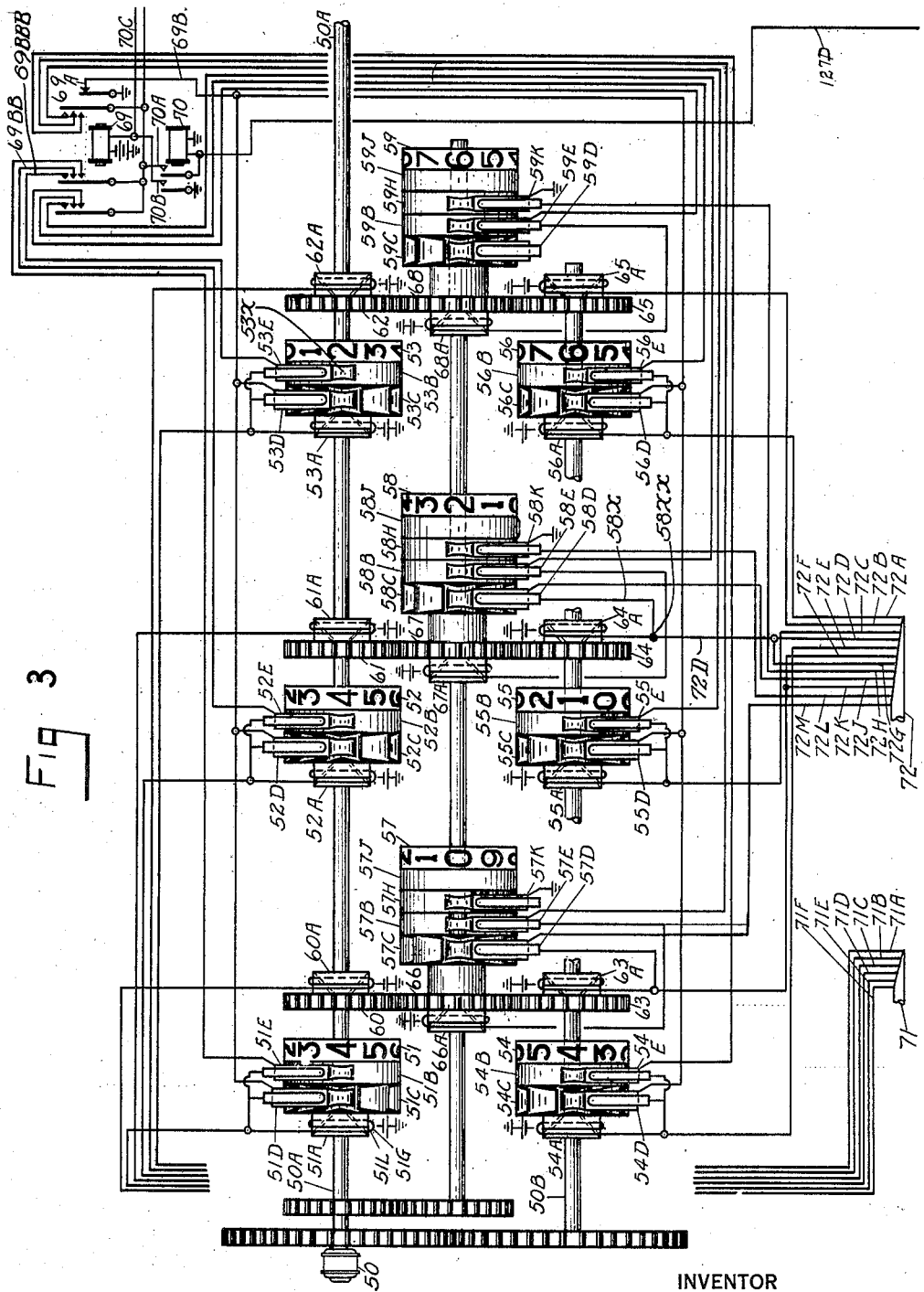

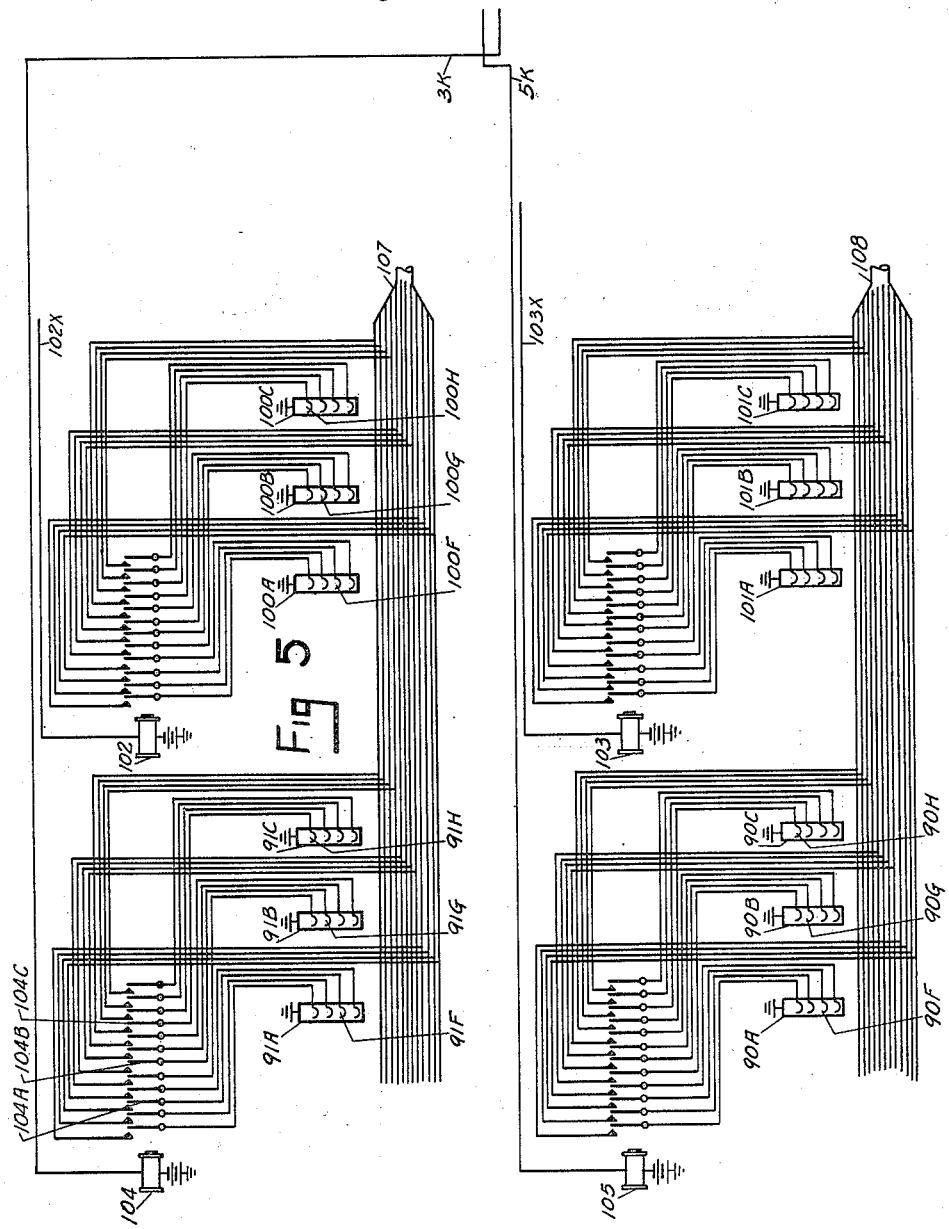

Oct. 24, 1939.   C. SMITH   2,176,933
CALCULATING AND ACCOUNTING MACHINE
Original Filed March 30, 1933   49 Sheets-Sheet 5
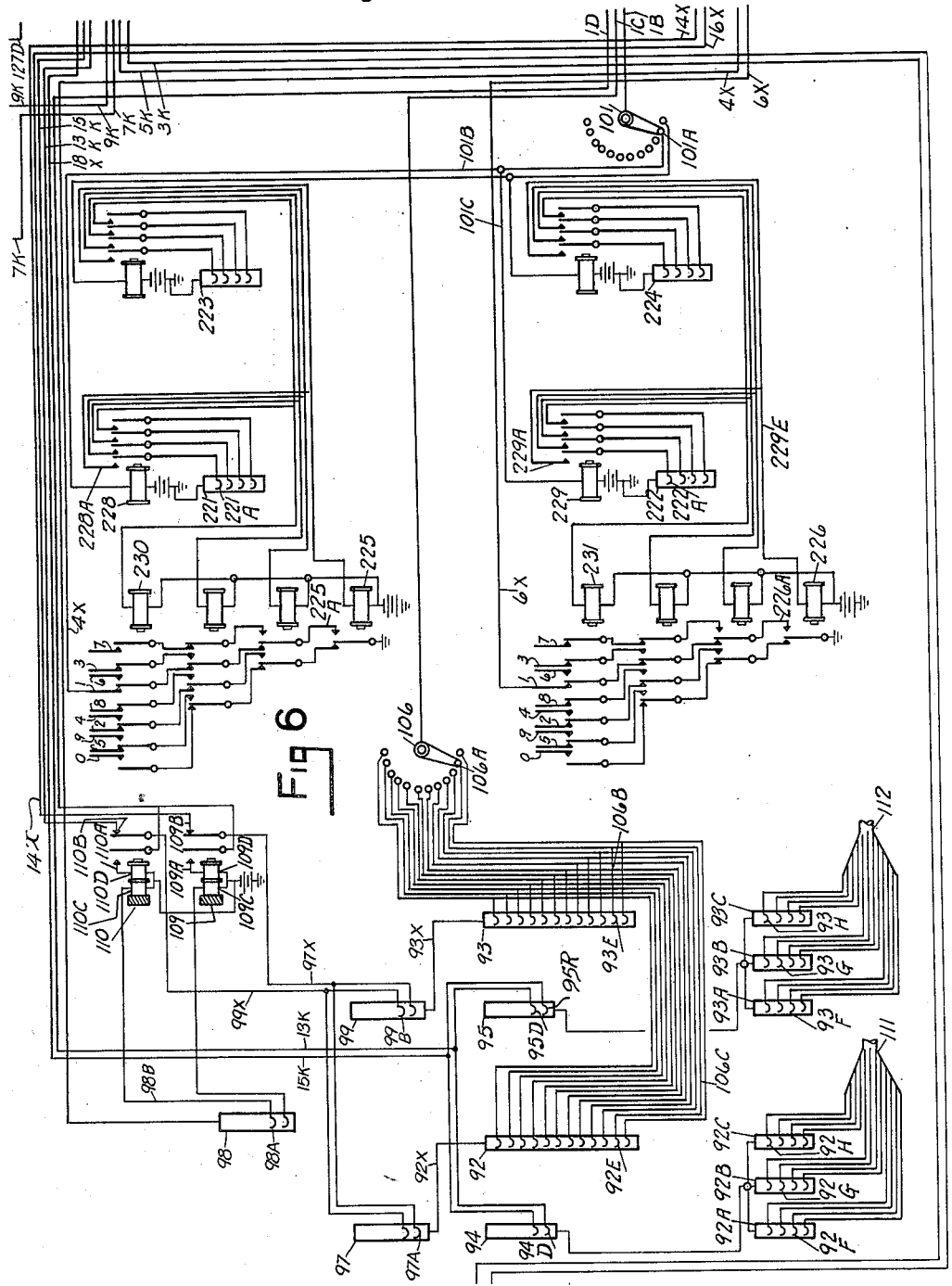
INVENTOR
Clyde Smith

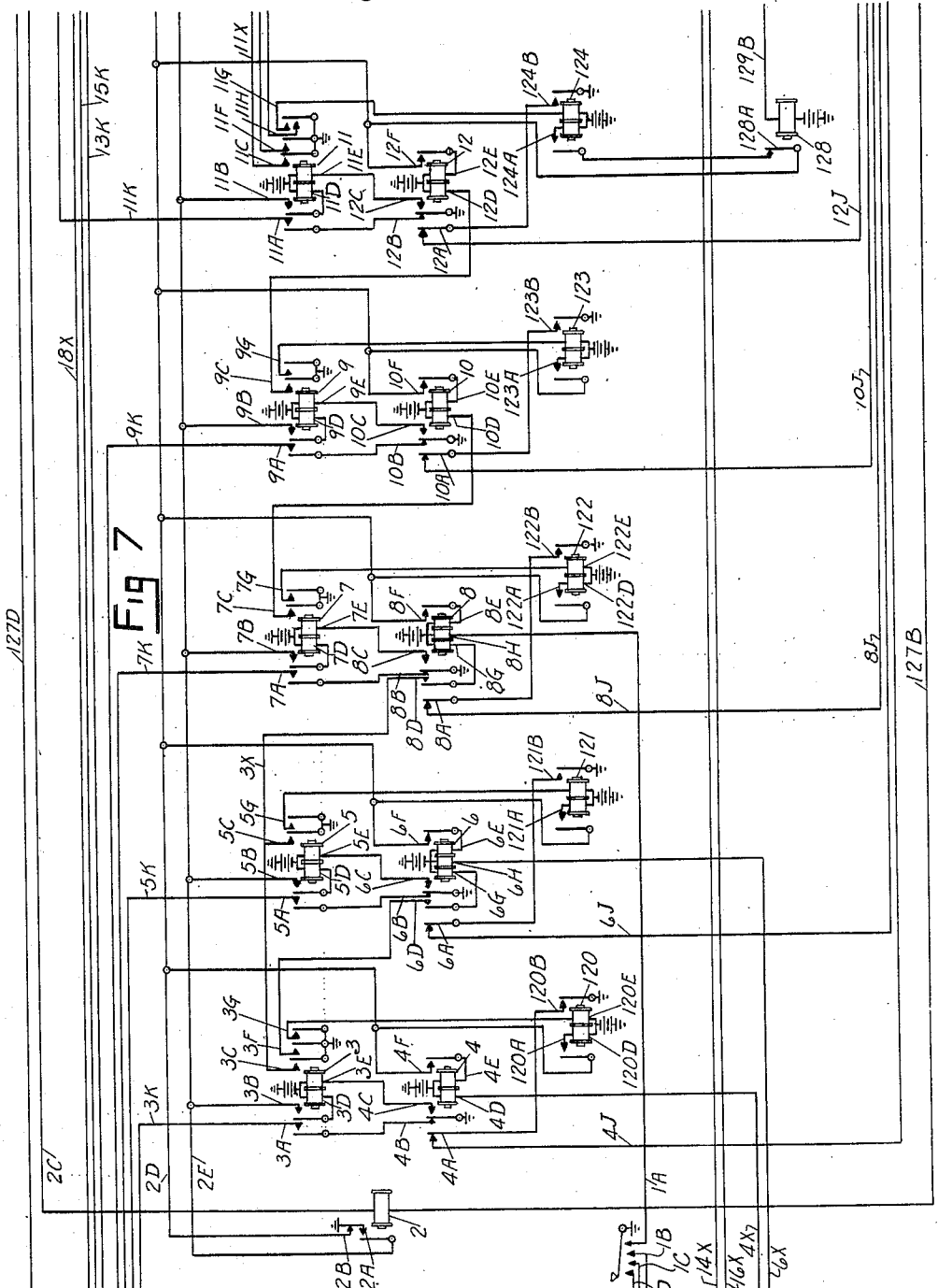

Oct. 24, 1939.  C. SMITH  2,176,933
CALCULATING AND ACCOUNTING MACHINE
Original Filed March 30, 1933  49 Sheets-Sheet 7
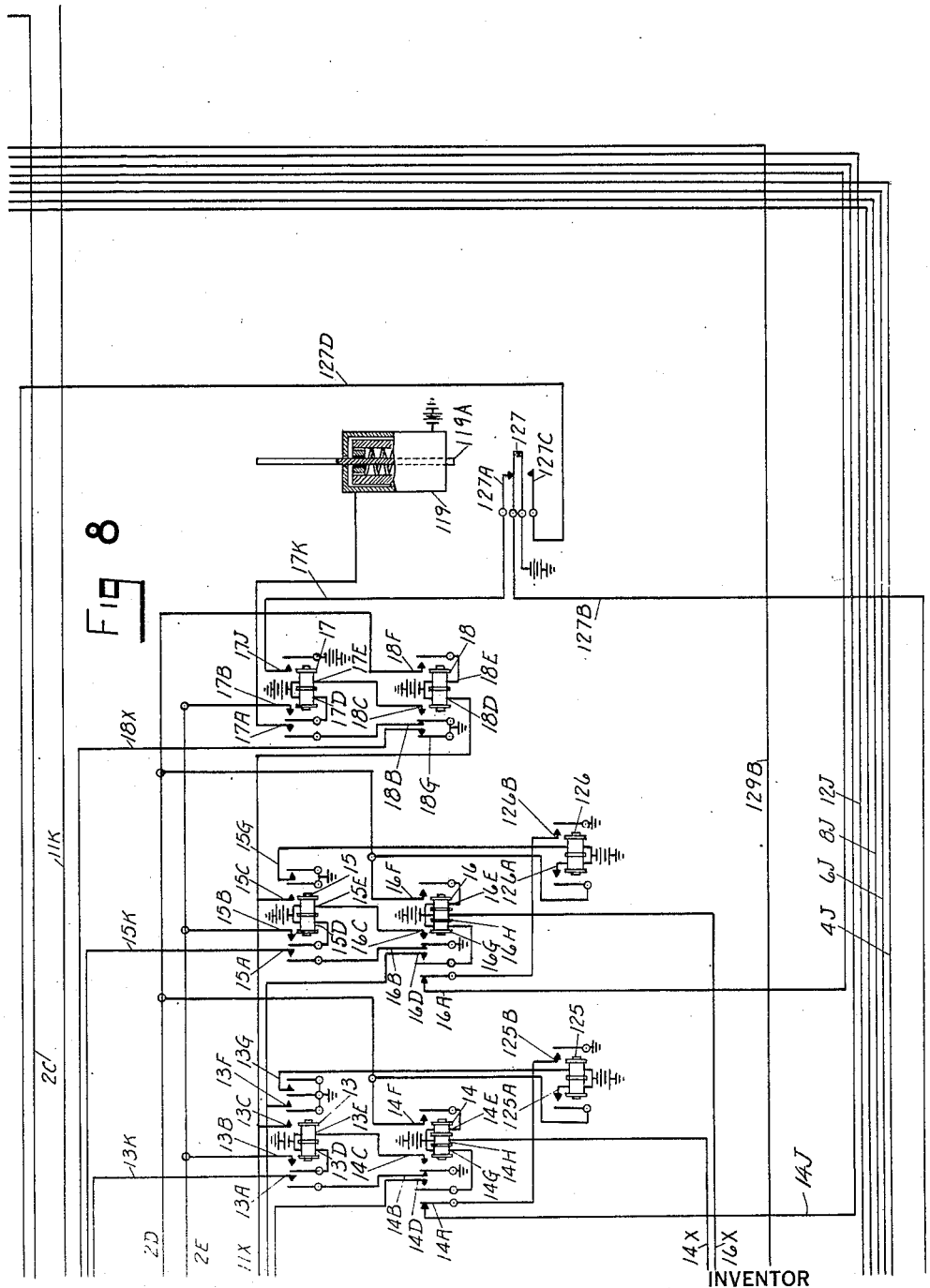
INVENTOR
Clyde Smith Oct. 24, 1939.   C. SMITH   2,176,933
CALCULATING AND ACCOUNTING MACHINE
Original Filed March 30, 1933   49 Sheets-Sheet 8
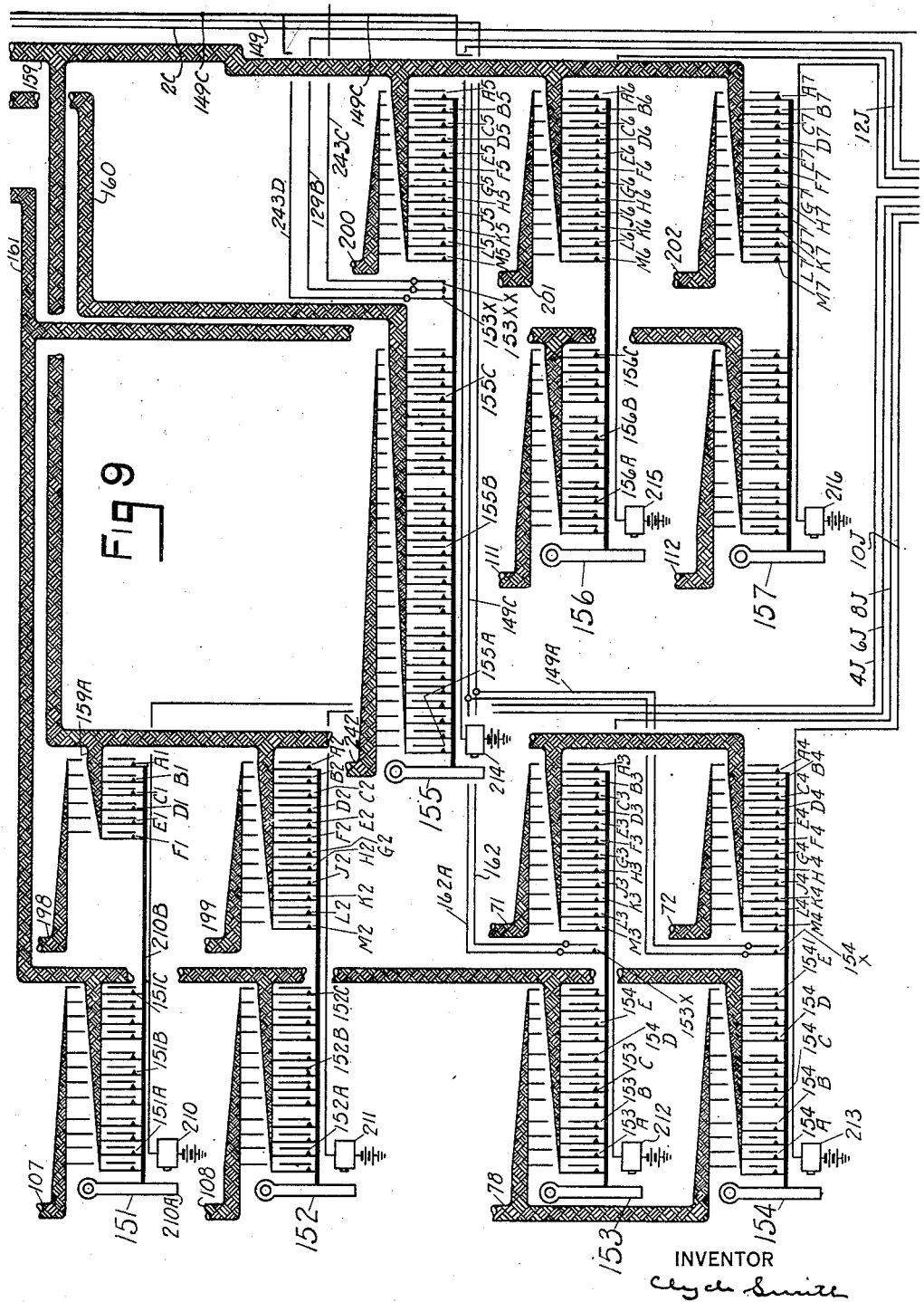
INVENTOR
Clyde Smith

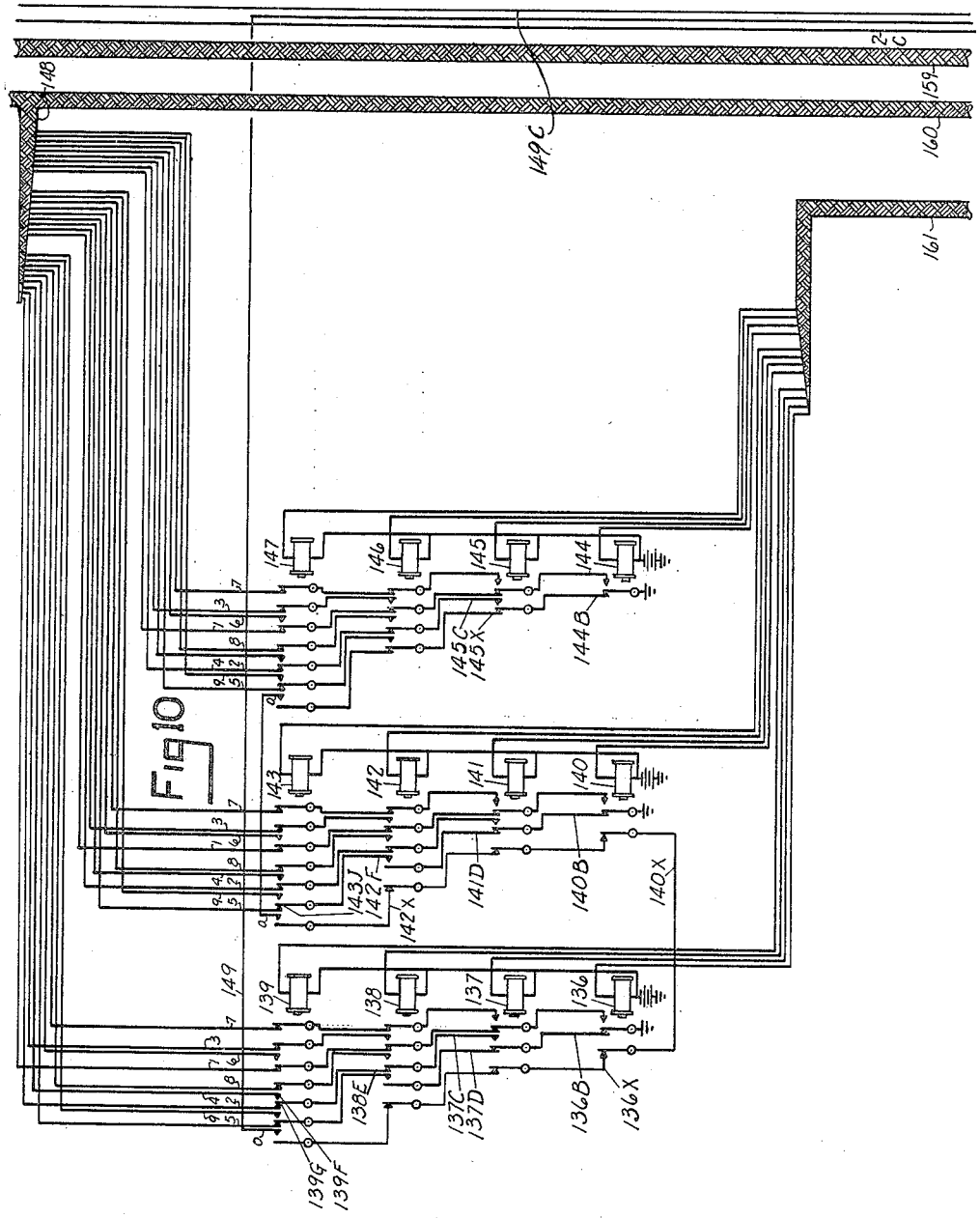

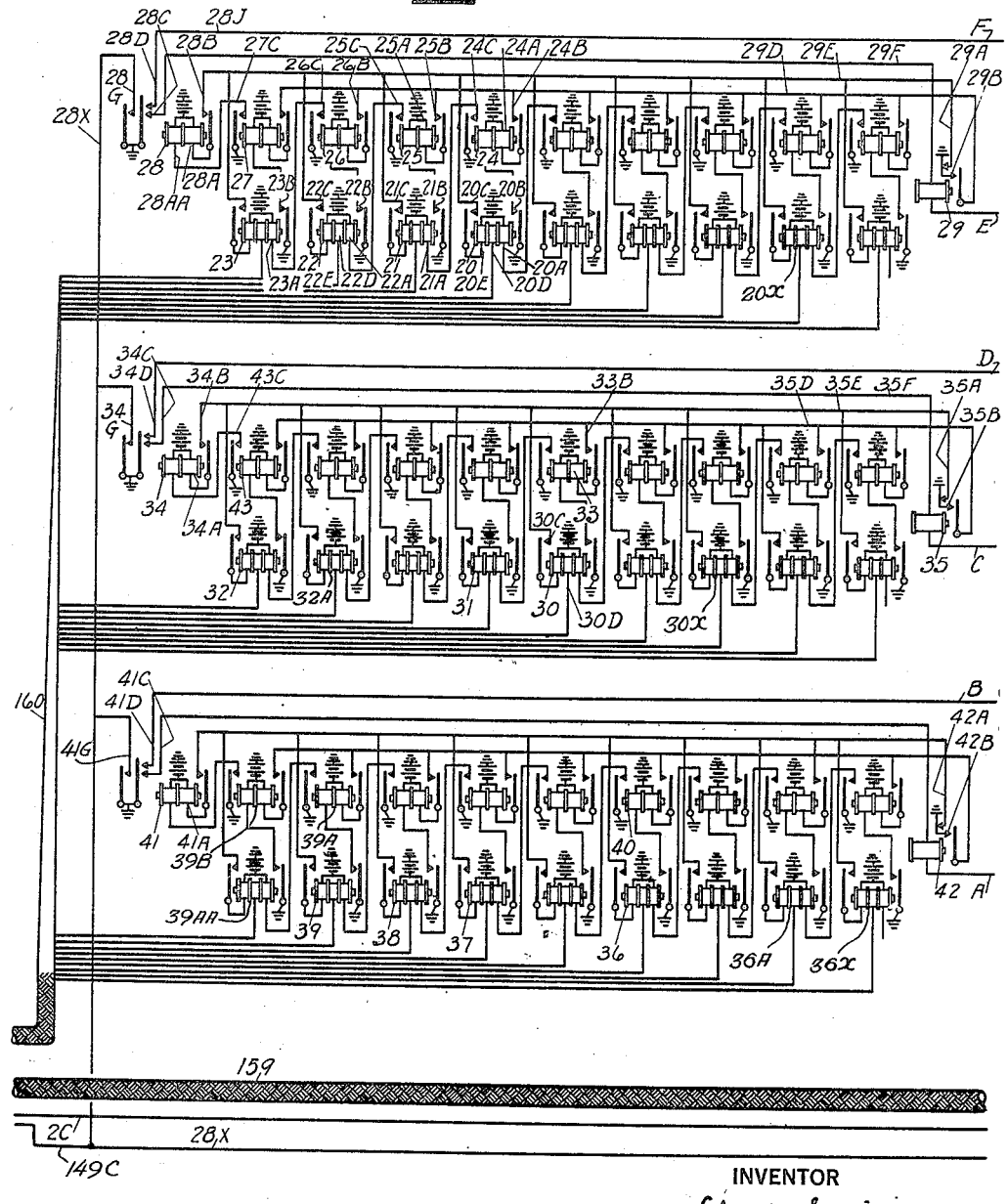

Oct. 24, 1939.   C. SMITH   2,176,933
CALCULATING AND ACCOUNTING MACHINE
Original Filed March 30, 1933   49 Sheets—Sheet 11

INVENTOR
Clyde Smith

Oct. 24, 1939.   C. SMITH   2,176,933
CALCULATING AND ACCOUNTING MACHINE
Original Filed March 30, 1933   49 Sheets-Sheet 12

INVENTOR
Clyde Smith

Oct. 24, 1939.  C. SMITH  2,176,933
CALCULATING AND ACCOUNTING MACHINE
Original Filed March 30, 1933  49 Sheets-Sheet 14

INVENTOR
Clyde Smith

Oct. 24, 1939.  C. SMITH  2,176,933
CALCULATING AND ACCOUNTING MACHINE
Original Filed March 30, 1933   49 Sheets-Sheet 16

INVENTOR.
Clyde Smith

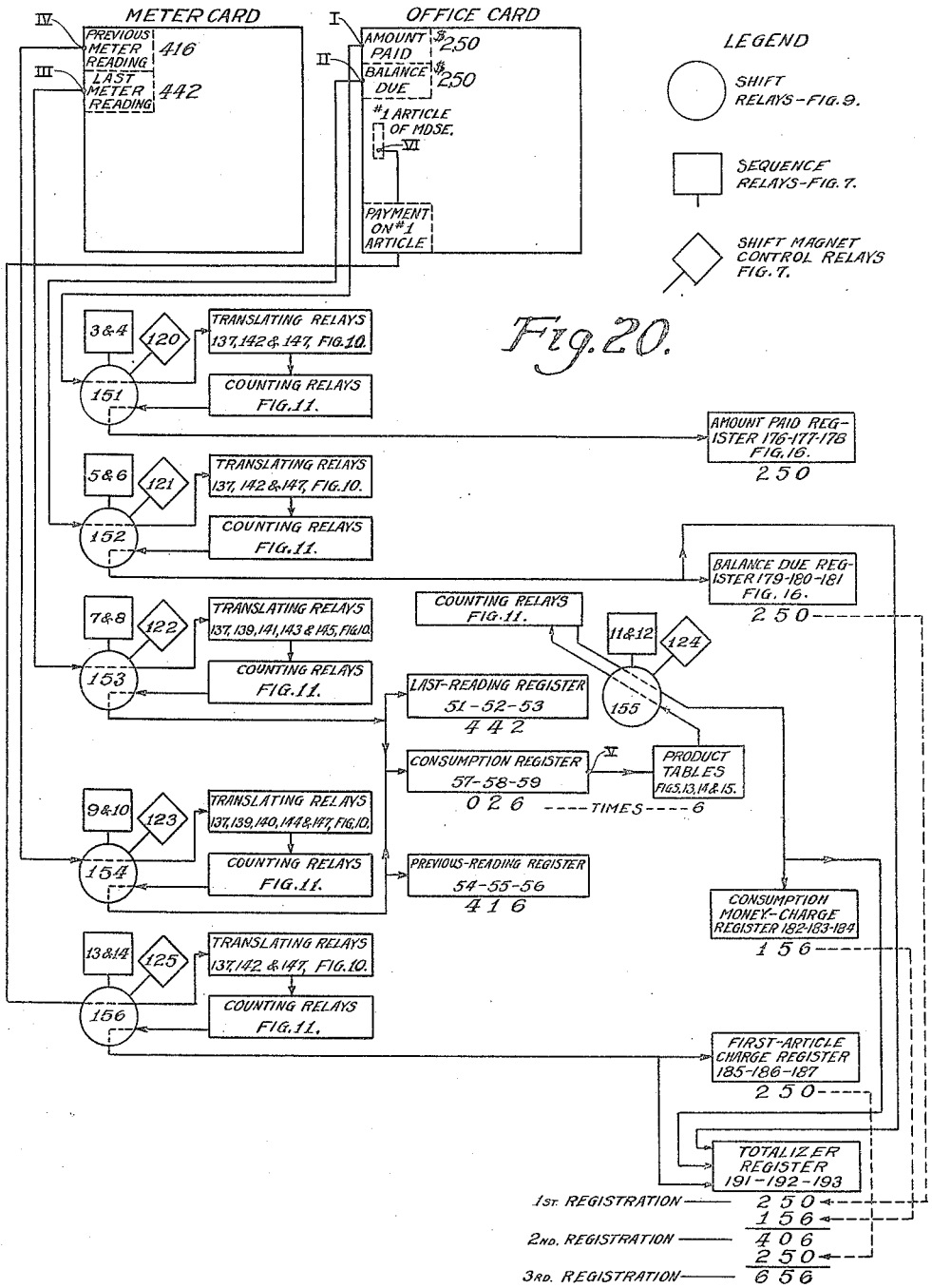

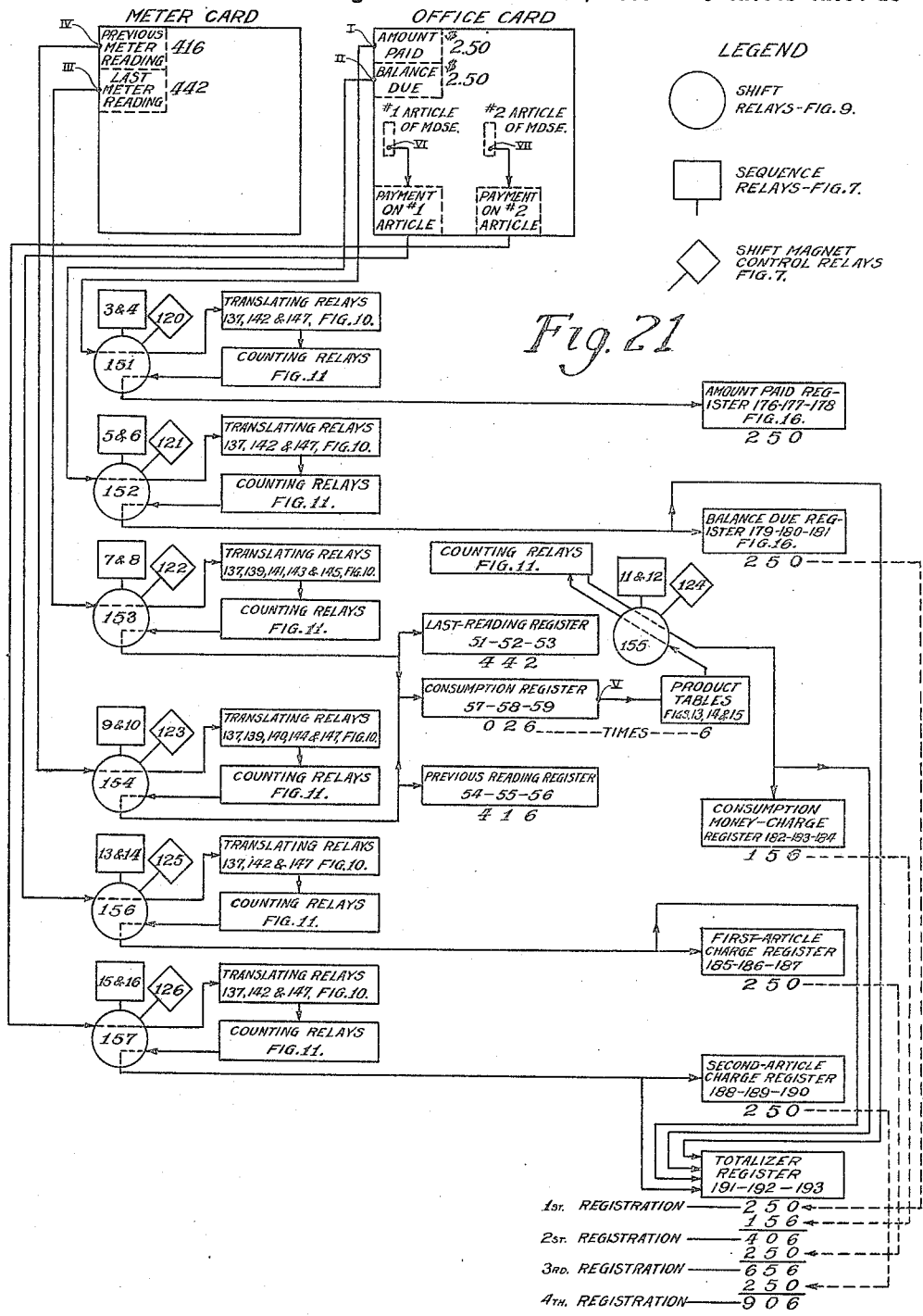

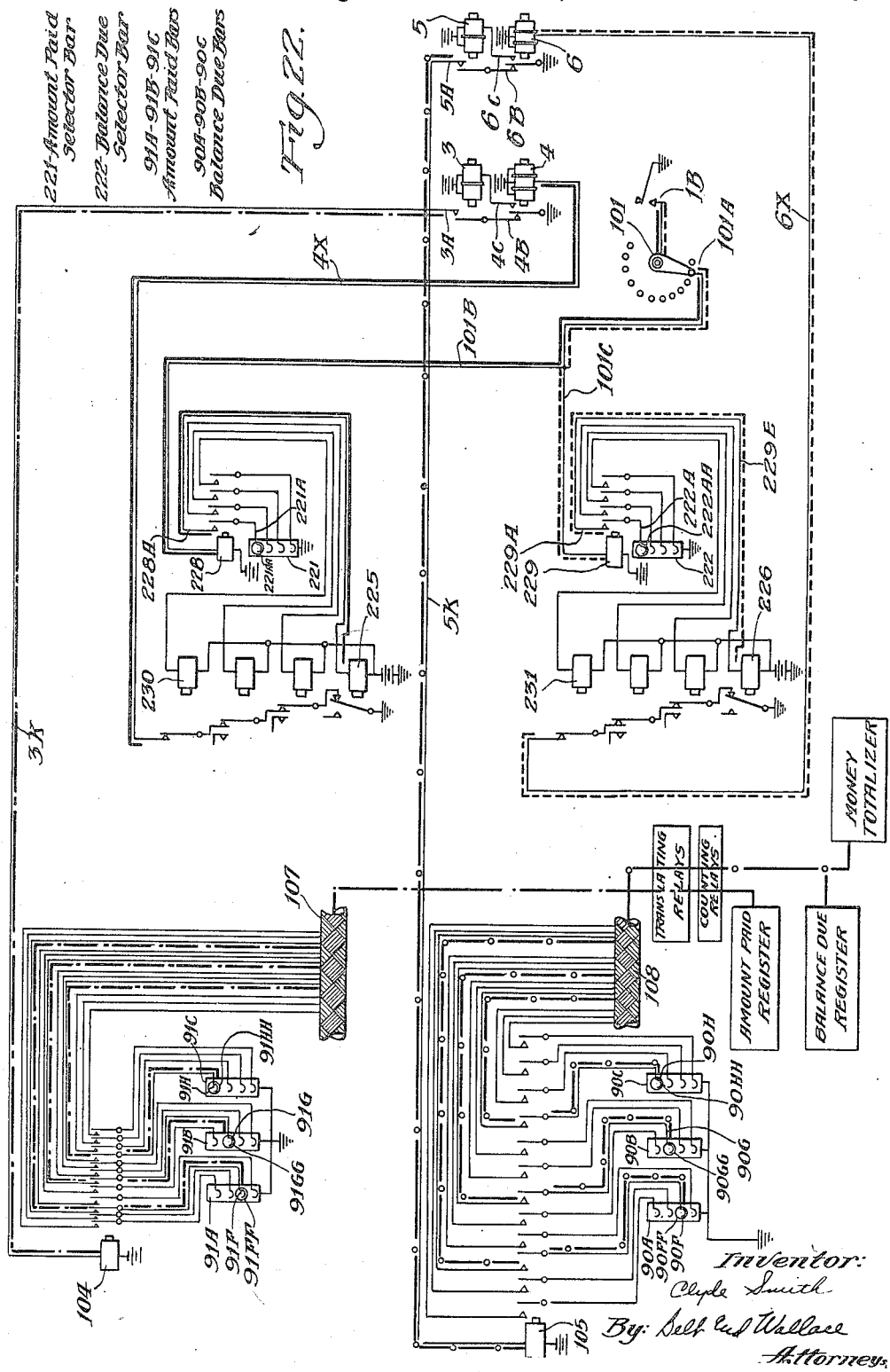

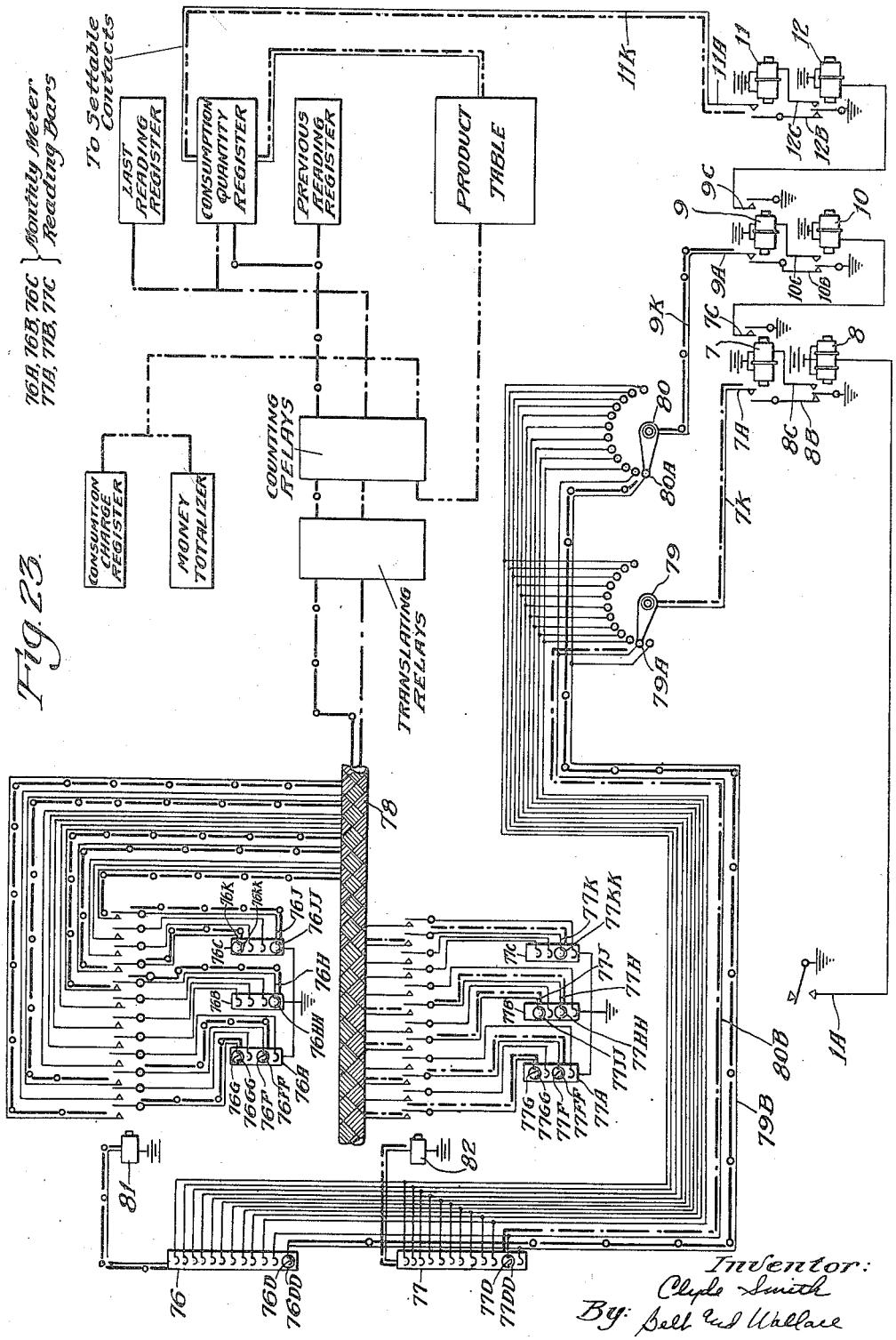

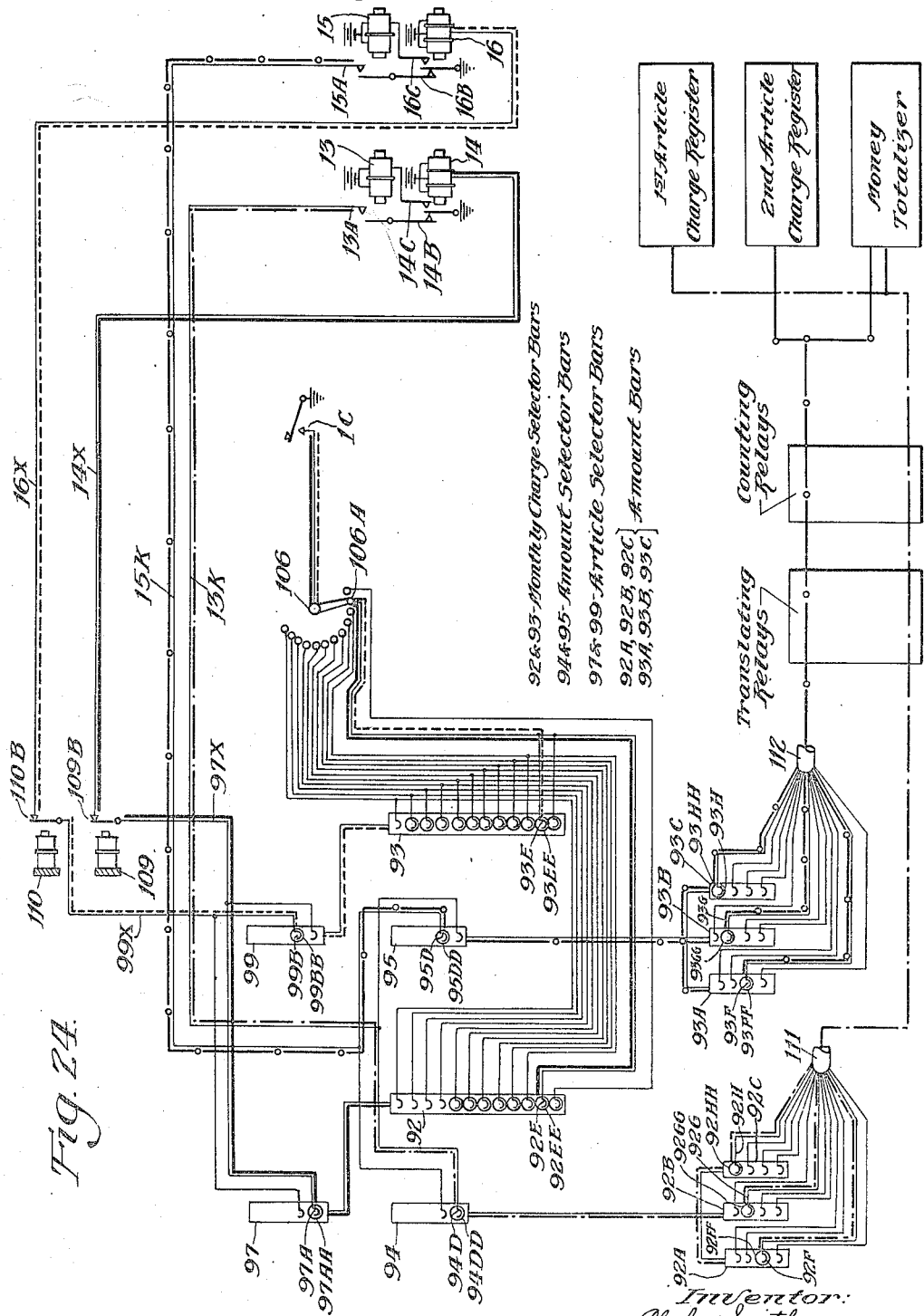

Oct. 24, 1939.                C. SMITH                 2,176,933
               CALCULATING AND ACCOUNTING MACHINE
         Original Filed March 30, 1933    49 Sheets-Sheet 22

FIG. 25.

Oct. 24, 1939.                    C. SMITH                    2,176,933
                    CALCULATING AND ACCOUNTING MACHINE
              Original Filed March 30, 1933    49 Sheets-Sheet 26

FIG.29.

Oct. 24, 1939.   C. SMITH   2,176,933
CALCULATING AND ACCOUNTING MACHINE
Original Filed March 30, 1933   49 Sheets-Sheet 28

INVENTOR:
Clyde Smith,
By: Belt & Wallace
ATTORNEYS

Oct. 24, 1939.  C. SMITH  2,176,933
CALCULATING AND ACCOUNTING MACHINE
Original Filed March 30, 1933   49 Sheets-Sheet 29

INVENTOR:
Clyde Smith,
By: Belt & Wallace
ATTORNEYS

Oct. 24, 1939.                C. SMITH                        2,176,933
              CALCULATING AND ACCOUNTING MACHINE
            Original Filed March 30, 1933    49 Sheets-Sheet 30

FIG.33.

INVENTOR:
Clyde Smith,
By: Belt and Wallace
ATTORNEYS

Oct. 24, 1939. C. SMITH 2,176,933
CALCULATING AND ACCOUNTING MACHINE
Original Filed March 30, 1933 49 Sheets-Sheet 32

Oct. 24, 1939.     C. SMITH     2,176,933
CALCULATING AND ACCOUNTING MACHINE
Original Filed March 30, 1933    49 Sheets—Sheet 33

INVENTOR:
Clyde Smith,
By: Bell and Wallace
ATTORNEYS

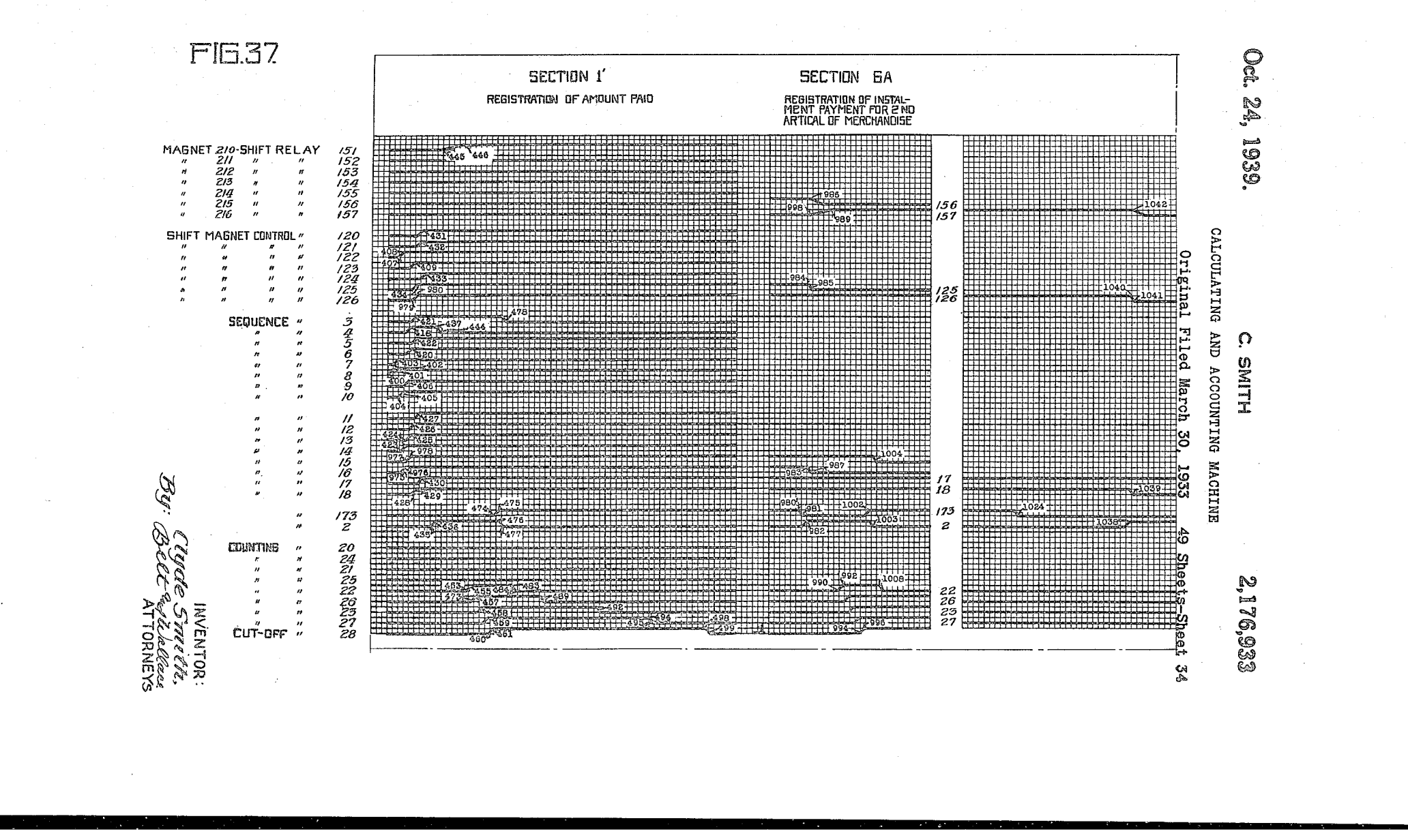

Oct. 24, 1939.  C. SMITH  2,176,933

CALCULATING AND ACCOUNTING MACHINE

Original Filed March 30, 1933   49 Sheets-Sheet 34

FIG.37

INVENTOR:
Clyde Smith.
By: Belt & Wallace
ATTORNEYS

Oct. 24, 1939.   C. SMITH   2,176,933
CALCULATING AND ACCOUNTING MACHINE
Original Filed March 30, 1933   49 Sheets-Sheet 35

INVENTOR:
Clyde Smith,
By: Belt and Wallace
ATTORNEYS

FIG.42.

Oct. 24, 1939.                 C. SMITH                    2,176,933
                    CALCULATING AND ACCOUNTING MACHINE
                 Original Filed March 30, 1933    49 Sheets-Sheet 41

Oct. 24, 1939.    C. SMITH    2,176,933
CALCULATING AND ACCOUNTING MACHINE
Original Filed March 30, 1933    49 Sheets-Sheet 43

Oct. 24, 1939.    C. SMITH    2,176,933
CALCULATING AND ACCOUNTING MACHINE
Original Filed March 30, 1933    49 Sheets-Sheet 44

INVENTOR:
Clyde Smith,
By: Belt and Wallace
ATTORNEYS

ENTRY OF NEGATIVE CARRY-OVER

Oct. 24, 1939.          C. SMITH                 2,176,933
              CALCULATING AND ACCOUNTING MACHINE
           Original Filed March 30, 1933    49 Sheets-Sheet 49

FIG.52.

| Label | | Number |
|---|---|---|
| MAGNET 212-SHIFT RELAY | | 153 |
| " 213 " " | | 154 |
| " 214 " " | | 155 |
| SHIFT MAGNET CONTROL | | 122 |
| " " " | | 123 |
| " " " | | 124 |
| SEQUENCE | " | 7 |
| " | " | 8 |
| " | " | 9 |
| " | " | 10 |
| " | " | 11 |
| " | " | 12 |
| " | " | 17 |
| " | " | 18 |
| COUNTING | " | 23 |
| " | " | 27 |
| CUT-OFF | " | 28 |
| STEPPING | " | 29 |
| COUNTING | " | 32 |
| " | " | 43 |
| CUT-OFF | " | 34 |
| STEPPING | " | 35 |
| COUNTING | " | 39A |
| " | " | 39B |
| CUT-OFF | " | 41 |
| STEPPING | " | 42 |
| " | " | 173 |
| " | " | 2 |
| TRANSLATING | " | 136 |
| " " | " | 140 |
| " " | " | 144 |
| CLUTCH | " | 51A |
| " | " | 60A |
| " | " | 52A |
| " | " | 61A |
| " | " | 53A |
| " | " | 62A |
| " | " | 54A |
| " | " | 63A |
| " | " | 55A |
| " | " | 64A |
| " | " | 56A |
| " | " | 65A |
| RELAY | " | 228 |
| " | " | 229 |
| " | " | 81 |
| " | " | 82 |
| " | " | 128 |
| " | " | 119 |
| " | " | 70 |
| " | " | 69 |
| " | " | 194 |
| " | " | 195 |
| " | " | 196 |

INVENTOR:
By: Clyde Smith,
    Belt and Wallace
         ATTORNEYS

Patented Oct. 24, 1939

2,176,933

UNITED STATES PATENT OFFICE

2,176,933

CALCULATING AND ACCOUNTING MACHINE

Clyde Smith, Hopkinsville, Ky., assignor to Addressograph-Multigraph Corporation, Cleveland, Ohio, a corporation of Delaware Application March 30, 1933, Serial No. 663,454
Renewed June 19, 1939

24 Claims. (Cl. 235—61.6)

The object of the invention as a whole is to provide a completely automatic machine for computing amounts to be charged for commodities measured by meter, as electricity, gas, and water. The registrations and computations are for the most part from cards perforated according to meter readings and amounts to be registered in relation to installment charges for merchandise. As not essential to the inventive features of the machine, or because means are implied in the devices described, the specification does not contain descriptions of elements that would be included in a commercial machine of the kind, such as card-feeding and printing mechanisms. The specification is complete as to the features of an operating machine embodying the inventive elements here first described, though some of these features have been described and claimed in applications for patents heretofore submitted by myself; notably: Serial No. 535,069, filed May 4, 1931; Serial No. 563,572, filed September 18, 1931; Serial No. 572,075, filed October 30, 1931; Serial No. 600,319, filed March 9, 1932; and Serial No. 614,411, filed May 31, 1932.

An object of the invention is the improvement of the means for selecting for registration the monthly installment charges for merchandise in large variety. In previous application Serial No. 563,572 were described the means for selecting articles (or classes) of merchandise for such installment charges, which involved the permanent assignment for each article of a set of contact bars and fingers for the figures of the recurring charge and also a set of two bars and their fingers for each month. Selections may be made among the amount bars and the monthly bars in such wise that no greater number of sets of these need be provided than the maximum number of articles that may be charged to a single customer at one time. Of these two plans, the latter will be the more economical when there is much variety of merchandise on sale. The selective principle is one that may well be made useful for other purposes.

A further object is to provide for making noneffective, through a special perforation on occasion, perforations which may have been made in advance for successive installment payments, when the obligation at any time is cancelled. This principle likewise is one of wider useful application.

Another object of the invention is illustrated in the special means for registering partial payments on account together with the balance that may be due after receipt of such a payment. The means described for the registration of such figures according to card perforations are virtually the same as have been described for other like registrations, but the special selective means may provide adequate capacity, in excess of the normal operating requirements, without provision beyond the practical needs to the extreme possible or theoretical demand.

Another object of the invention is to provide means for registering the proper consumption quantity when a meter newly installed stands at its zero position, or a meter in operation runs to or by its full zero position, as it may when it has made a round of its capacity, say 9999.

In this specification are described the connections of equipment for a conventional four-unit numerical code in new relations to such registering control means as I have described in previous applications, notably counting relays and shift relays, and in new multiple relations for selection.

It may be here observed that, as in previous applications, the card for controlling a succession of operative actions is placed in a standard stationary position, and all contacts through perforations are physically effected at one time, to be electrified in a predetermined order, without idling or cycle-completing intervals between the actions due from the several sets of closed contacts. With circuits controllable by added perforations, selective or cancelling, cards may be repeatedly used for successions of changing conditions and operations; they need not be sorted, nor need those with superfluous perforations be discarded.

The various objects of the invention are effected by the mechanisms and circuits illustrated in the accompanying drawings.

Figure 1 is an outline of a meter card for twelve months, with perforations for monthly selections and for meter readings in code of January and February. The bars are shown in dotted outline for twelve months.

Figure 2 is a similar outline of an office card, with a perforation for selecting the present month, on which a partial amount paid and the balance due on the previous month's bill are to be registered. Perforations appear in code for these two months, also for two articles of merchandise, and for the monthly payment due on each such article through a series of months represented by a series of single perforations. A single perforation appears on a cancellation bar for voiding the advance perforations for one of the series.

Figure 3 is a plan view of registering and associated driving wheels for displaying the last reading and the previous reading of the meter, and their difference, the consumption quantity.

Figure 5 shows bars and fingers for the amount paid and balance due, as in the card of Figure 2, and monthly selector switches.

Figure 6 shows bars and fingers for selecting bars for registering the amount paid and balance due and monthly installment charges on merchandise, and for cancelling future installment charges.

Figures 7 and 8 show the sequence relays.

Figure 9 shows seven shift relays. These serve for connecting in full or selective course the circuits from the contact fingers to the counting and carry-over relays, in order to complete operating circuits to the members of sundry registers.

Figure 10 shows translating relays, for translating the code perforations in the cards into true digital representation for the due energization of counting relays.

Figure 11 shows the three groups of counting relays, for hundreds, tens, and units, with their associated stepping relays. According to the numerical selection of counting relays by the electrification of contact fingers or contact-closing wheels of registers, these operate in combination with their stepping relays to advance the seven sets of number wheel registers and with them certain subtractive and totalizing registers.

Figure 12:
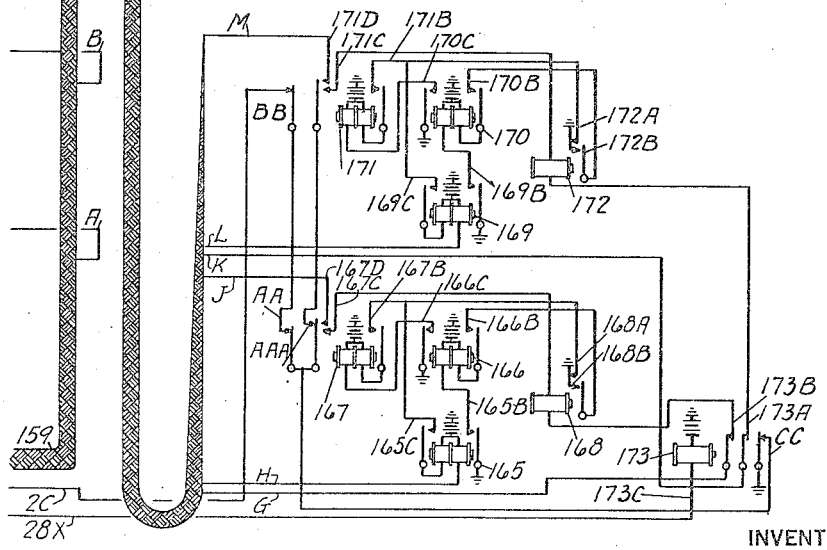

Figure 12 shows a set of carry-over relays, effective for tens and hundreds number wheels on two sets of registers on which carry-overs may be required.

Figure 13:
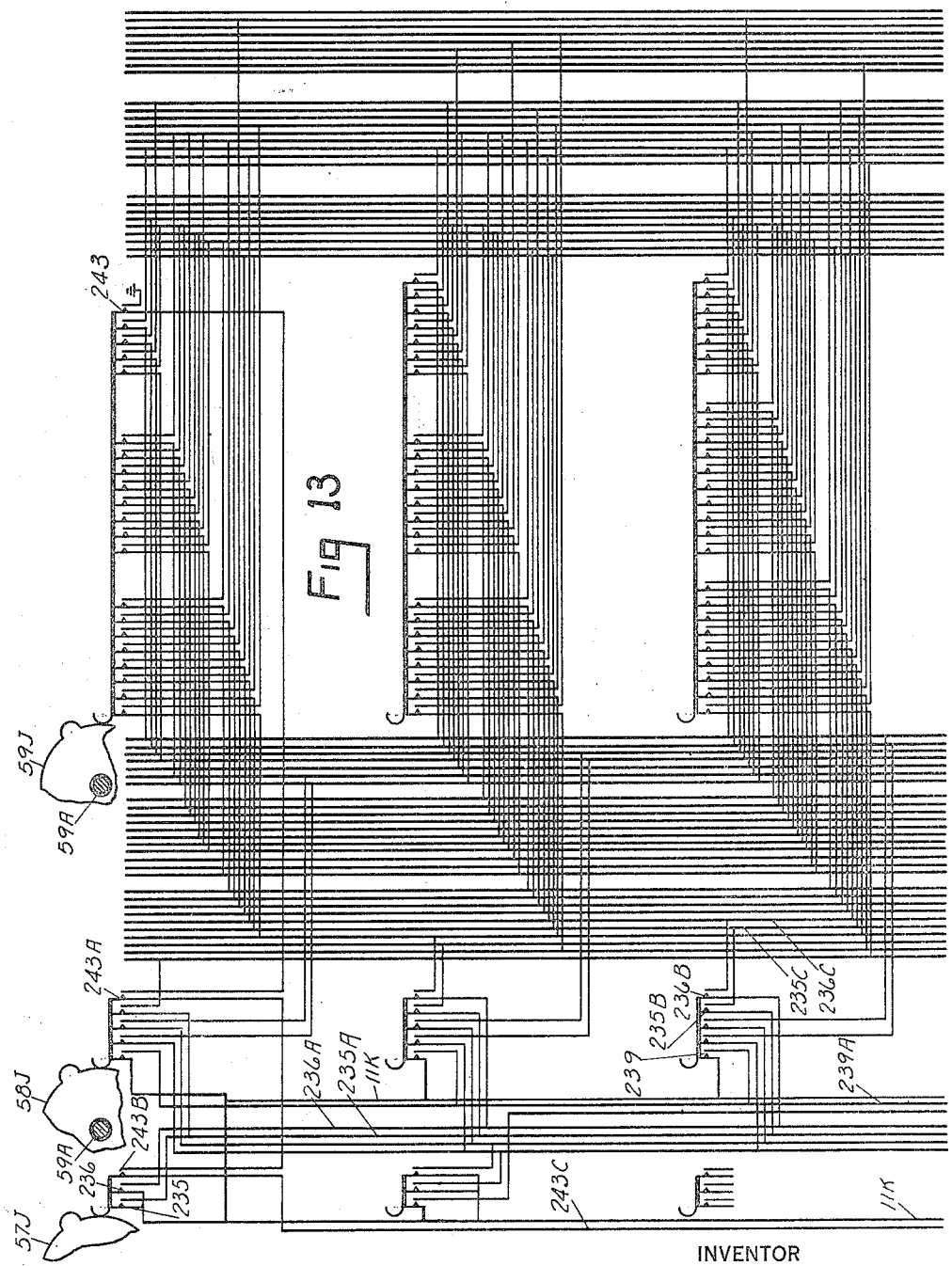
Figure 14:
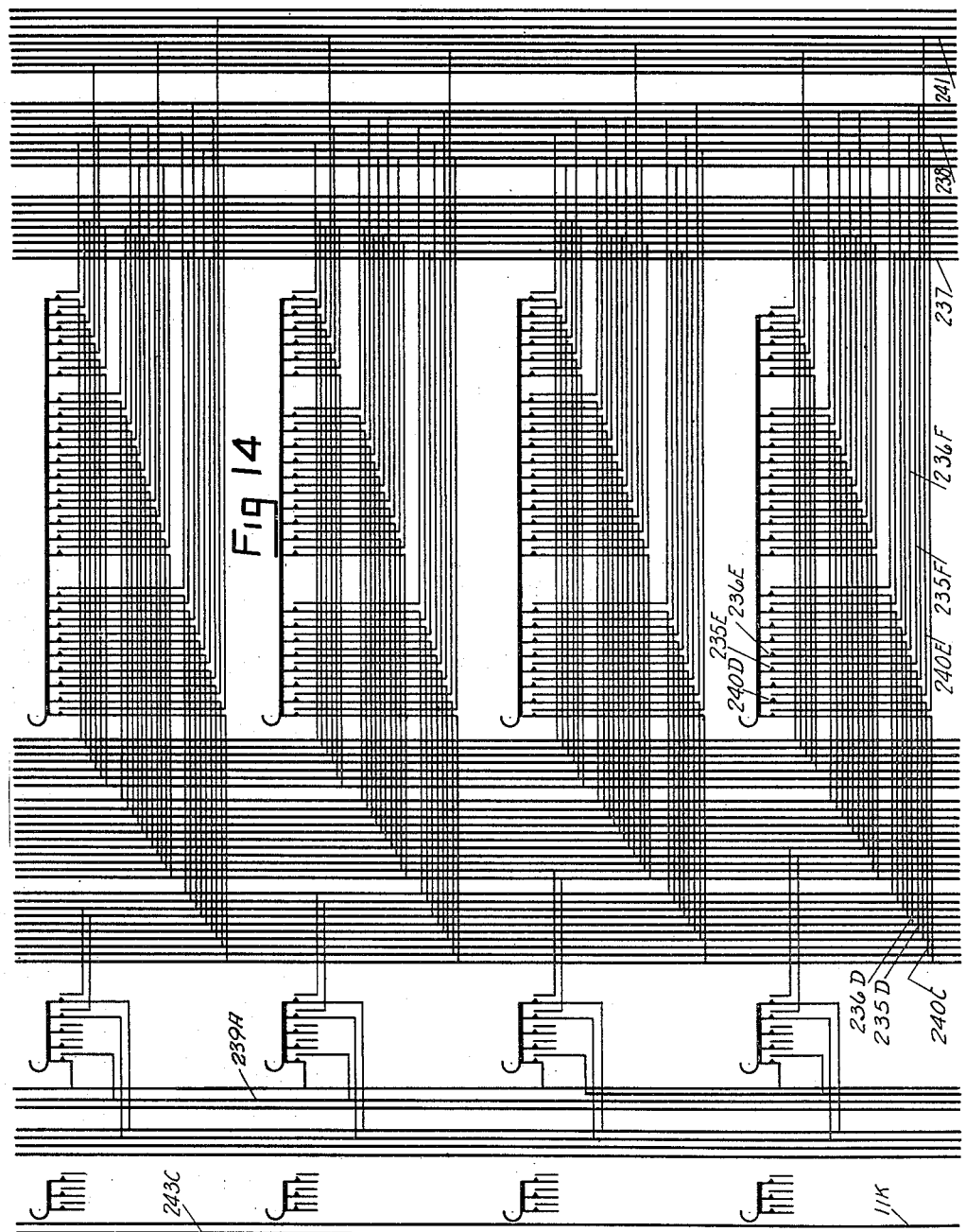
Figure 15:
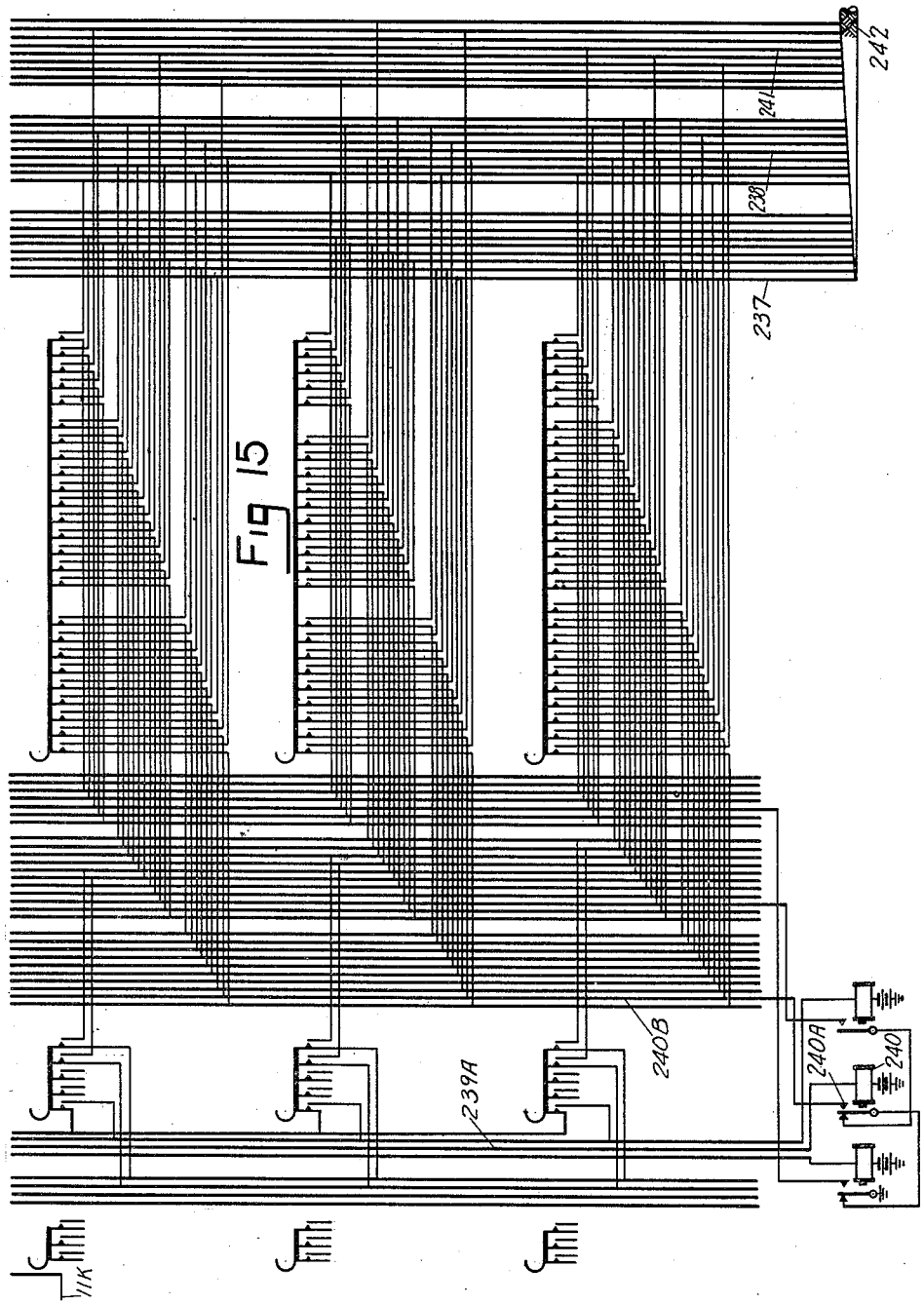

Figures 13, 14, and 15 show a systematic arrangement of circuits for direct registration of the money charge from the multiplication of the consumption quantity by a given rate or composite of rates.

Figure 16:
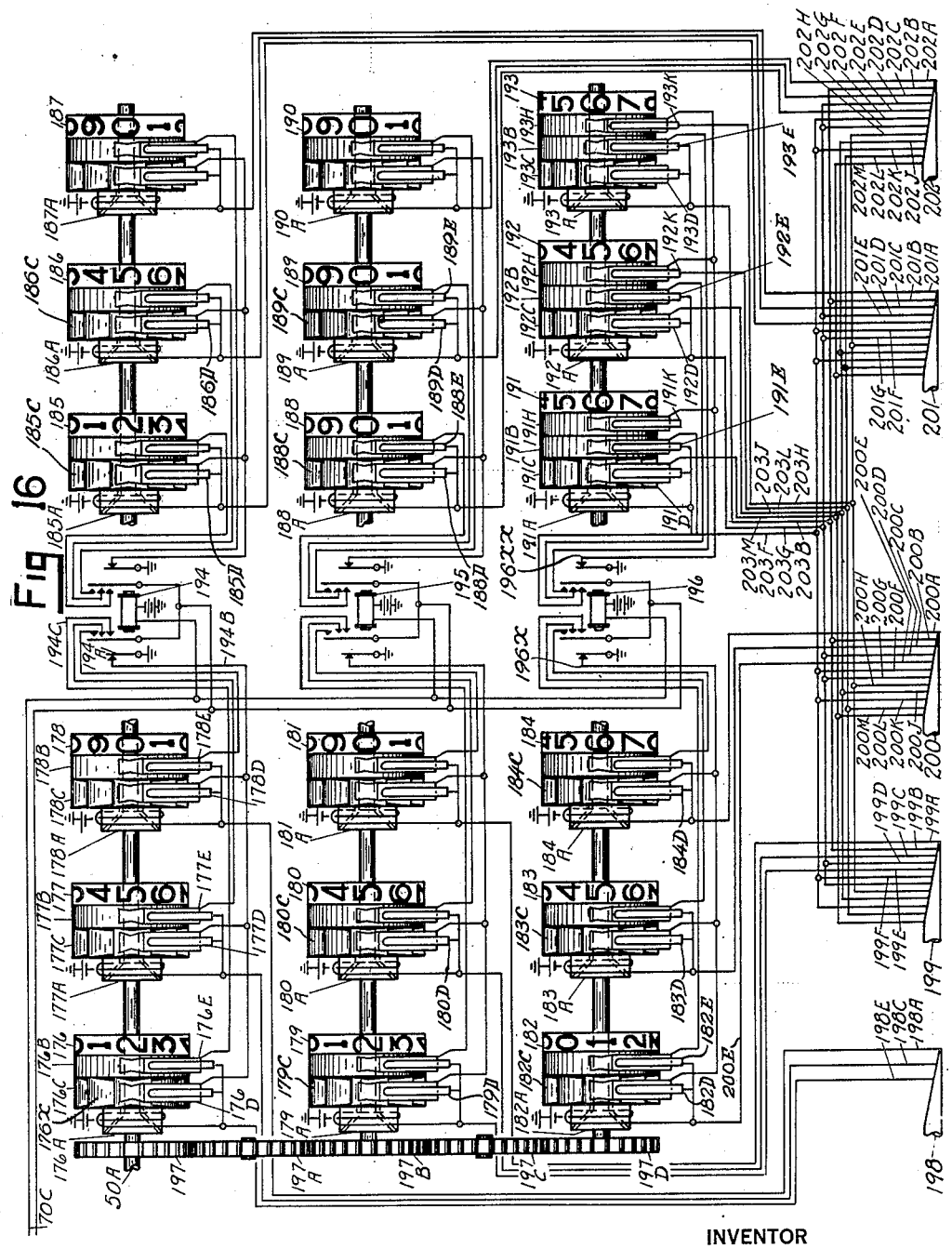

Figure 16 is a plan view of the registers for the amount paid, balance due, consumption, money charge, separate charges for two articles of merchandise, and a total.

Figure 17:
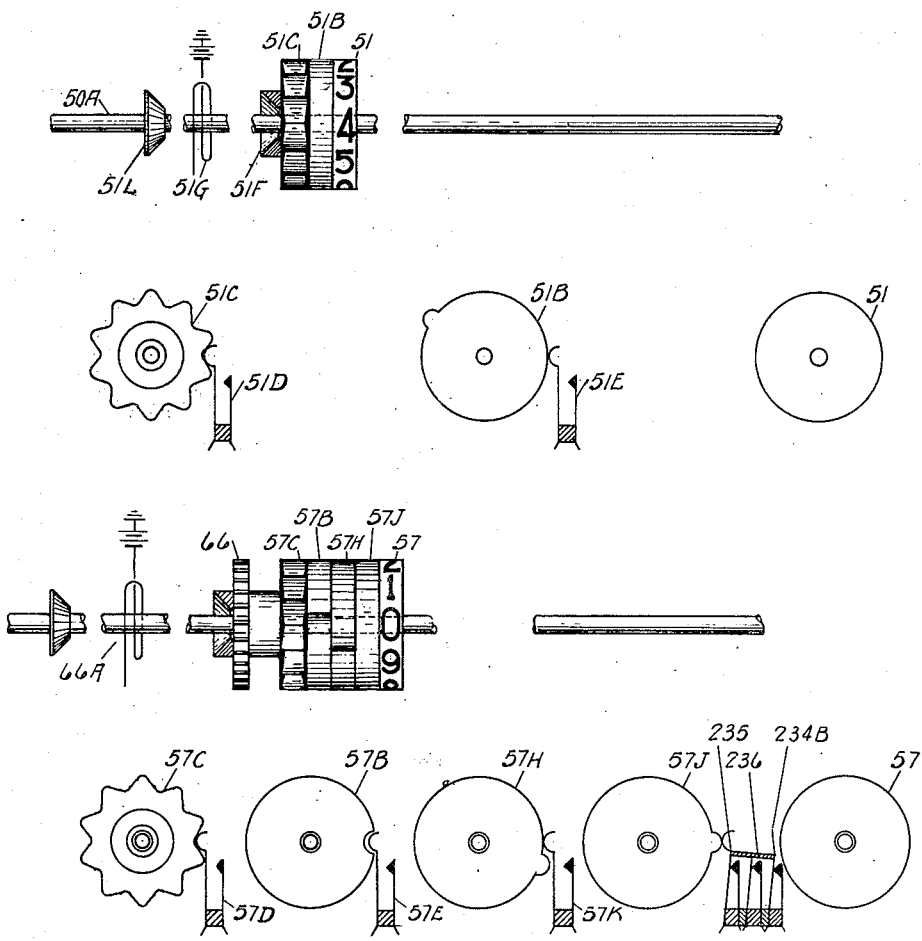
Figure 26:
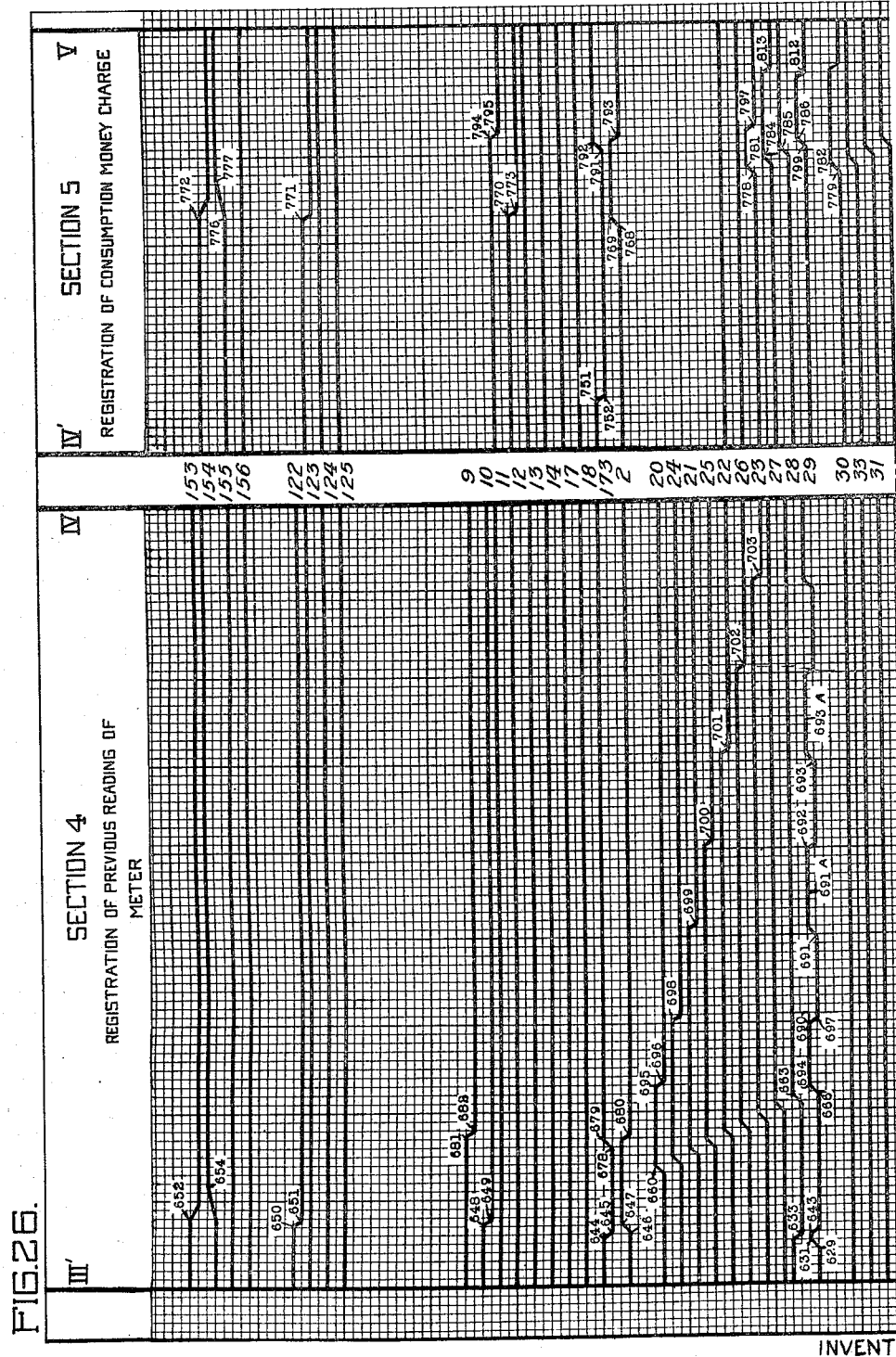
Figure 27:
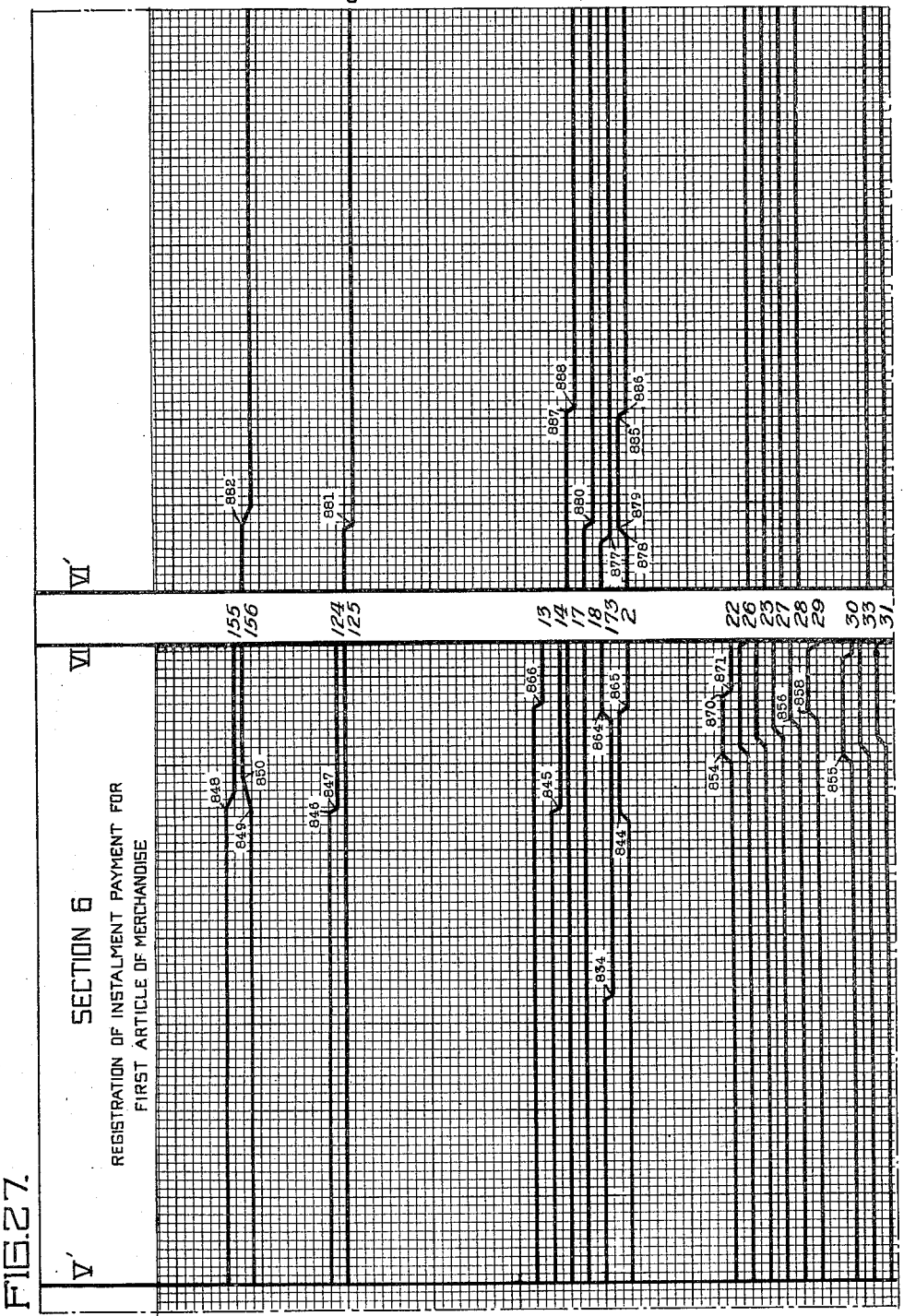
Figure 28:
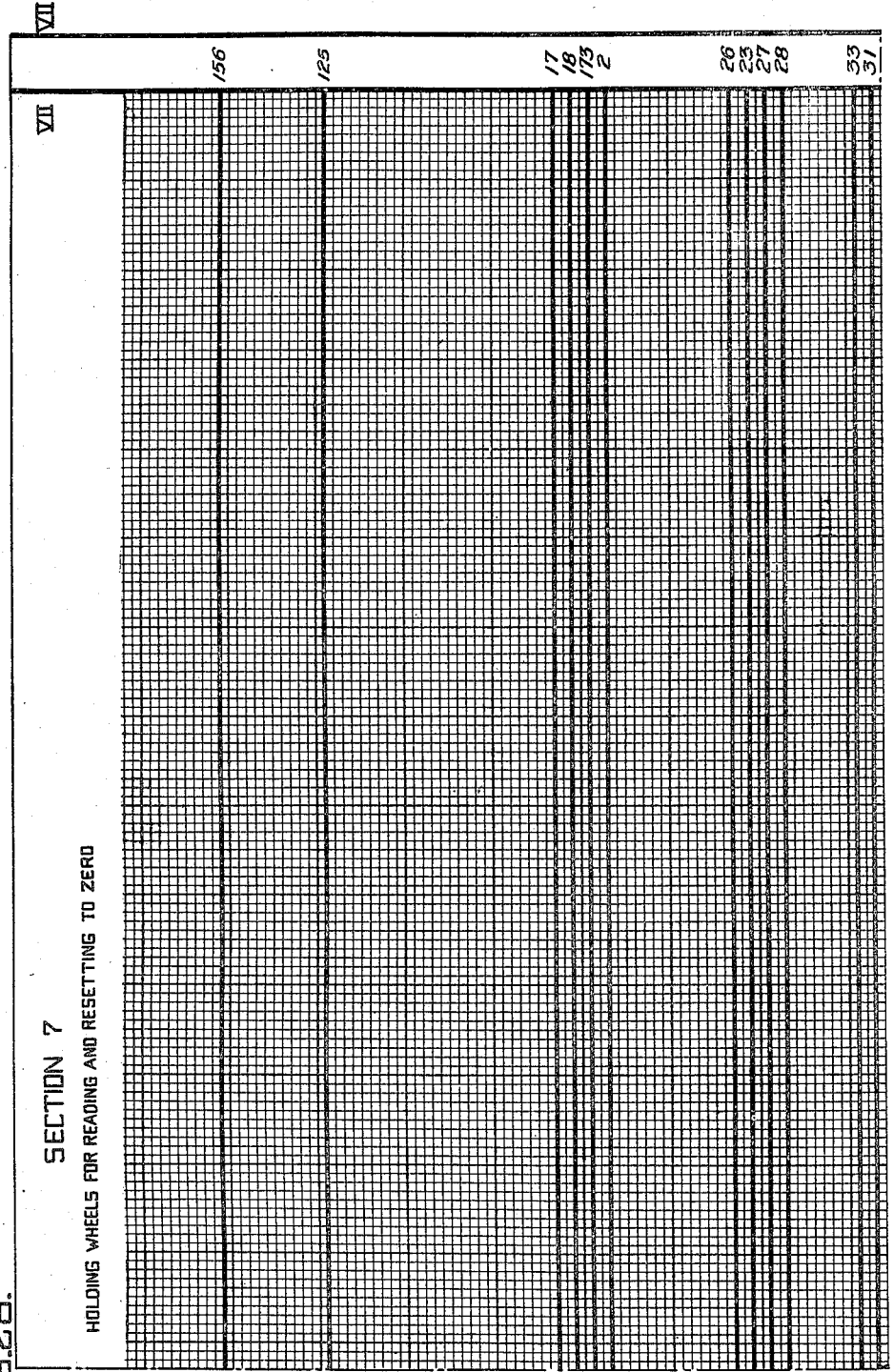
Figure 30:
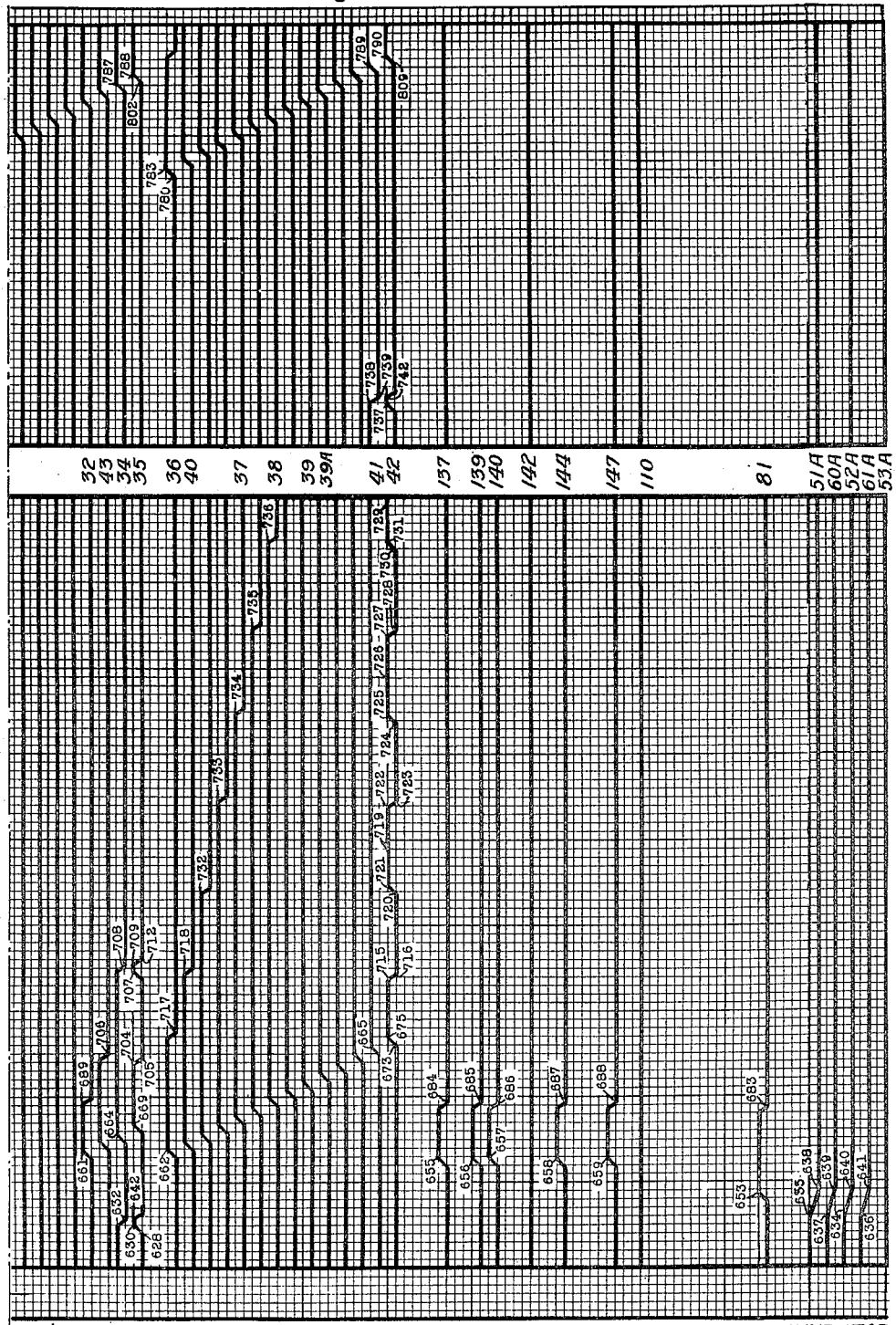
Figure 31:
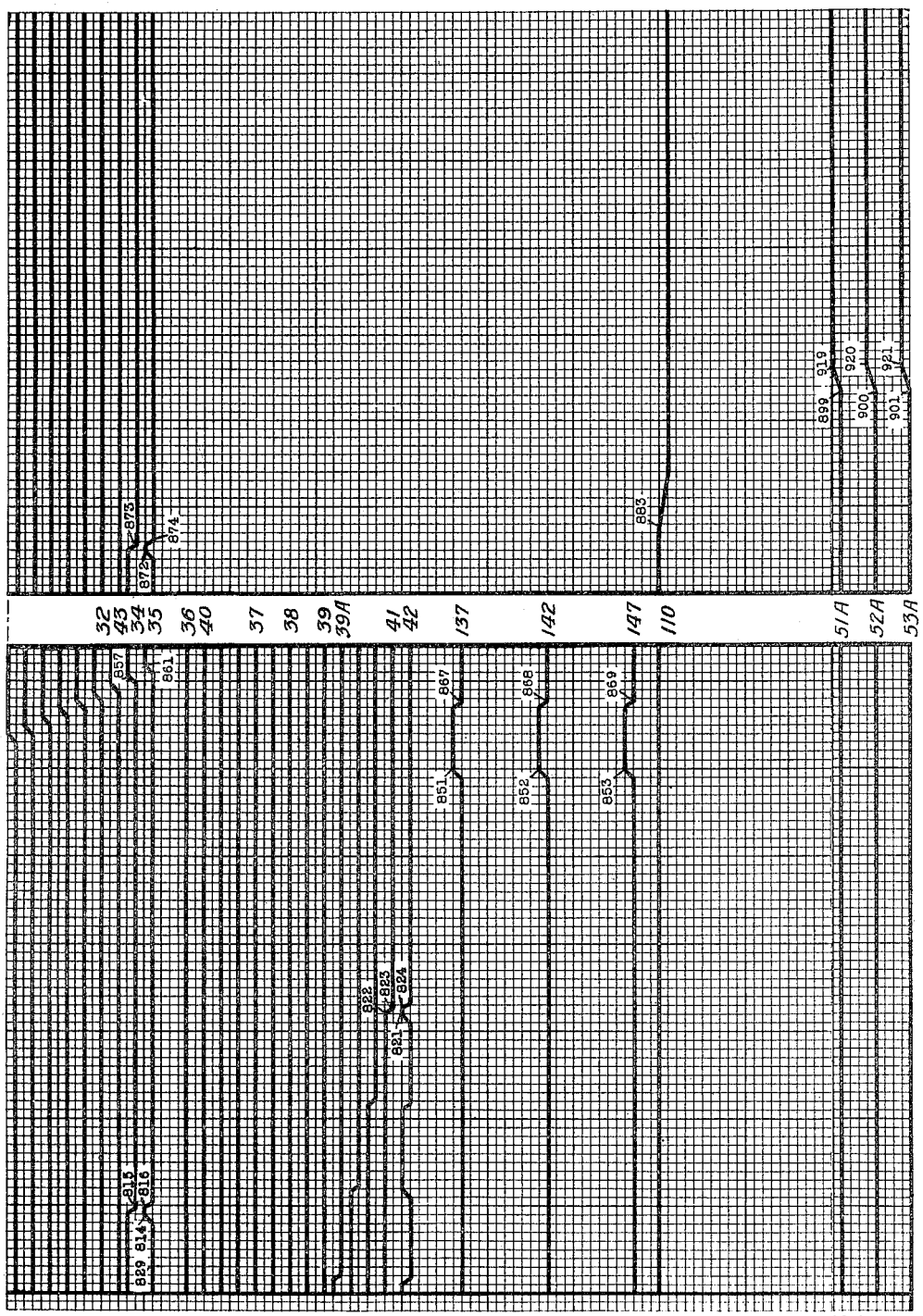
Figure 32:
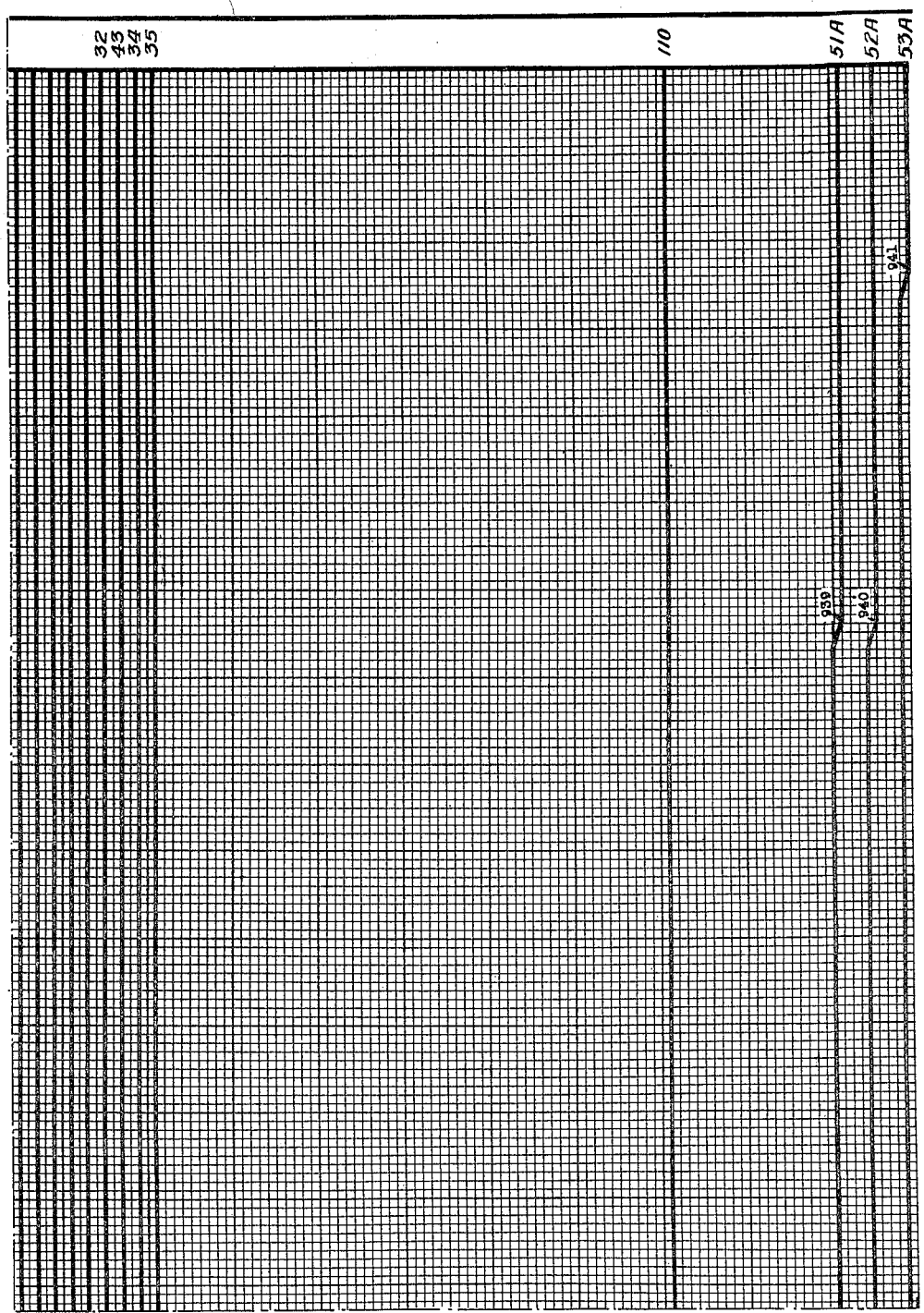
Figure 34:
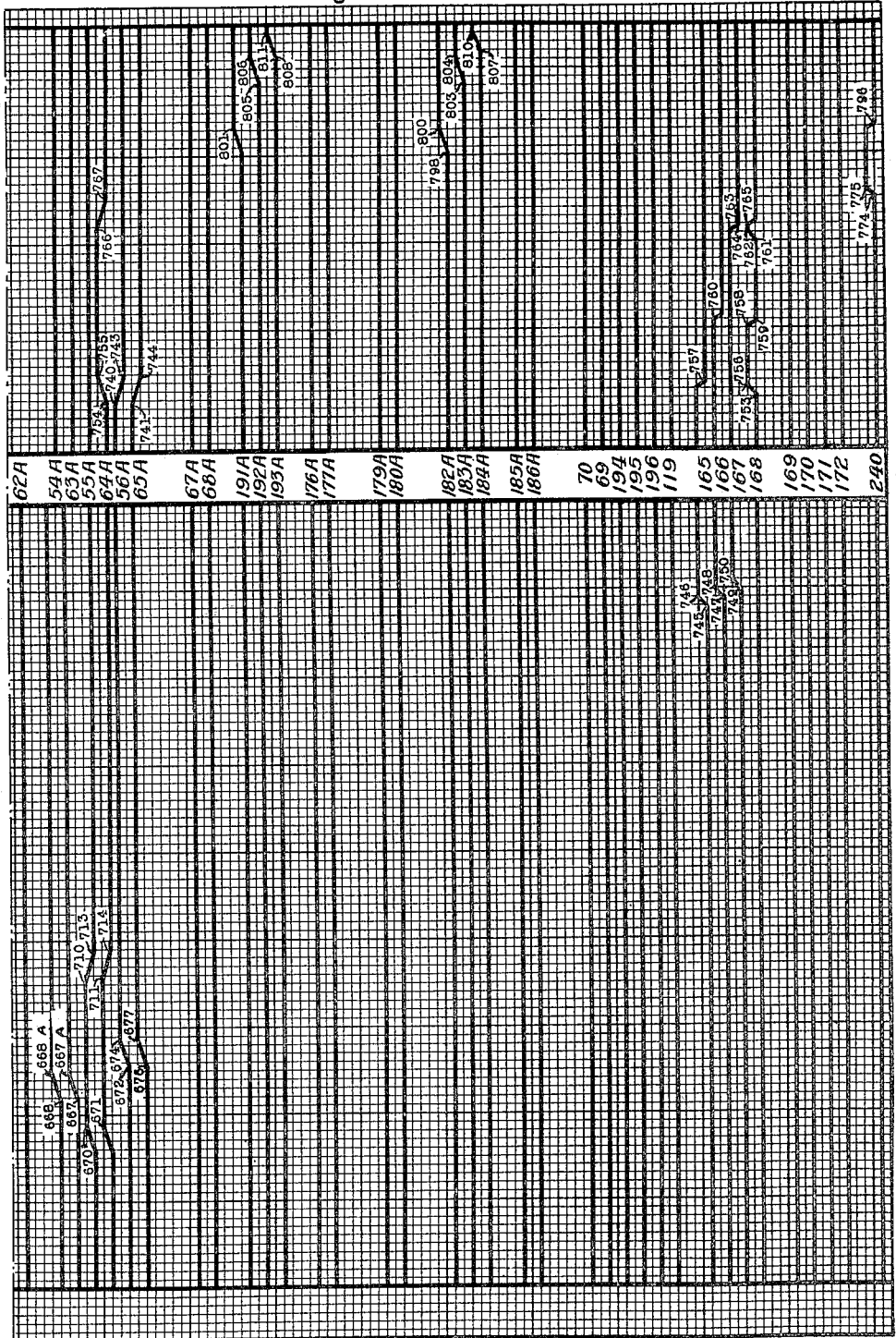
Figure 35:
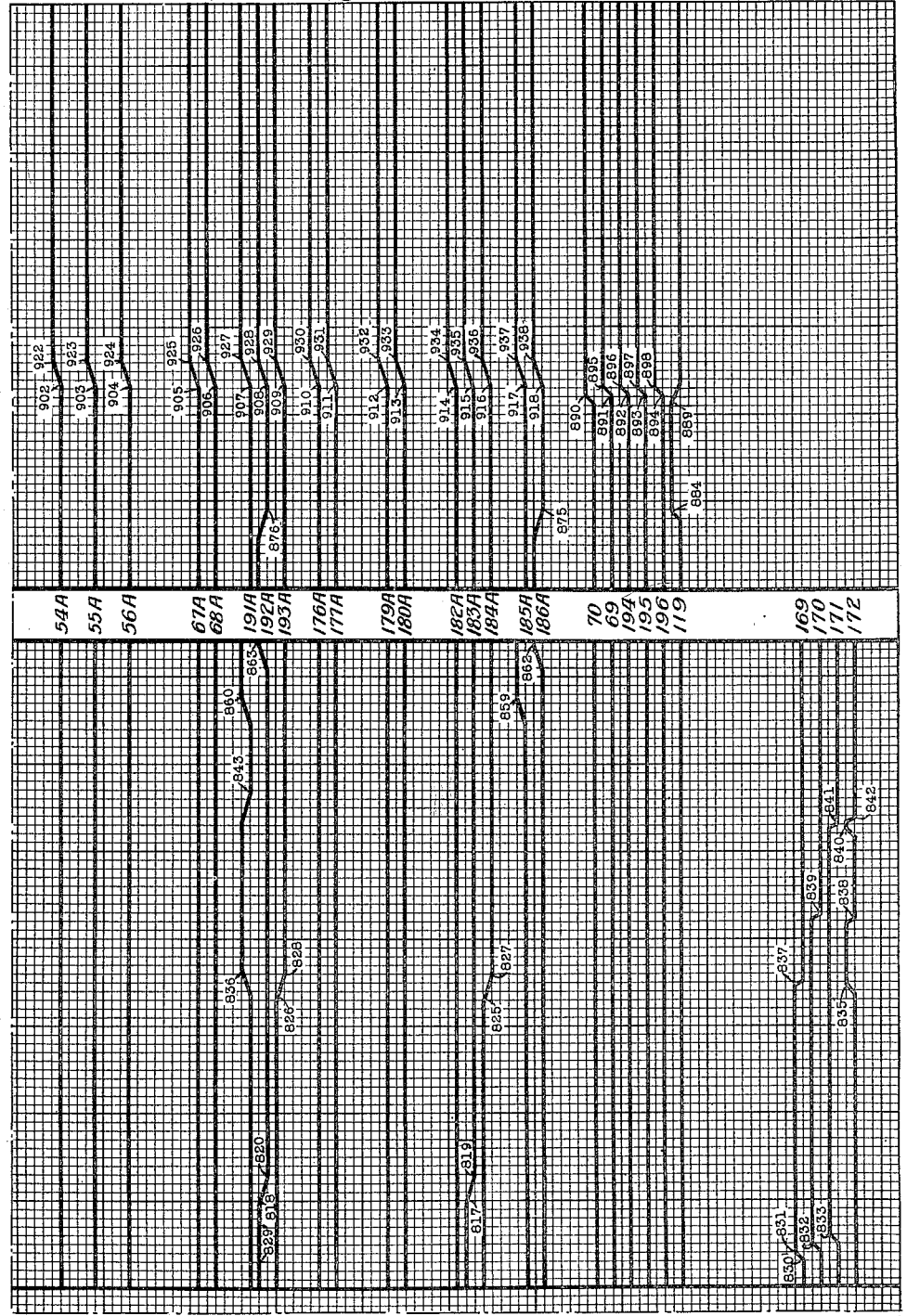
Figure 36:
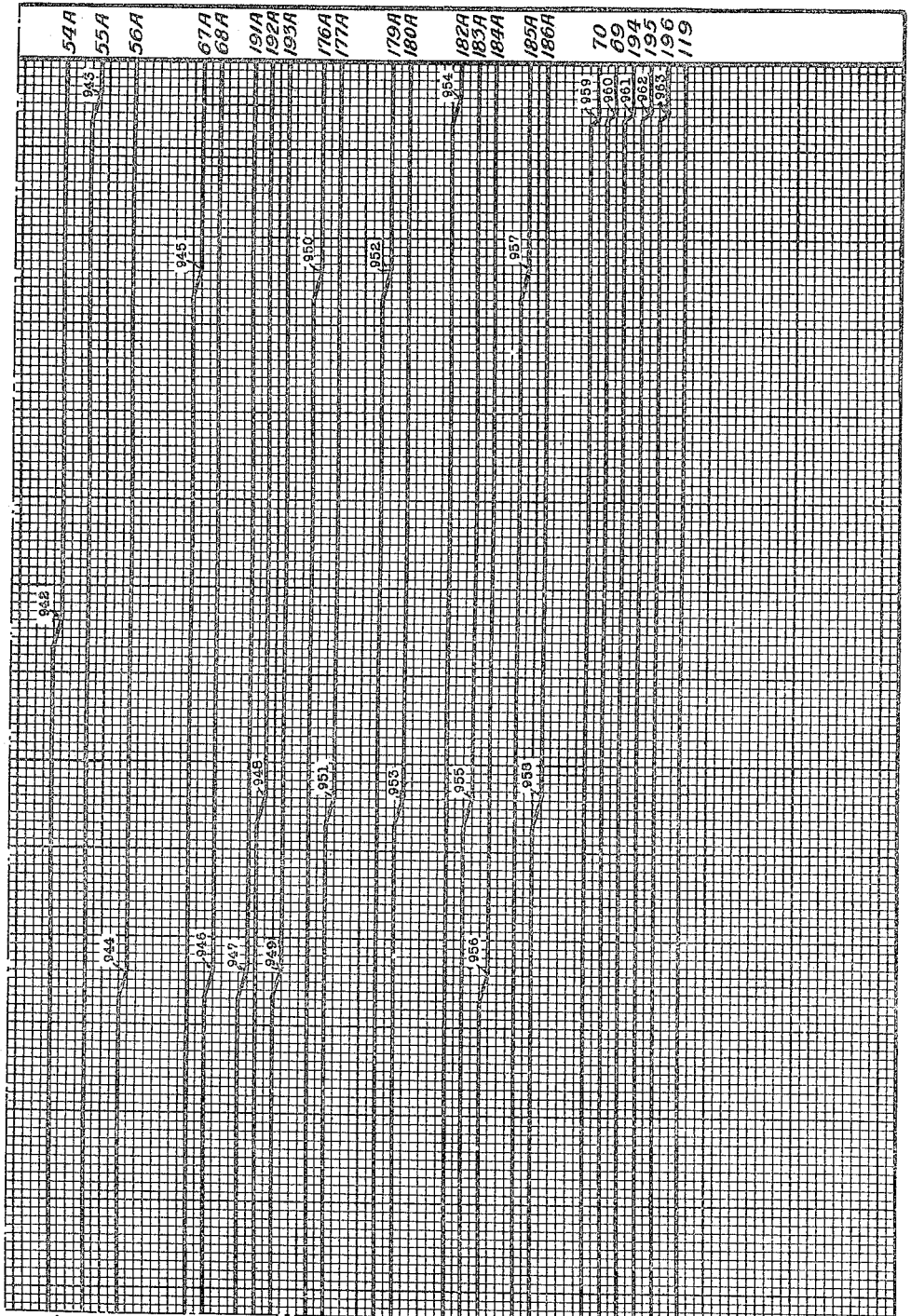

Figure 17 shows details of register wheels.

Figure 18:
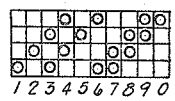

Figure 18 illustrates the conventional four-unit code used, translatable into terms of true digital representation.

Figure 19:
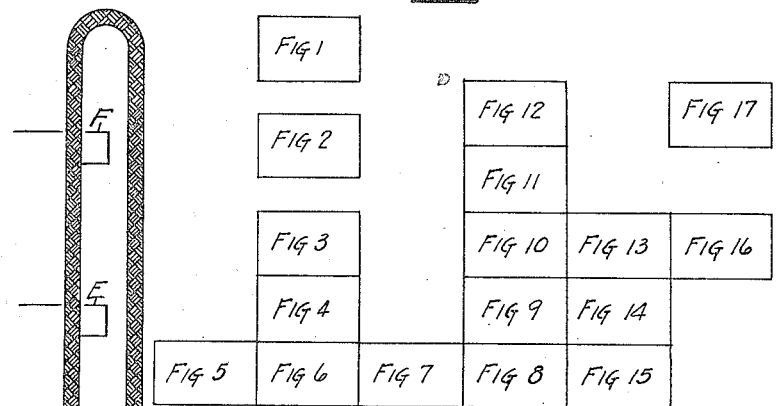

Figure 19 is a schematic diagram for the proper joining of several of the sheets of drawings.

Figure 38:
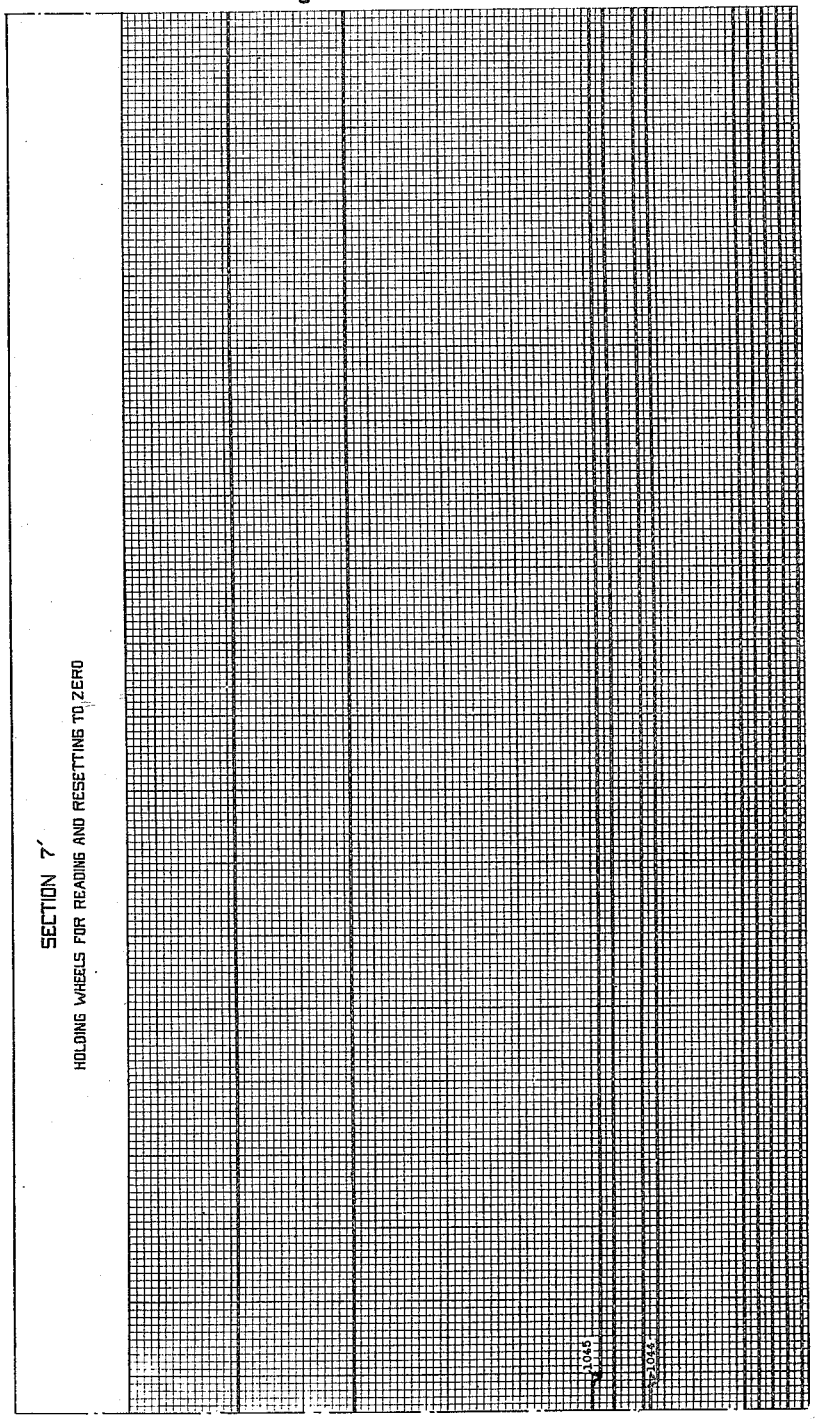
Figure 39:
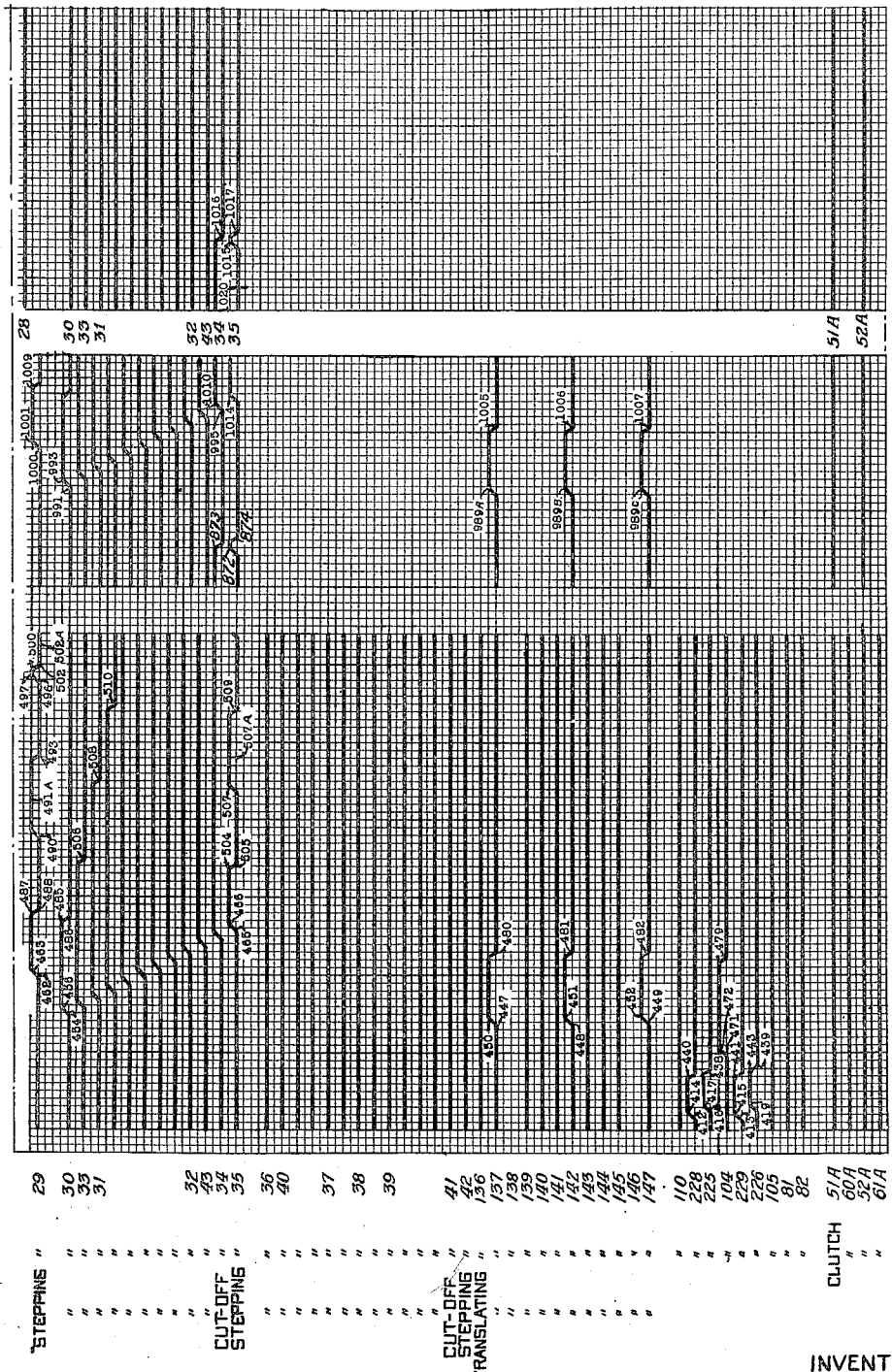
Figure 40:
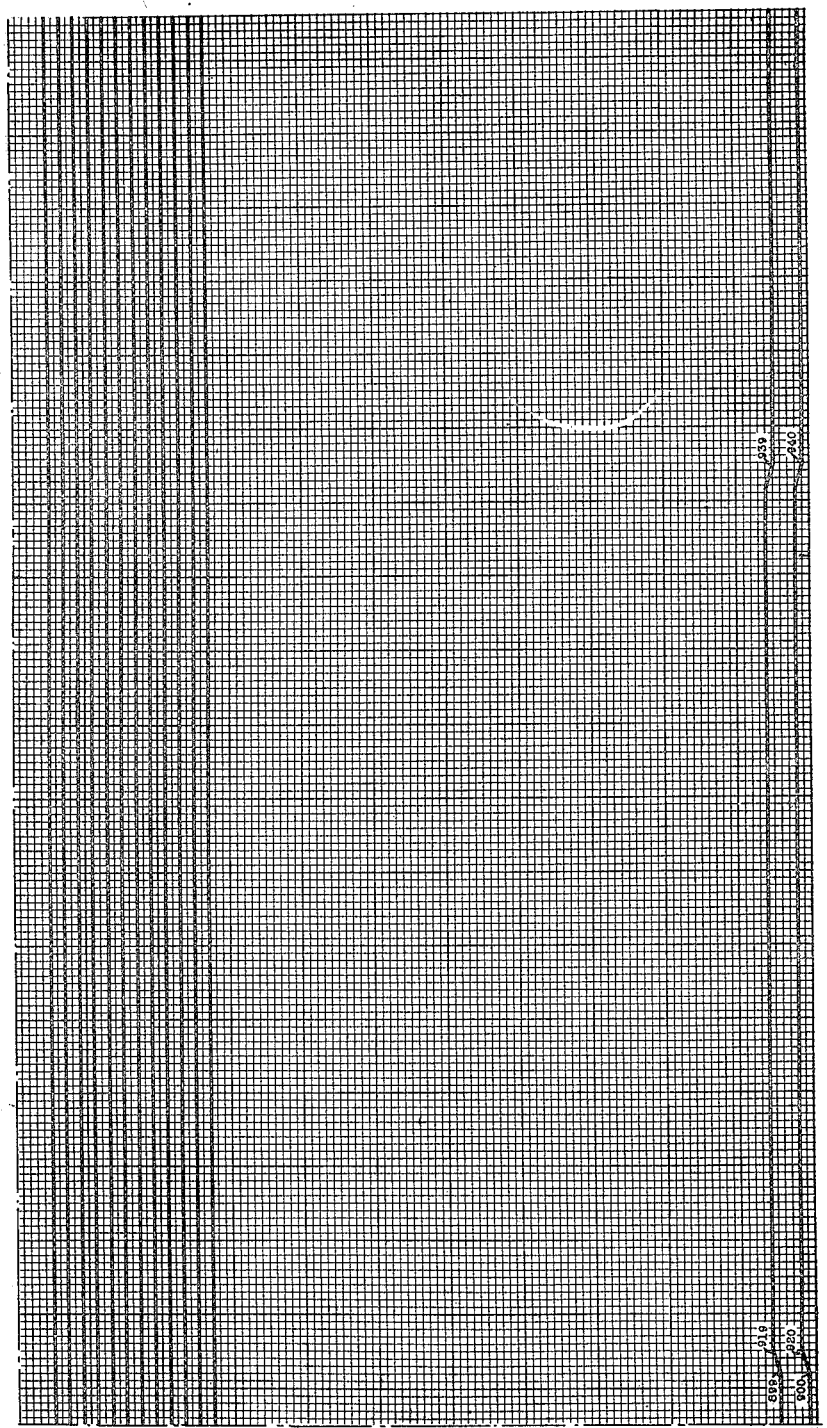
Figure 41:
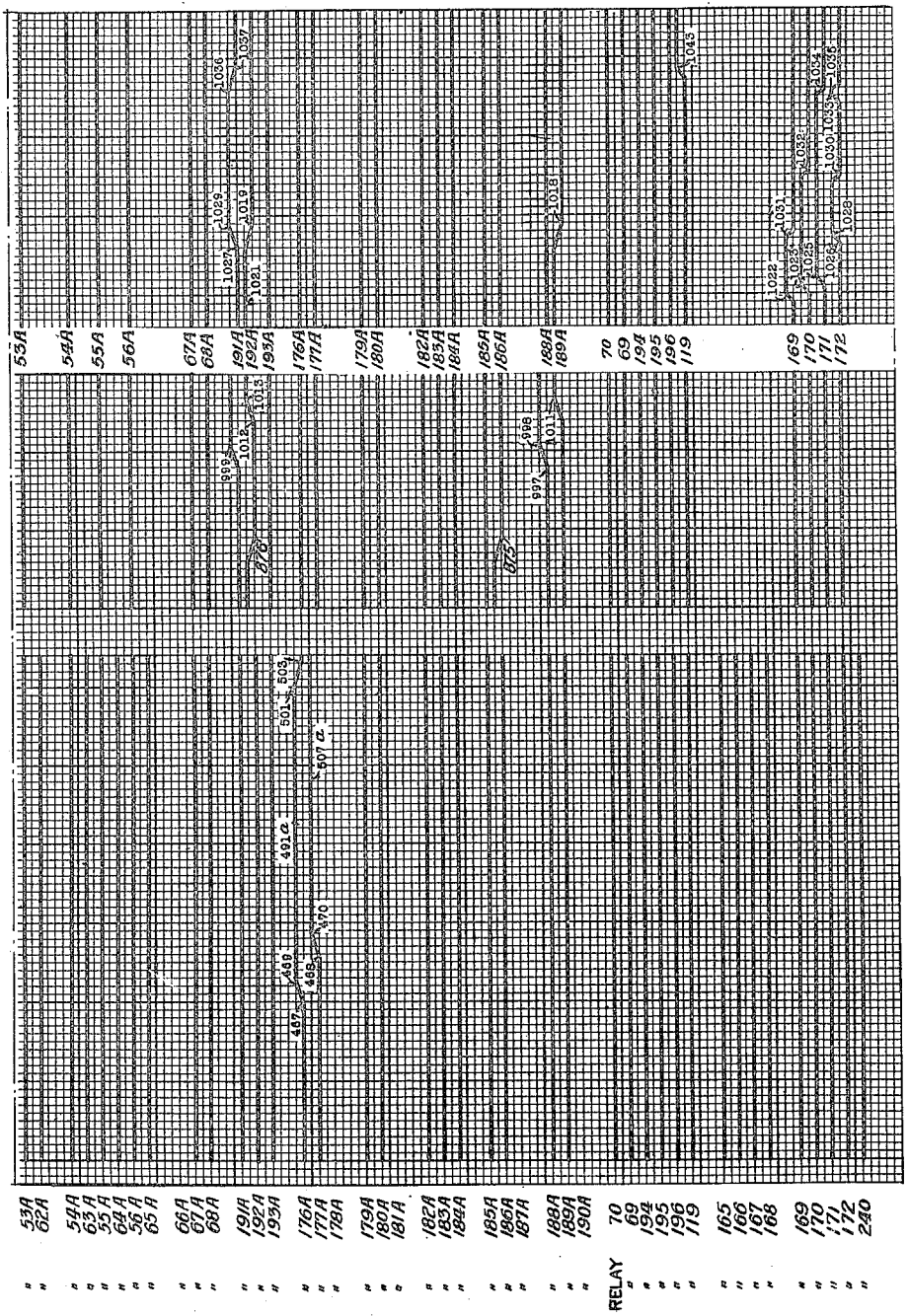
Figure 43:
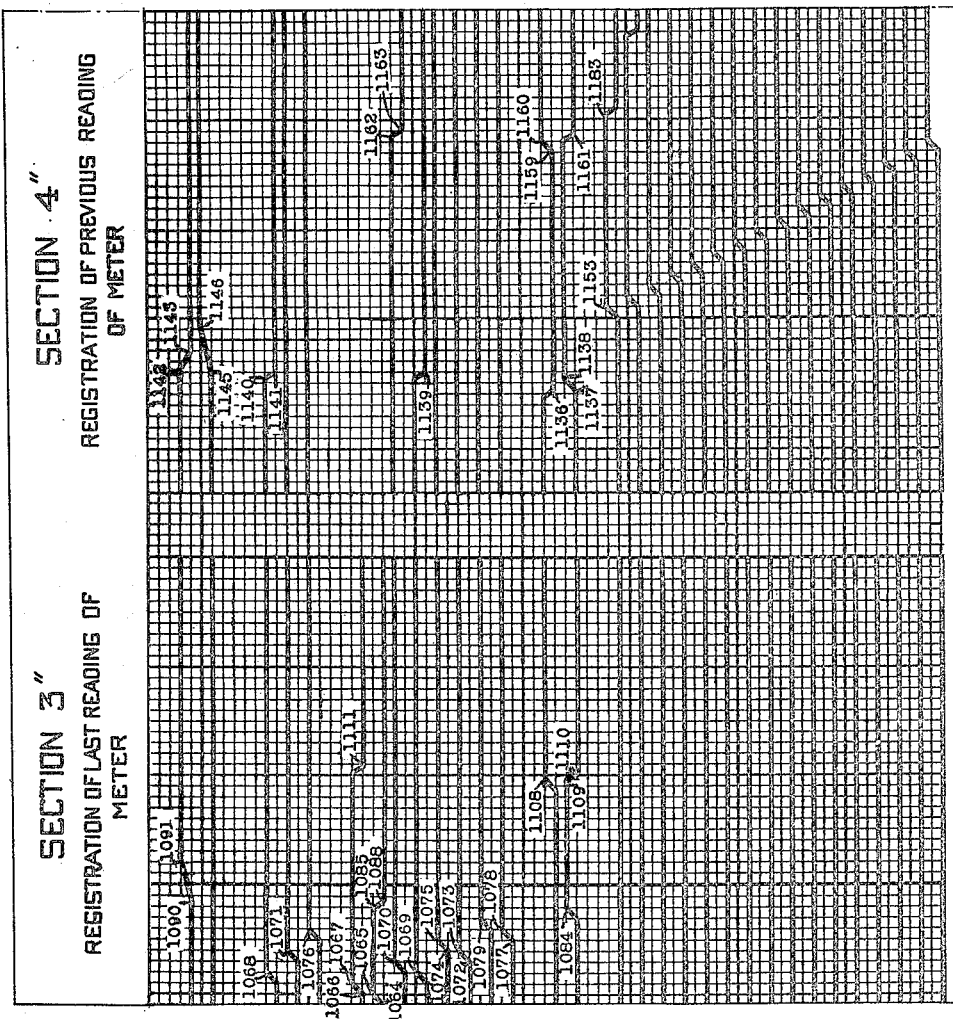
Figure 44:
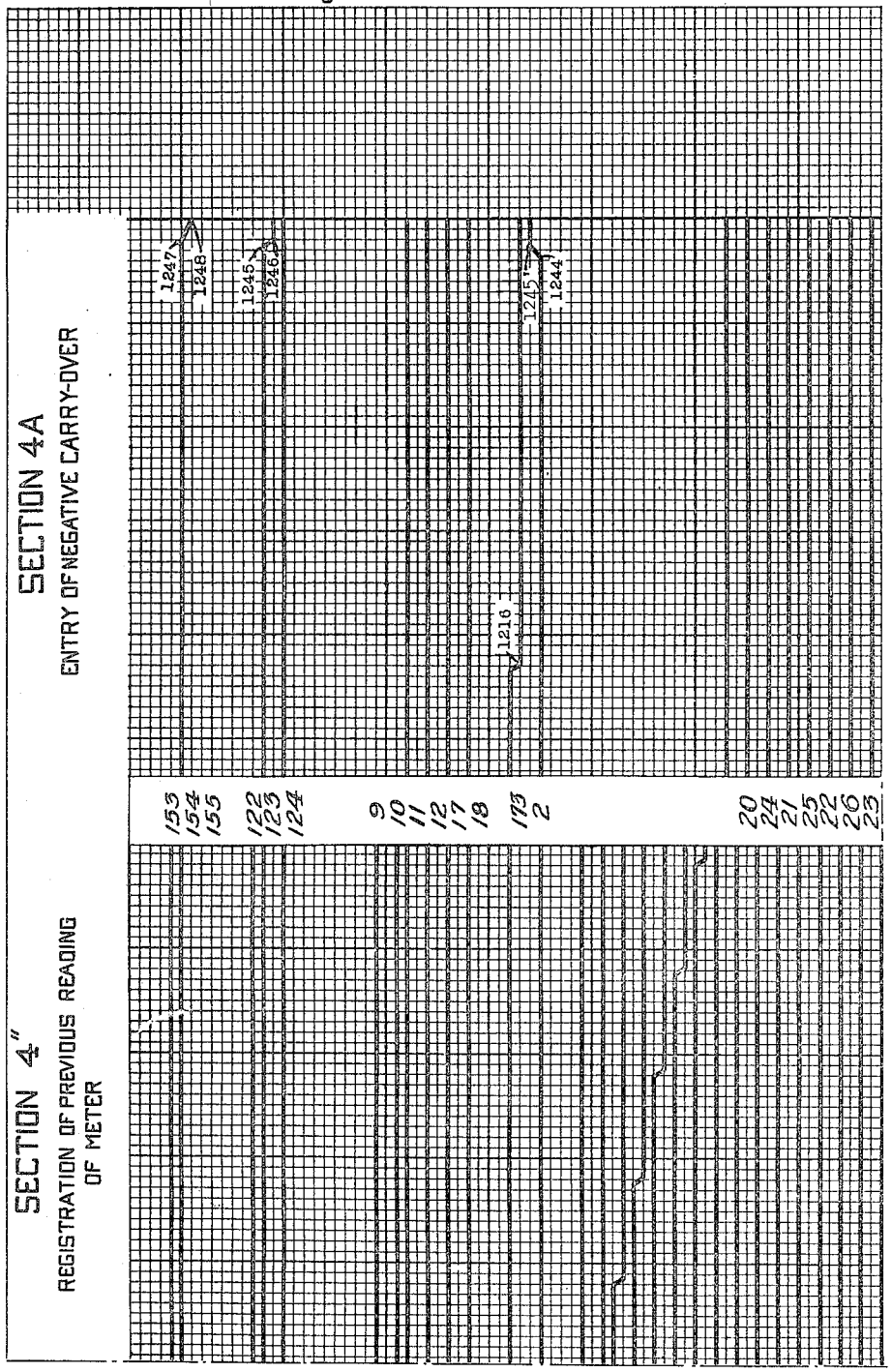
Figure 45:
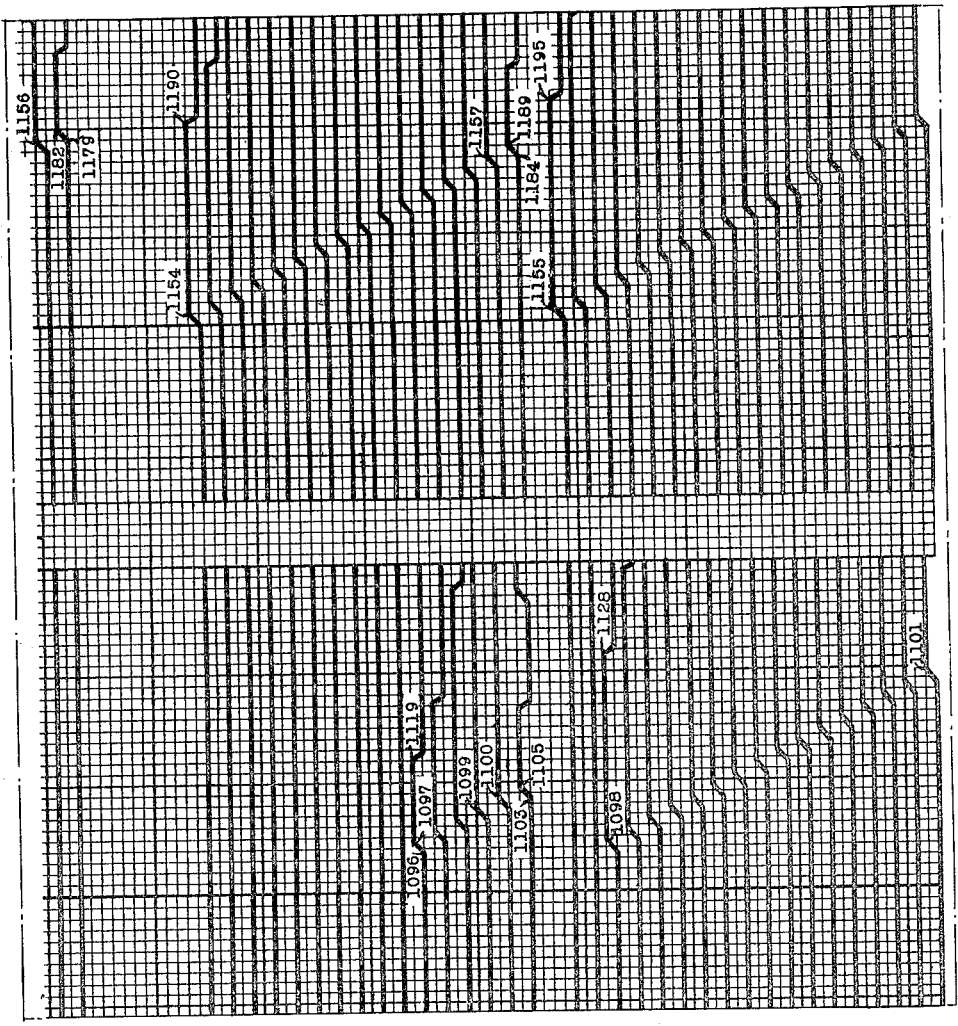
Figure 46:
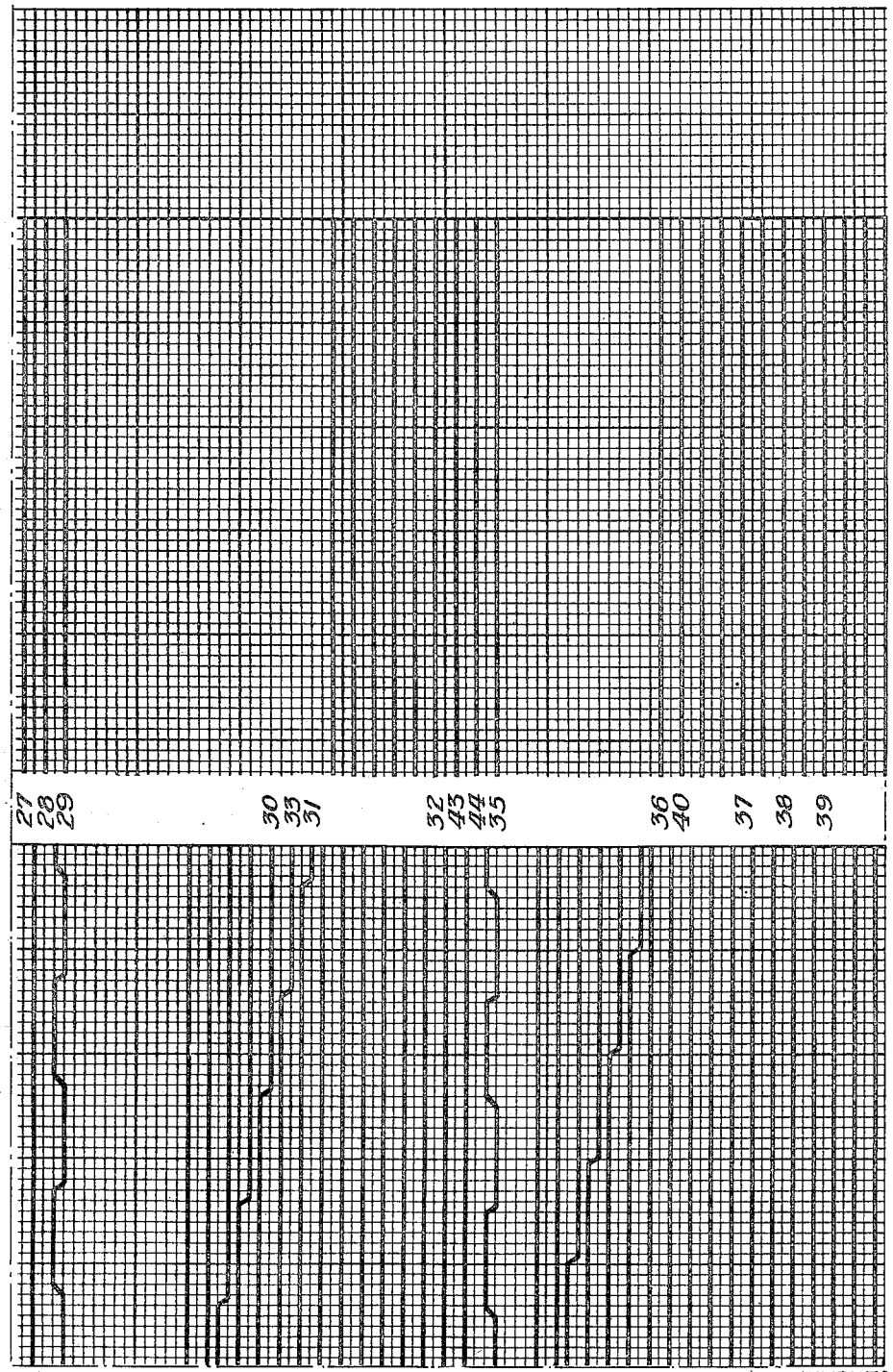
Figure 49:
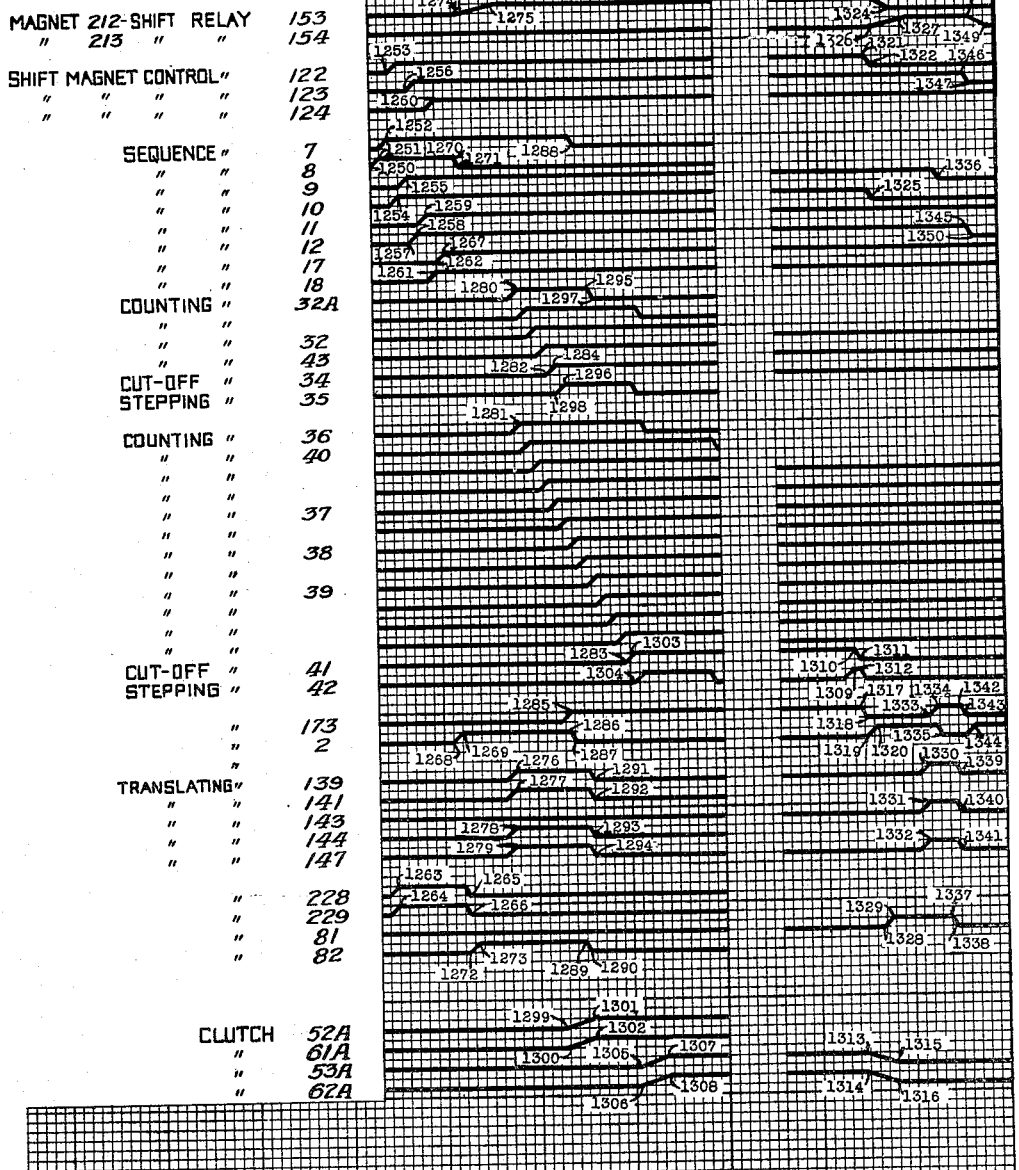
Figure 50:
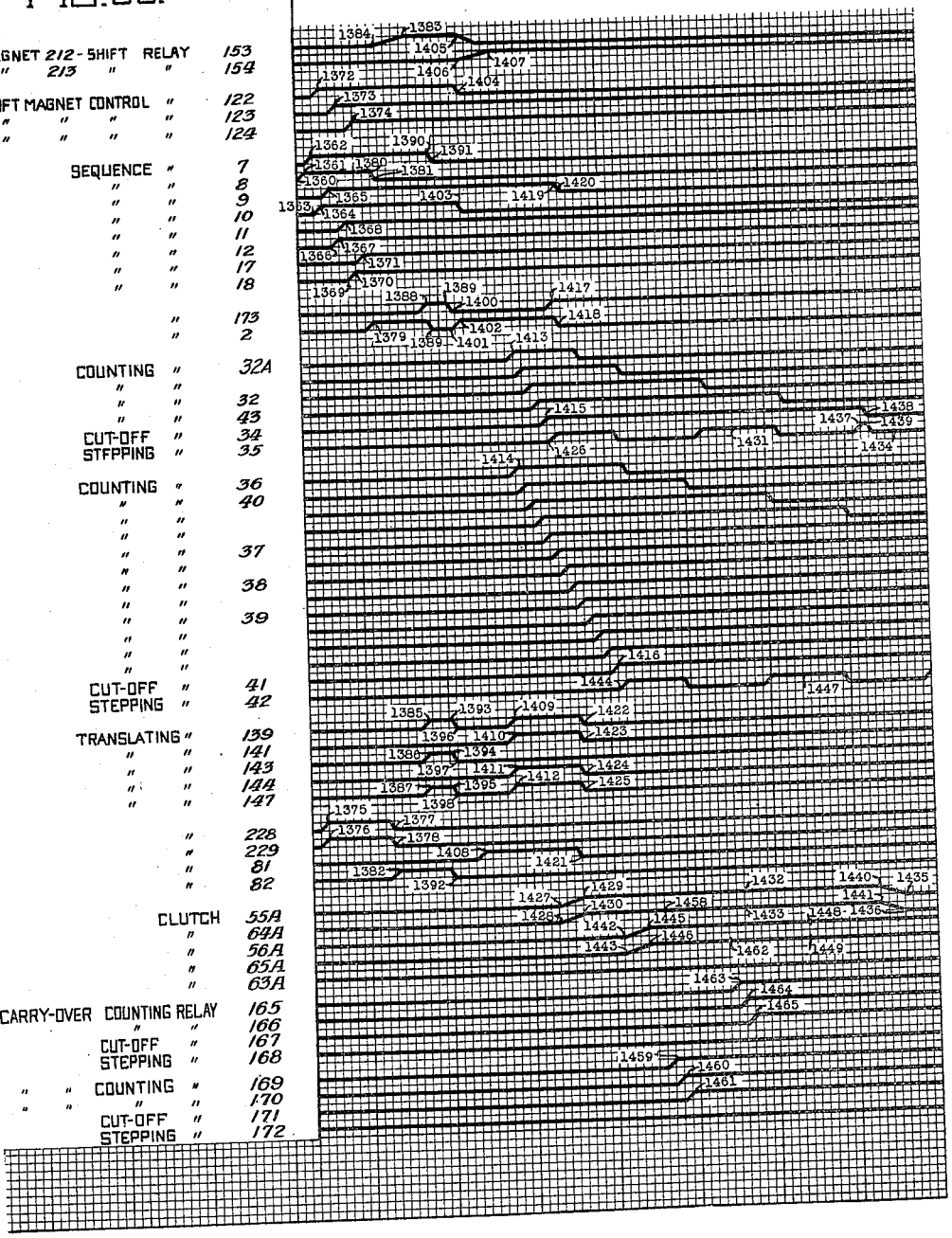
Figure 51:
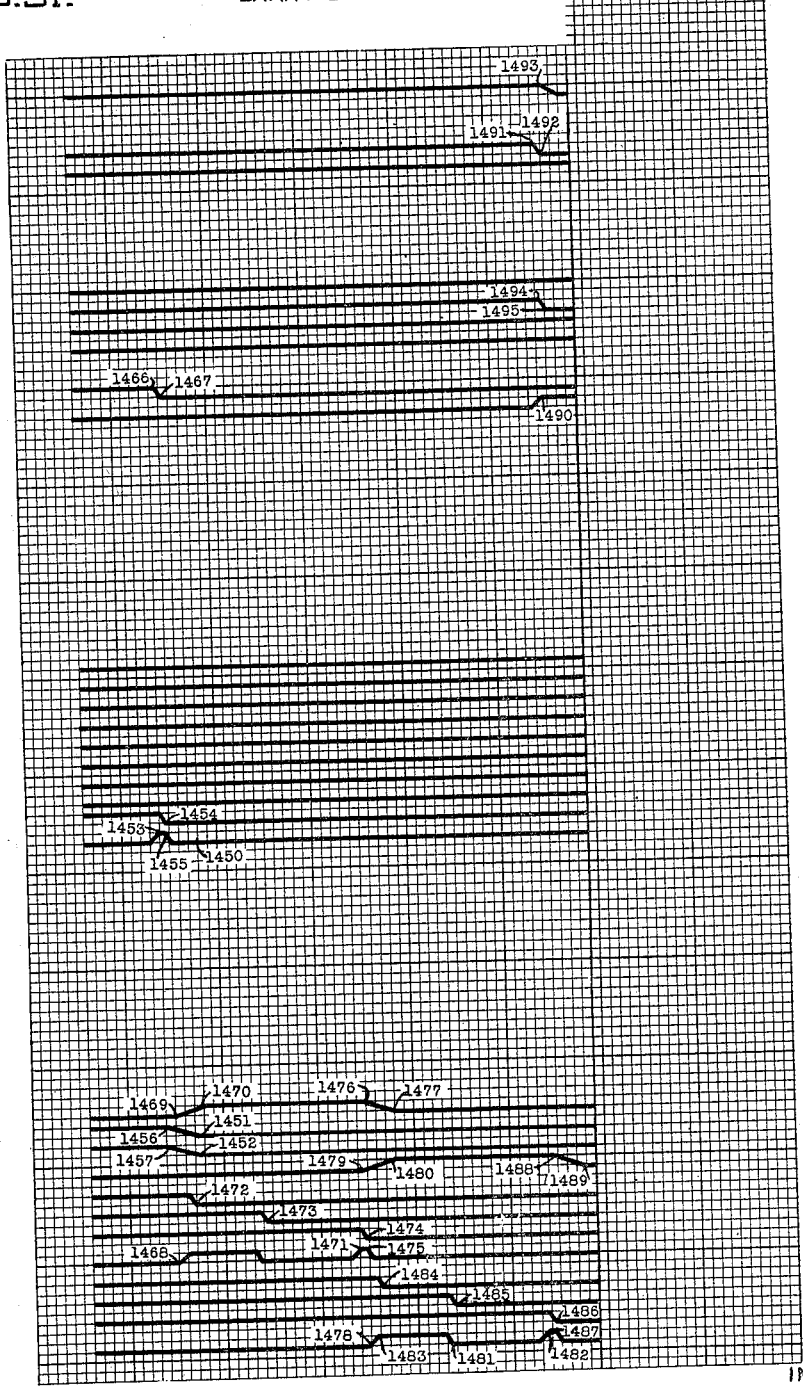

Figs. 20 and 21 are views illustrating the sequence of operations in two typical complete cycles of operation of the machine;

Figs. 22 to 24 are views illustrating the manner in which selections are performed in the operation of certain parts of the machine;

Figs. 25 to 36, when joined, are a timing chart of the first described typical operation of the machine, Figs. 25, 26, 27 and 28 when arranged end to end in the order named from left to right forming the upper section of said chart, Figs. 29, 30, 31 and 32 forming the central section of said chart when arranged respectively under the figures in the upper chart section, and Figs. 33, 34, 35 and 36 forming the lower section of said chart when arranged respectively under the figures in the central chart section;

Figs. 37 to 42, when joined, are a timing chart of the second described typical operation of the machine, Figs. 37 and 38 when arranged end to end in the order named from left to right forming the upper section of said chart, Figs. 39 and 40 forming the central section of said chart when arranged respectively under the figures in the upper chart section, and Figs. 41 and 42 forming the lower section of said chart when arranged respectively under the figures in the central chart section;

Figs. 43 to 48, when joined, are a timing chart of the third described typical operation of the machine, Figs. 43 and 44 forming the upper section of said chart when arranged end to end from left to right in the order named; Figs. 45 and 46 forming the central section of said chart when arranged respectively under Figs. 43 and 44, and Figs. 47 and 48 forming the lower section of said chart when arranged respectively under Figs. 45 and 46;

Fig. 49 is a timing chart of the fourth described typical operation of the machine;

Figs. 50 and 51, when joined end to end from left to right in the order named, are a timing chart of the fifth described typical operation of the machine; and Fig. 52 is a timing chart of a typical and the sixth described typical operation of the machine.

PRELIMINARY DESCRIPTION

Before describing the apparatus and the operation of this apparatus a brief description of the operations and the sequence thereof that are performed in the machine of this invention is presented and in this connection reference is first made to Fig. 20.

The machine of this invention operates under control of pairs of cards successively fed into cooperation with sets of sensing fingers and contact bars. One of these cards referred to as a meter card (Fig. 1) is, in the illustrated form of the invention, adapted for use to receive meter readings for twelve calendar months. In the course of operation of the machine the meter reading for the present month, referred to hereinafter as the last meter reading, has the meter reading for the preceding month, referred to hereinafter as the previous meter reading, subtracted therefrom whereby a consumption quantity is ascertained. Then through electrical circuits arranged in a manner to be described and referred to hereinafter as product tables the charge to be made for the consumption quantity is determined.

The product tables to which reference has just been made are arranged to compute the charge for the consumption quantity under what is known as rate steps and, in accordance with the rate steps described hereinafter, a consumption quantity of 50 units or less is charged at the rate of 6¢ per unit. A consumption quantity between 51 units and 100 units is charged for at the rate of 6¢ per unit for the first 50 units and at the rate of 5¢ per unit for each unit between 51 and 100. All consumption quantities of 101 units or more are charged for at the rate of 6¢ for the first 50 units, 5¢ per unit for the second 50 units and 4¢ per unit for each and every unit above 101 units. As a further illustration of the foregoing, assuming a consumption quantity of 45 units, the charge for this would be 45 times 6 which equals 270. Now assuming a consumption quantity of 62, the charge for this would be 50 times 6 plus 12 times 5 which equals 360. As a still further example, assuming a consumption quantity of 117, the charge for this would be 50 times 6 plus 50 times 5 plus 17 times 4 which equals 618.

In addition to the meter reading card the machine also operates under control of what is known as an office card (Fig. 2). In this card perforations are made pertaining to an amount paid and a balance due for a previous charge which has not been paid in full, and also this card contains information pertaining to charges to be made for articles of merchandise purchased on the installment plan. This office card also contains what will be referred to hereinafter as selecting perforations and also amount indicating perforations. The meter card likewise contains selecting perforations and amount perforations. The manner in which selections are performed under control of these selecting perforations will be explained in detail hereinafter.

The various perforations pertaining to amounts in both the meter and office cards are made in the cards in accordance with the code shown in Fig. 18, and the true digital value represented in accordance with perforations made in accordance with this code is ascertained through what are hereinafter called translating relays, which is to say, perforations made in accordance with the code shown in Fig. 18 cause electrification of certain circuits, and these circuits in turn cause energization of relays whereupon contacts under control of the relays are closed to thereby potentialize other circuits and such other circuits are arranged to pertain to the true digital value represented by the perforations under the code shown in Fig. 18.

Each complete cycle of operation of the machine includes steps or phases which are performed in sequence under control of what are hereinafter called sequence relays. Other relays referred to hereinafter as shift magnet control relays cooperate with the shift relays and function to energize the shift magnets of what are hereinafter called shift relays. In each phase or step or operation in a complete cycle of operation of the machine these shift relays function to establish the circuits necessary for effecting the particular operation.

Thus in a typical operation such as is illustrated in Fig. 20 a meter card and an office card are arranged in operative position in the machine. The first operation illustrated in Fig. 1 is the entry of an amount paid on a past due bill. This operation proceeds under control of the sequence relays 3 and 4, the shift magnet control relay 120 and the shift relay 151, and the amount paid, $2.50 in this instance, is sensed at the point I and through the shift relay 151 the translating relays 137, 142 and 147 (Fig. 10), the counting relays (Fig. 11) and the shift relay 151 th's amount of 250 is entered into the amount paid register 176—177—178 (Fig. 16).

The next operation is to record the balance due on a previous charge. This balance due, $2.50 in this instance, is ascertained at the point II and in this instance the operation proceeds under control of the sequence relays 5 and 6, the shift magnet control relay 121 and the shift relay 152. The amount 250 is picked up at the point II and through the shift relay 152, the translating relays 137, 142 and 147 (Fig. 10) and the counting relays (Fig. 11) and the shift relay 152 this amount is entered in the balance due register 179—180—181 (Fig. 16), this amount also being entered in the totalizer register 191—192—193 (Fig. 16).

Thus at the end of the second operation which proceeds under control of the sequence relays 5 and 6 the amount paid register 176—177—178 registers 250, the balance due register 179—180—181 registers 250 and the totalizer register 191—192—193 registers 250.

The next operation originates at point III and pertains to entering the last meter reading 442 in the last-reading register 51—52—53. This last reading is also concurrently entered in the consumption register 57—58—59. This operation proceeds under control of the sequence relays 7 and 8, the shift magnet control relay 122 and the shift relay 153. The last meter reading quantity 442 is picked up at the point III and through the shift relay 153, translating relays 137, 139, 141, 143 and 145 (Fig. 10), the counting relays (Fig. 11) and the shift relay 153, this quantity is entered in the last-reading register 51—52—53 and in the consumption register 57—58—59. During the entry of this quantity in the consumption register 57—58—59 this register moves in a forward or additive direction.

The next operation proceeds under control of the sequence relays 9 and 10, the shift magnet control relay 123 and the shift relay 154. The value of the previous meter reading 416 is picked up at the point IV and then through shift relay 154, the translating relays 137, 139, 140, 144 and 147 (Fig. 10), the counting relays (Fig. 11) and the shift relay 154, this quantity 416 is entered in the previous reading register 54—55—56 and concurrently in the consumption register 57—58—59. In this operation the consumption register operates in a rearward or subtractive direction and the result is that at the end of this operation the consumption register displays 026, the consumption quantity, or the difference between a last meter reading of 442 and a previous meter reading of 416.

The next operation proceeds under control of the sequence relays 11 and 12, the shift magnet control relay 124 and the shift relay 155. The consumption quantity 26 is picked up at the point V and through the product tables (Figs. 13, 14 and 15) this consumption quantity is multiplied by 6, inasmuch as the consumption quantity 26 does not exceed the first rate step quantity 50, and from the product tables through the shift relay 155, counting relays (Fig. 11) and the shift relay 155, the charge for this consumption quantity, that is, 26 times 6 or $1.56, is entered in the consumption money-charge register 182—183—184, and concurrently this amount is entered in the totalizer register 191—192—193. Hence at the end of this operation the totalizer register displays 406, the sum of 250 and 156.

The next operation proceeds under control of the sequence relays 13 and 14, the shift magnet control relay 125 and the shift relay 156. In this instance the charge for an article of merchandise is indicated by a selection opening at the point VI and the amount of the charge due is indicated on the office card at the position indicated "Payment on #1 article" and through shift relay 156, translating relays 137, 142 and 147 (Fig. 10), the counting relays (Fig. 11), the shift magnet relay 156, the charge for this article of merchandise 250 is entered in the first-article charge register 185—186—187 and concurrently in the totalizer register 191—192—193 so that at the end of this operation the totalizer register displays 656.

It will be noted that each entry into a register in the foregoing operations is effected through the counting relays (Fig. 11) which are described in detail hereinafter. These counting relays therefore constitute what may be broadly called a differential mechanism or a means for effecting entry in a register or other amount manifesting device.

It will be noted from Fig. 20 that it is the shift relays that control the interconnection between the sensing means which ascertain the amount, the translating relays when the amount is represented in code, the counting relays and the register that is to receive the amount, and the manner in which this is effected by the shift relays will be explained in further detail hereinafter.

In Fig. 21 a complete cycle of operation similar to that illustrated in Fig. 20 is shown but in this instance an additional operation is interposed in the complete cycle of operation. The machine operates under the conditions depicted in Fig. 20 in such a way that the cycle of operation which is added in the arrangement depicted in Fig. 21 is skipped so that no idle cycling of the machine occurs. Thus in the operation depicted in Fig. 20 the sequence relays 15 and 16 are not rendered operative but where a charge is to be made for a payment due on a second article of merchandise, as in the cycle of operation depicted in Fig. 21, the sequence relays 15 and 16 are rendered operative, and this operation proceeds under control of these sequence relays, the shift magnet control relay 126 and the shift relay 157. In this instance the additional or seventh operation is initiated at a selection opening at point VII, and the amount of the charge for this second article of merchandise $2.50 is picked up at the point on the office card indicated "Payment on #2 article" and through the shift relay 157, translating relays 137, 142 and 147 (Fig. 10), counting relays (Fig. 11) and shift relay 157, this amount is entered in the second-article charge register 188—189—190 and concurrently in the totalizer register 191—192—193 so that when this additional amount is the result of 7 rather than 6, operation as depicted in Fig. 20, the totalizer register 191—192—193 displays 906.

As explained heretofore, the meter card has a capacity for receiving perforations pertaining to, for example, twelve different meter readings, as the use of the card and the number of perforations in the card will increase, and therefore a selection is made in a manner which will be described more fully hereinafter with reference to Fig. 23 of the manner in which particular sets of perforations are selected in each billing period.

Furthermore, most accounts will not have a balance due and an amount paid on a previous charge so that it will not always be necessary to perform the operations which proceed under control of the sequence relays 3 and 4 and sequence relays 5 and 6, but an arrangement is made for selecting perforations pertaining to such amounts and the manner in which this selection is effected will be explained more fully hereinafter with reference to Fig. 22.

Furthermore, the machine as illustrated is arranged to select charges for articles of merchandise selected on the installment plan and the manner in which selections of such charges is effected will be explained more fully hereinafter with reference to Fig. 24 wherein the manner in which such selection is effected is shown.

However, before presenting a detailed description of the manner in which such selections are performed a description of the apparatus in the form of my invention illustrated in the accompanying drawings is set forth.

DESCRIPTION OF APPARATUS

In describing the apparatus, which is made up largely of conventional elements, I indicate the functions of many of the parts and circuits. A full account of the operation follows; in which only are the circuits traced in detail.

*Meter Card. Figure 1*

The card is shown in outline with its perforations indicated as on the bars illustrated in dotted lines. The reference numbers used for perforations in Figures 1 and 2 are the same as the reference numbers and letters for like-positioned fingers of Figures 4, 5, and 6, except that the perforations have one added like letter. The perforations are for the purpose of permitting electrical contact between the bars and their fingers.

On the meter card are two classes of perforations—selector and code. The monthly selector perforation is always a single hole in a field of twelve; this selects the particular group of code perforations to become effective. Each selector perforation as 76DD, 77DD, represents a month of the year—76DD the first month (January); 77DD, the second month, and so on.

Perforations as 77FF are code perforations. The perforations in one field may be one or two. They are used to set up through the translating and counting relays circuits to register the meter readings. 76FF and 76GG represent the hundreds digit of the illustrated number for the previous reading, (4); 76HH, the tens digit (1); 76JJ and 76KK, the unit digit (6). Of the illustrated number for the last reading, 77FF and 77GG represent the hundreds digit (4); 77HH and 77JJ, the tens digit (4), and 77KK, the units digit (2).

*Office card. Figure 2*

An office card is shown in Fig. 2 having spaces (areas) of which four are shown that are adapted to cooperate with contact bars in the machine, and in Fig. 2 three bars, 91A, 91B, 91C, cooperate with one area; 90A, 90B, 90C with another area; and so on. The card also is provided with perforations 221AA, 222AA for selecting one or more of said spaces or areas. Through perforation 221AA circuits may be set up to register through code perforations 91FF, 91GG, and 91HH, the amount paid on last month's bill (2.50). Through perforation 222AA circuits may be set up to register through code perforations 90FF, 90GG, and 90HH, the amount left due on last month's bill after crediting the amount paid.

The above perforations are made only when the consumer is in arrears.

Perforations as 92EE and 93EE are for the months (respectively eight and eleven) in which payments are to be made; these are pre-punched according to the obligations for payment. They are for the purpose of setting up circuits through the merchandise selector perforations, as 97AA, 95BB, and 94DD, 95DD, and monthly payment perforations as 92 FF, 92GG, 92HH, and 93FF, 93GG, 93HH, to register the amounts due. Perforations 97AA and 99BB are for the purpose of selecting any one of several articles of merchandise; as 97AA for a stove, and 99BB for a refrigerator, and of setting up circuits for electrifying through the merchandise amount selector perforations 94DD and 95DD, and the monthly payment perforations, as 92FF, 92GG, 92HH, circuits to register the amounts of payments as they became due from month to month.

Perforation 98AA is for the purpose of cancelling future monthly charges on any of the several articles; this sets up circuits to render ineffective the perforations originally made for future charges for a selected article.

*Registering wheels for last reading, previous reading, and consumption quantity. Figure 3*

The driving mechanism is of conventional form, here illustrated with a view to simplicity. In Figure 3 are shown three registers driven by motor 50 and its associated gears and shafts. The three number wheels, 51, 52, 53, are for the purpose of registering the last meter readings, in hundreds, tens, and units. They are advanced to their numerical positions according to card perforations, by the action of the translating relays (Fig. 10) and the counting relays (Fig. 11), as described in the third sequence of operation. Wheels 54, 55, 56, are for a like purpose in relation to the previous meter reading; they are likewise governed by the counting relays, in the fourth sequence of operation. The consumption wheels 57, 58, 59, are gear-driven, forward in connection with the last reading wheels, and backward in connection with the previous reading wheels, for the purpose of registering a numerical difference, which is the consumption quantity, and for the purpose of preparing circuits through contact-closing wheels for further operations.

Each register wheel assembly, alike for the last and previous readings, includes for each order of numbers a number wheel, as 51 (in the hundreds order of the last reading), a zero-setting wheel, as 51B, and a contact, 51E, a shunting wheel, as 51C, a shunting contact, as 51D, and a conventional magnetic clutch, as 51A. These wheels are mounted on sleeves on their several shafts and are driven when connected by a clutch, as 51A, under control of the counting relays of the order, as 20 and its mate 24 (Fig. 11).

The armature of the clutch, as 51L, (Fig. 17) is attached to the shaft 51A, the field piece, as 51F, is provided by the hub of the wheel; the coil, as 51G, is stationary.

The clutch coils, as 51G, are connected through the contacts of the shift relays (Fig. 9) and are in series with the stepping relays, as 29 (Fig. 11) and connected to contacts as 28C of the cut-off relay 28 (Fig. 11) where the circuit is closed when the cut-off relay is energized. When clutch 51A is energized the wheel takes motion; and on each movement from digit place to digit place, shunting wheel 51C closes shunting contact 51D, grounding it, momentarily shunting out stepping relay 29; and with the completion of each such digit movement, contacts as 51D open.

Positioned on shafts 50A and 50B and operating in connection with the last reading wheels 51, 52, 53, and previous reading wheels 54, 55, 56, are gears as 60 and 63, each of which has a clutch, as 60A and 63A, energized at the same time as and so long as the energization of register wheel clutches, as 51A and 54A continues. Clutches, as 60A and 63A are energized through the contacts of the shift relay and from contact 28D of cut-off relay 28 (Fig. 11). These gears and clutches are for the purpose of forwardly driving the consumption wheels 57, 58, 59, in unison with the last reading wheels and backwardly in unison with the previous reading wheels, through gears 60, 61, 62, 66, 67, 68, 63, 64, 65.

The register wheels thus enumerated are alike in construction and operation, though they do not all move in the same direction. The several parts of the various wheels serving a like purpose bear the same reference letters on the drawings.

The consumption wheels, 57, 58, 59, are of the same general design as the before-described wheels, except that each wheel has certain additional members, as carry-over wheel 57H and contact 57K and contact-closing wheel 57J, here shown less contacts. Wheel 57H is for the purpose of effecting a subtractive carry-over, in combination with shunting wheel 57C and clutch 63A. Wheel 57J is for the purpose of closing selected contacts for effecting the consumption money charge. Wheels as 57J and contacts are shown in side view in Figures 13, 14, 15. Clutches as 66A are only for the purpose of zero-setting the several consumption wheels.

Relays 69 and 70 are zero-setting relays, for setting to zero the several register wheels at the end of an operation, as will be described under operation headings.

Figure 4:
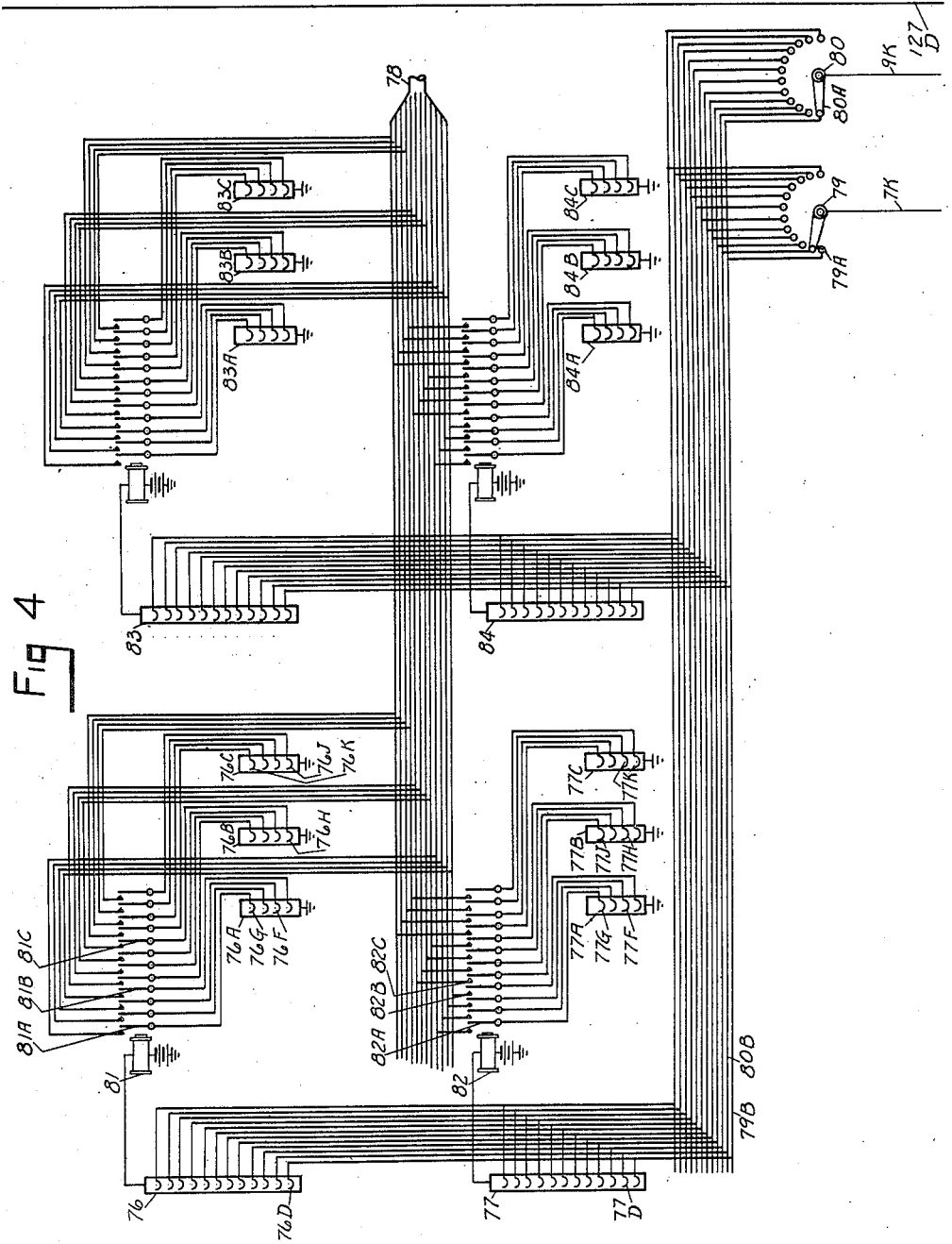
Figure 4 shows the meter reading and monthly selector bars and fingers for four months, and the monthly selector switches.

*Meter reading contact bars and fingers. Figure 4*

The contact bars and fingers of Figure 4 are of conventional form, and substantially alike. Their purpose is to complete electrical paths selected through the various perforations. Four groups of bars and fingers are shown; in practice, there would be a group for each month.

Each group of bars consists of a monthly selector bar, as 76, and three meter reading bars, as 76A, 76B, 76C. Each selector bar, as 76, has twelve fingers. Each finger on each bar is wired in multiple with each like-positioned finger on each other bar, for a purpose which will be described. Bars 76A, 76B, 76C are respectively the hundreds, tens, and units bars of one group. These bars and fingers, and other like bars and fingers, take up the record of the meter reading perforations in the card, as 76FF and 76GG for the hundreds (4), 76HH for the tens (1), and 76JJ and 76KK for the units (6) (Fig. 1), and set up circuits to translate the coded perforations into true digital representation, and register it on the number wheels (Fig. 3). Each finger, as 76G, is wired to the right-hand side of a pair of relay contacts, as 81A; the left-hand side of each pair is wired in multiple to each other like-positioned contact, as 82A, with the wiring extended through cable 78, cable 78 (Fig. 9), to a correspondingly positioned contact, as 154B, in a shift relay, as 154. There are as many pairs of contacts in the left-hand section of each shift relay as there are fingers on the bars, or 12, four for the hundreds, four for the tens, and four for the units.

The selector bars, as 77, when used for the last reading, are momentarily grounded by the de-energization of an even-numbered relay, as 8 (Fig. 7) of a sequence relay pair and the continued energization of the odd-numbered relay of the pair, as 7, and set up circuits to energize through the contacts of the shift relays (Fig. 9) and the translating relays (Fig. 10) the counting relays of Figure 11. The ground is removed by the deenergization of the odd-numbered relay of a sequence relay pair, as 7 (Fig. 7), releasing the translating relays but leaving the counting relays still energized through a local circuit. For the purpose of selecting a proper set of monthly meter reading bars for use, a system is provided consisting of two switches, 79 and 80 (Fig. 4), a bar, as 76, and twelve fingers, as 76D, one for each month. Switches 79 and 80 have each a contact, as 79A, for each month; the contacts of one switch are multipled to like-positioned contacts of the other. Fingers, as 76D, are multipled to other like-positioned fingers in the several sets of selector bars; these in turn are multipled to other like-positioned contacts in switches 79 and 80. These switches connect conductors 7K and 9K to any one of the twelve switch contacts, so that any reading may be made effective as the last or previous.

Each group of bars has a relay, as 81, for the purpose of completing through the contacts, as 81A, the circuits from bars, as 76A, 76B, 76C, and associated fingers, to the conductors of cable 78, when energized from monthly selector bars, as 76.

*Amount paid and balance due bars. Figure 5*

Bars 91A, 91B, 91C, and 100A, 100B, 100C, are amount paid bars; 90A, 90B, 90C, and 101A, 101B, 101C, are balance due bars. They are for the purpose of setting up circuits to register any partial payment and the consequent balance due on the past month's bill.

Each set of bars, as 91A, 91B, 91C, has a relay, as 104, for the purpose of closing the circuits from the bars and fingers to their respective conductors in cables, as 107, which are wired to like-lettered cables of Figure 9. Like-positioned contacts of relays, as 104 and 102, are multiplied to the conductors of cables, as 107. Only four sets of bars and fingers are shown: in practice there would be as many sets of bars and fingers as the maximum number of times any consumer may be expected to be in arrears in the course of twelve months. With the system herein described, any set of bars may be used for any month. As here shown and described in detail under an operation heading, a set each of amount paid and balance due bars is made effective; it is understood, however, that either one of the two sets of bars may be used independently of the other set. Two of the four sets of bars are shown completely wired; relays 104 and 105 are shown wired through conductors 3K and 5K to contacts 3A and 5A of Figure 7; relays 102 and 103 have the wiring dead-ended at 102X and 103X; if wired for use, these conductors would terminate in additional contacts, the same as 3A and 5A in additional relays. A set of bars is selected for use by the selector bars and relays of Figure 6.

*Bars and fingers for selecting bars for registering amount paid, balance due, and monthly installment charges on merchandise, and for cancellation of future installment charges. Figure 6*

Bars 221, 223, 222, and 224, and associated fingers, selector relays, as 225 and 226, and switch 101, are for the purpose of setting up circuits to select a set of bars each, as 91A, 91B, and 91C, (Fig. 5) to register the amount paid and balance due, represented by perforations, as 91FF, 91GG, 91HH, (Fig. 2) for the former, and 90FF, 90GG, 90HH, for the latter. Each selector bar has four fingers, as 222A; each finger is wired to the right-hand side of a relay contact, as 229A; the left-hand side of such a contact is wired to a conductor, as 229E, and which is multipled to other like contacts in its group and the wiring is extended to relays, as 226. Relays 225 and 226 and their mates are selector relays for selecting for grounding a conductor, as 6X; they are selectively energized from bars as 222 through perforations as 222AA and fingers as 222A.

The grounding of conductors, as 6X, energizes sequence relays, as 6 (Fig. 7) for later grounding the selected balance due bars of Figure 5. In practice the full set of the contacts numbered from 1 to 0 of relay 231 would be available for energizing sequence relays, as 6 (Fig. 7). There would be a sequence relay pair for each contact. Only two selector bars, 221 and 223, for the amount paid, and 222 and 224, for the balance due, are shown; in practice there would be two bars, as 221 and 222, for each month.

For example, if there is likely to be more than one unpaid balance in the life of a particular card, an arrangement like that shown would be duplicated and would comprise relays 102, 103, sensing sets 100A, 100B, 100C, 101A, 101B, 101C (Fig. 5), as shown, and also a duplication of relays 3, 4, 5, 6, 120, 121 of Fig. 7 in which would be terminated wires 102X, 103X and to which would be connected branch wires from 2D, 2E, 3X in a manner similar to that in which connections are made to relays 3, 4, 5 and 6. Wires duplicating 4X and 6X would extend to terminals 2 in contacts of the combinational relays 225, 230. Wires duplicating 4J, 6J would extend to relays duplicating 210, 211 in Fig. 9, and contact wiring of relays 210, 211 would be branched down to the contacts of the added relay in multiplying formation.

In operation, should sensing sets 228, 229 operate to energize relays 3, 4, 5 and 6, the operation of the system would be as described more fully hereinafter, and upon deenergization of relay 5 ground would be removed from wire 3X, thus opening the locking circuit of contact 8G of relay 8 permitting relay 8 to release upon the next operation of relay 2 whereby the added relay set would be skipped because all of its connecting wires similar to 3K, 5K, 4X, 6X, 4J, 6J and the three branching wires from 2D, 2E and 3X would be open. Should sensing sets 228, 229 operate to energize the combinational relays to close contacts for terminals 2, thus energizing the added relays, the operation would proceed with illustrated relays 3, 4, 5 and 6 unresponsive because all of their control wires 3K, 5K, 4X, 6X, 4J, 6J would be open and the first action of relay 2 would result in releasing the added relay and not relay 4, and the full routine of operation would follow, as described more fully hereinafter.

Common to both groups of bars is a switch, 101, with a contact for each month; only two contacts are shown wired. This switch is for the purpose of extending a circuit to relays, as 228 and 229, which, when energized, close through their several contacts, as 228A, the circuits from the fingers, as 221A, to the relays, as 225.

Bars 92, 94, 97, and 93, 95, 99, and associated fingers, and switch 106, are for the purpose of setting up circuits to select the articles of merchandise and the month's payments to be made on each article. Bar 98, and associated fingers, and slow-to-release relays 109, 110, are for the purpose of cancelling further payments on articles under purchase if for any reason the obligation is terminated. Bars 92A, 92B, 92C, are amount bars for one article; bars 93A, 93B, 93C, are amount bars for another article. In practice, there should be as many groups of amount bars as the maximum number of articles under purchase at a time by one customer, not the maximum variety on sale by the company, since any bar may be selective of any article at any price.

Bars 92 and 93 and associated fingers are monthly charge selector bars; their fingers, as 92E and 93E, and all other like-positioned fingers of every bar are wired in multiple and to correspondingly positioned contacts in switch 106. As here illustrated, each of the two bars has a capacity for twelve months.

Bars 94 and 95 are merchandise amount selector bars; they are for the purpose of extending a selected circuit to the merchandise amount bars, as 92A, 92B, 92C; they are here shown with a capacity for five articles each. In practice, each bar should have a finger for each of the maximum variety of articles or classes sold on installments by the user of the machine. The fingers, as 94D, are wired in multiple with like-positioned fingers of bar 95, with the wiring of fingers, as 94D, extended through conductor 13K to a sequence relay contact, as 13A (Fig. 8), which in its order of operation electrifies fingers, as 94D, bar 94, and amount bars 92A, 92B, 92C, causing the amount represented by the perforations, as 92FF, 92GG, and 92HH (Fig. 2), to be registered.

Bars 97 and 99 are article selector bars; they are for the purpose of energizing through their fingers, as 97A and 99B, a plurality of commodity circuits such as conductors 97X and 99X, contacts 110B and 109B, and conductors 14X and 16X, sequence relays as 14 and 16, which in due turn will electrify fingers as 94D and 95D and bars 94 and 95 next above mentioned. They are here shown with a capacity for five articles; in practice each bar would have fingers for the maximum number of articles or classes sold on installments by the company.

Bars 92A, 92B, 92C, and 93A, 93B, 93C, are merchandise amount bars, here illustrated with a set of three bars (for three digits) for each one of two articles. These bars are for the purpose of registering the amount due on each monthly payment of each article. There is a set of three bars for each merchandise amount selector bar, as 94.

The fingers of the monthly charge selector bars, as 92F and 93F, are shown wired in cables 111 and 112 and broken off at a near-by point and extended to cables 111 and 112 (Fig. 9) where the wiring reappears, with each finger wired to a correspondingly positioned contact in its respective shift relay.

Bar 98 is the cancellation bar. It is for the purpose of cancelling future payments on any of the several articles for which perforations, as 92EE and its mates, have been made in advance, thus permitting the continued use of the same card. As here shown, it has a capacity of five articles, illustrated with only two fingers wired. Each finger is wired to a slow-to-release relay, as finger 98A to relay 110. Relays, as 110, when energized, lock up through contacts, as 110A, preventing the energization of sequence relay 16 (Fig. 9), which controls the electrification of fingers, as 95D, cancelling the operation of amount bars 93A, 93B, 93C. But one cancellation bar is needed, as a customer's card can be perforated to cancel future payments on any or all articles for which amounts have been prepunched.

Description of the circuits will be fully illustrated under Operation headings.

*Sequence Relays. Figures 7 and 8*

The sequence relays are of a conventional type, with conventional contacts. Their function is to govern the succession of operations, with provisions for interpolating additional operations and for immediately passing action from the completion of each due operation to the starting of the next. The circuits and actions of particular sequence relays are detailed in the description of the sequences under Operation headings.

Relays 3 and 5 have each a special contact, as 3C, connected to common conductor 3X. Such special contacts are for the purpose of holding energized through winding 8G relay 8, so long as any of the special contacts remain grounded. Relays 11, 13, 15, have like contacts, and hold relay 18 energized through conductor 11X and winding 18D. These contacts are for the purpose of holding any one of relays 14, 16, 18, energized if its mating odd-numbered relay is energized. Once freed from this energizing source, relays 14, 16, 18 pass under control of sequence control relay 2. Upon the deenergization of the latest of relays 3 and 5, the relay 8 is controlled by sequence relay 2, and upon the deenergization of the latest or relays 11, 13, 15, the relay 18 is controlled by sequence relay 2.

Each of the even-numbered relays of the sequence pairs enumerated (except pair 4—3, which is the first pair in the chain to become energized if selected for operation) will when energized take its place in the chain and be released in its order. For example, relay 14 is energized from finger 97A (Fig. 6), and when energized locks up through winding 14G contacts 14D and 11H, and remains energized so long as relay 11 so remains. While relay 14 is energized, winding 14E is also energized through contact 14F and sequence control contact 2B, so long as 2B is closed. In this manner, relays as 6, 14, 16, having been energized are continued energized so long as any odd-numbered relay of a lower position is energized. On release of such odd-numbered relays, relays as 14 come under the control of contact 2B.

Associated with each relay pair are shift magnet control relays numbered from 120 to 126. These are for the purpose of grounding such contacts as 120B, setting up circuits through contacts as 4A, conductors as 4J, to energize shift magnets as 210 (Fig. 9) on the deenergization of relays as 4. These relays are energized from contacts as 3G. Once energized, they lock up through contacts as 120A and contact 2B, and are released when the next even-numbered relay, as 6, is released by contact 2B.

Each pair of sequence relays governs an operation. For example, for an operation without selective registrations, when key 1 is pressed relay 8 is energized through winding 8H, and energizes its mate 7, which in turn energizes relay 10, which energizes its mate 9; and in turn relays 12 and 11, and 18 and 17, are energized; relays 8, 10, and 12 through relays 7, 9, and 11 each energize their respective shift magnet control relays 122, 123, 124; relay 17 energizing closes the sequence control circuit through contact 17J, conductor 17K, closed contacts 127A, conductor 127B, sequence control relay 2, conductor 2C to contacts BB, AA, and CC, of Fig. 12. Control relay 2 energizing opens contact 2B, freeing relay 8 through its contact 8F, grounding contacts 8A and 8B; contact 8B grounds contact 7A and conductor 7K; contact 8A energizes shift magnet 212 (Fig. 9), connecting the circuits from fingers, as 77F (Fig. 4) of the contact bars, as 77A, to the translating relays (Fig. 10), where the coded perforations are translated to the counting relays (Fig. 11), and from the counting relays to the selected register, as wheels 51, 52, 53 (Fig. 3). Contact 8B starts the first operation (without selective registration) by energizing relay 82 (Fig. 4), closing the circuit from the selected meter reading bars 77A, 77B, 77C, and associated fingers (Fig. 4). The deenergization of relay 8 opens contacts 8C and 8F; contact 8C frees winding 7E of relay 7 from this source of energization, and places it under control of contacts 2A and 7B, to be deenergized at the beginning of the registering operation, when sequence control relay 2 is deenergized.

The circuit through sequence control contact CC of relay 173 (Fig. 12) is opened in the course of each counting relay action (except for the carryover), and at any one of the sequence control contacts A and B on a carry-over action. Any opening of contact CC deenergizes sequence control relay 2, and deenergizes the odd-numbered sequence relay (in this example, 7) which at the due stage opens the starting circuit. It requires the closure of all such contacts to energize again the control relay, deenergize the next even-numbered sequence relay, and start the next due operation.

The sequence relays are arranged in part in a chain of pairs, always energized, and in part in single pairs selectively energized. They are numbered in pairs 4 and 3, 6 and 5, and so on to 18 and 17. Once energized, they are released one by one on the energization and deenergization of sequence control relay 2, through the make-before-break contacts 2A and 2B.

The selectively energized pairs are 4 and 3, for amount paid, 6 and 5 for balance due, 14 and 13 for a particular item of merchandise (illustrated as a stove), and 16 and 15 for such another item (illustrated as a refrigerator); their selection for operation is through card perforations (Fig. 2).

Pairs 8 and 7 for last reading, 10 and 9 for previous reading, 12 and 11 for consumption money charge, and 18 and 17 for release, are invariably energized, by the momentary closing of key 1. This directly energizes relay 8, through winding 8H, closing contact 8C, energizing relay 7, through winding 7E, which grounds contact 7C, energizing winding 10D of relay 10, which energizes its mate 9; relay 9 through its contact 9C energizes relay 12, which energizes its mate 11; relay 11 grounds contact 11C and conductor 11X, energizing winding 18D of relay 18, which closes contact 18C and energizes relay 17; relay 17 closes contact 17J and completes the circuit for the energization of sequence control relay 2. Relay 18 energizing grounds contact 18G, conditioning a circuit through conductor 18X preparatory to holding cancellation relays 109 and 110 (Fig. 6) energized for a cancelling operation if there be one.

The special sequence relay pairs enumerated are selectively energized from bars or fingers; as, bar 221, finger 221A, relay 225 and the No. 1 contact of relay 230 (Fig. 6) for pair 4—3; bar 222, finger 222A, relay 226, and the No. 1 contact of relay 231, for pair 6—5; fingers as 97A, pair 14—13; fingers as 99B for pair 16—15 (Fig. 8).

Relays 8, 10, 12, 18, and their mates, if energized are energized in regular order. Relays 4, 6, 14, 16, and their mates are energized selectively according to card perforations.

On the energization of relay 17, contact 17J closes, closing a circuit through contact 127A, conductor 127B, sequence control relay 2, conductor 2C, contacts BB and AA, contact CC (Fig. 12), energizing relay 2; whereupon contact 2B opens; and if relays 4 and 6 and their mates are not energized, contact 8F is freed from ground, releasing relay 8. On the deenergization of relay 2, contact 2A is freed from ground, releasing, through contact 7B and winding 7D, relay 7.

In this manner, each energization of control relay 2 releases the even numbered relay of a pair and the deenergization of the control relay releases the corresponding odd numbered relay of the pair. The energization of the control relay 2 to release the even numbered relay corresponding to the next sequence will also operate to release the shift magnet control relay used in the previous sequence.

If relay 4 is selectively energized, then on the first energization of relay 2 contact 2B frees contact 4F from ground, releasing relay 4; on the deenergization of relay 2, contact 2A opens, freeing contact 3B from ground, releasing relay 3. Relay 8 would be the next relay to be released as described above, as winding 8G is freed from ground when contact 3C opens.

For holding the number wheels a sufficient length of time for reading (and it might be printing), and to start the zero-setting operation, a solenoid, 119, is provided, with a predetermined time of action. It is energized by the release of relay 18, and starts its plunger rod downward. Near the end of the stroke, contact 127A is opened, releasing sequence control relay 2, deenergizing sequence relay 17, which deenergizes the solenoid; also, near the end of the downward stroke, contact 127C is closed, setting up circuits to reset all number wheels to zero.

In Figure 7 only two pairs of sequence relays, 3—4 for amount paid, and 5—6 for balance due, are shown. In practice there would be as many such pairs as the maximum number of times any customer might be expected to be in arrears.

Relay 128 (Fig. 7) is for the purpose of releasing shift magnet 214 (Fig. 9) when the consumption is nil, with 000 on the consumption wheels 57, 58, 59 (Fig. 3), and conditioning the sequence control circuit for such operations as may be due to follow.

Shift Relays. Figure 9

The several shift relays, 151 to 157, are for the purpose of momentarily connecting, in due order of use, the several groups of fingers to energize the translating and carry-over relays, and to connect the operating circuits of the counting relays to the several clutches and other members of the various registers.

There is one multi-contact shift relay for each of the operations; namely, for the amount paid, the balance due, the last reading, the previous reading, the money charge computed from the meter consumption quantity, and the two articles of merchandise in illustration. The shift relays are alike in construction and use, except that the number of contacts in the righthand portion of relay 151 (for amount paid), and the lefthand portion or relay 155 (consumption money charge) varies with the number of circuits to be established.

Each shift relay, as 151, consists of an operating magnet, 210, an armature, 210A, an insulated member, as 210B, for tying together all of the hammer springs (the anvil springs being stationary), of two groups of normally open contacts. The lefthand group of contacts, except relay 155, contains a pair of contacts for each translating relay, arranged in three sub-groups of four parts each, and wired to the translating relays (Fig. 10) through cable 161. The lefthand group of contacts in relay 155 contains a pair of contacts for each pair of counting relays, arranged in three subgroups of nine pairs each. These are from the circuits for registering the consumption money charge. The righthand group of contacts in each of the relays contains a pair of contacts for each branch of the circuit from the operating contacts of the counting and carryover relays to the clutches and other members of the registers.

The shift relays are controlled from the sequence relays (Figs. 7 and 8) through shift magnet control relays, as 120. Each in turn is energized so long as its operation is in progress. When energized, armatures as 210A close all contacts by means of members as 210B. The righthand contact of each pair of contacts in the lefthand group is wired to a cable as 107 which terminates in a like-numbered cable in Figure 5. A like contact in the righthand group is wired to a cable as 198, which also terminates in a like-numbered cable in Figure 16. Other like relays have other like cables terminating near their connecting apparatus. The lefthand contact of each pair of contacts of the righthand group is wired to cable 159 through branches as 159A to the control wires, as A, B, C, D, E, F, of Figure 12, of the stepping and cut-off relays; and each such contact of each pair in such shift relay is likewise multipled to each other in cable 159.

The righthand contacts of the lefthand group of contacts of shift relays 153 and 154 are multipled in cable 78, and extended to the meter reading bars, as 76A, 76B, 76C, and 77A, 77B, 77C (Fig. 4). The righthand contacts of the righthand group of contacts in the shift relays are wired to like-numbered cables in the various figures.

The lefthand contacts of the lefthand group of contacts of relay 155 are wired directly to the counting relays (Fig. 11) through cable 160, as the righthand contacts of this group are wired through cable 200 to the consumption money charge circuits of Figure 16.

The shift relay for each operation is energized at the beginning of the operation through the regular and special sequence relays. The shift relays operate in their order as here numbered: 151 to 157 if there is a full round of operations, including 151 for amount paid, 152 for balance due, 153 and 154 for last and previous readings, 155 for consumption money charge, 156 and 157 for the two articles of merchandise. If there are only the meter readings and the charge for consumption, relays 153, 154, 155 are operated.

The one lot of shift relays suffices for all number wheels that can be advanced according to card perforations, i. e., all except the consumption quantity wheels (Fig. 3).

Contact 153X of relay 153 is for the purpose of energizing relay 173 (Fig. 12), to advance the operation of the sequence relays should the last reading be 000; contact 154X of relay 154, if the previous reading be 000; contact 155X of relay 155, if the money charge be 000.

For convenience of tracing, all contacts of the right-hand group have reference numbers and letters, and correspondingly positioned contacts in the several relays have the same reference letters; each contact is connected to a conductor which is correspondingly positioned in a cable, and each such conductor bears a corresponding reference letter, as A1 is connected to conductor 71A in Figure 3.

*Translating relays. Figure 10*

These relays are for the purpose of translating the four-unit code perforations in the card to a true digital representation, and of setting up circuits for energizing the counting relays (Fig. 11) through cable 148. The circuit here illustrated includes combinational translating relays. Relays 136, 137, 138, 139, are the hundreds; 140, 141, 142, 143, the tens; and 144, 145, 146, 147, the units. The relays of each set will be momentarily energized from the several sets of bars as in (Fig. 5), and the relays selected for energization will correspond to the perforations in the card.

For the purpose of easy identification, the contacts of relays 139, 143, 147, are numbered from 1 to 9 and 0. The 0 contacts of relays 139, 143, and 147, are for the purpose of energizing relay 173 (Fig. 12) through the special contacts of shift relays 153 and 154 (Fig. 9) if the last or previous meter reading is 000. The marking contacts numbered 1 to 9 are multipled to cable 160 through cable 148. The energization of these relays and the circuits set up are described under Operation headings.

*Counting relays. Figure 11*

These relays, all of which are shown in Figure 11, are for the purpose of positioning the several sets of number wheels (Figs. 3 and 16). There are three groups illustrated, respectively for the hundreds, tens, and units orders, with nine pairs in each group each pair corresponding to one of the digits from 1 to 9. These relays are arranged in a chain of two rows for each order of numbers. Relays 20 and 24 as a pair represent 4 in the hundreds order; 30 and 33, 5 in the tens; 36 and 40, 6 in the units. Each relay in the lower row to be energized will be energized from a like-positioned contact, as the No. 4 contact of relay 139 (Fig. 10), through a winding as 20D. This energization is momentary. Once energized, relays as 20 lock up through windings as 20E, contacts as 20C and 29A, so long as contact 29A is closed.

On the energization of such a relay as 20 from the No. 4 contact, its mate 24 is energized through contact 20B; relay 24 in its turn energizes relay 21 through contact 24C. In like manner all relays representing lower numerical values in the chain are energized.

Relay 28, designated a cut-off relay, is in addition to the paired relays. It has two sources of energization: contact 27C and winding 28AA; and contacts 29A, 28B, and winding 28A, so long as contact 29A is closed. It is first energized by contact 27C of the No. 1 pair, and remains energized from this source so long as contact 27C is closed. On deenergization of relay 27, control of relay 28 passes to contact 29A, through contact 28B and winding 28A. On energization of relays as 28, contacts as 28G are grounded, energizing through conductor 28X relay 173 (Fig. 12), opening sequence control contact CC, deenergizing sequence control relay 2 (Fig. 7) which, for example, releases sequence relay 7, removing ground from bar 77, releasing relay 82 (Fig. 4), and frees counting relays 20, 30, and 36, from this source of energization. When these latter relays become energized, they are locked up through contacts as 20C, conductor 29E, and contact 29A, and hold their mates, as 24, energized through contacts as 20B.

It may be noted that here as elsewhere the operation prepared through the card perforations becomes, upon the removal of ground from the bars, independent of the perforations and the bars.

In Figure 11 for each group of counting relays there is one stepping relay: 29 for the hundreds, 35 for the tens, 42 for the units.

On energization of a cut-off relay, as 28, contacts as 28C and 28D are grounded. Contact 28C completes a circuit through conductor 29F to energize stepping relay 29, closing contact 29B and opening contact 29A with a make-before-break effect. On the opening of contact 29A, relay 20 is deenergized, through contact 20C and winding 20E; on the closing of contact 29B, relay 24 is held energized through contact 24B and winding 24A so long as relay 29 is energized.

The subsequent energization and deenergization of stepping relay 29 is effected by a number wheel, as 51 (Fig. 3). Stepping relays, as 29, are in series with clutches of the number wheels, as 51A, and the energization of a stepping relay is effected through a clutch, as 51A, but the deenergization of stepping relay 29 in all but the final operation is effected by the closing of a shunting contact as 54D associated with the number wheel, this contact being closed whenever stepping relay 29 is to be energized. The result is to count the number represented by the code perforations in the card and the counting relay first energized therefrom, and to advance the number wheel accordingly.

This one lot of counting relays suffices for all number wheels thus to be advanced. The counting relays are shown wired to cable 160; their respective conductors from windings as 20D lead to like-positioned contacts in the translating relays (Fig. 10).

The contacts of the cut-off relays, as 28D, and one side of the stepping relays, as 29, are wired by means of conductors as E and F to cable 159, and are multipled to the contacts in the right-hand group of the shift relays. Such conductors are lettered A, B, C, D, E, and F. Each occupies a position in the shift relays corresponding to its letter, beginning with A, the first right-hand pair.

Carry-over relays. Figure 12

The carry-over relays are essentially of the same design and operation as the counting relays. They are for the purpose of effecting arithmetical carry-overs in either direction of number wheel movement.

Each set of carry-over relays for each digit consists of one pair of counting relays, 165 and 166, a cut-off relay, 167, and a stepping relay, 168. When energized, a cut-off relay, as 167, opens contacts as AA, AAA, for the purpose of opening the sequence control circuit and the operating circuit to the next higher order of relays, to prevent their premature operation before the carry-over in the lower order is completed.

Relay 173 is for the purpose of opening the sequence control circuit at contact CC and the circuits of the carry-over stepping relays at contacts 173A and 173B, until the original movement of the number wheels under control of the stepping relays of Figure 11 is completed. On deenergization of relay 173, contact CC also grounds contacts as 167C and 167D of the carry-over relays, if cut-off relay 167 is energized, conditioning each set as 167C and 167D to effect its carry-over on the deenergization of relay 173. If relays 167 and 171 are both energized, contact AAA is open, withholding ground from contacts 171C and 171D until relay 167 is deenergized.

The carry-over relays are connected with the register wheels through cable 159 and like-lettered contacts of the shift relays (Fig. 9).

The details of the operation of the carry-over relays are described under Operation headings.

Consumption money charge circuits. Figures 13, 14, 15

The circuits of this set of figures are for the purpose of effecting registration on the consumption money wheels, 182, 183, 184 (Fig. 16), of the charge as predetermined for every position (up to 125) that may be taken by the consumption quantity wheels 57, 58, 59 (Fig. 3). They are the same as illustrated and claimed in my co-pending application filed May 4, 1931, and bearing Serial Number 535,069. The operation of registration 156, the product of 26 times 6, is illustrated under an Operation heading. The circuits are prearranged for a rate schedule of six cents per unit for the first fifty units, five cents for the second fifty, and four cents for all above one hundred—up to 125, the highest quantity for which complete wiring is shown.

Money registers. Figure 16

In Figure 16 are shown six sets of three number wheels each, on which money charges can be registered: wheels 176, 177, 178, for the amount paid; 179, 180, 181, for the balance due; 182, 183, 184, for the consumption money charge; 185, 186, 187, for charge for one article of merchandise; 188, 189, 190, for charge for a second such article; and 191, 192, 193, for a totalizer. The amount paid wheels, 176, 177, 178, do not register on the totalizer; the others do. All wheels, except the totalizer wheels, 191, 192, 193, are alike in design and operation. Each totalizer wheel has two additional members: a carry-over contact-closing wheel, as 193H, and a contact as 193K for effecting the carry-over. The wheels are of the same design as those shown in Figure 3, and the same draftsman's conventions are applied.

All the wheels are loosely mounted on their several shafts. Shaft 50A is the prime mover, driving the several sub-shafts through gears 197, 197A, 197B, 197C, and 197D.

For all except the totalizer wheels, clutches as 176A, 177A, 178A, are, each in due order, connected with stepping relays 29, 35, 42, whose action has been described. The circuits are established from the counting relays to the clutches, through their several shift relays. The wheels are moved in accordance with the number of counting relays set up by the consumption quantity contact-closing wheels or card perforations.

For the totalizer wheels, 191, 192, 193, when operating in unison with any of the several other groups of wheels, the clutches 191A, 192A, 193A, are energized from contacts 28D, 34D, 41D (Fig. 11) of the cut-off relays. When operating on a carry-over operation, the forward movement of the wheel is under control of clutches as 192A, shunting wheel 192C, contact 192D, and a correspondingly positioned carry-over stepping relay. The wiring of each group of three number wheels, except the totalizer group, terminates in a nearby cable; for the totalizer wheels, which operate in unison with four of the five sets of wheels, the wiring to the several members, as clutch 192A, is multipled in four of the five cables to conductors as 202D and 201D, which are wired to contacts of the shift relays 152, 155, 156, 157, which bear the same reference letters; these in turn are wired to operating members of the counting relays (Fig. 11), which also bear the same reference letters.

For carry-over operations on the totalizer wheels, certain members, as clutch 192A, are multipled within each cable, as conductor 202D is multipled to conductor 202G, which is also wired through the several cables to contacts in the several shift relays bearing the same reference letter, as G2. In this instance, the shift relay contact G2 is wired to conductor G, the stepping relay of the carry-over relays (Fig. 12), for advancing the wheel on a carry-over. The shunting contacts, as 192J, are not multipled within their own cables, but are wired through cables as 200 (Fig. 16), cable 200 (Fig. 9), directly to a shift relay contact as J5 and conductor J of carry-over relays (Fig. 12).

With this arrangement, it will be seen that clutches as 192A are energized on all registering operations from cut-off relay contacts, as 34D, and on carry-over operations through stepping relay 168 of the carry-over relays (Fig. 12). The shunting contacts, as 192D, in registering operations are ineffective; on carry-over operations they are effective, and are grounded by contacts as 167D of carry-over relays.

Relays 194, 195, 196, are zero-setting relays for the several sets of number wheels. Once energized, they remain energized until all wheels reach their zero positions.

Full details of operation will be described under Operation headings.

*Description of operation*

The operation first described relates to a consumer who has paid $2.50 on account, leaving a balance due of $2.50, with meter readings of 442 and 416, the difference, or consumption quantity, being 26, which is multiplied (in effect) by a rate of 6 to produce a money charge of $1.56, with a charge for a stove of $2.50 as one of a series, and with the cancellation of a series of like charges for a refrigerator. The repetitions of the figures 250 tend toward simplicity without confusion.

*Cards.*—The cards of Figures 1 and 2 are inserted, each in a standard stationary position between the contact bars and fingers. The card of Figure 1 is perforated at the second position or area thereon adapted to receive perforations pertaining to a meter reading for a last meter reading of 442, respectively for the hundreds, tens, and units, at 77FF, 77GG (4); 77HH, 77JJ (4); and 77KK (2); and the card is also perforated at the first position or area thereon adapted to receive perforations pertaining to a meter reading for a previous meter reading of 416, respectively at 76FF, 76GG (4); 76HH (1); and 76KK, 76JJ (6); and for the second month of the year at 77DD, and for the first month at 76DD. The perforations in the card of Figure 2 are later recited.

PRELIMINARY DESCRIPTION

The following description of the operation of my machine is made with reference to the timing charts Figs. 25 to 52 and more particularly to Figs. 25 to 36 wherein an operation entailing the conditions just above described is charted.

*Sequence relay preparations.*—Prior to the time the machine is set in operation, the switches 79 (last reading—Fig. 4), 101, 106 (Fig. 6) are set to the second contact, representing the second month, and previous reading switch 80 (Fig. 4) to the first contact, representing the first month.

With the cards in place, key 1 (Fig. 7) is momentarily pressed at the point 400 (Fig. 25). This grounds conductors 1A, 1B, 1C, 1D; the first of these to be so grounded, 1A, potentializes winding 8H of sequence relay 8 (last reading), and this relay upon energizing at point 401 closes contacts 8D, 8C, 8F, and opens contacts 8A and 8B. Contact 8F closes a circuit through winding 8E, conductor 2D, to contact 2B, holding relay 8 energized from this source, until sequence relay 2 is energized. Contact 8C energizes winding 7E of relay 7 at point 402, energizing it at point 403. Contact 8D closes a holding circuit through winding 8G to contacts as 5C to retain relay 8 energized against the action of relay 2 if relay 5 or 3, or both, is energized.

Upon the energization of relay 7 at point 403 relay 10 starts to energize at the point 404 and when this relay is energized at point 405 relay 9 starts to energize and energization of this relay is completed at the point 406.

Upon the energization of relay 7 at point 403 the contact 7G closed whereupon relay 122 started to energize at point 407, and this relay is energized at the point 408. Upon the energization of the relay 9 at the point 406 contact 9G closed and thereupon relay 123 started to energize, this relay being energized at the point 409.

Contact 8A opening opens the circuit from contact 122B to the shift relay under its control, 153 (Fig. 9). Contact 8B opening opens the circuit to contact 7A, preventing electrification of conductor 7K until its sequence of operation is reached.

Conductor 1D, the second of the several conductors to ground, grounds cancellation bar 98 and through perforation 98AA grounds conductor 98B, energizing winding 110C of slow-to-release relay 110 at point 410, momentarily energizing it and when relay 110 is fully energized at point 411 it remains energized by reason of its slow-to-release operation and subsequently this relay is locked in its energized condition through winding 110D, contact 110A, conductor 18X and contact 18G (Fig. 8) as will later be described. Contact 110B opens at point 411, preventing energization of sequence relay 16 (Fig. 8) through conductor 16X, which withholds registration of the monthly payment on the refrigerator.

Conductor 1B, the third of the several conductors to ground, grounds switch 101, contact 101A, conductors 101B, 101C, momentarily potentializing relays 228 and 229, at points 412 and 413, respectively, whereupon these relays start to energize and when energized at points 414 and 415, respectively, close their several contacts. Bar 221 grounds at point 414 through perforation 221AA finger 221A, potentializing through contact 228A relay 225 at point 416 which when energized at point 417 closes contact 225A, grounding the No. 1 contact of relay 230, potentializing through conductor 4X and winding 4D relay 4 at point 418. In a like manner, bar 222 grounds finger 222A, and through contact 229A relay 226 is energized at point 419, grounding the No. 1 contact of relay 231, energizing through conductor 6X relay 6 at point 420. Relays 4 and 6 lock up through contacts 4F and 6F, and when these relays are energized at points 418 and 420, the contacts 4C and 6C thereof close whereupon circuit is closed to relays 3 and 5, and these last relays are therefore energized at points 421 and 422, respectively.

Conductor 1C, the last of the four conductors to ground, grounds merchandise monthly switch 106, contact 106A, conductors 106B, 106C, fingers 93E, 92E, and through perforations 93EE and 92EE bars 93 (for months to pay on refrigerator) and 92 (for months to pay on stove) ground conductors 92X and 93X, and article selector bars 97 and 99. Through perforations 97AA and 99BB, fingers 97A and 99B, conductors 97X and 99X are grounded. The ground on 99X is ineffective, as the circuit is open at contact 110B, due to relay 110 being previously energized. The ground on conductor 97X completes its circuit through contact 109B, conductor 14X, potentializing winding 14H of sequence relay 14 (Fig. 8) at point 423, which locks up at point 424 with the effect before described and when this relay is locked up contact 14C thereof is closed whereupon relay 13 is potentialized wherefore this relay energizes at point 425.

Sequence relays 4, 6, 8, 14 and their mates 3, 5, 7 and 13 (Figs. 7 and 8) are now energized; of these, relay 8 was the first to energize; it in turn energized relay 7, as before described, closing contacts 7A, 7B, 7C, 7G. Contact 7A is not effective until relay 8 is deenergized, as described more fully presently, contact 7B completes a holding circuit through winding 7D, conductor 2E, contact 2A, which is effective when relay 2 is energized.

Relay 10 energizing energized relay 9, as before described, which energized relay 12 at point 426; relay 12 energized relay 11 at point 427; relay 11 through contact 11C grounded, conductor 11X, potentializing winding 18D of relay 18 at point 428. Relay 18 was energized at point 429 and thereupon relay 17 started to energize and this relay was energized at point 430; relay 18 also grounds contact 18G, conductor 18X, completing a holding circuit through conductor 18X for cancellation relay 110 (Fig. 6), which now locks up through contact 110A and winding 110D.

Sequence relays 4, 6, 8, 10, 12, 14, and 18, are now energized. On their energization, their mates 3, 5, 7, 9, 11, 13, 17, were also energized, and in the same manner as described for relay 7. They close contacts as 7G, energizing through windings, as 122E, shift magnet control relays as 122, and several like relays, 120, 121, 123, 124 and 125, which relays become energized at points 431, 432, 409, 433 and 434, respectively. Relay 4 is now locked up through winding 4E, contact 4F, conductor 2D, and sequence control contact 2B. Relay 3 is energized through winding 3E by contact 4C; and through contacts 3F and 6D, and winding 6G, relay 6 is held energized against the action of contact 2B until its sequence of operation is reached. Relays 8 and 14 are held energized in a like manner. Relays 10 and 12 are held energized from contacts as 7C, 9C, and windings as 10D, relay 18, from contacts as 11C, and winding 18D.

With the energization of relay 17 at point 430, contact 17J is closed, closing the sequence control circuit through conductor 17K, contact 127A, conductor 127B, sequence control relay 2, conductor 2C, sequence control contacts BB, AA, and CC (Fig. 12), and thereupon at point 435 sequence control relay 2 starts to energize.

*Preparation for registration of amount paid.*—The sequence control circuit is closed, potentializing sequence control relay 2 at point 435 and when this relay is energized at point 436 contact 2B opens and contact 2A closes; contact 2B frees conductor 2D and contact 4F from ground and therefore at point 437 relay 4 starts to release; (windings 4D and 6H of relays 4 and 6 are freed of ground at points 438 and 439 for at points 440 and 441 the switch which was opened to free relays 228 and 229 of ground and the release of these relays initiated the release of relays 225 and 226 at points 442 and 443, and it was the release of these relays at points 438 and 439 that freed windings 4D and 6H of ground) contact 2A grounds conductor 2E and contact 3B, holding relay 3 energized through winding 3D. Contacts 4A and 4B are closed at point 444; contact 4A completes the circuit from contact 120B of shift control relay 120, through conductor 4J to shift magnet 210 (Fig. 9), potentializing it at point 445, and this relay when energized at point 446 closes all of its paired relays. Contact 4B completes a circuit from ground through contact 3A and conductor 3K to relay 104 (Fig. 5), which thereupon starts to energize at point 471, and upon its energization at point 472 the contacts thereof are closed. Hence when the shift magnet is energized at point 446 it is effective for closing circuits from bars 91A, 91B and 91C through perforations 91FF, 91GG, 91HH (Fig. 2), fingers 91F, 91G and 91H, cable 107 (Figs. 5 and 9), through contacts 151A, 151B, 151C, and cable 161 to the translating relays 137, 142 and 147 (Fig. 10), which therefore respectively start to energize at points 447, 448 and 449. Contacts 4A and 4B are closed at point 444; contact 4A completes the circuit from contact 120B of shift control relay 120, through conductor 4J to shift magnet 210 (Fig. 9), all of its paired contacts, and closing the circuits from bars 91A, 91B, 91C, through perforations 91FF, 91GG, 91HH (Fig. 2), fingers 91F, 91G, 91H, cable 107 (Figs. 5 and 9), through contacts 151A, 151B, 151C, cable 161 to the translating relays (Fig. 10). The translating relays close circuits thence to the counting relays of Fig. 11. The counting relays close circuits through cables 159, 159A, to the right-hand group of contacts of shift relays 151, cable 198 (Figs. 9 and 16), to the connecting members of the register wheels 176, 177, 178.

The 0 is ineffective on this and all other operations when either except the last meter reading or the previous meter reading or both are zero, or the consumption is zero, as will be explained more fully hereinafter. Relay 137 energizing at point 450 closes effectively contact 137C, which is grounded from contact 136B, grounding contacts 138E and 139G, the No. 2 contact, starting to energize through cables 148 and 160 winding 22D of counting relay 22 for the hundreds (2) at point 453. In a like manner, shift contact 151B energizes translating relay 142, grounding contact 142F from contacts 141D and 140B, grounding 143J, the No. 5 contact, thus starting to energize through cable 148, 160 counting relay 30 for the tens (5) at point 454. For the units (0), relay 147 is energized, without effect.

*Energization of counting relays for registration of amount paid*

Relay 22 upon energization at point 455 grounds contact 22B which initiates energization of relay 26 at point 473 and when this relay is energized at point 457 it initiates energization of relay 23, which, in turn, when energized at point 458, initiates energization of relay 27, whole energization of relay 27 at point 459 initiates energization of cut-off relay 28 at point 460. Once energized, cut-off relays as 28 also have as a means of energization windings at 28A which are energized through contacts as 28B, conductors as 29E and contacts as 29A, so long as stepping relays as 29 are deenergized. Contact 22C is also effective through conductor 29E and contact 29A of relay 29, while said relay is unenergized, for founding and holding relay 22 energized. Contact 22B will hold relay 26 energized so long as said contact is held closed by relay 22.

Upon the energization of cut-off relay 28 at point 461 the contacts 28C, 28D and 28G thereof are closed. The closing of contact 28C grounds stepping relay 29 whereupon this relay starts to energize at point 462, the energization of this relay being completed at point 463.

The energization of counting relay 30 at point 456 resulted in the successive energization of its mate and relays of lower numerical value in the chain whereupon the cut-off relay 34 of this chain energizes at point 464 and grounds the associated stepping relay 35 at point 465 whereupon this stepping relay energizes at point 466. The periods of energization for these groups of relays in the tens and hundreds order overlap in point of time, as do their subsequent periods for deenergization in the manner presently to be described. Since, however, in the present example a fewer number of counting relays (representative of 2) are locked up in the hundreds order than in the tens order, both the energizing period and the deenergizing period for the relays of the hundreds order are shorter than the corresponding periods for the tens order.

The closure of contacts 28C and 34C at points 461 and 464, respectively, set up circuits through the stepping relays 29 and 35, hereinabove described as energizing at points 463 and 466 respectively, through cables 159, 159A, the right hand group of contacts of shift relay 151 (Fig. 9), cable 198 (Figs. 9 and 16) applying ground to clutches 176A and 177A at points 467 and 468 whereupon these clutches start to energize at the same time respectively as stepping relays 29 and 35 at points 462 and 465. Stepping relay 29 and clutch 176A begin energization prior to stepping relay 35 and clutch 177A because of the fewer number of counting relays locked-up in the hundreds order. The energization of clutch 176A at point 469 sets number wheel 176 in motion and the energization of clutch 177A at point 470 sets number wheel 177 in motion.

The first of the cut-off relays 28 and 34 to energize, and in the present example it is cut-off relay 28, supplies ground from a contact as 28G to conductor 28X and thence to relay 173 which begins to energize at point 474 and upon completion of its energization at point 475, contact CC is opened thereby opening the series circuit which had held sequence control relay 2 energized. Thereupon at point 476 sequence control relay 2 commences to deenergize and upon its deenergization at point 477 contact 2A thereof opens, subsequent to the closing of contact 2B thereby breaking the energization circuit for winding 3D of sequence relay 3 which thereupon commences to deenergize and its deenergization is completed at point 478. When sequence relay 3 deenergizes, contact 3A thereof is relieved of ground for thus freeing from ground the conductor 3K and relay 104 (Fig. 5) the latter then becoming deenergized at point 479 thereby opening the circuits in series with contacts 104A, 104B and 104C and thus isolating the ground at contact bars 91A, 91B and 91C from the translating relays 137, 142 and 147 (Fig. 10), which are then depotentialized at points 480, 481 and 482.

When the translating relay 137 deenergizes at point 480 it opens the series circuit starting at the grounded movable contact of translating relay 136, and including the central winding 22D of counting relay 22 whereupon at point 483 said relay starts deenergization which is completed at point 484, the left-hand winding of relay 22 having been previously deenergized immediately after stepping relay 29 energized at point 463 and opened contact 29A for freeing said left-hand winding of relay 22 from ground through conductor 29E and contact 22C. Deenergization of translating relay 142 at point 481 opens the series circuit started at the grounded movable contact of translating relay 140 and including the central winding 30D of counting relay 30 whereupon said winding is permitted to deenergize, but relay 30 remains energized through its left-hand winding which is held energized from ground at contact 35A of unenergized stepping relay 35 and through conductor 35E and contact 30C. Translating relay 147 was ineffective in this operation upon energization and is likewise ineffective when it becomes deenergized at point 482.

As the chain of counting relays starting with relays 30 and 33 proceeds with energization one after the other and finally with the energization of stepping relay 35 at point 466, contact 35A will be freed from ground thereby freeing from ground conductor 35E and the left-hand winding of relay 30 whereupon said relay begins to deenergize at point 485 and completes deenergization at point 486.

Relay 3 upon deenergization, in addition to opening contact 3A with the above described effect, opens contacts 3C, 3F and 3G to free them from the ground, contact 3G thus freeing winding 120E of shift magnet control relay 120 from ground, and conditioning it for release through contacts 120A and 2B on the next energization of sequence control relay 2.

The successive release of the counting relay locked up in the tens and hundreds orders now proceeds as permitted by the alternate energization and deenergization of the stepping relays 29 and 35. As explained hereinabove the stepping relays 29 and 35 during the present stage of operation of the apparatus are respectively in series with clutches 176A and 177A (Fig. 16). Referring particularly to the wheel unit of hundreds order and associated with the clutch 176A in Fig. 16 it will be observed that upon the energization of clutch 176A at point 469 the number wheel 176 will commence rotation with the constantly rotating shaft 50A. Just prior to such rotation the number wheel 176 stood at zero and shortly after the beginning of such rotation while the number wheel is moving from the zero position to the position wherein the numeral 1 is displayed, the shunting wheel 176C, which rotates unitarily with the number wheel 176, will carry one of the lobes 176X thereon into position for closing the shunting contact 176D whereupon ground is extended from contact 194A of relay 194 (Fig. 16) through conductor 194B and thence through the contact 176D to conductor 198E. It will be noted that such provision of ground from contact 194A upon the conductor 198E will simply supplement the source of ground supplied to said conductor 198E from contact 28C (Fig. 11) and hence clutch 176A which is provided with a local battery will remain energized. However, stepping relay 29 will be shunted out of the circuit since it is then connected to ground upon each side of the circuit passing therethrough, the one point of ground being at contact 28C and the other at contact 194A (Fig. 16). In other words the grounding of contact 194A short circuits the source of the battery at clutch 176A so far as concerns energization of stepping relay 29. The deenergization of stepping relay 29 effected by this first closing of contact 176D (Fig. 16) begins at point 487 and is completed at point 488.

During the deenergization of stepping relay 29 contact 29A is made prior to the breaking of contact 29B. The breaking or opening of contact 29B relieves said contact of its source of ground whereupon conductor 29D and the right-hand winding of relay 26 are relieved of ground whereupon relay 26 begins to deenergize and is completely deenergized at point 489, the left-hand winding of relay 26 having been previously deenergized upon the opening of contact 22B incident to the deenergization of counting relay 22.

Rotation of the number wheel 176 and shunting wheel 176C continues and prior to the entry of the first digit upon said number wheel the shunting wheel lobe 176X described above as passing beneath shunting contact 176D, passes beyond the position where it is effective for closing contact 176D whereupon said contact 176D opens and removes the shunt from stepping relay 29. Stepping relay 29 then begins to energize at point 490 and during its energization at point 491 opens contact 29A subsequent to the closing of contact 29B. Thus contact 29B is grounded in time to place ground upon the right-hand winding of energized relay 27 prior to the removal of ground from the left-hand winding of relay 23 by the opening of contact 29A. Such opening of contact 29A and removal of ground from the left-hand winding of relay 23 results in deenergization of relay 23 at point 492.

The number wheels are rotated at such speed that twenty space divisions on the chart cover the time required for the number wheels to rotate from one digital position to the next. Entry of the first digit on number wheel 176 occurs at point 491A on the line pertaining to stepping relay 29 and at point 491a on the line pertaining to the clutch 176A. The second digit 2 is entered twenty chart divisions later at the time indicated by points 502A and 503 respectively on the lines pertaining to stepping relay 29 and clutch 176A.

As rotation of the number wheel 176 proceeds and shortly after the entry of the digit 1 at the time indicated by points 491A and 491a, a succeeding lobe upon shunting wheel 176C passes into the proper position with respect to the contact 176D to close said contact thereby shunting out the stepping relay 29 a second time and in the manner previously described. Thereupon stepping relay 29 begins to deenergize and upon its deenergization at point 493 relay 27 is disconnected from ground at contact 29B and begins to deenergize at point 494, such energization being completed at point 495. Meanwhile contact 29A which closed prior to the opening of contact 29B, has become grounded and is effective through conductor 29E to hold cut-off relay 28 energized.

During continued rotation of the number wheel 176 incident to entry of the second digit 2 and prior to the entry of such digit the second lobe of shunting wheel 176C passes from where it is effective for closing contact 176D thereby permitting the shunting contact 176D to open and stepping relay 29 to again become energized. Stepping relay 29 begins to energize at point 496 and upon its energization at point 497 contact 29A is opened thereby removing ground from conductor 29E and the right hand winding 28A of cut-off relay 28. Thereupon cut-off relay 28 begins deenergization at point 498 and becomes fully deenergized at point 499. When cut-off relay 28 is thus deenergized contact 28C thereof is opened whereby ground is removed from the series circuit including conductor 29F, stepping relay 29, conductor °E (Figs. 11 and 12), cable 159 (Figs. 12 and 9) contact E1 of shift relay 151, cable 198 (Figs. 9 and 16), conductor 198E, clutch 176A and its battery and ground. Consequently at point 500 the stepping relay 29 begins to deenergize and at the same time at point 501 clutch 176A begins to deenergize. Deenergization of stepping relay 29 is completed at point 502 whereas deenergization of the clutch 176A is completed and the number wheel 176 stops rotating at point 503. The number wheel 176 now displays the digit 2.

Energization of the stepping relay and of a number wheel clutch associated with a particular order takes place immediately upon the energization of the cut-off relay associated with such order and immediately subsequently to the energization of the chain of counting relays set up as an incident to entering the digit of that particular order. The action of the counting relays, the cut-off and stepping relays and the number wheel operating clutches of each order operates independently of those of the other orders. Therefore, the entry of the digit 5 in the tens order, while beginning at a time slightly after the beginning of the entry of the digit 2 in the hundreds order, takes place during a time overlapping with that for the entry of the digit 2.

Concurrently with potentialization of stepping relay 35 at point 465 the tens order clutch 177A (Fig. 16) which is in series therewith begins energization at point 468. Upon the energization of clutch 177A at point 470 the number wheel 177 is connected to and begins to rotate with shaft 50A. Shortly after number wheel 177 begins to rotate from the zero position, the shunting wheel 177C carries one of its lobes beneath shunting contact 177D whereby ground is applied to conductor 198C at a point between clutch 177A and stepping relay 35, the ground being obtained from contact 194A of unenergized relay 194. As has been explained hereinabove with respect to clutch 176A and the application of ground to the corresponding conductor 198E associated therewith and through shunting contact 176D, the placing of ground upon conductor 198C by the shunting contact 177D does not deenergize clutch 177A and therefore the number wheel 177 continues to rotate with the shaft 50A. Such placing of ground upon conductor 198C, however, does shunt out stepping relay 35 whereupon the stepping relay 35 begins to deenergize at point 504 and becomes completely deenergized at point 505. The sequential release and operation of the counting relays which have been locked up in the tens order is similar to that already described with reference to the counting relays locked up in the hundreds order. That is, each time the number wheel 177 moves a short distance from a digital position toward the succeeding digital position the shunting contact 177D will be closed and the stepping relay 35 thus shunted out to release a counting relay as relay 33 in the upper line of the double row of counting relays and each time shortly prior to the entry of the succeeding digit the shunting wheel associated with the number wheel will be rotated a sufficient distance to permit contact 177D to open and remove the shunt from the stepping relay 35 thus permitting said relay to become energized, thereby opening its contact 35A to remove ground from and cause deenergization of the next of the locked-up counting relays in the lower line of the double row pertaining to the tens order. Upon the first deenergization of stepping relay 35 shortly after the number wheel 177 moves away from the zero position and as indicated at point 505 contact 35B is disconnected from ground whereby relay 33 is depotentialized and therefore becomes deenergized at point 506. Later and shortly prior to the entry of the first digit 1 the contact 177D is opened so that the shunt is removed from stepping relay 35 whereupon it becomes energized at point 507. Energization of relay 35 at point 507 relieves ground from contact 35A thereby causing relay 31 to start deenergization which is completed at point 508.

Shortly thereafter the first digit is entered upon the tens wheel 177 at points 507A and 507a indicated respectively on the lines pertaining to the stepping relay 35 and the clutch 177A, and subsequently a second lobe of the shunting wheel 177C is carried into position for closing shunting contact 177D whereupon stepping relay 35 is deenergized a second time at point 509 to open contact 35B and thus remove ground from and release the counting relay next below counting relay 31 in the chain and as indicated at point 510.

Alternate energization and deenergization of stepping relay 35 takes place in the time interval represented by the space between the lines I—I', of the chart, there having been locked up as many pairs of counting relays as there were digits to be entered upon the number wheel 177. Prior to the entry of the fifth digit, the fifth of the lobes upon the shunting wheel 177C to have been brought into cooperation with the shunting contact 177D will be moved from its operative position whereby the shunting contact 177D opens and relieves the shunt from across stepping relay 35 whereupon said stepping relay begins to energize at point 511 and upon its energization at point 512 contact 35A is opened relieving ground from cut-off relay 34 and causing it to begin deenergization at point 513. When cut-off relay 34 deenergized at point 514, contact 34C thereof is opened to remove ground from the series circuit including conductor 35F, stepping relay 35, conductor 198C (Fig. 16) and the clutch 177A. Therefore with this opening of contact 34C stepping relay 35 and clutch 177A begin deenergization respectively at points 515 and 516. Deenergization of the stepping relay 35 and of the clutch 177A is respectively completed at points 517 and 518, the number wheel 177 stopping rotation at this later point. The number wheels 176, 177 and 178 in the Amount paid section of the register now display 250, or $2.50.

*Registration of balance due.*—With the deenergization of cut-off relay 34 at point 514, the last of the cut-off relays to deenergize, all contacts as 28G and 34G are opened, deenergizing relay 173 (Fig. 12) at point 519 and grounding sequence control contact CC, energizing sequence control relay 2 at point 520, opening contact 2B, releasing sequence relay 6 at point 521, through conductor 2D, contact 6F, and winding 6E. Contact 2B opening also frees contact 120A from ground, releasing shift magnet control relay 120 at point 522, freeing contact 120B from ground, releasing through contact 4A and conductor 4J the magnet 210 of shift relay 151 at point 523.

Contacts 121B and 6A are closed; 6A completes a circuit from 121B through conductor 6J to magnet 211 of shift relay 152, which thereupon begins to energize and completes energization at point 524. Contact 6B grounds contact 5A, conductor 5K (Figs. 7 and 5), causing energization of relay 105 at point 525, which sets up circuits as before described from fingers 90F, 90G and 90H extending through card perforations 90FF, 90GG, and 90HH, into grounded relation with the bars 90A, 90B, and 90C, the grounded circuit extending through the contacts of relay 105, cable 108, (Figs. 5 and 9), shift relay contacts 152A, 152B, 152C, to translating relays 137, 142, 147 energizing them at points 526, 527, and 528.

Since the present registration of Balance due is the same in amount as the registration described above with respect to the Amount paid, the same translating relays are energized as before. The grounded circuits set up by the energized translating relays are extended to counting relays 22 and 30, as before, which thereupon start to energize and complete such energization at points 529 and 530. The chains of counting relays again lock up, the chain pertaining to the hundreds order being succeeded by the energization of cut-off relay 28 at point 531 and the energization of stepping relay 29 at point 532. The chain of counting relays locked up in the tens order is succeeded by the energization of cut-off relay 34 at point 533 and immediately thereafter the energization of stepping relay 35 at point 534.

Upon the energization of cut-off relay 28, which is the first of the cut-off relays to energize, contact 28G thereof grounds conductor 28X thereby starting to energize relay 173 at point 535 and upon the energization of relay 173 at point 536 contact CC thereof opens, releasing sequence control relay 2 which immediately begins deenergization, that is completed at point 537. Deenergization of sequence control relay 2 causes contact 2A thereof to open and break the circuit extending through contact 5B of sequence relay 5 thus resulting in deenergization of relay 5 at point 538. Relay 5 upon its deenergization releases contact 5A thereby removing ground from relay 105 (Fig. 5) which immediately begins deenergization which is completed at point 539. Thereupon the contacts of relay 105 are opened and break the ground connection between the bars 90A, 90B and 90C and the translating relays 137, 142 and 147. Said translating relays then begin deenergization at points 540, 541 and 542 thereby breaking the source of ground for energization of counting relays 22 and 30.

Since at this time stepping relay 29 is energized thereby freeing contact 29A, conductor 29E and the left-hand winding 22E of relay 22 from ground, the deenergization of translating relay 137 at point 543 will result in depotentialization of relay 22 at point 544 together with the central winding 22D. Relay 30 however does not deenergize immediately upon deenergization of its central winding 30D upon deenergization of translating relay 142 since stepping relay 35 is not yet energized and hence contact 35A remains grounded to supply ground through conductor 35E to the left-hand winding of counting relay 30.

Upon the energization of cut-off relays 28 and 34 contacts 28C, 28D, 34C and 34D are closed. Contacts 28C, 28D, 34C and 34D respectively ground conductors E, F, C and D (Figs. 11 and 12) which conductors are extended through cable 159 to contacts E2, F2, C2 and D2 of shift relay 152 (Fig. 9), the circuits extending through conductors 199E, 199F, 199C and 199D in cable 199 (Figs. 9 and 16). Conductors 199E and 199C are connected with clutches 179A and 180A, the other side of these clutches being connected through battery with ground. Conductors 199F and 199D lead respectively to conductors 203F and 203G which in turn respectively connect with clutches 191A and 192A of the totalizer register 191—192—193. Thus it will be seen that contacts 28C and 28D of Fig. 11 respectively extend ground to clutches 179A and 191A in the Balance due and the totalizer registers while contacts 34C and 34D are connected respectively extend ground to the clutches 180A and 192A of said registers. Since contacts 28C and 28D close simultaneously ground will be supplied to clutches 179A and 191A at the same time whereupon said clutches begin to energize at points 545 and 546 and upon completion of their energization at points 547 and 548 the number wheels 179 and 191 as well as the shunting wheels respectively associated therewith begin to rotate with the constantly rotating shafts upon which they are mounted. Rotation of the number wheel 179 and its shunting wheel 179C operate the shunting contact 179D for alternately applying and removing ground to the conductor 199E at a point adjacent to the clutch 179A and between said clutch and the stepping relay 29 to thereby periodically shunt out and deenergize stepping relay 29 to cause successive deenergization of the locked-up counting relays in the hundreds order in the manner hereinabove described during entry of the Amount paid. As the number wheels 179 and 191 rotate with their respective shafts which rotate at the same speed, the shunting wheel 179C brings one of its lobes into position for closing the shunting contact 179D shortly after the wheel leaves the zero position, thereby causing stepping relay 29 to become deenergized at point 549. Thereupon contact 29B is removed from ground and thus causes counting relay 26 to become deenergized at point 550. Alternate energization and deenergization of stepping relay 29 continues during the interval of time represented by the space between vertical chart lines II—II', and before the end of such time interval and just prior to the entry of the second digit 2 on number wheels 179 and 191 the shunting contact 179D opens whereupon stepping relay 29 energizes to release the cut-off relay 28 which immediately upon deenergization opens its theretofore grounded contacts 28C and 28D. The opening of contact 28C breaks the series circuit including stepping relay 29 and the clutch 179A, while the opening of contact 28D opens the series circuit including clutch 191A. In this manner clutches 179A and 191A start to deenergize simultaneously and deenergize at such time as to cause number wheels 179 and 191 to cease rotation while each is in the position showing entry of the digit 2.

Cut-off relay 34, upon its energization at point 533 and the consequent grounding of its contacts 34C and 34D establishes the above described circuits including the conductors C and D (Figs. 11 and 12) and the conductors 199C and 203G (Fig. 16) for potentializing clutches 180A and 192A at points 551 and 552 which clutches become energized for connecting the number wheels 180 and 192 to their respective shafts at points 553 and 554. Thereupon the number wheels 180 and 192 take synchronous motion with their shafts while the shunting wheel 180C brings successive lobes into position for closing the shunting contact 180D shortly after the number wheels move beyond each digital position and for opening such shunting contact shortly prior to the number wheels reaching the next digital position. In this way the stepping relay 35 is successively deenergized and energized incident to deenergizing the locked-up counting relays of the tens order one after the other and then deenergizing the cut-off relay 34. That is, shortly prior to the number wheels 180 and 192 reaching the positions for showing entries of the digit 5 one of the lobes upon the shunting wheel 180C will be removed from the position where it had been effective for closing shunting contact 180D whereby ground is removed from the circuit between stepping relay 35 and the clutch 180A and stepping relay 35 again becomes potentialized at 555. Upon energization of stepping relay 35 at point 556 contact 35A opens thereby removing ground from cut-off relay 34 which immediately begins deenergization at point 557 and upon its deenergization at point 558 and the consequent opening of contact 34C, the series circuit including stepping relay 35 and clutch 180A is broken so that said stepping relay 35 and clutch 180A begin to deenergize at points 559 and 560. Contact 34D is also removed from ground thereby breaking the circuit including conductor D (Figs. 11 and 12), conductor 203G (Fig. 16) and the clutch 192A whereupon said clutch begins to deenergize at point 561. Clutches 180A and 192A therefore become completely deenergized simultaneously at points 562 and 563 and when the number wheels 180 and 192 will be released from their respective driving shafts at a time to display entries of the digit 5. The Balance due register 179—180—181 and the Totalizer register 191—192—193 will now each display entries of 250, or $2.50.

Registration of last reading: (442)

With the deenergization of relay 34 at point 558, the last of the cut-off relays to deenergize near the end of the operation for entering the amount of 250 on the number wheels of the Balance due and the Totalizer registers, relay 173 is depotentialized a point 564 and becomes deenergized at point 565 thereby closing contact CC and thus starting energization of sequence control relay 2 at point 566 and upon energization of relay 2 at point 567 contact 2B opens causing depotentialization of shift magnet control relay 121 at point 568, through its left-hand winding the relay 121 becoming deenergized at point 569. The right-hand winding of relay 121 had been previously deenergized upon the deenergization of sequence relay 5 at point 538. Hence relay 121 was at that time left energized through its left-hand winding and under control of sequence control relay 2.

Upon the deenergization of shift magnet control relay 121 at point 569 contact 121B opened whereupon the circuit including contact 6A and conductor 6J were removed from ground to cause shift magnet 211 to begin deenergization at point 570. Relay 8 is also released through contact 2B incident to the energization of sequence control relay 2, the deenergization of relay 8 commencing at point 571 and being completed at point 572. Released relay 8 closes contact 8A thereby commencing energization through conductor 8J of shift magnet 212 at point 573. Shift magnet 212 becomes fully energized at point 574. Closed contact 8B of deenergized sequence relay 8 grounds contact 7A of energized relay 7, conductor 7K, switch 79, contact 79A, conductor 80B, finger 77D; and through card perforations 77DD monthly reading selector bar 77 is grounded whereupon relay 82 starts energization at point 575 and upon energization at point 576 conditions circuits as before described through perforations 77FF and 77GG for the hundreds (4), 77HH and 77JJ for the tens (4) and 77KK for the units (2). The circuits are thus extended from ground at the bars 77A, 77B and 77C through cable 78 (Figs. 4 and 9) to contacts 153A, 153B, 153C, 153D and 153E thereby energizing translating relays 137 and 139 for the hundreds (4), 141 and 143 for the tens (4) and 145 for the units (2). Although relay 82 is energized at point 576, a point in advance of the energization of the shift magnet relay 212 at point 574, the circuits prepared by the closing of the contacts of relay 82 cannot be extended to the translating relays until the shift relay 153 is closed. Consequently upon the closing of the contacts of shift relay 153 at point 574 the translating relays 137, 139, 141, 143 and 145 begin to energize at points 577, 578, 579, 580 and 581.

When relay 137 energizes at point 582 for closing contact 137C and upon the energization of relay 139 at point 583 for closing contact 139F, conductor number 4 is grounded thereby extending the ground to the central winding of relay 20 (Fig. 11) which begins energization at point 584 and completes energization at point 585. For the tens, relays 141 and 143 upon becoming energized at points 588 and 589 close contacts for placing ground upon the number 4 conductor at relay 143 thereby extending ground to and starting energization of counting relay 31 at point 586, this relay becoming fully energized at point 587. For the units, translating relay 145 upon energizing at point 590 closes contact 145C thereby grounding the number 2 conductor associated with relay 147 and resulting in energization of counting relay 39 at point 591.

As soon as counting relays 20, 31 and 39 become energized, the counting relays of lower numerical value respectively associated therewith begin to lock up one after the other so that eventually the cut-off relay 41 becomes energized at point 592 and cut-off relays 28 and 34 become energized at points 593 and 594. Upon the energization of cut-off relays 28, 34 and 41 their contacts 28C, 34C and 41C are closed and grounded for establishing circuits to cause energization of the stepping relays 29, 35 and 42 at points 595, 596 and 597.

Cut-off relay 41 was the first of the cut-off relays to energize during this stage of the operation and upon such energization at point 592 and the closing of contact 41G thereof conductor 28X is grounded thereby placing ground upon relay 173 which begins to energize at point 598. Concurrently with energization of relay 173 at point 599 contact CC opens thereby interrupting the energization circuit for sequence control relay 2 which then begins to deenergize and upon its deenergization at point 600 sequence relay 7 is freed from ground and begins deenergization which is completed at point 601. Deenergization of relay 7 opens contact 7A thereby freeing from ground the conductor 7K and relay 82 which immediately begins deenergization that is completed at point 602. Release of the contacts of relay 82 interrupts the circuit for grounding the translating relays whereupon with the deenergization of relay 82 at point 602 the translating relays 137, 139, 141, 143 and 145 begin deenergization which is completed at points 603, 604, 605, 606 and 607. Such deenergization of the translating relays terminates the source of energization of the middle windings of counting relays 20, 31 and 39 which are then placed under control of their respectively associated stepping relays 29, 35 and 42. But since stepping relay 42 was already energized by the time translating relay 145 is deenergized at point 607 contact 42A of stepping relay 42 will have been opened to deenergize the left-hand winding of counting relay 39 and consequently upon the deenergization of translating relay 145 the relay 39 begins deenergization with its central winding at point 608.

As explained above the energization of cut-off relays 28, 34 and 41 closes contacts 28C, 34C and 41C for energizing stepping relays 29, 35 and 42 the circuit being extended from the stepping relays by means of conductors E, C, and A, cable 159, shift contacts E3, C3 and A3 of shift relay 153 (Fig. 9), cable 71 (Figs. 9 and 3) conductors 71E, 71C and 71A to clutches 51A, 52A and 53A and through battery to ground upon the other side of said clutches. Clutches 51A, 52A and 53A are therefore in series with stepping relays 29, 35 and 42 and begin energization concurrently therewith. That is, clutch 51A which is in series with stepping relay 29 begins energization at point 609 which is at the same time stepping relay 29 begins energization at point 610; clutch 52A begins energization at point 611 which is the same time at which stepping relay 35 begins to energize at point 612; whereas clutch 53A begins energization at point 613 concurrently with the beginning of energization of stepping relay 42 at point 614.

The grounding of contacts 28D, 34D and 41D of cut-off relays 28, 34 and 41 upon energization of such cut-off relays extends ground through conductors F, D and B, cable 159 (Figs. 11, 12 and 9), contacts F3, D3 and B3 of shift relay 153, cable 71 (Figs. 9 and 3) conductors 71F, 71D and 71B to clutches 60A, 61A and 62A and the batteries and ground associated therewith. Hence, upon the closing of the contacts as 28C and 28D of the cut-off relays the clutches 60A, 61A and 62A will begin energization respectively at the same time as clutches 51A, 52A and 43A and as indicated at points 615, 616 and 617.

When clutches 51A and 60A become energized at points 618 and 619 the number wheel 51 and the gear 60 are clutched to shaft 50A to rotate in unison therewith. Gear 60 then drives gear 66, which is journalled upon the shaft bearing the same, and the number wheel 57 forwardly. Since gears 60 and 66 have an equal number of teeth the number wheels 51 and 57 will be caused to rotate at the same speed.

Likewise energization of clutches 52A and 61A at points 620 and 621 will clutch the number wheel 52 and the gear 61 to shaft 50A whereupon the gear 61 will drive the gear 67 and the number wheel 58 forwardly, the latter being driven at the same speed as number wheel 52. And upon energization of clutches 53A and 62A at points 622 and 623 number wheel 53 and gear 62 will take motion with shaft 50A whereby the number wheel 59 will be driven forwardly through the gears 62 and 68 at the same speed as number wheel 53.

Referring now to the number wheel units containing number wheels 53 and 59 and pertaining to the units order respectively in the last reading, register 51—52—53 and the consumption quantity register 57—58—59, as the wheel 53 takes motion with the shaft 50A and moves a short distance from the zero position a lobe of the shunting wheel 53C closes shunting contact 53D whereby ground which is obtained at contact 69A of relay 69 (Fig. 3) is applied to conductor 71A at a point adjacent to the clutch 53A and between such clutch and the stepping relay 42. Consequently the stepping relay 42 is shunted out and begins deenergization which is completed at point 624. Deenergization of stepping relay 42 opens contact 42B whereupon counting relay 39A is depotentialized and becomes deenergized at point 625. As rotation of the unit containing number wheel 53 continues, the lobes upon shunting wheel 53C open and close shunting contact 53D in the manner hereinabove described with reference to shunting contacts 176D and 179D in Fig. 16 and whereby the locked-up counting relays in the units order (Fig. 11) are successively deenergized. Shortly prior to the entry of the second digit 2 upon number wheels 53 and 59 a lobe upon shunting wheel 53C is removed from its position for closing contact 53D whereby the contact is permitted to open and relieve the shunt from stepping relay 42 and permit said relay to become energized for causing deenergization of the cut-off relay 41 which in turn opens contact 41C and results in deenergization of the stepping relay 42 and the clutch 53A in series therewith. Contact 41D also opens upon the deenergization of cut-off relay 41 thus removing ground from conductor B (Figs. 11 and 12) and conductor 71B (Fig. 3) to cause deenergization of clutch 62A. Clutches 53A and 62A deenergize simultaneously during the interval of time represented by the space between the chart lines III—III', the release of the clutches 53A and 62A being at such time as will cause the number wheels 53 and 59 to stop while each displays a reading of 2.

When stepping relays 29 and 35 were energized immediately after the energization of cut-off relays 28 and 34 the central windings of counting relays 20 and 31 had previously been deenergized when ground was removed therefrom by the opening of contacts associated with translating relays 137, 139, 141 and 143 at points 603, 604, 605 and 606, and consequently upon the energization of stepping relays 29 and 35 and the opening of contacts 29A and 35A the left-hand windings of relays 20 and 31 were depotentialized whereupon said counting relays began to deenergize and became deenergized at points 626 and 627.

Movement of the number wheel 52 with the shaft 50A will cause the lobes upon shunting wheels 52C to pass to and from an operative relation for closing the shunting contact 52D. Likewise, movement of the number wheel 51 and shunting wheel 51C will have the effect of opening and closing shunting contact 51D. Shunting contacts 52D and 51D like contact 53D have available a source of ground at contact 69A of released relay 69 (Fig. 3). The number wheel units including number wheels 51 and 52 in the present example are operating in conjunction with the same number of locked-up relays (Fig. 11) and as a consequence rotate in unison. Just prior to the entry of the fourth digit 4 upon each of the number wheels 51 and 52 and the number wheels 57 and 58 rotated respectively therewith, lobes respectively upon the shunting wheels 52C and 51C are removed from a position where they had been effective for closing contacts 52D and 51D whereupon shunt is removed from stepping relays 35 and 29 and these stepping relays thereupon begin to energize at points 628 and 629. And upon energization of stepping relays 35 and 29 at points 630 and 631 the contacts 35A and 29A thereof will be opened thereby depotentializing cut-off relays 34 and 28. Deenergization of cut-off relays 34 and 28 at points 632 and 633 causes opening of contacts 34C, 34D, 28C and 28D. Contacts 34C and 28C upon opening break the series circuit extending through conductors 35F and 29F, stepping relays 35 and 29, conductors C and E (Figs. 11 and 12), conductors 71C and 71E (Fig. 3) to clutches 52A and 51A whereupon said clutches begin to deenergize at points 634 and 635. Likewise, the opening of contacts 34D and 28D break the series circuit extended through conductors D and F (Figs. 11 and 12) and conductors 71D and 71F, (Fig. 3) to clutches 61A and 60A whereupon said clutches begin to deenergize at points 636 and 637 which points are at the same position in point of time as are the points 634 and 635 where clutches 52A and 51A begin deenergization. Clutches 51A, 60A, 52A and 61A are all deenergized at points 638, 639, 640 and 641 concurrently with each of the number wheels 51, 57, 52 and 58 displaying readings of the digit 4. Stepping relays 29 and 35 which are respectively in series with clutches 51A and 52A begin deenergization concurrently and respectively with said clutches at points 643 and 642.

*Registering previous reading (416)*

With the deenergization of cut-off relays 28 and 34 contacts 28G and 34G thereof were removed from ground whereupon relay 173 which had been held energized through these connections begins to deenergize at point 644 and upon completion of deenergization at point 645 contact CC thereof closes to supply ground which causes sequence control relay 2 to begin energization at point 646. Energization of sequence control relay 2 at point 647 causes contact 2B thereof to be removed from ground thereby causing sequence relay 10 to begin deenergization at point 648 and complete deenergization at point 649. Opened contact 2B also starts deenergization at point 650 of the left-hand winding of relay 122 and of said relay 122 since the right-hand winding thereof had previously been deenergized upon the deenergization of sequence relay 7 and the opening of contact 7G thereof. Relay 122 therefore completed deenergization at point 651 whereupon contact 122B thereof is opened to remove ground from contact 8A and conductor 8J thereby starting release of shift magnet 212 at point 652.

Deenergization of relay 10 at point 649 permits contact 10B thereof to close placing ground upon contact 9A, conductor 9K, switch 80, contact 80A, conductor 79B, finger 76D; and through perforation 76DD monthly reading selector bar 76 is grounded, energizing relay 81 at point 653. Energization of relay 81 closes the contacts thereof to prepare circuits as before described from the grounded bars 76A, 76B and 76C through perforations 76GG and 76FF for the hundreds (4), 76HH for the tens (1) and 76JJ and 76KK for the units (6) to fingers 76G, 76F, 76H, 76J and 76K. The circuits are extended from said fingers through the closed contacts of relay 81 and thence through cable 78 (Figs. 4 and 9), to shift contacts 154A, 154B, 154C, 154D and 154E. Now it will be noted that upon the deenergization of sequence relay 10 and the closing of contact 10A thereof ground will be extended from contact 123B of relay 123 through conductor 10J to shift relay 213 whereupon said relay 213 begins to energize. Upon the completion of energization of shift relay 213 at point 654 the above recited contacts as 154A of shift relay 154 will be closed to extend the circuits previously prepared by the closing of the contacts associated with relay 81, to the translating relays 137, 139, 140, 144 and 147 which then begin to energize and complete energization at points 655, 656, 657, 658 and 659.

The thus energized translating relays extend ground from the grounded contacts of the translating relays 136, 140 and 144 respectively to the central windings of counting relays 20 for the hundreds (4), 32 for the tens (1) and 36 for the units (6) whereupon the counting relays 20, 32 and 36 begin to energize and complete energization at points 660, 661 and 662. The counting relays then lock up one after the other in chains as before and eventually the cut-off relays 28, 34 and 41 become energized at points 663, 664 and 665.

Cut-off relay 28 closes contacts 28C and 28D upon its energization thereby extending ground from such closed contacts to conductors 29F and F. Grounded conductor 29F leads through stepping relay 29 to conductor E. Conductors F and E (Figs. 11 and 12) which are thus grounded lead through cable 159 to contacts F4 and E4, of shift relay 154 (Fig. 9) the circuit being extended from these contacts through cable 72 (Figs. 9 and 3) to conductors 72F and 72E and thence to clutches 63A and 54A and the battery and ground respectively associated with each of these clutches. Consequently with the energization of cut-off relay 28 and the closing of contacts 28C and 28D stepping relay 29 will begin to energize at point 666, concurrently with clutch 63A at point 667 and with clutch 54A at point 668.

With the energization of cut-off relay 34 and the closing and grounding of its contacts 34C and 34D ground is extended from contact 34C through conductor 35F, stepping relay 35, conductor C (Figs. 11 and 12), cable 159 (Figs. 12 and 9), contact C4, cable 72 (Figs. 9 and 3) and conductor 72C to clutch 55A and its associated battery and ground whereupon the stepping relay 35 and the clutch 55A are potentialized and complete energization at points 669 and 670. The ground at closed contact 34D is extended through conductor D (Figs. 11 and 12), cable 159 (Figs. 12 and 9), contact D4, cable 72 (Figs. 9 and 3) and conductor 72D to clutch 64A and its associated battery and ground whereupon the clutch 64A is potentialized and becomes energized at point 671.

Energized cut-off relay 41 through its grounded contact 41C extends ground through stepping relay 42, conductor A (Figs. 11 and 12), cable 159 (Figs. 12 and 9, contact A4 of shift relay 154, cable 72 (Figs. 9 and 3) and conductor 72A to clutch 56A and its associated battery and ground whereupon said clutch 56A and stepping relay 42 become potentialized at points 672 and 673 and become energized at points 674 and 675. Grounded contact 41D of energized cut-off relay 41 extends ground through conductor B (Figs. 11 and 12), cable 159 (Figs. 12 and 9), contact B4 of shift relay 154, cable 72 (Figs. 9 and 3 and conductor 72B to clutch 65A and its associated battery and ground thereby potentializing clutch 65A at point 676 and causing energization of said clutch at point 677.

Since the fewer number of energized counting relays were locked up in the tens order, cut-off relay 34 was the first of the cut-off relays (Fig. 11) to become energized and upon its energization at point 664, contact 34G thereof closed and applied ground to conductor 28K thereby potentializing relay 173 at point 678 and upon the energization of relay 173 at point 679 contact CC opened thereby removing ground from sequence control relay 2 and causing this relay to become deenergized at point 680. Release of relay 2 removes ground from contact 2A thereby depotentializing sequence relay 9 at point 681 and causing said relay to become deenergized at point 682. Upon deenergization of sequence relay 9 contact 9A thereof opens removing ground from conductor 9K, switch 80, contact 80A, conductor 79B, finger 76D and bar 76 thereby causing deenergization of relay 81 such deenergization being completed at point 683. With the deenergization of relay 81 the contacts thereof open removing the source of ground at the bars 76A, 76B and 76C from the energized translating relays 137, 139, 140, 144 and 147 which thereupon begin deenergization which is completed at points 684, 685, 686, 687 and 688.

Since stepping relay 35 was already energized at point 669 prior to deenergization of translating relay 140 at point 686 contact 35A of stepping relay 35 had been removed from ground thereby having depotentialized the left-hand winding of counting relay 32 so that upon the deenergization of translating relay 140 and the removal of ground thereby from the central winding of counting relay 32 said counting relay was depotentialized at point 689.

Now with clutches 54A and 63A of the hundreds order energizing at points 668A and 667A the number wheel 54 and the gear 63 will be clutched to the shaft 50B and since the gears 63 and 66 have the same number of teeth the number wheel 57 will be rotated at the same speed as number wheel 54. Number wheel 54 is rotated forwardly while the number wheel 57 is rotated backwardly. Clutches 55A and 64A are similarly operative in the tens order for rotating the number wheels 55 and 58, number wheel 58 being driven at the same speed as number wheel 55 but backwardly.

Likewise clutches 56A and 65A are effective for driving the number wheels 56 and 59 at the same speed, number wheel 56 being driven forwardly whereas the number wheel 59 is driven backwardly by means of gears 65 and 68. It will be seen therefore that during operation of the last reading register 51—52—53 the consumption quantity wheels 57—58—59 were driven forwardly to display an amount equal to the amount set up on the last reading register wheels and that during operation of the previous reading register 54—55—56 the number wheels of the consumption quantity register 57—58—59 will be rotated subtractively an amount equal to the previous reading. Therefore, after the previous reading wheels come to rest and after certain carry-over operations, presently to be described, have taken place the consumption quantity wheel 57—58—59 will display the net consumption quantity.

During rotation of the number wheels 54 and 57 the contact wheel 54C is effective shortly after the wheel 54 moves from the zero position to close shunting contact 54D thereby carrying ground from closed contact 69A of relay 69 (Fig. 3) and applying such ground to conductors 72E at a point adjacent to the clutch 54A and between said clutch and the stepping relay 29 thereby shunting out the relay 29 as has been described hereinabove. This depotentializing of the stepping relay 29 is indicated at point 690 and prior to the entering of the first digit 1 upon the number wheel 54, as indicated at point 691A on the line pertaining to stepping relay 29, the shunting contact 54D is opened to permit repotentialization of the stepping relay 29 at point 691. Subsequent to entry of the digit 1 on number wheel 54, at said point 691A, contact wheel again closes contact 54D to depotentialize stepping relay 29 at point 692 and prior to the entry of the second digit 2 upon number wheel 54 at point 693A, shunting wheel 54C opens contact 54D for again potentializing relay 29 at point 693 and so on, depotentializing the stepping relay 29 shortly after the entry of each digit and causing potentialization thereof just prior to the completion of the entry of each digit until finally as previously explained the cut-off relay 28 is deenergized to open contacts 28C and 28D at a point betwen the chart lines IV—IV' thus deenergizing the stepping relay 29 and the clutches 54A and 63A and stopping the number wheels 54 and 57 at 4 and zero, it being recalled that the number wheel 57 had previously been rotated forwardly an amount of four digits incident to the entry of the last reading amount.

Each time the stepping relay 20 was energized as at point 694 a counting relay as 20 in the lower row of the double row of counting relays pertaining to the hundreds order was deenergized, relay 20 being depotentialized at point 695 and deenergized at point 696 since the supply of ground thereto was interrupted by the opening of contact 29A. Each time the stepping relay 29 was deenergized as at point 697 the counting relay of next lower numerical value in the chain of locked-up relays and in the upper row of the double row of counting relays pertaining to the hundreds order was depotentialized as counting relay 24 at point 698. The successive deenergization of counting relays 21, 25, 22, 26 and 23 is shown at points 699, 700, 701, 702, and 703. Release of counting relay 27 takes place during that interval of time represented by the space between chart lines IV—IV'.

Shortly after the number wheel 55 has been rotated from its zero position the contact wheel 55C closes shunting contact 55D whereby ground is applied to conductor 72C between the clutch 55A and stepping relay 35 whereupon stepping relay 35 is shunted out of operation and begins deenergization at point 704 and upon its deenergization at point 705 opens contact 35B thereby removing ground from the right-hand winding of counting relay 43 which begins deenergization which is completed at point 706. Shortly prior to the entry of the first digit 1 upon the number wheel 55 the shunting contact 55D is opened and relieved from ground whereupon stepping relay 35 is again potentialized to become energized at point 707 thereby removing ground from contact 35A and cut-off relay 34 which thereupon begins to deenergize and completes such deenergization at point 708.

Deenergized cut-off relay 34 opens contacts 34C and 34D breaking the circuits to stepping relay 35 and clutch 55A and to the clutch 64A all of which begin to deenergize simultaneously at points 709, 710, and 711, their deenergization being completed at points 712, 713 and 714. Upon the deenergization of clutches 55A and 64A the number wheel 55 will stand at 1 whereas the number wheel 58 which has been rotated subtractively in the amount of 1 will stand at 3.

During rotation of number wheel 56 the shunting wheel 56C associated therewith is effective by means of the lobes thereon to close shunting contact 56D shortly after the number wheel moves from the zero position and from all subsequent digital positions and to open the shunting contact 56D shortly prior to the wheel 56 reaching each digital position. In this way ground is periodically applied from contact 69A of relay 69 to the conductor 72A adjacent to the clutch 56A and between said clutch and the stepping relay 42, said stepping relay being shunted out of operation each time ground is so applied. Relay 36 was caused to deenergize at point 717 upon the first energization of stepping relay 42 when contact 42A thereof was opened to remove ground from the left-hand winding of relay 36. The first shunting of stepping relay 42 occurs shortly after number wheel 56 moves from zero whereupon the stepping relay 42 begins deenergization at point 715 and upon its deenergization at point 716 opens contact 42B which being thus relieved of ground frees the right-hand winding of counting relay 40 from ground, the left-hand winding of relay 40 having been previously relieved of ground upon the deenergization of counting relay 36 at point 717. Counting relay 40 begins deenergization concurrently with its right-hand winding at point 718.

Shortly before the entry of the first digit 1 upon the number wheel 56 at point 719, as indicated on the line pertaining to stepping relay 42, the lobe on shunting wheel 56C which had therefore been holding shunting contact 56D closed is carried beyond its operative position with respect to said contact whereupon the contact opens and removes the shunt from stepping relay 42 which then begins to energize at point 720. Stepping relay 42 energizes at point 721 and shortly after the entry of the digit 1 the succeeding lobe on shunt wheel 56C closes shunting contact 56D to again shunt out stepping relay 42 which is depotentialized at point 722 and deenergizes at point 723. When this lobe passes from operative position with the shunting contact said contact opens to again remove shunt from the stepping relay 42 which is then potentialized at point 724 and energized at point 725, prior to the entry of the second digit 2 at point 726. As rotation of the number wheel 56 proceeds another lobe on shunting wheel 56C is carried into position for closing shunting contact 56D whereupon the stepping relay 42 is depotentialized at point 727 and deenergized at point 728. Prior to the entry of the third digit 3 at point 729 the lobe is carried from beneath the shunting contact 56D which opens and permits potentialization of stepping relay 42 at point 730 and energization at point 731.

Each time the stepping relay 42 is energized the contact 42A thereof is opened to cause deenergization of the counting relay then highest in numerical value locked up in the lower of the double row of counting relays pertaining to the units order, and each time the stepping relay 42 is thereafter deenergized the contact 42B thereof is opened to cause deenergization of the counting relay then highest in numerical value locked up in the upper of the double row of counting relays pertaining to the units order. This action is shown graphically on the chart (Fig. 30), where with energization of the counting relay 42 at point 675 the counting relay 36 started deenergization which is completed at point 717. Upon deenergization of stepping relay 42 at point 716 counting relay 40 begins deenergization at point 718; upon energization of counting relay 42 at point 721 the next counting relay in the lower of the double row of relays begins deenergization at point 732; upon deenergization of stepping relay 42 at point 723 deenergization of the next counting relay in the upper of the double row of relays begins deenergization at point 733; upon energization of stepping relay 42 at point 725 counting relay 37 begins deenergization at point 734; upon deenergization of stepping relay 42 at point 728 the next counting relay in the upper of the double row begins deenergization at point 735; and upon energization of stepping relay 42 at point 731 counting relay 38 begins deenergization at point 736. This action continues until finally upon energization of stepping relay 42 at point 737 shortly prior to the entry of the sixth digit 6 upon number wheel 56 cut-off relay 41 begins deenergization at point 738 and upon complete deenergization at point 739 the contacts 41C and 41D of cut-off relay 41 open. The opening of contact 41C removes ground from and thus opens the circuit including stepping relay 42, conductor A (Figs. 11 and 12), conductor 72A (Fig. 3) and the clutch 56A which thereupon begins deenergization at point 740. Opening of contact 41D removes ground therefrom thus opening the series circuit including conductor B (Figs. 11 and 12), conductor 72B (Fig. 3) and the clutch 65A which thereupon concurrently with the beginning of deenergization of clutch 56A begins deenergization at point 741. Since stepping relay 42 is in series with the clutch 56A point 742 where said stepping relay begins deenergization is the same in point of time with the beginning of deenergization of clutch 56A.

Upon deenergization of clutches 56A and 65A at points 743 and 744 number wheel 56 will stand at 6 whereas the number wheel 59 which was caused to rotate backwardly by the clutch 65A and gears 65 and 68, will also stand at 6 since the reading of 2 was previously upon this wheel and the reverse rotation of it 6 digital places will carry it in position for reading 6.

The consumption quantity register wheels 57, 58 and 59 now display a reading of 036 which is the difference, before carry-over, between the last reading 442 and the previous reading 416. The actual difference between the amounts of 442 and 416 is 026 and the manner in which this reading is obtained upon the consumption register wheels 57, 58 and 59 will now be explained.

*Carry-over in subtraction*

During rotation of the number wheel 59 subtractively from 2 to 6 the lobe upon carry-over wheel 59H, while the number wheel 59 was moving between positions 0 and 9 became effective for momentarily closing carry-over contact 59K thereby applying ground to conductor 72H. This ground is carried by conductor 72H through cable 72 (Figs. 3 and 9), contact H4 upon shift relay 154, cable 159 (Figs. 9 and 12) to carry-over counting relay 165 to energize the right-hand winding thereof. Such energization of carry-over relay 165 is begun at point 745 and is completed at point 746. Energization of carry-over relay 165 closes contact 165B thereby applying ground to the left-hand winding of carry-over relay 166 which thereupon begins energization at point 747. Upon completion of energization of carry-over relay 166 at point 748 contact 166C is closed to apply ground to the left-hand winding of cut-off relay 167 thus starting energization of relay 167 at point 749, such energization being completed at point 750.

Energized relay 167 closes contact 167C thus preparing a circuit for subsequent energization of stepping relay 168, but which circuit is ineffective at this time because relay 173 remains energized whereby contact CC is open removing ground from the closed contact 167C, and contact 173B is also open to break the circuit upon the other side of stepping relay 168.

The application of ground by carry-over contact 59K (Fig. 3) to conductor 72H and ultimately to relay 165 (Fig. 12) for energizing the latter is but momentary, the lobe upon carry-over wheel 59H being carried beyond the position for closing contact 59K as the number wheel 59 proceeds with its rotation. However, upon energization of carry-over relay 165 contact 165C thereof closes and provides a holding circuit for relay 165 through contact 168A of stepping relay 168 so long as stepping relay 168 remains unenergized. During the carry-over operation the locked-up carry-over relays 165 and 166 and the cut-off relay 167 are placed under the control of relay 168 in the same fashion as are the counting relays and the cut-off relays (Fig. 11) under control of their respectively associated stepping relays. The locked-up carry-over relays 165 and 166 remain inactive so long as any of the cut-off relays 28, 34 and 41 remain energized, but upon the deenergization of the last of the cut-off relays 28, 34 and 41 to deenergize and in the present example cut-off relay 41 is the last to deenergize, at point 739, ground is removed from conductor 28X (Figs. 11 and 12) to deenergize relay 173. Such deenergization of relay 173 is begun at point 751 and upon completion of its deenergization at point 752 contacts 173B and CC are closed. Ordinarily the closing of contact CC will result in the grounding of conductor 2C and the immediate energization of sequence control relay 2 (Fig. 7) to commence the next sequenced operation, but when a carry-over operation is to take place one of the cut-off relays 167 or 171 will be energized whereby contacts AA or BB thereof will be opened thereby breaking the circuit between the point of ground at contact CC and the relay 2. Consequently in the present operation relay 2 will remain energized after deenergization of the cut-off relay 41 and of relay 173.

Deenergizaiton of relay 173 does, however, begin the carry-over operation and upon the closing of contacts CC and 173BB thereof circuit is completed from ground at contact CC, contact 167C, stepping relay 168 (which begins energization at point 753) contact 173B, conductor G, cable 159 (Figs. 12 and 9) contact G4 of shift relay 154, cable 72 (Figs. 9 and 3) conductor 72G, conductor 72D and to clutch 64A and the battery and ground associated therewith. Clutch 64A thereupon begins energization concurrently with the stepping relay 168 and at point 754.

Ground is also carried from contact CC of relay 173 through closed contact 167D of cut-off relay 167 to conductor J and thence through cable 159 (Figs. 12 and 9) contact J4 of relay 154, cable 72 (Figs. 9 and 3) and conductor 72J to one side of the shunting contact 58D associated with the contact wheel 58C. The other side of contact 58D is joined by a conductor 58X to a point 58XX upon conductor 72D so that upon closing of contact 58D ground will be applied to conductor 72D at point 58XX between the battery of clutch 64A and stepping relay 168 whereby the relay 168 will be shunted out of operation.

Upon energization of clutch 64A at point 755, gear wheel 64 takes motion with the shaft 50B and in such a direction as to drive, through gear 67, the number wheel 58 backwardly. When stepping relay 168 energized at point 756 contact 168A thereof was removed from ground breaking the holding circuit for relay 165 which thereupon began deenergization which was completed at point 757.

Shortly after retrograde movement of the number wheel 58 commences a lobe upon contact wheel 58C is disposed in position for closing contact 58D whereby as before described ground is applied at point 58XX on conductor 72D. Such application of ground at this point upon the conductor 72D is ineffective so far as concerns energization of the clutch 64A since the ground thus applied to conductor 72D only supplements the ground already obtained from contact CC of relay 173 and supplied through conductors 72G and 72D. But upon the application of ground at point 58XX stepping relay 168 will be shunted and consequently begin deenergization at point 758. With complete deenergization of stepping relay 168 at point 759 contact 168A thereof is closed prior to the opening of contact 168B and such closing of contact 168A provides ground for cut-off relay 167 thus holding said relay 167 energized while relay 166 starts to deenergize at point 760 because of the ground having been removed from the right-hand winding thereof by the opening of contact 168B. Cut-off relay 167 which had theretofore been held energized through its left-hand winding by a source of ground at contact 166C of relay 166 is now held energized by its right-hand winding which receives ground from contact 168A.

As rotation of number wheel 58 continues the lobe upon contact wheel 58C which had closed contact 58D, passes from its operative position with such contact whereby the latter opens removing ground from point 58XX on conductor 72D thus relieving the shunt from stepping relay 168 which then begins energization at point 761. Upon completion of energization of stepping relay 168 at point 762 contact 168A is removed from ground and hence cut-off relay 167 begins deenergization at point 763 which deenergization is completed at point 764.

Cut-off relay 167 thus deenergized opens contacts 167C and 167D. The opening of contact 167C breaks the series circuit including stepping relay 168 and clutch 64A whereupon at points 765 and 766 said stepping relay and said clutch begin deenergization. Deenergization of the clutch 64A is started at such a time that upon completion of deenergization at point 767 the number wheel 58 will have been reversely moved one digital position so it now displays the digit 2 instead of the digit 3. At this time, therefore, the consumption quantity register 57—58—59 displays 026 which is the true difference between 442, the amount of the last reading, and 416, the amount of the previous reading.

*Registration of consumption money charge*

With the deenergization of cut-off relay 167, at point 764, contact AA thereof closes thereby completing the circuit from ground at contact CC of relay 173 to conductor 2C and the sequence control relay 2 whereupon said relay 2 is potentialized at point 768 and becomes energized at point 769. Relay 2 thus energized opens contact 2B thereby depotentializing sequence relay 12 and shift magnet control relay 123 at points 770 and 771. The opening of contact 2B frees the left-hand winding of relay 123, the right-hand winding thereof having been previously deenergized upon the opening of contact 9G when sequence relay 9 was deenergized.

As an incident to deenergization of relay 123 contact 123B thereof opens removing ground from contact 10A and conductor 10J whereby shift magnet 213 (Fig. 9) begins deenergization at point 772. Concurrently with the deenergization of sequence relay 12 at point 773 contact 12B thereof closes applying ground to contact 11A of sequence relay 11, conductor 11K (Figs. 7, 8 and 13). The number wheels 57, 58 and 59 stand at 026 and the lobes upon the contact closing wheels 57J, 58J and 59J respectively associated therewith close the contacts of switches corresponding to the 0, the 2 and the 6 respectively for the hundreds, tens and units orders. That is, referring to Figs. 13, 14 and 15 the contact closing wheel 57J will now stand in such a position as to close the upper of the switches in the vertical left-hand row of switches which pertain to the hundreds order, the switches in this left-hand row being respectively representative from top to bottom of the digits 0 to 9. Contact closing wheel 58J will be rotated to such a position as will close the third from the top switch in the second from the left vertical row of switches associated therewith, or, the switch corresponding to the digit 2 in the tens order. Contact closing wheel 59J will close the seventh from the top of the switches in the third from the left vertical row of switches, or, the switch corresponding to the digit 6 in the units order. Since the upper of the switches in the left-hand or hundreds row of switches is closed, grounded conductor 11K will ground closed contacts 235 and 236, the ground being extended through conductors 235A and 236A to closed contacts 235B and 236B of the switch corresponding to the digit 2 in the tens order. From closed contacts 235B and 236B ground is extended through conductors 235C and 236C to horizontal conductors 235D and 236D and to closed contacts 235E and 236E of the switch which corresponds to the digit 6 in the units order. And from contacts 235E and 236E the ground is extended through conductors 235F and 236F to vertical conductors 237 and 238.

Contact 239 of the switch in the tens order corresponding to the digit 2 is grounded through conductor 11K and upon the closing of the switch at the time the number wheel 58 is moved by the carry-over action to display the digit 2, extends ground to conductor 239A and thence to relay 240 (Fig. 15) causing relay 240 to begin energization at point 774. Upon energization of relay 240 at point 775 contact 240A thereof is closed to extend ground to conductor 240B, horizontal conductor 240C, contact 240D, horizontal conductor 240E and vertical conductor 241.

Now it will be observed that grounded conductors 237, 238 and 241 are respectively the number one conductor, the number 5 conductor and the number 6 conductors of three separate groups of vertical conductors, the groups from left to right pertaining respectively to the hundreds order, the tens order and the units order. The individual conductors in each of these three groups are from left to right representative of the digits 1 to 9. Conductors 237, 238 and 241 are, therefore, representative of 156 or of the monetary amount of $1.56 which is the amount to be charged for a consumption quantity of 26 kilowatt hours at a price of six cents per kilowatt hour.

Conductors 237, 238 and 241 lead into cable 242 (Figs. 15 and 9) and to contacts 155A, 155B and 155C of shift relay 155 thus preparing a circuit for energizing certain counting relays upon the closing of the shift relay 155. Shift relay 155 is closed as follows: It will be observed (Fig. 7) that upon deenergization of sequence relay 12 contact 12A thereof closed to extend ground from contact 124B of relay 124 to conductor 12J whereupon at point 776 shift magnet 214 began energization and when this energization was completed at point 777 the contacts 155A, 155B and 155C closed for extending the heretofore described circuit, leading in through the cable 242, into cable 160 (Figs. 9 and 11) for carrying ground to counting relays 23 of the hundreds order, 30 of the tens order and 36 of the units order causing said counting relays to begin energization at points 778, 779 and 780. Counting relays 23, 30 and 36 become energized at points 781, 782 and 783. In the manner hereinabove described energized counting relay 23 causes successive energization of counting relay 27, cut-off relay 28 and stepping relay 29 at points 784, 785 and 786. Likewise energized counting relay 30 causes successive energization of the counting relays associated therewith of lower numerical value as well as cut-off relay 34 and stepping relay 35, the latter two named relays becoming energized at points 787 and 788. Counting relay 36 upon its energization also causes successive energization of the associated counting relays of lower numerical value as well as cut-off relay 41 and stepping relay 42, the latter two named relays becoming energized at points 789, and 790. These locked-up counting relays of the various orders are representative of 1 in the hundreds order, 5 in the tens order and 6 in the units order or of the monetary amount of $1.56.

The first of the cut-off relays (Fig. 11) to energize, and in the present operation the first to energize is the relay 28, applies ground to conductor 28X thereby potentializing relay 173 at point 791 which relay energizes at point 792 incident to opening contact CC thereof and removing ground from sequence control relay 2 whereupon relay 2 is depotentialized and becomes deenergized at point 793. Deenergization of relay 2 opens contact 2A thereby removing ground from sequence relay 11 which then begins deenergization at point 794. Relay 11 thus caused to deenergize at point 795 opens contact 11A removing ground from conductor 11K relay 240 and from the middle windings of counting relays 23 and 30 (Fig. 11). Relays 240 thereupon begins deenergization which is completed at point 796. Inasmuch as stepping relay 29 has already been energized at this time as indicated at point 786, contact 29A has been opened thereby freeing from ground the left-hand winding of counting relay 23 placing relay 23 under control of its central winding which was held energized from ground the source of which is at the contact 12B of sequence relay 12. Hence upon the opening of contact 11A this source of ground to the central winding of counting relay 23 is removed whereupon relay 23 begins deenergization which is completed at point 797.

The central winding of counting relay 30 deenergizes concurrently with the central winding of counting relay 23 but since the left-hand winding of counting relay 30 is held energized from ground at contact 35A of stepping relay 35 which is yet unenergized, counting relay 30 does not deenergize at this time. Upon deenergization of relay 240 at point 796 contact 240A opens removing ground from the source for energizing the central winding of counting relay 36 which central winding thereupon deenergizes, but the left-hand winding of counting relay 36 remains energized from ground received at contact 42A of stepping relay 42 which at this time remains unenergized.

The charge of $1.56 for the consumption quantity is to be entered in the totalizer register 191—192—193 as well as in the consumption charge register 182—183—184 (Fig. 16). With the energization of cut-off relay 28 and the closing of its contact 28C which is thereby grounded, ground is extended through conductor 29F, stepping relay 29, conductor E (Figs. 11 and 12) cable 159 (Figs. 12 and 9), contact E5 of shift relay 155, cable 200 (Figs. 9 and 16), conductor 200E to clutch 182A and the battery and ground associated therewith. Thereupon the clutch 182A becomes potentialized concurrently with the stepping relay 29 as indicated at points 798 and 799. Clutch 182A becomes energized at point 800 to cause the number wheel 182 to take motion with the shaft upon which it is mounted. Contact 28D upon closing extends ground through conductor F (Figs. 11 and 12) cable 159 (Figs. 12 and 9) contact F5 of shift relay 155, cable 200 (Figs. 9 and 16) conductor 200F to clutch 191A and the battery and ground associated therewith. Thereupon the clutch 191A is potentialized and upon its energization at point 801 the number wheel unit including number wheel 191 commences rotation with the shaft supporting the same.

Cut-off relay 34 when energized at point 787 closed contact 34C thereby grounding conductor 35F and extending ground through stepping relay 35, conductor C (Figs. 11 and 12), cable 159 (Figs. 12 and 9) contact C5 of shift relay 155, conductor 200 (Figs. 9 and 16), conductor 200C to clutch 183A and the battery and ground associated therewith. Thereupon stepping relay 35 and clutch 183A are simultaneously potentialized at points 802 and 803 and are respectively energized at the points 788 and 804. Ground from closed contact 34D of cut-off relay 34 is extended through cable D (Figs. 11 and 12) cable 159 (Figs. 12 and 9), contact D5 of shift relay 155, cable 200 (Figs. 9 and 16), conductor 200D, conductor 203G to clutch 192A and the battery and ground associated therewith. Thus the clutch 192A is potentialized at point 805 and becomes energized at point 806 concurrently with the energization of clutch 183A at point 804. Therefore number wheels 183 and 192 take motion simultaneously.

When cut-off relay 41 is energized contact 41C thereof closes to extend ground through stepping relay 42, conductor A, (Figs. 11 and 12), cable 159 (Figs. 12 and 9), contact A5 of shift relay 155, cable 200 (Figs. 9 and 16) conductor 200A and clutch 184A and the battery and ground associated therewith. Contact 41D also closes at this time to extend ground through conductor B (Figs. 11 and 12), cable 159 (Figs. 12 and 9), contact B5 of shift relay 155, cable 200 (Figs. 9 and 16) conductor 200B, conductor 203B and clutch 193A and the battery and ground associated therewith. Therefore clutches 184A and 193A and the stepping relay 42 are potentialized simultaneously respectively at points 807, 808 and 809. When clutches 184A and 193A are energized at points 810 and 811 the number wheels 184 and 193 take motion for having the amount of 6 respectively entered thereon.

Shortly after number wheels 182 and 191 of the consumption charge and of the totalizer registers take motion the shunting wheel 182C associated with number wheel 182 closes the shunting contact 182D to extend ground from contact 196X of relay 196 (Fig. 16) to the conductor 200E at a point between the battery of clutch 182A and the stepping relay 29 thereby shunting out stepping relay 29 and causing the same to become deenergized at point 812. Contact 29B is thus opened freeing relay 27 (Fig. 11) from ground which relay then becomes deenergized at point 813. Eventually shortly prior to the entry of the first digit 1 upon number wheel 182 the shunting contact 182D is permitted to open thereby relieving the shunt from stepping relay 29 which then becomes potentialized and upon energization opens contact 29A causing deenergization of cut-off relay 28 which then opens contacts 28C and 28D which break the energizing circuits for and cause deenergization of the stepping relay 29 and clutches 182A and 191A, said clutches being deenergized during that interval of time represented between the lines V—V' at the time digit 1 is entered upon number wheel 182 and the digit 3 is entered upon the number wheel 191. It will be recalled that the number wheel 191 previously stood at 2 since the amount of 250 had been entered in the totalizer register 191—192—193 as an incident to the amount of 250 having been entered in the balance due register 179—180—181.

During rotation of the number wheels 183 and 192 while the number wheel 183 is being run up from 0 to a reading of 5, the shunting wheel 183C will periodically open and close the shunting contact 183D to cause alternate energization and deenergization of stepping relay 35 to cause successive deenergization of the locked-up counting relays in the tens order in the manner hereinabove described. And finally shortly prior to the entry of the digit 5 upon number wheel 182 shunt is removed from the stepping relay 35 to permit its energization at point 814 and the consequent opening of its contact 35A and the resultant deenergization of cut-off relay 34 at point 815 whereupon contacts 34C and 34D are open to remove ground therefrom and break the energizing circuits for stepping relay 35 and clutches 183A and 192A. Thereupon said stepping relay 35 and the clutches 183A and 192A are depotentialized at points 816, 817 and 818. Deenergization of clutches 183A and 192A at points 819 and 820 occurs simultaneously with the entry of the fifth digit 5 upon number wheel 183 and the entry of the fifth digit 0 upon the number wheel 192. It will be recalled that number wheel 192 previously had the digit 5 standing thereon as an incident to the totalizer register having recorded the reading 250 which represented the balance due amount.

Rotation of the number wheels 184 and 193 proceeds after energization of their respective clutches 184A and 193A at points 810 and 811 and as this movement continues the shunting wheel 184C manipulates the shunting contact 184D for periodically shunting out stepping relay 42 to cause successive deenergization of the locked-up counting relays in the units order. And eventually shortly prior to the entry of the sixth digit 6 upon each of the number wheels 184 and 193 and after the counting relays have all been deenergized, shunt is removed from stepping relay 42 which thereupon is energized at point 821 to open contact 42A thereof which causes depotentialization of cut-off relay 41 at point 822, and its subsequent deenergization at point 823. This deenergization of cut-off relay 41 opens contacts 41C and 41D thereby simultaneously depotentializing stepping relay 42 and clutches 184A and 193A at points 824, 825 and 826 when the clutches 184A and 193A become deenergized at points 827 and 828 the number wheel 184 will be stopped in the position showing a registration of 6 and likewise the number wheel 193 will be stopped at a position displaying the digit 6 since both of these wheels stood at zero at the beginning of the present entry of 156.

The consumption charge register 182—183—184 now displays a reading of 156 while the totalizer register 191—192—193 displays a reading of 306 which is the sum of 250 plus 156 without carryover. The correct sum of 250 and 156 is obviously 406 instead of 306 and a carry-over operation now to be described is effected for adding a further digit to number wheel 191 so that the totalizer register will display the correct total 406.

*Carry-over on totalizer wheels*

While the number wheels 183 and 192 were rotating under control of the counting relays locked up in the tens order and between the entries of the digits 9 and 0 on the wheel 192 the carry-over wheel 192H carried the lobe thereon beneath the carry-over contact 192K at points 829 and 829', respectively on the lines pertaining to stepping relay 35 and to clutch 192A, to momentarily close said contact whereby ground was extended from contact 196XX of relay 196 (Fig. 16) through contact 192K, conductor 203L, conductor 200L, cable 200 (Figs. 16 and 9), contact L5 of shift relay 155, cable 159 (Figs. 9 and 12) and conductor L to the right-hand winding of carry-over stepping relay 169 whereupon said relay is potentialized at point 830. Energization of relay 169 at point 831 closes contacts 169B and 169C. Closed contact 169C provides a stick circuit for relay 169 through contact 172A so long as stepping relay 172 remains unenergized, relay 169 thus remaining energized after the opening of carry-over contact 192K. Closed contact 169B causes potentialization of carry-over relay 170 which upon energization at point 832 closes contacts 170B and 170C of which 170C places ground upon cut-off relay 171 which then begins energization which is completed at point 833. Since relay 173 remains energized at this time, the closing of contacts 171C and 171D of cut-off relay 171E is ineffective because contact CC is open as well as contact 173A, thus isolating contact 171C and stepping relay 172 is a local circuit and withholding ground from contact 171D.

Later, however, when the last of the cut-off relays (Fig. 11) deenergizes, which in this instance is cut-off relay 41 at point 823, ground is removed from conductor 28X thus depotentializing relay 173 which deenergizes at point 834 thereby closing contacts CC and 173A. Ground is then extended from contact CC through contact AAA, contact 171C, stepping relay 172, contact 173A, conductor K, cable 159 (Figs. 12 and 9), contact K5 of shift relay 155, cable 200 (Figs. 9 and 16), conductor 200K and conductor 203F and to the clutch 191A and the battery and ground associated therewith. Ground is extended from contact 171D through conductor M, cable 159 (Figs. 12 and 9), contact M5 of shift relay 155, cable 200 (Figs. 9 and 16), conductor 200M and conductor 203M to one side of the shunting contact 191D. Ground is thus provided whereby during rotation of the number wheel 191 and the shunting wheel 191C when the shunting contact 191D is closed ground will be applied to conductor 203F at a point between the clutch 191A and the stepping relay 172 whereby the relay 172 will be deenergized. Upon the closing of the contact 171C, the circuit previously described including the stepping relay 172 and the clutch 191A is potentialized whereupon the stepping relay 172 and the clutch 191A begin energization which is respectively completed at points 835 and 836. When stepping relay 172 energizes at point 835 contact 172A is opened thus freeing the left-hand winding of carry-over relay 169 from ground whereupon said relay begins to deenergize at point 837.

Number wheel 191 takes motion concurrently with the energization of clutch 191A and shortly after the motion is under way shunting contact 191D is closed shunting out the stepping relay 172 which is then depotentialized and becomes deenergized at point 838. Deenergization of relay 172 thus frees contact 172B from ground whereby the stick circuit for carry-over relay 170 is broken whereupon the relay 170 begins deenergization which is completed at point 839.

Prior to the entry of the first additional digit upon the number wheel 191 the shunting contact 191D is permitted to open freeing the shunt from stepping relay 172 which then becomes energized at point 840 and opens contact 172A whereby the stick circuit for cut-off relay 171 is broken, the relay 171 then starting deenergization which is completed at point 841. Deenergized relay 171 opens contact 171C thereby opening the series circuit including stepping relay 172 and the clutch 191A which are then depotentialized and later respectively deenergized at points 842 and 843. The opening of contact 171D breaks the circuit which it had established for extending ground from contact CC to the shunting contact 191D. Clutch 191A is deenergized at point 843 concurrently with the entry of the additional digit upon number wheel 191 which wheel then displays the digit 4. The totalizer register 191—192—193 now displays 406 which is the sum of 250, the balance due amount, and 156, the charge for the consumption quantity.

*Registering installment payment for merchandise*

That part of the operation now to be described has to do with the entry of a $2.50 installment payment for a stove. The entry of 250 is therefore to be made in the first article register 185—186—187 and also in the totalizer register 191—192—193.

Prior to the entry of the carry-over described in the preceding operation, all of the cut-off relays 28, 34 and 41 (Fig. 11) had been deenergized thereby removing ground from conductor 28X and deenergizing relay 173 (Fig. 12) which then closed its contacts including the contact CC. Ground was then extended from contact CC through contact AA of cut-off relay 167 to contact BB of cut-off relay 171. Therefore, with the deenergization of cut-off relay 171 at point 841 near the end of the above described carry-over entry contact BB closed completing the circuit for potentializing sequence relay 2 which then started energization and completed energization at point 844.

Sequence control relay 2 when thus energized opens contact 2B thereby depotentializing sequence relay 14 through its right-hand winding, relay 14 then becoming deenergized at point 845. The opening of contact 2B also removes ground from the left-hand winding of shift magnet control relay 124 thus breaking the stick circuit therefor whereby said relay begins deenergization at point 846. The right-hand winding of relay 124 had previously been deenergized upon the deenergization of sequence relay 11 and the opening of contact 11G. When relay 124 becomes deenergized at point 847 ground is removed from its contact 124B and hence from contact 12A and conductor 12J so that shift relay 214 (Fig. 9) begins to deenergize at point 848.

When sequence relay 14 deenergized at point 845 contact 14C thereof opened and contact 14B closed extending ground through contact 13A, conductor 13K (Figs. 8, 7 and 6), finger 94D, bar 94 (which is engaged by finger 94D through perforation 94DD in the card shown in Fig. 2), bars 92A, 92B and 92C, fingers 92F, 92G and 92H which engage their respective bars through card perforations 92FF, 92GG and 92HH. From fingers 92F, 92G and 92H the ground is extended through conductors in cable 111 (Figs. 6 and 9) to contacts 156A, 156B and 156C of shift relay 156 thus preparing a circuit which will extend ground to the translating relays (Fig. 10) upon the energization of shift magnet 215 and the closing of the contacts upon shift relay 156 in the manner now to be described.

Deenergized sequence relay 14 also closed contact 14A thereby extending ground from contact 125B of relay 125 through conductor 14J (Figs. 8 and 9) to the shift magnet 215 causing potentialization thereof at point 849 and its energization at point 850. At this time the contacts 156A, 156B and 156C of the shift relay 156 are closed and extend ground from the previously described prepared circuits including the fingers 92F, 92G and 92H (Fig. 6) through conductors in cable 161 (Figs. 9 and 10) to translating relays 137, 142 and 147 which are thus caused to energize at points 851, 852 and 853. These translating relays when energized set up circuits for establishing and extending ground to counting relays 22 for the hundreds (2) and 30 for the tens (5). That is, energized translating relay 137 closes a circuit for extending ground from the grounded movable contact of translating relay 136 to the central winding of counting relay 22. Energized translating relay 142 closes a circuit for extending ground from the grounded movable contact of translating relay 140 to the central winding of counting relay 30. Translating relay 147 though energized is ineffective in this part of the operation.

Counting relays 22 and 30 when energized at points 854 and 855 lock up from a source of ground at the contacts 29A and 35A of their respective stepping relays 29 and 35. The counting relays respectively associate with relays 22 and 30 and of lower numerical value lock up one after the other as before and eventually cause energization of cut-off relays 28 and 34 at points 856 and 857.

Cut-off relay 28 upon its energization closes contact 28C thereby extending ground through conductor 29F, stepping relay 29, conductor E (Figs. 11 and 12), cable 159 (Figs. 12 and 9), contact E6 of shift relay 156, cable 201 (Figs. 9 and 16), conductor 201E and to clutch 185A and the battery and ground associated therewith. Thereupon the stepping relay 29 and the clutch 185A are potentialized and become respectively energized at points 858 and 859. Energized relay 28 closes contact 28D thereby extending ground through conductor F (Figs. 11 and 12), cable 159 (Figs. 12 and 9), contact F6 of shift relay 156, cable 201 (Figs. 9 and 16), conductor 201F, and conductor 203F to the clutch 191A and the battery and ground associated therewith. Clutch 191A therefore becomes potentialized and later energized at point 860 concurrently with the energization of the clutch 185 at point 859. Number wheels 185 and 191 then start motion simultaneously with the energization of their clutches 185A and 191A.

In the tens order the energization of cut-off relay 34 closes contact 34C which extends through conductor 35F, stepping relay 35, conductor C (Figs. 11 and 12), cable 159 (Figs. 12 and 9) contact C6 of shift relay 156, cable 201 (Figs. 9 and 16), conductor 201C and to the clutch 186A and the associated battery and ground. Contact 34D of cut-off relay 34 is also closed and extends ground through conductor D (Figs. 11 and 12), cable 159 (Figs. 12 and 9), contact D6 of shift relay 156, cable 201 (Figs. 9 and 16), conductor 201D, conductor 203G and to the clutch 192A and the battery and ground associated therewith. Since contacts 34C and 34D close simultaneously the stepping relay 35, the clutches 186A and 192A will be simultaneously potentialized and become energized at points 861, 862 and 863 and number wheels 186 and 192 in the tens order of their respective registers begin rotation at the same time.

The first of the cut-off relays (Fig. 11) to energize, and in this part of the operation cut-off relay 28 was the first to energize, resulted in grounding of conductor 28X and the energization of relay 173 at point 764. Contact CC of relays 173 opened thereby breaking the energization circuit for sequence control relay 2 which thereupon began deenergization which was completed at point 865. Upon its deenergization relay 2 opened contact 2A freeing from ground the left-hand winding of sequence relay 13 which relay was thus depotentialized and later deenergized at point 866. Deenergized relay 13 opened contact 13A thereby freeing from ground conductor 13K and the energized translating relays 137, 142 and 147 which thereupon began deenergization which was completed at points 867, 868 and 869.

Upon deenergization of relays 137 and 142 ground for holding energized the central windings of counting relays 22 and 30 was broken whereupon such windings became deenergized. Deenergization of the central winding of counting relay 30 was ineffective since the left-hand winding of such relay remained energized because of its connection with ground at contact 35A of unenergized stepping relay 35. However, at this time stepping relay 29 had already been energized at point 858 whereby contact 29A had been freed from ground and the left-hand winding of relay 22 deenergized so that relay 22 began deenergization at point 870 concurrently with the deenergization of its central winding, such deenergization being completed at point 871.

Now as the number wheels 185 and 191 are caused to rotate with the shafts upon which they are mounted the shunting wheel 185C associated with number wheel 185 causes opening and closing of the shunting contact 185D to cause said contact upon the closing thereof to extend ground from the right-hand contact of relay 194 (Fig. 16) to a point upon the conductor 201E between the clutch 185A and stepping relay 29 whereby said stepping relay 29 will be shunted out and caused to deenergize. Stepping relay 29 thus alternately energized and deenergized releases the locked-up counting relays pertaining to the hundreds order as before and eventually shortly prior to the entry of the second digit 2 upon the wheel 185 and the entry of the second additional digit 6 upon the number wheel 191 the cut-off relay 28 will be deenergized freeing the stepping relay 29 and the clutches 185A and 191A from ground so that the wheels 185 and 191 will stop with the entry thereon of the two digits. This entry takes place during the interval of time represented by the space between the chart lines VI—VI', Likewise during the rotation of the number wheel 186 and the shunting wheel 186C associated therewith said shunting wheel periodically closes and opens shunting contact 186D to alternately apply and remove ground received from the right hand contact of relay 194 (Fig. 16) to the conductor 201C between the source of battery at clutch 186A and stepping relay 35 whereby said relay is alternately deenergized and energized for successively deenergizing the locked-up counting relays pertaining to the tens order. And when the last of these locked-up relays is released, relay contact 186D is opened and stepping relay 35 is permitted to energize. This final energization of stepping relay 35 takes place at point 872 shortly prior to the entry of the fifty digit upon the number wheels 186 and 192, and upon such energization of the stepping relay 35 the contact 35A thereof opens to start deenergization of cut-off relay 34 which is completed at point 873. Cut-off relay 34 thus deenergized opens contact 34C which established the circuit for energizing stepping relay 35 and clutch 186A. Contact 34D also opens at this time thereby breaking the circuit which energized clutch 192A. Therefore upon the opening of contacts 34C and 34D stepping relay 35 and clutches 186A and 192A are all depotentialized and become deenergized at points 874, 875 and 876. With deenergization of clutches 186A and 192A the number wheels 186 and 192 will have had five digits entered thereon and since each had previously stood at zero, each will now stand at 5. The first article register 185—186—187 will now read 250 or $2.50, the amount of the installment payment for the stove while the totalizer register 191—192—193 will stand at 656 which is the sum of the amounts entered in the balance due register, the consumption charge register and the first article register, these amounts being respectively 250, 156 and 250.

With the desired entries now standing upon the various registers it will be desirable to hold the number wheels for such a length of time as will enable a reading thereof to be taken, or, if the number wheels have printing means thereon, then for such a length of time as will enable a printing operation to be performed. Subsequent to such reading or printing of the entries upon the various register wheels such wheels will be returned to zero preparatory to the beginning of a new series of operations which are predetermined by succeeding record cards. An operation of the means for holding the wheels of the registers and for resetting such wheels to zero will now be described.

Holding for reading and release

Cut-off relay 34 which was the last of the cut-off relays (Fig. 11) to deenergize, and when deenergized at point 873 removed ground from conductor 28X whereupon relay 173 deenergized at point 877 closing contact CC and commencing energization of sequence control relay 2 at point 878. When relay 2 energizes at point 879 contact 2B thereof opens removing ground from sequence relay 18 through its right-hand winding, relays 15 and 16 having not been energized as an incident to the carrying out of the operations of the present example. The left-hand winding of relay 18 is therefore not held energized from contact 15C of unenergized relay 15 and was therefore previously deenergized immediately upon the deenergization of relay 13 and the opening of contact 13C. Therefore, when contact 2B opens, relay 18 begins deenergization which is completed at point 880.

Also, with the opening of contact 2B when relay 2 is energized, shift-magnet control relay 125 is deenergized through its left-hand winding, the right-hand winding thereof having been previously deenergized upon deenergization of relay 13 and the opening of contact 13G. Relay 125 when deenergized at point 881 frees ground from contact 125B and contact 14A whereby the conductor 14J and shift magnet 215 are depotentialized, the latter starting to deenergize at point 882.

Deenergization of relay 18 at point 880 opens contact 18G thereby removing ground from conductor 18X and thus ultimately from locked-up slow-to-release relay 110 (Fig. 6) which thereupon at point 883 begins deenergization.

Contact 18B closes when relay 18 deenergizes and extends ground by way of contact 17A to timed delay solenoid 119 and the battery and ground associated therewith. Thereupon the solenoid 119 is potentialized and becomes energized at point 884 and thus causes the plunger rod 119A to descend against spring pressure. Eventually the lower end of the descending rod 119A strikes against the movable contacts of switch 127 thereby opening contact 127A and shortly thereafter closing contact 127C. The opening of contact 127A breaks the circuit from ground and battery at contact 17J whereby the circuit extended through conductor 17K, switch contact 127A and conductor 127B to sequence control relay 2 is broken causing the sequence control relay 2 to start deenergization at point 885 and to complete deenergization at point 886. Relay 2 thus deenergized opens contact 2A removing ground from sequence relay 17 which thereupon begins deenergization at point 887. And when relay 17 deenergizes at point 888 contact 17A thereof opens thereby causing deenergization of the solenoid 119 which deenergization begins at point 889.

While the plunger rod 119A of timed delay solenoid 119 is in its lowermost position thereby closing contact 127C battery is extended from the ground and battery locally associated with contact 127 through conductor 127D (Figs. 8 and 3) to ground through relay 70 which thereupon is potentialized and becomes energized at point 890, energized relay 70 closes contact 70B which then extends ground to relays 69 (Fig. 3), 194, 195 and 196 (Fig. 16) and the batteries and grounds associated therewith so that said relays respectively begin energization at points 891, 892, 893 and 894.

Energized relay 69 through its several contacts with the exception of contact 69A which will be opened at this time will extend ground from the point adjacent to relay 70 through said relay and its contact 70A to the various zero setting contacts as 53E associated with the several number wheel units in the last reading register 51—52—53, the previous reading register 54—55—56 and the consumption quantity register 57—58—59. Referring particularly to zero setting wheel 53B and the contact 53E of the last reading register, it will be understood that so long as the wheel 53 stands at any position other than zero the periphery of the zero setting wheel 53B will co-act with contact 53E for closing the same and preparing a circuit from contact 69BBB relay 69 to the clutch 53A and the battery and ground associated therewith. Therefore with the closing of contact 69BBB circuit will be completed from ground at the winding of relay 70 and through clutch 53A which will then energize and cause the number wheel 53 to take motion with the shaft 50A until such time as the wheel approaches its zero position when a notch 53X in the periphery of zero setting wheel 53B will permit one part of the contact 53E to drop thereinto thereby opening the contact and breaking the circuit to clutch 53A which then begins deenergization at such a time as will result in its deenergization and the stopping of wheel 53 when such wheel reaches zero.

Now it will be noted that so long as a number wheel as 53 is off of the zero position so that the contact as 53E associated therewith is closed the series circuit thus causing energization of the clutch as 53A includes the relay 70 so that said relay 70 will remain energized so long as any of the zero setting contacts as 53E remains closed or in other words so long as any of the number wheels as 53 is off zero.

The zero setting contacts as 176E in the amount paid register 176—177—178 (Fig. 16) are connected at one side with a circuit leading from ground through the battery associated with the clutch of the number wheel unit of which they comprise a part. The other side of these contacts are connectable with ground from the next to the left movable contact upon relay 194, the ground applied to the next to the left movable contact of relay 194 being extended thereto from ground at the winding of relay 70, thence through the winding of relay 70, the right contact 70A of relay 70 and the conductor interconnecting said contact 70A and the next to the left contact of relay 194. Hence, when reset relay 194 is energized closing its next to the left movable contact, and any of the number wheels 176, 177 or 178 are off zero the contacts 176E, 177E or 178E thereof will be closed to complete a circuit through the clutch 176A, 177A or 178A to ground at the winding of reset control relay 70 (Fig. 3) to cause rotation of the number wheel unit or units until such time as they are respectively returned to zero. Ground from the winding or relay 70 is extended to the zero setting contacts associated with the number wheels of the other registers shown in Fig. 16 from contacts of the relays 194, 195 and 196 (when such relays are energized) as is readily understood by an examination of Figs. 3 and 16.

Therefore when the relays 69, 194, 195 and 196 are energized at points 895, 896, 897 and 898 any register number wheel which is then off zero will have its associated clutch energized. Register wheels in the present example which are at this time off zero are those indicated by the numbers 51, 52, 53, 54, 55, 56, 58, 59, 191, 192, 193, 176, 177, 179, 180, 182, 183, 184, 185 and 186 and consequently the clutches respectively associated with these several number wheels for returning them to zero respectively begin energization at points 899 to 918 inclusive and complete energization at points 919 to 938 inclusive.

It will be realized that the point where energization of reset control relay 70 is begun has been selected arbitrarily for the point of such energization is determined by the length of time necessary for the plunger rod 119A (Fig. 8) to descend to its lowermost limit of movement to cause grounding of contact 127C. Timed delay solenoid 119 will be so calibrated so the plunger rod 119A will descend slowly enough to allot an adequate time interval between the arrival of the various number wheels at their ultimate positions and the beginning of movement of such wheels for reset that a reading thereof can easily be taken if they be ordinary number wheels, or that an impression can readily be taken therefrom if they be printing wheels.

Since all of the number wheels incident to being reset to zero will be rotated forwardly the number of digital positions through which they will be moved prior to reaching the zero position will correspond to the complement of the number standing as a reading thereon. With reference to the last reading wheels 51, 52 and 53 which display a reading of 442, wheels 51 and 53 will each be rotated through six digital positions before reaching zero while wheel 53 will be rotated through eight digital positions. Therefore clutches 51A and 52A are deenergized at points 939 and 940 after rotation of the number wheels 51 and 52 through six digital positions and their arrival at the zero position. Clutch 53A deenergizes at point 941 after number wheel 53 has rotated through eight digital positions to arrive at zero.

Number wheels 54, 55 and 56 which stand at 416 must respectively be rotated through six, nine and four digital positions before arriving at zero have cessation of movement upon the deenergization of the clutches 54A, 55A and 56A at points 942, 943 and 944.

Number wheel 57 of the consumption amount register already stands at zero and consequently the reset clutch 66A associated therewith is not energized since the reset contact 57E coincides with the notch in the periphery of reset wheel 57B and the ground therefore cannot be extended from relay 70 through the contact 57E. Number wheels 58 and 59 however are off zero since they respectively display readings of 2 and 6 and the reset contacts 58E and 59E are closed for extending ground from the winding of relay 70 to the clutches 67A and 68A. Upon energization of the clutches 67A and 68A at points 925 and 926 these number wheels 58 and 59 are rotated respectively through eight digital positions and four digital positions prior to the notches in the periphery of reset wheels 58B and 59B causing the opening of contacts 58E and 59E and ultimate deenergization of the clutches 67A and 68A at points 945 and 946 respectively co-incident with the number wheels 58 and 59 reaching zero.

Number wheels 191, 192 and 193 stand at 656 and upon energization of their clutches 191A, 192A and 193A at points 927, 928 and 929 they must be rotated respectively through four, five and four, five and four digital positions before the reset contacts 191E, 192E and 193E associated therewith are opened for causing deenergization of the clutches 191A, 192A and 193A at points 947, 948 and 949 respectively concurrently with said number wheels reaching zero.

Number wheels 176 and 177 of the amount paid register stand at 2 and 5 so that after movement thereof respectively eight digital positions and five digital positions the clutches 176A and 177A deenergize at points 950 and 951 as these wheels arrive at zero.

Register wheels 179 and 180 of the balance due register likewise stand at 2 and 5 so that upon rotation of these wheels respectively through eight digital positions and five digital positions the clutches 179A and 180A deenergize at points 952 and 953 when these wheels will stand at zero.

Wheels 182, 183 and 184 of the consumption charge register read 156 so that concurrently with their respective rotation through 9, 5 and 4 digital positions the clutches 182A, 183A and 184A thereof will deenergize at points 954, 955 and 956 when these wheels will stand at zero.

The register for showing the installment charge for the first article of merchandise (the stove) displays a reading of 250 so that the wheels 185 and 186 must be rotated respectively through eight and five digital positions prior to arriving at zero, and consequently after the wheels 185 and 186 have moved respectively through eight digital positions and five digital positions the clutches 185A and 186A will deenergize at points 957 and 958.

Number wheels 55 and 182 at the beginning of the resetting operation each stood at 1 and had to be rotated through nine digital positions prior to reaching zero. As will be seen in the chart, therefore, at points 943 and 954, these two wheels were the last to reach their zero position. Shortly prior to the number wheels 55 and 182 reaching zero their resetting contacts 55E and 182E were permitted to open. Upon the opening of contact 55E the circuit starting with ground at clutch 55A, the battery associated with the clutch 55A, clutch 55A, contact 55E, the next to the right movable contact of relay 69, contact 70A of relay 70, and through the winding of relay 70 to ground is broken. Likewise with the opening of contact 182E the circuit beginning with ground at clutch 182A, battery at clutch 182A, clutch 182A, contact 182E, the next to the left movable contact of relay 196, contact 70A of relay 70 and through the winding of relay 70 to ground is broken. These two circuits are the last of the circuits for holding relay 70 energized so that upon the opening of contacts 55E and 182E relay 70 begins deenergization. When relay 70 is deenergized at point 959 contact 70B thereof opens removing ground from relays 69, 194, 195 and 196 which thereupon begin to deenergize, such deenergization being respectively completed at points 960, 961, 962 and 963.

Attention is directed to contact 69A associated with relay 69 (Fig. 3) and also to the right and left movable contacts of relays 194, 195 and 196 (Fig. 16). Each of these contacts is grounded and while the relays of which they comprise a part are deenergized said contacts are effective for extending ground to the shunting contacts associated with the various shunting wheels of the number wheel units. For example, contact 69A extends ground through conductor 69B to the shunting contacts associated with the shunting wheels of the last reading and of the previous reading registers (Fig. 3). While such a source of ground is necessary for these shunting contacts during the setting-up operation of the number wheels so the stepping relays (Fig. 11) can be shunted out, this source of ground is unnecessary during reset of the number wheels and in fact if present, would under certain circumstances prematurely interrupt the resetting operation. For instance, assume an example where number wheels 53 and 176 stop at 2 prior to the resetting operation and assume further that these are the last number wheels to be reset to zero. Then after the other wheels have reached zero thereby opening their associated reset contacts and removing that source of energization for relay 70, if ground were applied to shunting contacts 53D and 176D respectively from the contacts 69A and 194A, the shunting contacts 53D and 176D upon closing shortely after the number wheels 53 and 176 pass the digital position of 8, would extend ground to reset contacts 53E and 176E thereby shunting out relay 70 which would then deenergize opening contact 70B and cause premature deenergization of relays 69 and 194 and the removal of the source of ground for reset contacts 53E and 176E so that upon the next opening of the contacts 53D and 176D as the wheels 53 and 176 approach the succeeding digital position of 9 the clutches 53A and 176A would deenergize thereby leaving the wheels 53 and 176 at positions displaying 9 instead of 0. Avoidance of this situation where grounding of any of the reset contacts as 53E from shunting contacts as 53D would cause a premature deenergization of reset relays 70, 69, 194, 195 and 196 and deenergization of any of the clutches as 53A during a reset operation prior to the return of the number wheel as 53 to zero is provided for by the contacts as 69A which provide ground for the shunting contacts as 53D only during entries in the registers and are opened by the relays 69, 194, 195 and 196 during a reset operation.

Registering additional installment charge for merchandise

The above described series of apparatus operations followed a set-up of the sequence relays (Figs. 7 and 9) which omitted energization of sequence relays 15 and 16. These relays 15 and 16 were left unenergized so the apparatus would not function to cause entry of a charge for the second article of merchandise, namely, a refrigerator. Had the relays 15 and 16 been energized and the charge entered for the installment payment to be made upon the refrigerator the amount of the payment would have been set up in the register 188—189—190 (Fig. 16) and added to the other entries in the totalizer register 191—192—193 (Fig. 16). A description will now be given of the apparatus during an operation to effect an entry in the registers 188—189—190 and 191—192—193 for the second article of merchandise (the refrigerator) as well as the first article of merchandise (the stove). These operations of the apparatus are represented graphically in the chart shown in Figs. 37 to 42.

Section I', Registration of amount paid, of the chart in Figs. 37, 39 and 41 corresponds to section I, Registration of amount paid, of the chart shown in Figs. 25, 29 and 33. Operation commences in the same manner as hereinabove described with reference to the chart shown in Figs. 25, 29 and 33 and the chart lines have applied thereto the same reference characters as do the lines in the chart of Figs. 37, 39 and 41 for indicating the same operations by the same parts. For example, in section I of Fig. 25 the reference character 400 indicates the point where key 1 is pressed against contact 1A for grounding and initiating energization of sequence relay 8, and the reference character 401 indicates the point where energization of relay 8 is completed.

In the present operation, however, where an installment payment is to be provided for upon a refrigerator, the office card shown in Fig. 2 will have no perforation 98AA so that when the card is inserted over the various contact bars in Figs. 4, 5 and 6, the contact finger 98A will be insulated from the cancellation bar 98 (Fig. 6). Therefore when the key 1 is depressed far enough to close and ground contact 1D, the ground thus extended to the cancellation bar 98 will not be impressed upon the contact finger 98A, and hence slow-to-release relay 110 will not be energized as was the case in the preceding example as indicated at point 411 (Fig. 29). During the present operation the ground imposed from starting key 1 upon the cancellation bar 98 will be extended to neither of the relays 110 or 109 to cause energization thereof so that contacts 110B and 109B remain closed as shown in Fig. 6 and therefore when the key 1 is depressed sufficiently far to apply ground to contact 1C, such ground will be extended through switch 106 (Fig. 6) contact 106A, conductor 106B, contact 93E, which engages the bar 93 through card perforation 93EE, bar 93, conductor 93X, bar 99, which is engaged by finger 99B through card perforation 99BB, contact finger 99B, conductor 99X, closed contact 110B of slow-to-release relay 110 and conductor 16X (Figs. 6, 7 and 8) to the sequence relay 16, thus potentializing sequence relay 16 at point 975 and causing it to become energized at point 976 (Fig. 37). Contact 1C when grounded by the depressing of key 1 also extends ground through switch 106, contact 106A, conductor 106C, contact finger 92E, which extends through card perforation 92EE, bar 92, conductor 92X, bar 97, contact finger 97A which engages the bar 97 through card perforation 97AA, conductor 97X, contact 109B of unenergized relay 109 and conductor 14X (Figs. 6, 7 and 8) to the central winding of sequence relay 14 which thereupon begins energization at point 423 as described hereinabove with reference to the chart shown in Figs. 25 to 36 and becomes energized at point 424.

Relay 16 when energized closes contact 16C which extends ground to the right hand winding of sequence relay 15 potentializing the same at point 977. When relay 15 energizes at point 978 contact 15G thereof closes and potentializes shift magnet control relay 126 at point 979. When relay 126 energizes at point 980 contact 126A closes establishing a holding circuit through conductor 2D which is effective during the times sequence control relay 2 is deenergized and contact 2B thereof, is closed. Contact 15C also closes with the energization of relay 15 concurrently with the closing of contact 13C of relay 13 and each of the contacts 15C and 13C extend ground to the left-hand winding of relay 18 and are effective for holding relay 18 energized so long as either of the relays 13 or 15 remain energized.

Upon the energization of sequence relay 17 at point 430 contact 17J thereof closes to establish the circuit through conductors 17K and 127B for energizing sequence control relay 2 whereby operation of the apparatus is caused to proceed as above described and as indicated graphically in sections 1 to 6 inclusive of the chart shown in Figs. 25 to 36. The present chart (Figs. 37 to 42), in section 6A, picks up the operation at the point of termination along the line VI forming the right-hand boundary of section 6 in the previously described chart. Therefore in section 6A the points 872 and 873 are shown respectively for the energization of stepping relay 35 and the resulting deenergization of cut-off relay 34. And as has been described above deenergization of the cut-off relay 34 at point 873 initiates deenergization of clutches 186A and 192A, such deenergization being respectively completed simultaneously at the points 875 and 876 coincidentally with the number wheels 186 and 192 of the first article register 185—186—187 and of the totalizer register 191—192—193 entering the digits 5 thereon. The stage in the operation of the apparatus is then reached when the first article register has been operated to display a reading of 250 while the totalizer register has entered therein a series of entries totalling 656.

In the present operation of the device however, the number wheels are not at this time returned to zero because there is the further entry to be made of the installment payment due for the second article of merchandise (the refrigerator). Therefore upon the deenergization of cut-off relay 34 at point 873 ground is removed from conductor 28X (Figs. 11 and 12) thereby depotentializing relay 173 at point 980' which relay becomes deenergized at point 981. Thereupon contact CC is closed and establishes the circuit for causing energization of sequence control relay 2 at point 982. Relay 2 thus energized opens contact 2B removing ground from the right-hand winding of sequence relay 16 which then begins deenergization at point 983. The opening of contact 2B also removes ground from the left-hand winding of shift magnet control relay 125 which relay then begins deenergization at point 984, the right-hand winding of relay 125 having been previously deenergized upon the opening of contact 13G when relay 13 was deenergized. When relay 125 is deenergized at point 985, contact 125B opens removing ground from contact 14A and conductor 14J thereby freeing from ground the shift magnet 215 which then begins deenergization at point 986.

Deenergization of relay 16 opened contact 16C to free from ground the right-hand winding of sequence relay 15 whereupon such right-hand winding deenergizes and leaves relay 15 energized through its left-hand winding under control of sequence control relay 2. Contact 16B of deenergized relay 16 extends ground through contact 15A, conductor 15K (Figs. 8 and 6) contact finger 95R, contact bar 95 which is engaged by the finger 95R through a perforation which will be provided in the card (Fig. 2), contact bars 93A, 93B and 93C, fingers 93F, 93G and 93H which engage the contact bars through perforations 93FF, 93GG and 93HH in the card of Fig. 2, and thence through conductors in the cable 112 to contacts 157A, 157B and 157C of the shift relay 157 (Fig. 9). Upon the closing of the shift relay 157 in the manner now to be described the thus prepared grounded circuit leading to contacts 157A, 157B and 157C will be extended to the translating relays (Fig. 10) and finally to the counting relays (Fig. 11) for setting up thereon the amount of 250 which is representative of the $2.50 installment payment to be made for the refrigerator.

Relay 16 when deenergized at point 987 also closes contact 16A which extends ground from contact 126B to shift magnet 216 (Fig. 9) which then begins energization at point 988. Upon energization of the shift magnet 216 at point 989 the shift relay 157 closes contacts 157A, 157B and 157C thereby extending the previously described prepared circuit from ground at contact 16B through conductor 15K and the bars 93A, 93B and 93C (Fig. 6) to the translating relays (Fig. 10). Translating relays 137, 142 and 147 respectively representing the digits for the number 250 are energized at points 989A, 989B and 989C by the ground extended thereto through the contacts 157A, 157B and 157C. Energized translating relay 147 is ineffective in this operation, but energized translating relays 137 and 142, as has been described hereinabove, prepare circuits extending ground from the grounded movable contacts of relays 136 and 140 respectively to the center windings of counting relays 22 and 30 (Fig. 11).

Thereupon counting relays 22 and 30 begin energization at points 990 and 991 and upon their energization at points 992 and 993 initiate the locking up or energization of the counting relays in their respective chains one after the other in the sequence correlated with their decreasing numerical value.

Eventually at points 994 and 995 cut-off relays 28 and 34 are respectively potentialized after the energization of counting relays 27 and 43 and the closing of their contacts 27C and 43C which place ground upon said cut-off relays. When cut-off relay 28 becomes energized at point 996 contacts 28C and 28D are closed. Contact 28C extends ground through conductor 29F, stepping relay 29, conductor E (Figs. 11 and 12), cable 159 (Figs. 12 and 9), contact E7 of shift relay 157, cable 202 (Figs. 9 and 16), conductor 202E and to the clutch 188A and the battery and ground associated therewith. Thereupon the clutch 188A is potentialized at point 997 and becomes energized at point 998 to cause the number wheel 188 to take motion. Motion of wheel 191 is to begin concurrently with that of wheel 188 so that the entry being made in the second article register will also be made in the totalizer register. The circuit for energizing the clutch 191A for causing the number wheel 191 to take such motion is established by the closing of contact 28D which then extends ground through conductor F (Figs. 11 and 12), cable 159 (Figs. 12 and 9), contact F7 of shift relay 157, cable 202 (Figs. 9 and 16), conductor 202F and conductor 203F to the clutch 191A and the battery and ground associated therewith. Clutch 191A then begins energization which is completed at point 999 at which time the number wheel 191 takes motion.

Stepping relay 29 which is in series with the circuit for energizing clutch 188A begins energization concurrently with the energization of said clutch and at point 1000. Energization of the stepping relay 29 at point 1001 opens contact 29A thereby removing ground from the left-hand winding of counting relay 22 which winding thereupon deenergizes. The central winding however, of counting relay 22 remains energized until such time as translating relay 137 is deenergized in the manner now to be described.

Cut-off relay 28 when energized closed contact 28G, and since this was the first of the cut-off relays to energize thereby impressed ground on conductor 28X for causing relay 173 to energize at point 1002 at which time contact CC opened to free sequence control relay 2 from ground. Deenergization of relay 2 thus initiated is completed at point 1003, to open contact 2A causing deenergization of sequence relay 15 at point 1004. Sequence relay 15 when thus deenergized opens contact 15A thereby breaking the circuit including conductor 15K (Figs. 8 and 6), contact bars 93A, 93B and 93C and contacts 157A, 157B and 157C of shift relay 157 (Fig. 9), which held translating relays 137, 142 and 147 (Fig. 10) energized. Thereupon said translating relays 137, 142 and 147 begin deenergization which is completed at points 1005, 1006 and 1007. Translating relay 147 had been ineffective in the present operation and its deenergization is likewise ineffective. Deenergization of translating relay 137 however at point 1005 breaks the energizing circuit for counting relay 22 which then begins deenergization at point 1008. Deenergization of translating relay 142 at point 1006 breaks the energizing circuit for the central winding of counting relay 30 which winding then deenergizes. However relay 30 is held energized through its left-hand winding which is connected through conductor 35E with contact 35A of stepping relay 35 which remains unenergized at this time.

Shortly after the number wheels 188 and 191 begin rotation at points 998 and 999 the shunting wheel 188C associated with number wheel 188 closes shunting contact 188D thereby extending ground from the right-hand contact of relay 195 (Fig. 16) to the conductor 202E at a point between clutch 188A and stepping relay 29 whereby the stepping relay 29 is shunted out and begins deenergization at point 1009. During continued rotation of the number wheels 188 and 191 the shunting contact 188D is alternately opened and closed to alternately energize and deenergize stepping relay 29 and thus deenergize the locked-up counting relays of the hundreds order and ultimately unlock or deenergize the cut-off relay 28. Such deenergizing of cut-off relay 28 and the consequent deenergization of stepping relay 29 and of the clutches 188A and 191A takes place during that interval of time represented by the space in the chart between sections 6A and 7'. Clutches 188A and 191A are deenergized at such a time as will result in two digits having been entered upon each of the wheels 188 and 191 so these wheels will now respectively display the digits 2 and 8.

When cut-off relay 34 energizes at point 1010 and contacts 34C and 34D are closed and grounded, contact 34C extends ground through conductor 35F, stepping relay 35, conductor C (Figs. 11 and 12) cable 159 (Figs. 12 and 9), contact C7 of shift relay 157, cable 202 (Figs. 9 and 16) and conductor 202C to the clutch 189A and the battery and ground associated therewith. Thereupon the clutch 189A begins energization which is completed at point 1011. Number wheel 189 then takes motion. Stepping relay 35 which is in series with clutch 189A begins energization concurrently therewith and completes such energization at point 1014. Number wheel 192 also takes motion and such motion of the number wheel 192 is provided for by the ground upon closed contact 34D being extended through conductor D (Figs. 11 and 12), cable 159 (Figs. 12 and 9) contact D7 of shift relay 157, cable 202 (Figs. 9 and 16), conductor 202D and conductor 203G to clutch 192A and the battery and ground associated therewith. Therefore clutch 192A is potentialized at point 1012 and becomes energized at point 1013 concurrently with the energization of clutch 189A at point 1011.

During movement of the number wheels 189 and 192 the shunting wheel 189C associated with the number wheel 189 alternately closes and opens its cooperating shunting contact to alternately apply and remove ground from the right-hand contact of relay 195 to a point upon the conductor 202C at a point between the clutch 189A and the stepping relay 35 so that stepping relay 35 will be alternately deenergized and energized for successively deenergizing the locked-up counting relays in the tens order. Finally, shortly prior to the entry of the fifth digit 5 upon the number wheel 189 and of the fifth digit 0 upon the number wheel 192, the shunting contact 189D will be opened thereby freeing stepping relay 35 from shunt which relay then begins energization which is completed at point 1015. This energization occurs after the chain of counting relays has been deenergized and causes deenergization of cut-off relay 34 at point 1016. Cut-off relay 34 thus deenergized opens contacts 34C and 34D. Contact 34C breaks the series circuit through stepping relay 35 and clutch 189A whereupon these parts respectively begin deenergization which is completed at points 1017 and 1018. Opening of contact 34D breaks the energization circuit for clutch 192A which then begins deenergization which is completed at point 1019. With the deenergization of clutches 189A and 192A at points 1018 and 1019 the number wheels 189 and 192 will each have been advanced five digits. The second article register will now read 250 and the totalizer register 806.

A reading of 656 stood upon the totalizer register prior to the addition of the last amount of 250 thereon and the correct reading of the totalizer register should therefore be 906. The additional digit is entered upon the hundreds wheel 191 to effect the correct reading of 9 by means of a carry-over operation which will now be described.

During the entry of the last of the five digits to be entered upon the number wheel 192 said wheel passes from 9 to zero and during this interim at the time indicated by the points 1020 and 1021 upon the lines pertaining to the stepping relay 35 and to the clutch 192A, the lobe upon carry-over wheel 192H momentarily closed carry-over contact 192K thereby extending ground from the right-hand contact of relay 196 (Fig. 16) through the closed contact 192K conductor 203L, conductor 202L, cable 202 (Figs. 16 and 9), contact L7 of shift relay 157, cable 159 (Figs. 9 and 12), and through conductor L and the right-hand winding of carry-over counting relay 169 to battery and ground. Therefore carry-over relay 169 was potentialized and became energized at point 1022. Relay 169 thus energized locked up through contact 169C and contact 172A of stepping relay 172 in the manner previously described and by closing contact 169B caused energization of carry-over relay 170 at point 1023. Relay 170 thus energized closed contact 170C thereby causing energization of cut-off relay 171 at point 1025. Relay 171 opened contact BB so that later when cut-off relay 34 deenergized at point 1016 to remove ground from conductor 28X and thus cause deenergization of relay 173 at point 1024 the resulting closing of contact CC would not extend ground to sequence control relay 2, this circuit then being broken at contact BB.

The deenergization of relay 173, however, in addition to closing contact CC also closes contacts 173A and 173B. Circuit therefore is closed from ground at contact CC through contact AAA, contact 171C, stepping relay 172, contact 173A, conductor K, cable 159 (Figs. 12 and 9) contact K7 of shift relay 157, cable 202 (Figs. 9 and 16) conductor 202K and conductor 203F to the clutch 191A and the battery and ground associated therewith thus potentializing the stepping relay 172 and the clutch 191A at points 1026 and 1027 and causing the same to become respectively energized at points 1028 and 1029. Number wheel 191 therefore at point 1029 is connected with and takes forward motion with the shaft upon which it is mounted.

Contact 171D of cut-off relay 171 (Fig. 12) extends ground from contact CC through cable 159, (Figs. 12 and 9), contact M7 of shift relay 157, cable 202 (Figs. 9 and 16), conductor 202M and conductor 203M to one side of the shunting contact 191D. Therefore shortly after the number wheel 191 and the shunting wheel 191C take motion a lobe upon the shunting wheel 191C upon closing the contact 191D will extend ground to a point upon conductor 203F at a point between the clutch 191A and stepping relay 172 in the series circuit including the same. Therefore stepping relay 172 is shunted and begins deenergization which is completed at point 1030. Previously upon the energization of the stepping relay 172 at point 1028, contact 172A thereof was opened removing ground from relay 169 which then began deenergization at point 1031. Now upon completion of the present deenergization of stepping relay 172 at point 1030 contact 172B is opened removing ground from relay 170 which thereupon begins deenergization which is completed at point 1032. Shortly prior to the entry of this additional digit upon the number wheel 191 the shunt of the relay 172 is removed by the opening of shunting contact 191D whereupon the stepping relay begins to energize and completes energization at point 1033. Stepping relay 172 thus energized opens contact 172A thus removing ground from cut-off relay 171 which then becomes deenergized at point 1034. Deenergized relay 171 opens contact 171C thereby breaking the series circuit including stepping relay 172 and the clutch 191A which thereupon begin deenergization at points 1035 and 1036. Complete deenergization of the clutch 191A occurs at point 1037 concurrently with the entry of the additional digit to number wheel 191 so that the wheel now displays 9 and the totalizer register displays the reading of 906 which is the correct total of the several entries contained therein.

Deenergization of cut-off relay 171 at point 1034 permits closing of contact BB thereby establishing the energizing circuit from ground at contact CC for sequence control relay 2 which then begins energization which is completed at point 1038. Relay 2 thus energized opens contact 2B which through contact 18F results in deenergization of relay 18 at point 1039. Contact 2B upon opening also removes ground from the left-hand winding of relay 126 which therefore begins deenergization at point 1040. Deenergization of the right-hand winding of relay 126 took place upon deenergization of relay 15 and the opening of contact 15G. Relay 126 therefore begins deenergization concurrently with the deenergization of its left-hand winding and upon completion of this deenergization at point 1041 ground at contact 126B is removed from contact 16A and shift magnet 216 (Fig. 9) which then begins deenergization at point 1042.

Relay 18 which is now deenergized closes contact 18B thereby extending ground through contact 17A to timed control solenoid 119 and to battery and ground. Solenoid 119 is therefore energized at point 1043 and causes its plunger rod 119A to start descending. And after a selected length of time which may be varied at will by changing the design of the device 119, the plunger rod 119A strikes against the movable switch contact 127 thereby opening contact 127A and breaking the energization circuit for sequence control relay 2. Relay 2 then begins deenergization and upon completion of such deenergization at point 1044 contact 2A is opened removing ground from the left-hand winding of sequence relay 17 whereupon said relay begins deenergization which is completed at point 1045.

At point 1045 when relay 17 deenergizes, contact 17A opens, breaking the energization circuit for timed control solenoid 119 which is depotentialized and becomes deenergized at point 1046. Prior to deenergization of solenoid 119 however the plunger rod 119A was advanced far enough for moving the contact 127 into position for closing contact 127C thereby establishing a circuit beginning with ground and battery adjacent to the movable contact 127 through contact 127C and conductor 127D (Figs. 8 and 3) to reset control relay 70 and to ground. Relay 70 then begins energization and when energized at point 1047 contact 70B thereof closes and extends ground to relays 69, 194, 195 and 196 and the batteries and ground respectively associated therewith whereupon said relays begin energization which is completed at points 1048, 1049, 1050 and 1051.

Upon energization of relay 69 contact 69A thereof is opened and the remaining contacts of said relay are closed as described hereinabove and ground is extended from the point adjacent to the winding of relay 70 through such winding, contact 70A and the contacts of relay 69 (with the exception of contact 69A), to the various reset contacts as 53E associated with the number wheel units of the last reading register 51—52—53, the previous reading register 54—55—56, and the consumption quantity register 57—58—59 whereby the clutches associated with these various number wheels which are off zero are energized and deenergized at the times indicated by the reference characters in chart section 7' are identical and of the same significance as those applied in section 7 of the first chart already described. That is, the number wheels upon these three registers stand in the same positions as they did at the beginning of the previously described reset operation. This is also true with respect to the number wheels in the registers 176—177—178 for the amount paid, register 179—180—181 for the balance due, register 182—183—184 for the consumption charge and the register 185—186—187 for the first article installment charge.

Number wheel 190 of register 188—189—190 stands at zero while the number wheels 188 and 189 stand respectively at 2 and 5. These latter named number wheels 188 and 189 take motion with their shaft for being returned to zero upon the energization of their associated clutches 188A and 189A at points 1052 and 1053. The potentialization for such energization being available upon the closing of the next to the right contact of relay 195 (Fig. 16) at point 1050. Shortly prior to the number wheel 188 arriving at the zero position the reset contact 188E thereof opens breaking the energizing circuit for the clutch 188A whereupon clutch 188A begins deenergization at point 1054 and completes such deenergization at point 1055 concurrently with the number wheel 188 reaching zero. It will be noted that the wheel 188 since it stood at 2 had to be rotated through eight digital positions for reaching the zero position. Number wheel 189 which begins rotation at point 1053 has to rotate through five digital positions before reaching the zero position and shortly prior to reaching such zero position the reset contact 189E thereof is opened breaking at point 1056 the energizing circuit for clutch 189A which soon thereafter becomes deenergized at point 1057 at the time wheel 189 reaches zero.

Since the reading upon the number wheels 191, 192 and 193 was 906 these wheels must be rotated respectively 1 digital position, zero digital positions, and 4 digital positions to be reset to zero. Clutch 191A and clutch 193A are energized by circuits originating at ground at a point adjacent to the winding of relay 70 (Fig. 3) and including the next to the right movable contact of relay 196 (Fig. 16) which upon closing completed such circuits. Said clutches 191A and 193A were therefore potentialized at points 1058 and 1059 and upon their energization at points 1060 and 1061 the number wheels 191 and 193 took motion. Shortly prior to number wheel 191 reaching the zero position, after having rotated nearly one digital position, the resetting contact 191E thereof opens thus breaking the energization circuit for clutch 191A which was thus caused to deenergize at point 1062 at the time wheel 191 reached zero. Clutch 193A remains energized until shortly before the number wheel 193 rotates through four digital positions and at which time contact 193E opens to break the energization circuit for the clutch which thereupon is depotentialized and becomes deenergized at point 1063 as the number wheel 193 reaches zero.

Later, as an incident to the last of the number wheels to be returned to zero (wheels 55 and 182) the last of the energizing circuits for reset control relay 70 (Fig. 3) will be broken as explained with reference to the previously described chart whereupon said relay becomes deenergized at point 959 and relays 69, 194, 195 and 196 are caused to deenergize at points 960, 961, 962 and 963.

*Flow chart illustrating operations pertaining to amount paid and to balance due*

An illustration of the apparatus operations for selecting, sensing and entering in the proper registers the amounts respectively pertaining to the amount paid and to the balance due is set out graphically in the flow chart (Fig. 22).

Referring to this flow chart (Fig. 22), the pressing of the starting key grounds contact 1B to indirectly cause energization of sequence relays as 3 and 4 which are later effective to cause entry of a selectable amount paid in the amount paid register and to indirectly cause the energization of sequence relays as 5 and 6 which are later effective for causing entry in the balance due register of a selectable balance due amount. Grounded contact 1B extends such ground through month selector switch 101 and switch contact 101A thereby placing ground upon conductor 101B. Thus relay 228 is grounded and energized, closing its contacts including contact 228A. Since the control card contains a perforation 221AA, contact finger 221A is permitted to engage and be grounded from the grounded contact bar 221 and extend this ground through the contact 228A to relay 225 which is thereby energized to close the movable contact thereof (Fig. 22). Circuit thus established from ground at this movable contact of relay 225 continues through the right-hand contacts of the relays in line thereabove including relay 230 and through conductor 4X to the central winding of sequence relay 4. This initially energized circuit for causing energization of relay 4 is made prominent by the heavy solid lines extending alongside of the circuit legs as conductors 101B and 4X. When sequence relay 4 energizes, it causes energization of sequence relay 3 and these sequence relays lock up as previously described.

Closing of contact 1B also establishes a circuit made prominent by the dotted line (Fig. 22) and including conductor 101C which extends ground to and causes energization of relay 229. When contact 229A of relay 229 is closed by the energization of such relay, ground is thereby extended from the contact bar 222 through finger 222A which is permitted to engage the contact bar through card perforation 222AA and through contact 229A and conductor 229E to relay 226 which is thus energized, moving its movable contact (Fig. 22) to the right thereby establishing a local circuit from ground at said movable contact and through the right-hand contacts of the relays aligned thereabove and conductor 6X to sequence relay 6. Thus relay 6 and later relay 5 are caused to energize and lock up as above described. Relays 5 and 6 when thus locked up (and as the operation of the apparatus ensues) are adapted to sense a reading selectable in amount indicated by card perforations and to cause such reading to be entered in the balance due register and in the money totalizer register.

In the present example, the operations selected through the relays 228 and 229 are but two, namely, the entry of an amount paid and of a balance due. If more operations were to be selected by either of these relays 228 or 229, different card perforations would be provided over the bars 221 or 222 and additional paired sequence relays as 3 and 4, and 5 and 6 would also be provided. If for example a card perforation should be provided for the grounding of the next to the left contact of relay 228 such contact would be grounded and extend such ground to the relay next above relay 225. The movable contact shown of relay 225 would then be swung to the left instead of to the right since relay 225 would remain unenergized and the contacts of the relays above relay 225 would be in position for imposing ground upon a different selected conductor as 4X which would extend the ground to a different pair of sequence relays as 3 and 4 for controlling a different operation. Similarly, if the control card were perforated for causing a finger other than the finger 222A to engage the contact bar 222, relay 229 upon its energization could be made effective for energizing different of the relays as 226 and 231 to extend ground from the movable contact of relay 226 over a different conductor as 6X for causing energization of a different pair of sequence relays as 5 and 6 to provide for a different operation of the apparatus.

If more than two pair of sequence relays as 3 and 4 are to be energized by a single grounding of the starting key contact 1B; that is, if more than two operations are to be initiated by a single grounding of the starting key 1B, more divergent circuit legs as 101B and 101C would be provided for each of the monthly switch contacts as 101A. Each of these additional circuit legs as 101B would lead to a relay as 228 which would be in control of selectable circuits as is the relay 228 in control of circuits selectable by card perforations 221AA.

With the sequence relays 3, 4, 5 and 6 energized, the subsequent deenergization of sequence relay 4, upon energization of sequence control relay 2 (Fig. 7), will cause the grounding of contact 4B and the extension of such ground through contact 3A and through the circuits traceable by dot-dash lines as that disposed alongside of conductor 3K, the circuits ultimately leading to the amount paid register to effect an entry therein of the amount paid. The circuit is traced through conductor 3K to relay 104 which upon energization closes its contacts thereby extending ground from the contact bars 91A, 91B and 91C through fingers 91F, 91G and 91H which are permitted to engage the contact bars through card perforations 91FF, 91GG and 91HH arranged in an order representative of the amount paid which in this instance is 250. From these contact fingers the ground is extended through the associated contacts of relay 104 and conductors passing into cable 107, thence to the translating relays which are energized selectively to establish local circuits which cause energization of the counting relays. Thereupon the counting relays are caused to lock up or energize in an arrangement representative of the amount paid 250 and to cause energization of the clutches pertaining to the number wheels in the amount paid register for such length of time as to result in the amount paid register effecting an entry of 250. Subsequent to energization of the counting relays the sequence control relay 2 (Fig. 7) is deenergized, deenergizing sequence relay 3, and after deenergization of the counting relays sequence control relay 2 (Fig. 2) is energized, deenergizing sequence relay 6, thereby closing contact 6B. Ground is thus impressed upon and extended through contact 5A and through the circuit legs traceable by the dash-circle line to sense from the control card a selected amount of balance due payment and to cause entry of such amount in both the balance due register and the money totalizer register.

This circuit is traced through the grounded conductor 5K to relay 105 which is thus energized, and upon its energization closes its several contacts thereby preparing circuits from grounded contact bars 90A, 90B and 90C through contact fingers 90F, 90G and 90H which are permitted to engage the contact bars through card perforations arranged to represent the selected amount 250 constituting the balance due. The contacts of relay 105 connected with these fingers extend the ground to conductors leading into cable 108 and to the translating relays which are again energized to establish a local circuit for impressing ground upon certain of the counting relays for initiating energization of these counting relays in a fashion representative of 250. When the cut-off relays associated with these counting relays are energized, an energizing circuit is established for the clutches associated with the number wheels in the balance due register and the money totalizer register and to enter 250 in each of these registers.

*Flow chart illustrating selecting, sensing and entering of the last meter reading, the previous meter reading and the consumption charge*

In Fig. 23 there is shown a flow chart isolating that part of the apparatus having to do with the selecting, sensing and entering of the last meter-reading, the previous meter-reading and the consumption charge.

Successive energization of the sequence relays 8, 7, 10, 9, 12 and 11 in the order named is initiated by pressing of the starting key whereby ground is applied to contact 1A and extended to relay 8. These relays are held energized by contacts of the relay energized next prior thereto and by the contacts of the sequence control relay 2 (Fig. 7) in the manner hereinabove explained. Eventually, with the sequence control relay 2 (Fig. 7) becoming energized, sequence relay 8 is deenergized applying ground to contact 8B and extending such ground through contact 7A and the circuit legs traced by the dot-dash line, which circuit legs include conductor 7K, month selector switch 79, switch contact 79A, conductor 80B, month contact finger 77D pertaining to the meter reading at the end of the second or last month and which finger is permitted to engage contact bar 77 through card perforation 77DD, said bar 77A and relay 82. When relay 82 is energized by the extension of ground thereto through the just traced circuit legs, the contacts of said relay are closed thus preparing complementary circuits beginning with ground at the last reading bars 77A, 77B and 77C, fingers 77F, 77G, 77H, 77J and 77K which are permitted to engage these last reading bars through card perforations 77FF, 77GG, 77HH, 77JJ and 77KK which are placed in an arrangement representative of the last meter reading 442, the closed contacts of relay 82 associated with said contact fingers, cable 78 and to the translating relays. Thereupon the translating relays which are connected with the conductors energized from ground at the last meter reading bars 77A, 77B and 77C are energized, establishing circuits for causing energization of counting relays representative of the amount 442. The cut-off relays associated with the energized counting relays are then energized and establish circuits for causing energization of clutches associated with the number wheels in the last reading register and in the consumption quantity register to effect the entry 442 in each of these registers.

Also shortly after energization of the cut-off relays associated with the counting relays of the sequence control relay 2 (Fig. 7) was deenergized to cause deenergization of sequence relay 7, the opening of contact 7A and the interruption of the circuit which had initiated energization of the counting relays.

Near the end of the last meter reading entry in the last reading register and in the consumption quantity register the cut-off relays associated with the counting relays were deenergized, effecting energization of the sequence control relay 2 (Fig. 7) and deenergization of sequence relay 10. In this manner contact 10B is grounded and extends ground through contact 9A and the circuit legs, traced by the dash-circle line, including conductor 9K, month selector switch 80, switch contact 80A, conductor 79B, monthly meter reading bar 76 which is engaged by the finger 76D through card perforation 76DD and relay 81. Relay 81 is thereby energized, closing its contacts of which certain ones are effective for establishing circuits beginning with ground at the previous reading bars 76A, 76B and 76C and extending through fingers 76F, 76G, 76H, 76J and 76K which are permitted to engage these previous reading bars through card perforations 76FF, 76GG, 76HH, 76JJ and 76KK which are placed in an arrangement representative of the previous meter reading 416. From these grounded contact fingers the circuit is extended through the contacts of relay 81 which are connected therewith and thence through conductors leading through cable 78 to selected of the translating relays which are thereby energized and establish a local circuit for initiating energization of counting relays which are representative of the amount 416. These counting relays energize and cause energization of their associated cut-off relays and the contacts of these cut-off relays are now connected electrically with clutches for causing rotation of the number wheels in the previous reading register and the consumption quantity register, the number wheels in the previous reading register being rotated forwardly to express the amount 416 while the number wheels in the consumption quantity register are rotated subtractively the amount of 416, after carry-over. The consumption quantity register now reads 026 thus expressing the difference between the last meter reading 442 and the previous meter reading 416.

When the first of the cut-off relays pertaining to the counting relays energized, a circuit was thereby established for causing deenergization of the sequence control relay 1 (Fig. 7) and the consequent deenergization of sequence relay 9 which then opened contact 9A thereby interrupting the circuit which indirectly initiated energization of the counting relays. Near the end of the entry of 416 in the previous reading register and in the consumption quantity register the last of the cut-off relays, associated with the counting relays, to deenergize deenergized thereby indirectly effecting energization of the sequence control relay and the consequent deenergization of sequence relay 12.

Sequence relay 12 thus deenergized grounds contact 12B which ground is extended through contact 11A and the circuit legs traced by the double-dot double-dash line, the circuit legs including conductor 11K, the product table (also shown in Figs. 13, 14 and 15) which is adjusted by the contact closing wheels associated with the number wheels in the consumption quantity register and thence to the counting relays which are thus caused to energize in an arrangement representative of 156 which amount is the product of the consumption quantity 26 by the rate of 6. When these counting relays are energized and their cut-off relays energized circuit is established through contacts of said cut-off relays to the clutches associated with the number wheels in the consumption charge register and in the money totalizer register whereby the amount of 156 is caused to be entered in each of these registers.

When the first of the cut-off relays associated with the counting relays energized, circuit was established for indirectly causing deenergization of the sequence control relay 2 (Fig. 2) and the consequent deenergization of sequence relay 11 which relay then opened contact 11A, interrupting the circuit which had indirectly initiated energization of the counting relays. Near the end of the entry of 156 in the consumption charge register and in the money totalizer register the last of the cut-off relays, associated with the counting relays, to deenergize deenergized, indirectly causing energization of the sequence control relay 2 (Fig. 7) and deenergization of a sequence relay for initiating a succeeding operation of the apparatus.

*Flow chart illustrating the selecting, sensing and the entering of amounts to be paid as installments in the purchasing of merchandise articles*

The flow chart shown in Fig. 24 isolates that part of the apparatus which is operative to sense from a control card the fact that an installment payment is to be made for selected articles of merchandise for a selected number of months and to sense the amount of these payments and cause the entry of these amounts in registers.

The sequence relays 13 and 14 when energized will initiate the sensing and entry of a selected installment charge for a selected article of merchandise while the sequence relays 15 and 16 when energized are similarly operative for effecting the sensing and entering of an installment charge for a different article of merchandise.

When the starting key is pressed ground is impressed upon contact 1C, the ground being extended through month selector switch 106, switch contact 106A, contact 92E, monthly charge selector bar 92 which is engaged by the contact finger 92E through card perforation 92EE pertaining to the second month, article selector bar 97, article selector finger 97A which engages the bar 97 through a card perforation 97AA which perforation and finger 97A are correlated with sequence relay 14 and connected therewith through conductor 97X, contact 109B of cancellation relay 109 and conductor 14X. Sequence relay 14 thus potentialized becomes energized and causes energization of sequence relay 13. The pressing of the starting key is but momentary. However, the relays 13 and 14 once energized after the grounding of starting key contact 1C remain energized until such time as they are deenergized by the sequence control relay 2 as hereinabove described. The circuit for initiating energization of the installment payment relays 13 and 14 is traced from the contact 1C at the starting key by the solid heavy line which extends closely along side of the various conductors as 97X and 14X.

The dotted line originating at the starting key contact 1C traces a circuit energized by the pressing of the starting key and for causing energization of sequence relay 16. This circuit includes contact 1C, month selector switch 106, switch contact 106A, contact 93E, monthly charge selector bar 93 which is engaged by the finger 93E through card perforation 93EE pertaining to the second month, article selector bar 99, article selector finger 99B which engages the bar 99 through card perforation 99BB which perforation and finger 99BB pertain to and are connected with sequence relay 16 through conductor 99X, contact 110B of cancellation relay 110 and conductor 16X. Thus when the starting key is pressed to apply ground to contact 1C the just described circuit traced by the dotted line carries ground to sequence relay 16 which is potentialized and upon its energization causes energization of its mate, sequence relay 15. Sequence relays 16 and 15 like sequence relays 14 and 13, when once energized by the momentary pressing of the starting key, lock up and remain energized until such time as they are released by the sequence control relay as an incident to the operation of the apparatus.

While the present disclosure shows but two pairs of sequence relays 13 and 14 and 15 and 16 for entering installment payments to be made for two different articles of merchandise, additional pairs of similar sequence relays could be provided for causing entries to be made for installment payments upon additional articles of mechandise. If such additional pairs of sequence relay were provided their energization would also be initiated by the closing of the starting key which key when closed places ground on the article selector bars 97 and 99. Additional contact fingers associated with the article selector bars 97 and 99 could be selectively engaged with said bars through card perforations, and the thus grounded additional contact fingers would be effective for extending ground through conductors as 99X and 16X to the additional pairs of sequence relays for entering installment payments upon the additional merchandise articles.

Pursuant to the operation of the apparatus the sequence control relay will eventually energize and remove ground from sequence relay 14 which then deenergizes and closes contact 14B whereby ground is extended through contact 14B, contact 13A, conductor 13K, contact finger 94D, amount selector bar 94 which is engaged by the finger 94D through card perforation 94DD, amount bars 92A, 92B and 92C, contact fingers 92F, 92G and 92H which respectively engage said amount bars through card perforations 92FF, 92GG and 92HH which are placed in an arrangement representative of the amount 250. Conductors connected with said contact fingers 92F, 92G and 92H extend this ground through cable 111 to the translating relays whereupon selected of said translating relays are energized to establish a local circuit for initiating energization of counting relays representative of the amount 250.

When the cut-off relays associated with these energized counting relays energize circuits are established thereby for energizing the clutches associated with the number wheels in the first article charge register and the money totalizer register whereby the entry of 250 is made in each of these registers. The various circuit legs beginning with contact 14B and energized for effecting these entries in the article charge register and the money totalizer register are traced by dot-dash lines as the dot-dash line extending alongside of conductor 13K.

Subsequent to the initiation of the operation for effecting entries in the first article charge register and in the money totalizer register the sequence control relay 2 is deenergized causing deenergization of sequence relay 13. Near the end of the entry of 250 in the first article charge register and in the money totalizer register the sequence control relay 2 is energized for initiating the succeeding operation to cause entry of the charge for the second article of merchandise in the second article charge register and in the money totalizer register. This energization of the sequence control relay 2 causes deenergization of sequence relay 16 and the closing of contact 16B whereby ground is extended through contact 16B, contact 15A, conductor 15K, amount selector bar 95, contact finger 95D which engages the bar 95 through card perforation 95DD, amount bars 93A, 93B and 93C, contact fingers 93F, 93G and 93H which engage these amount bars through card perforations 93FF, 93GG and 93HH, conductors which are connected with the contact fingers 93F, 93G and 93H, said conductors leading through cable 112 to the translating relays which are thus selectively energized for establishing a local circuit which extends ground to and initiates energization of the counting relays in an arrangement representative of the amount 250 predetermined by the arrangement of the card perforations 93FF, 93GG and 93HH.

Eventually the cut-off relays associated with these counting relays become energized thereby establishing circuits causing energization of the clutches associated with the number wheels in the second article charge register and in the money totalizer register causing such number wheels to take motion and eventually stop after the entry of 250 has been made in each of these registers. The circuit extending from contact 16B and for initiating this entry of 250 in the second article charge register and in the money totalizer register is traced by the dash-circle lines as that disposed alongside of the conductor 15K.

It will be observed that each of the conductors 13K and 15K leads to contact fingers associated with the amount selector bars 94 and 95. A greater number of amount selector bars 94 and 95 could be provided if desired and in which event the conductors 13K and 15K would also be connected with fingers associated with each of these additional amount selector bars. Each of the amount selector bars as 94 and 95 would be connected with a different set of amount bars as 92A, 92B and 92C. The amounts to be determined by each of the sets of amount bars as 92A, 92B and 92C can be varied as desired by re-arranging the card perforations as 92FF, 92GG and 92HH so that as many different amounts are available for entry as there are sets of amount bars, and the amount caused to be entered by the closing of a contact as 14B can be made to correspond to the amount predetermined by card perforations in registry with any of the sets of amount bars as 92A, 92B and 92C by placing in the control card over the amount selector bar as 94 connected herewith a perforation in registry with the contact finger led to by a conductor as 13K. In other words, the control card can be so perforated at the amount selector bars as 94 and 95 as to selectively connect the circuits originating with the contacts as 14B with any of the sets of amount bars as 92A, 92B and 92C to cause selected entries of charge amounts in the article charge registers and in the money totalizer register.

*Operations for meter readings affected by zeros*

The first assumed operation will be that determined by a card as that shown in Fig. 1, perforated for a previous meter reading of 879 and for a last meter reading of 028, that is, a combination of readings that will cause the number wheels in the consumption quantity register 57—58—59 (Fig. 3) to run backwardly through 000 from 028 a position above their capacity reading of 999 to the reading of 879. The mentioned reading 000 is in fact 1000 and the last reading 028 is in fact 1028 but since this register has only three number wheels, respectively for the units, tens and hundreds orders the 1 for the thousands order of these two amounts cannot appear on the register. However, the machine is operative in the following manner to set up the true consumption quantity of 149 k. w. a. (1028, the kilowatt hours consumed at the time of the last meter reading minus 879, the kilowatt hours consumed at the time of the previous meter reading).

The card shown in Fig. 2 will be assumed as having no perforations at the points which would permit engagement of contact fingers as 221A and 222A (Fig. 6) with their cooperative contact bars as 221 and 222 so that upon depression of the starting key 1 the sequence relays 4, 3, 6 and 5 will remain unenergized. It will be further assumed for the present operation that the control card carries no perforations in registry with the cancellation bar 98 (Fig. 6) so the contact fingers as 98A will be insulated therefrom and thus prevent energization of slow-to-release relays 109 and 110 when the key 1 is pressed; and there will be the further assumption that the card carries no perforations in registry with the article selector bars 97 and 99 so the contact fingers as 97A and 99B will be insulated therefrom and thus interrupt the circuits starting from ground through contact 1C of key 1 and extending through said fingers as 97A and 99B and the closed contacts 109B and 110B of relays 109 and 110 to sequence relays 14 and 16 and thus prevent energization of said sequence relays upon the pressing of key 1.

When the operation is started by the pressing of starting key 1 the grounding of contacts 1B, 1C and 1D is ineffective so far as concerns useful operations of the apparatus because of the absence from the control card (Fig. 2) of the above mentioned perforations, although the closing of contact 1B does extend ground through switch 101, switch contact 101A and conductors 101B and 101C to relays 228 and 229 which are thereby potentialized at points 1080 and 1081 and become energized at points 1082 and 1083, but such energization of these relays is of no significance since the circuits closed by the contacts as 228A and 229A thereof are dead-ended at the fingers as 221A and 222A which are insulated from the contact bars 221 and 222 by the body of the control card.

The grounding of contact 1A, however, places ground upon the central winding of sequence relay 8 which thereupon begins energization at point 1064 and thereafter energizes at point 1065 to close contact 8C and potentialize sequence relay 7 at point 1066 and energization thereof at point 1067. Sequence relay 7 thus energized closes contact 7G thereby potentializing shift magnet control relay 122 which becomes energized at point 1068. Contact 7C of relay 7 also closes thereby causing potentialization of relay 10. When relay 10 becomes energized at point 1069 contact 10C thereof closes placing ground upon sequence relay 9 which then begins energization and upon complete energization at point 1070 contact 9G thereof closes and results in energization of shift magnet control relay 123 at point 1071. Contact 9C of relay 9 also closes and extends ground to sequence relay 12 which then begins energization at point 1072 and upon complete energization at point 1073 closes contact 12C thus causing potentialization of sequence relay 11 at point 1074. When relay 11 is fully energized at point 1075 contact 11G thereof closes thereby extending ground to shift magnet control relay 124 which thereupon starts energization which is completed at point 1076. The closing and grounding of contacts 11H and 11F is ineffective in this operation because contacts 14D and 16D to which they respectively lead are open at this time. Contact 11C upon closing, however, extends ground to sequence relay 18 which is thereby potentialized at point 1077 and becomes energized at point 1078. Relay 18 thus energized closes contact 18C extending ground to relay 17 which is thus caused to become energized at point 1079.

When energized, sequence control relay 17 closes contact 17J which makes effective the hereinabove described circuit including the battery and ground associated with contact 17J, conductor 17K, conductor 127B, sequence control relay 2 and contact CC of relay 173 (Fig. 12) which remains unenergized at this time for causing energization of relay 2. Relay 2 when thus energized at point 1084 opens contact 2B thereby removing through contact 8F the ground from the right-hand winding of sequence relay 8. This right-hand winding of relay 8 then begins deenergization at point 1085. The central winding of sequence relay 8 began deenergization substantially concurrently with the beginning of deenergization of relays 228 and 229 at points 1086 and 1087 at the time starting contact 1 is manually released to remove ground from contacts 1A and 1B. Therefore by the time the right-hand winding of relay 8 becomes deenergized, the central winding thereof will have been previously deenergized by the opening of starting key 1 so that relay 8 becomes deenergized at point 1088 concurrently with the deenergization of its right hand winding.

Sequence relay 8 thus deenergized opens contact 8C thereby deenergizing the right-hand winding of relay 7 which relay then is placed under control of contact 2A of energized relay 2 and the left-hand winding of relay 7. Deenergization of relay 8 also closes contact 8B to extend ground through contact 7A, conductor 7K, switch 79, switch contact 79A, conductor 80B, contact finger 77D, contact bar 77 which is engaged by the finger 77D through a perforation in the card shown in Fig. 1, and to relay 82 which is thus caused to become energized at point 1089. Relay 82 thus energized closes its contacts thereby extending ground from contact bars 77A, 77B and 77C to contact fingers as 77G thereof which engage the bars through control card perforations arranged to represent the reading of 028 according to the code illustrated in Fig. 18. The thus grounded contact fingers will extend the ground through the closed contacts of relay 82 and conductors leading into the cable 78 (Figs. 4 and 9) to contacts upon the left-hand section of shift relay 153. In this way a circuit is prepared which upon the closing of the contacts of shift relay 153 will be extended through cable 161 to the translating relays in Fig. 10, which translating relays will then be selectively energized for closing contacts and establishing a local circuit to cause selective energization of the counting relays (Fig. 11) which are representative of the numerical amount of 028.

Deenergization of sequence relay 8 also closed contact 8A thereby extending ground from contact 122B of shift magnet control relay 122 to conductor 8J (Figs. 7 and 9) and to the shift magnet 212 for potentializing said magnet at point 1090 and succeeding energization thereof at point 1091. Upon the energization of shift magnet 212 at point 1091 shift relay 153 was actuated to close its contacts and extend the previously described prepared circuit, originating at ground adjacent to the contact bars 77A, 77B and 77C (Fig. 4), through conductors in cable 161 to translating relays 139, 141, 145 and 146. These translating relays thus potentialized complete energization at points 1092, 1093, 1094 and 1095. Energized translating relay 141 extends ground from the grounded movable contact 140B of translating relay 140 to the central winding of counting relay 32A (Fig. 11) which relay then begins to energize at point 1096. Energized relays 145 and 146 extend ground from contact 144B of relay 144 to the central winding of counting relay 36A (Fig. 11).

Counting relays 32A and 36A upon energizing at points 1097 and 1098 cause successive energization of the counting relays associated therewith in correlation with the descending order of their numerical value. When counting relay 43 energizes at point 1099, this being the last of the counting relays to energize in the tens order, contact 43C thereof closes and extends ground to cut-off relay 34 which is then caused to energize at point 1100.

The last of the units order counting relays to energize does so at point 1101 thereby closing its left-hand contact and extending ground to cut-off relay 41 which is thus caused to energize at point 1102.

When cut-off relay 34 energized at point 1100 contact 34C closed and extended ground through conductor 35F, stepping relay 35, conductor C (Figs. 11 and 12), cable 159 (Figs. 12 and 9) contact C3 of shift relay 153, cable 71 (Figs. 9 and 3), and conductor 71C to clutch 52A and the battery and ground associated therewith. Thereupon stepping relay 35 and the clutch 52A were potentialized at points 1103 and 1104 and became energized at points 1105 and 1106. Energization of stepping relay 35 opened the contact 35A thereby removing ground from the left-hand winding of relay 32A which winding thereupon deenergized. But relay 32A remains energized through its central winding until such time as the energization circuit therefor is broken by the deenergization of translating relay 141.

Contact 34D upon closing extended ground through conductor D (Figs. 11 and 12), cable 159 (Figs. 12 and 9), contact D3 of shift relay 153, cable 71 (Figs. 9 and 3), conductor 71D and to clutch 61A and its battery and ground. Thus clutches 52A and 61A become simultaneously energized at points 1106 and 1107.

The first of the cut-off relays to energize, cut-off relay 34 through its left-hand contact 34G, impressed ground upon conductor 28X thereby causing energization of relay 173 at point 1108. Contact CC was thus opened depotentializing sequence control relay 2 at point 1109 and upon deenergization of this relay at point 1110 contact 2A opened and freed relay 7 from ground which then began deenergization which was completed at point 1111. Deenergized relay 7 opened contact 7A thereby removing ground from conductor 7K and ultimately from relay 82 (Fig. 4). Relay 82 thus deenergized at point 1112 opened its contacts and interrupted the circuit from grounded bars 77A, 77B and 77C that held translating relays 139, 141, 145 and 146 energized whereupon these translating relays begin deenergization at points 1113, 1114, 1115 and 1116. The energization of translating relay 139 was ineffective during this operation and likewise its deenergization at point 1117 is without effect. Deenergization of translating relay 141 at point 1118 removes ground from the central winding of counting relay 32A which thereupon begins deenergization at point 1119 together with deenergization of the relay 32A since the left-hand winding had previously been deenergized upon energization of stepping relay 35. Deenergization of translating relays 145 and 146 at points 1120 and 1121 removes ground from the central winding of counting relay 36A which winding thereupon deenergizes but the relay 36A remains energized at this time through its left-hand winding since stepping relay 42 at this time remains unenergized and its contact 42A grounded. Shortly before the second digit 2 is entered upon the wheels 52 and 58 which began forward rotation at points 1106 and 1107, and after the locked-up counting relays of the tens order have been deenergized, the shunting contact 52D is opened to remove the shunt from stepping relay 35 which then energizes to open its contact 35A and remove ground from cut-off relay 34, this operation taking place during that interval of time represented by the space between chart sections 3" and 4". Upon thus deenergizing the cut-off relay 34 opens contacts 34C and 34D thereby breaking the circuits which had held energized the stepping relay 35 and clutches 52A and 61A all of which then deenergize and the clutches 52A and 61A deenergizing simultaneously at the time the number wheels 52 and 58 arrive at 2.

Upon energization of the cut-off relay 41 at point 1102 contact 41C is closed extending ground through cut-off relay 42, conductor A (Figs. 11 and 12), cable 159 Figs. 12 and 9), contact A3 of shift relay 153, cable 71 (Figs. 9 and 3) conductor 71A to clutch 53A and its battery and ground. Thereupon stepping relay 42 and clutch 53A are simultaneously potentialized at points 1122 and 1123 and become energized at points 1124 and 1125. Contact 41D which closes simultaneously with contact 41C extends ground through conductor B (Figs. 11 and 12) cable 159 (Figs. 12 and 9), contact B3 of shift relay 153, cable 71 (Figs. 9 and 3) and conductor 71B to clutch 62A and its battery and ground. Thus clutch 62a is potentialized at point 1126 and becomes energized at point 1127 simultaneously with the energization of clutch 53A.

When stepping relay 42 energized at point 1124 contact 42A opened removing ground from the left-hand winding of counting relay 36A which relay then began deenergization at point 1128.

As rotation of number wheels 53 and 59 take motion from the shaft 50A by the respective energization and closing of clutches 53A and 62A, the shunting wheel 53C associated with wheel 53 carries its lobes against the shunting contact 53D for successively opening and closing the same thereby applying and removing shunt upon stepping relay 42 which is thereby alternately deenergized and energized to successively deenergize the locked-up counting relays in the units order. And finally shortly prior to the entry of the eighth digit 8 upon the number wheels 53 and 59 and after the last of the locked-up counting relays has been deenergized shunt will be removed from stepping relay 42 which then energizing at point 1129 will open contact 42A and cause deenergization of cut-off relay 41 at point 1130. Relay 41 thus deenergized opens contacts 41C and 41D thereby breaking the circuits which had held energized the stepping relay 42, and clutches 53A and 62A, these parts then becoming depotentialized at points 1131, 1132 and 1133. Clutches 53A and 62A then deenergize at points 1134 and 1135 at the time for stopping rotation of the number wheels 53 and 59 when each registers 8.

Deenergization of cut-off relay 41 also opens contact 41G and frees conductor 28X from ground whereby relay 173 is depotentialized and later deenergizes at point 1136. Contact CC then closes placing ground upon sequence control relay 2 which then begins energization at point 1137. When relay 2 is energized at point 1138 contact 2B thereof opens removing ground from sequence relay 10 which is thereby depotentialized and later becomes deenergized at point 1139. Opened contact 2B also removes ground from shift magnet control relay 122 which thereupon begins deenergization at point 1140 and upon its deenergization at point 1141 contact 122B thereof opens and removes ground from contact 8A and conductor 8J whereby shift magnet 212 is depotentialized at point 1142. Shift magnet 212 deenergizes at point 1143 and opens the contacts of shift relay 153.

Deenergized relay 10 opens contact 10C thus placing relay 9 under control of contact 2A of relay 2 and the left-hand winding of relay 9 so that upon subsequent deenergization of relay 2 relay 9 will be deenergized. Contact 10B of deenergized relay 10 is closed thereby extending ground through contact 9A, conductor 9K, switch 80 (Fig. 4), switch contact 80A, contact finger 76D, contact bar 76 which is engaged by the finger 76D through a perforation in the control card shown in Fig. 1, and to relay 81 which then begins energization which is completed at point 1144. Relay 81 thus energized closes its contacts and in the manner hereinabove described thus preparing a circuit from ground at the contact bars 76A, 76B and 76C through fingers as 76G which are permitted to contact the contact bars through card perforations arranged according to the code shown in Fig. 18 to represent a consumption of 879, the closed contacts of relay 81 that are connected with the contact fingers thus grounded, cable 78 (Figs. 4 and 9) and contacts within the left-hand group of contacts upon shift relay 154. When shift relay 154 is closed this circuit is extended through the contacts upon shift relay 154 and through cable 161 to the translating relays of Fig. 10. Shift relay 154 is closed in the following manner. Upon deenergization of relay 10 contact 10A closed and extended ground from contact 123B and through conductor 10J to the shift magnet 213 (Fig. 9) which then began energization at point 1145, which upon its energization at point 1146 actuated the shift relay 154 to close its contacts.

The circuit thus extended by the closed contacts of shift relay 154 from ground at the bars 76A, 76B and 76C (Fig. 4) to the translating relays (Fig. 10) will cause potentialization of translating relays 137 and 138 representing 8 in the hundreds order, relays 140 and 141 representing 7 in the tens order and relays 146 and 147 representing 9 in the units order. These translating relays then become energized at points 1147, 1148, 1149, 1150, 1151 and 1152. In this way ground is extended from the grounded movable contacts of translating relays 136, 140 and 144 respectively to the central windings or counting relays 20X, 30X and 36X (Fig. 11) whereupon said counting relays become respectively energized at points 1153, 1154 and 1155.

Upon the energization of these counting relays their mates of lower numerical value successively lock up, and when the last of the relays locks up in the hundreds order the cut-off relay 28 is grounded and caused to energize at point 1156. In like manner cut-off relay 34 is grounded when the last of the counting relays in the tens order is energized, cut-off relay 34 then becoming energized at point 1157. And after energization of the last of the counting relays to energize and lock up in the units order, cut-off relay 41 is potentialized and thereafter is energized at 1158.

Cut-off relay 34 which is the first of the cut-off relays to energize closes contact 34G, extending ground through conductor 28X to relay 173 which then potentializes at point 1159 and later becomes energized at point 1160. Relay 173 thus energized opens contact CC removing ground from sequence control relay 2 which then starts deenergization which is completed at point 1161. Contact 2A of relay 2 is thus opened to remove ground from sequence relay 9 which then begins deenergization at point 1162. Upon deenergization of relay 9 at point 1163 contact 9A opens freeing ground from conductor 9K and eventually from relay 81 (Fig. 4) which is thus caused to deenergize at point 1164. Deenergized relay 81 opens its contacts and breaks the circuit starting with ground at contact bars 76A, 76B and 76C to the translating relays (Fig. 10) whereupon at points 1165, 1166, 1167, 1168, 1169 and 1170 translating relays 137, 138, 140, 141, 146 and 147 begin deenergization. When these translating relays respectively deenergize at points 1171 to 1176 inclusive the circuits beginning with ground at the grounded movable contacts of translating relays 136, 140 and 144 to the central windings of counting relays 20X, 30X and 36X are broken and these windings then deenergize.

When cut-off relay 28 energized at point 1156 contacts 28C and 28D were closed and extended ground respectively through conductors 29F and F. Conductor 29F thus grounded extends ground through stepping relay 29 to conductor E. The circuits are then extended through conductors E and F (Figs. 11 and 12) cable 159 (Figs. 12 and 9), contacts E4 and F4 of shift relay 154, cable 72 (Figs. 9 and 3) conductors 72E and 72F and to the clutches 54A and 63A and their associated batteries and ground thereby completing said circuits to cause potentialization of the clutches 54A and 63A at points 1177 and 1178. Stepping relay 29 which is in series with the circuit including the clutch 54A potentialized at point 1179 simultaneously with potentialization of said clutch at point 1177. When the clutches 54A and 63A are fully energized at points 1180 and 1181 they are effective for respectively connecting the number wheels 54 and 57 for rotation with the shaft 50B, the wheels 54 being rotated forwardly while the wheel 57 is rotated backwardly. When relay 29 is energized at point 1182 contact 29A opens thereby causing deenergization of the left-hand winding of counting relay 20X, but counting relay 20X does not deenergize at this time because of its central winding still being energized through the circuit established by translating relays 137 and 138. Therefore counting relay 20X begins deenergization later at point 1183 upon the deenergization of translating relays 137 and 138 at points 1171 and 1172.

During rotation of the number wheels 54 and 57 which begins at points 1180 and 1181 the shunting wheel 54C operates the shunting contact 54D for alternately deenergizing and energizing stepping relay 29 and thus successively release the counting relays locked up in the hundreds order, and shortly prior to entry of the eighth digit 8 on wheel 54 and the eighth digit 2 on wheel 57, and after the last of these counting relays has been deenergized during that interval of time represented by the space between chart sections 4″ and 4A, shunt is removed from stepping relay 29 which then energizes, opening contact 29A and causing deenergization of the cut-off relay 28. When thus deenergized the cut-off relay opens contacts 28C and 28D and breaks the circuits which had held energized the stepping relay 29 and the clutches 54A and 63A whereupon these parts deenergize. The clutches deenergize at such time as will cause the number wheels 54 and 57 to stop while respectively displaying the digits 8 and 2.

In the tens order of the counting relays (Fig. 11) when cut-off relay 34 energizes at 1157 and closes contacts 34C and 34D ground will be extended from contact 34C through the stepping relay 35 to conductor C and from contact 34D to the conductor D. Circuits from these grounded conductors C and D are extended through conductors C and D (Figs. 11 and 12), cable 159 (Figs. 12 and 9), contacts C4 and D4 of shift relay 154, cable 72 (Figs. 9 and 3) and through conductors 72C and 72D to clutches 55A and 64A and their associated batteries and ground. When these circuits are completed the stepping relay 35 is potentialized at point 1184 concurrently with the potentialization of clutches 55A and 64A at points 1185 and 1186. Clutches 55A and 64A become energized at points 1187 and 1188 to cause rotation of the number wheels 55 and 58 with the shaft 50B number wheel 55 rotating forwardly while number wheel 58 rotates backwardly. Upon energization of the stepping relay 35 at points 1189 contact 35A opens and causes deenergization of the left-hand winding of counting relay 30X which relay is then prepared for starting deenergization at point 1190 when its central winding is depotentialized by the shifting of the contacts of translating relays 140 and 141 when they are deenergized at points 1173 and 1174.

As number wheels 55 and 58 take motion from the shaft 50B at points 1187 and 1188 the shunting wheel 55C is operative for opening and closing the shunting contact 55D whereby the stepping relay 35 is alternately deenergized and energized to cause successive deenergization of the locked-up counting relays in the tens order. During that interval of time represented by the space between sections 4" and 4A and after the last of these counting relays has been deenergized and shortly prior to the additive entry of the seventh digit 7 on the number wheel 55 and the subtractive entry of the seventh digit 5 upon the number wheel 58 the shunting contact 55D will be opened to remove the shunt from stepping relay 35 whereupon it will then energize opening contact 35A to remove ground from and cause deenergization of cut-off relay 34. When thus deenergized relay 34 will open contacts 34C and 34D breaking the circuits which had held energized the stepping relay 35 and the clutches 55A and 64A. Clutches 55A and 64A are deenergized at such a time as will cause the number wheels 55 and 58 to stop respectively while registering the readings of 7 and 5.

Referring now to the units order of relays shown in Fig. 11, the energization of cut-off relay 41 at point 1158 closes contacts 41C and 41D. Contact 41C extends ground through stepping relay 42 to conductor A while contact 41D extends ground to contact B. These circuits to conductors A and B are extended through cable 159 (Figs. 12 and 9), switch contacts 4A and 4B of shift relay 154, cable 72 (Figs. 9 and 3) and conductors 72A and 72B to the clutches 56A and 65A and their associated batteries and ground. With the establishment of these circuits upon the closing of contacts 41C and 41D stepping relay 42 and clutches 56A and 65A are potentialized at points 1191, 1192 and 1193. Since the central winding of counting relay 36X was previously deenergized by the breaking of the energizing circuit therefore when translating relays 146 and 147 were deenergized at points 1175 and 1176, the energization of relay 42 at point 1194 and the consequent opening of its contact 42A will remove ground from and start deenergization of relay 36X at point 1195 with its left-hand winding.

Upon the energization of clutches 56A and 65A at points 1196 and 1197 the number wheels 56 and 59 take motion from the shaft 50B, number wheel 56 rotating forwardly and number wheel 59 backwardly, and during such motion the shunting wheel 56C alternately opens and closes shunting contact 56D thereby alternately applying and removing the shunt from stepping relay 42 which is thus alternately deenergized and energized for successively deenergizing the locked-up counting relays pertaining to the units order. Shortly prior to the additive entry of the ninth digit 9 upon number wheel 56 and the subtractive entry of the ninth digit 9 on the number wheel 59 and after all of the counting relays have been deenergized, contact 56D opens removing shunt from stepping relay 42 which then becomes energized at point 1198. Stepping relay 42 thus energized opens contact 42A thereby causing deenergization of cut-off relay 41 at point 1199. Thereupon cut-off relay 41 when deenergized opens contacts 41C and 41D to break the circuit which had held energized the stepping relay 42 and the clutches 56A and 65A which parts then become depotentialized at points 1200, 1201 and 1202. Clutches 56A and 65A later deenergize at points 1203 and 1204 concurrently with the entries upon the number wheels 56 and 59 of the digits 9.

Number wheels 58 and 59 were rotated forwardly during the entry of 2 and 8 thereon, the amount of the last reading. During the entry of the previous reading 879 upon the wheels 54, 55 and 56 the wheels 57, 58 and 59 were rotated subtractively or backwardly and so at this stage in the operation display a reading of 259. Since the consumption quantity wheels 57, 58 and 59 are supposed to display the difference of the readings upon the last reading wheels and the previous reading wheels, this reading of 259 is obviously incorrect, the true difference being 149. However, during the preceding part of the operation and while the number wheel 59 was being rotated backwardly from 8 through 0 to 9 and specifically while said number wheel was passing between the digital positions of 0 and 9 the lobe on carry-over wheel 59H momentarily closed contact 59K. Likewise while the number wheel 58 was being rotated backwardly from the digital position 2 to the digital position 5 said wheel passed from 0 to 9 and in so doing the lobe on the carry-over wheel 58H momentarily closed carry-over contact 58K.

Figure 47:
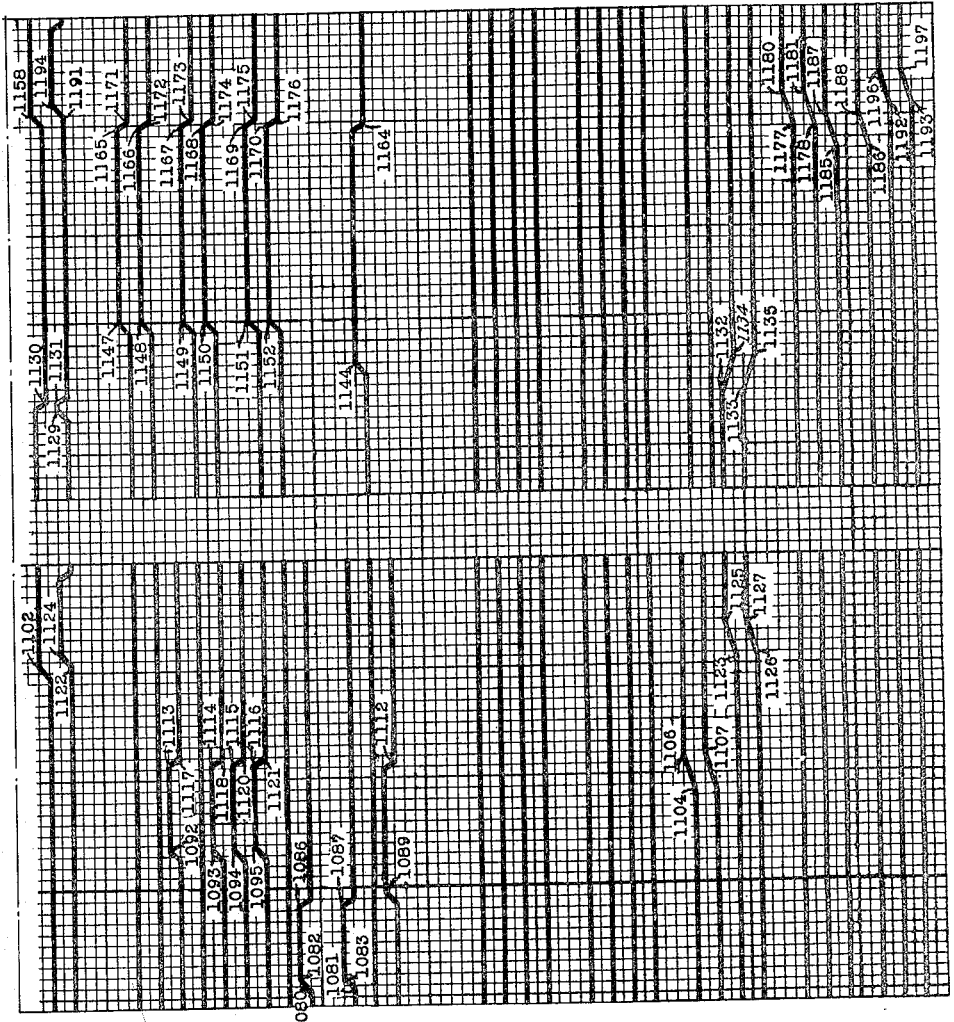
Figure 48:
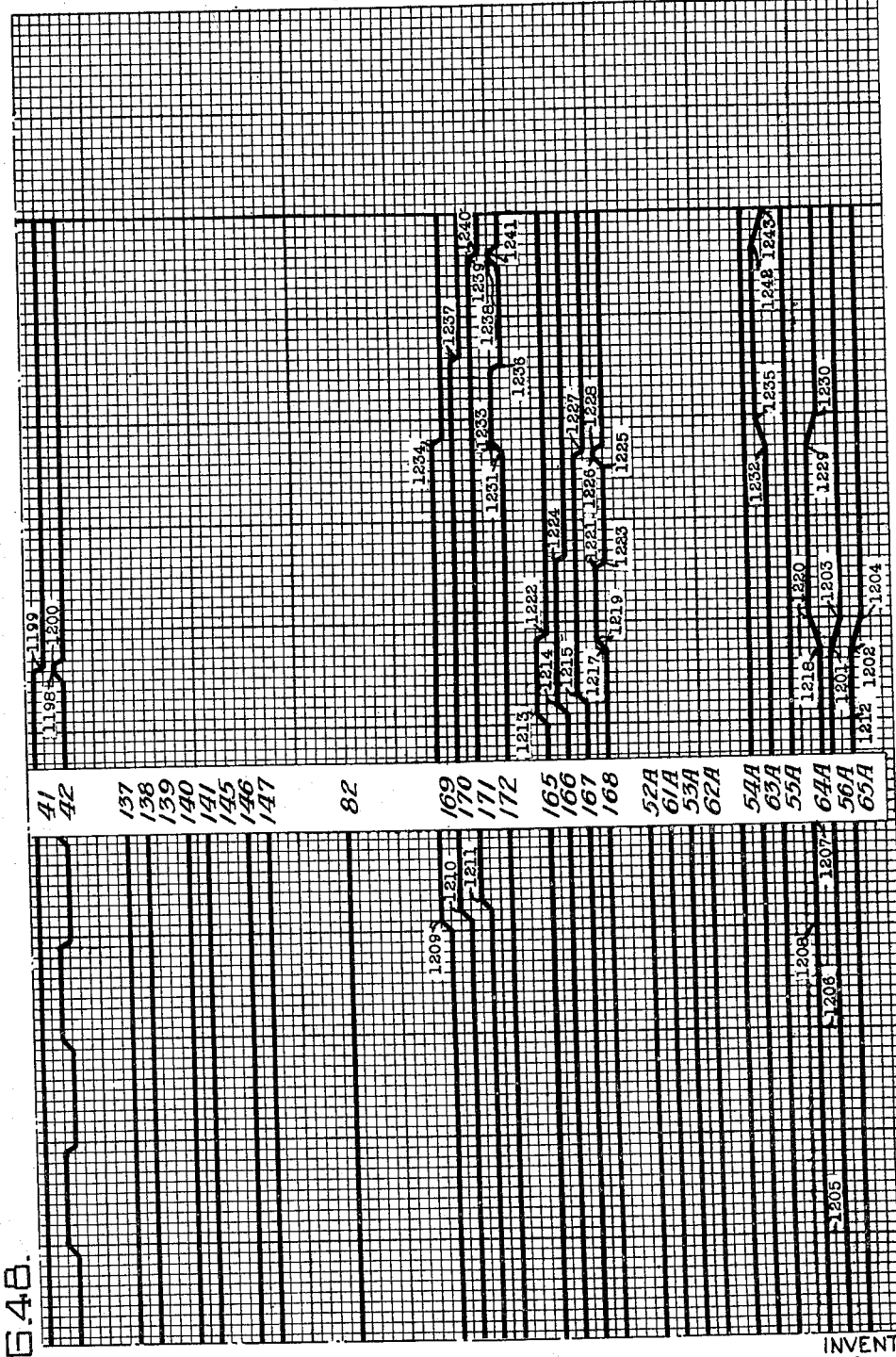

Referring to Fig. 47 of the chart and particularly to the horizontal line pertaining to the clutch 64A which drives the number wheel 58 rearwardly it will be recalled that the number wheel began rotating concurrently with the energization of the clutch 64A at point 1188. Prior to this backward rotation of the number wheel 58 it stood at 2. At the time indicated by the point 1205 number wheel 58 has been rotated backwardly through one digital position to display 1 and at the times indicated by the points 1206 and 1207 the wheel 58 will have been rotated backwardly respectively through 2 and 3 digital positions to respectively read 0 and 9. While passing from 0 to 9 coinciding with points 1206 and 1207 and when at point 1208 contact 58K was closed by the lobe upon the carry-over wheel 58H. Thereupon ground was extended from a point connected with one side of the contact 58K, through said contact, conductor 72L, cable 72 (Figs. 3 and 9), contact L4 of shift relay 154, cable 159 (Figs. 9 and 12) and conductor L to the right-hand winding of carry-over counting relay 169. This relay was then potentialized and became energized at point 1209. Relay 169 upon energization caused energization of relay 170 at point 1210 and relay 170 upon energization caused energization of cut-off relay 171 at point 1211. The relays 169, 170 and 171 thereby prepared a local circuit which remained ineffective at that time because of relay 173 being energized and holding open contacts CC and 173A. Relay 171 closes contacts 171C and 171D and opens contact BB.

Later on in the operation while the number wheel 59 was being rotated backwardly 9 digital positions from the position 8 through 0 to the position 9, at point 1212 (indicated in Fig. 48 upon the line for showing operation of the clutch 65A) the lobe upon carry-over wheel 59H was effective for closing carry-over contact 59K thereby providing for the extension of ground from one side of the contact 59K through said contact, conductor 72H, cable 72 (Figs. 3 and 9), contact H4 on shift relay 154, cable 159 (Figs. 9 and 12), conductor H and the right-hand winding of carry-over counting relay 165. Thereupon counting relay 165 potentialized and became energized at point 1213. Relay 165 thus energized closed contact 165B causing energization of relay 166 at point 1214 and relay 166 when energized closed contact 166C causing energization of relay 167 at point 1215. Since relay 173 was still energized and holding open its contacts 173B and CC, these energized relays 165, 166 and 167 were at this time without effect but are effective shortly thereafter in the manner now to be described.

Upon deenergization of cut-off relay 41 which is the last of the cut-off relays (Fig. 11) to deenergize during this part of the operation, contact 41G is opened thereby freeing conductor 28X from ground and providing for deenergization of relay 173 at point 1216. Energized relays 167 and 171 open contacts AA and BB so that the closing of contact CC upon the deenergization of relay 173 does not extend ground to sequence control relay 2 which would otherwise become energized at this time for initiating the succeeding operation. Deenergized relay 173 closing its contacts 173A, 173B, and CC does complete a circuit beginning with ground at contacts CC through contact 167C, stepping relay 168, contact 173B and conductor G. The ground from contact CC is also extended to contact 167D and conductor J. Conductors G and J extend these circuit legs through cable 159 (Figs. 12 and 9), contacts G4 and J4 of shift relay 154, cable 72 (Figs. 9 and 3), and conductors 72G and 72J respectively to the clutch 64A and its associated battery and ground and to one side of the shunting contact 58D. That is, the ground originating at contact CC is carried through a single conductor to contacts 167C and 167D where the circuit is divided one leg of the circuit being extended from 167C and through the stepping relay 168 to the clutch 64A in Fig. 3 to thereby cause potentialization of stepping relay 168 and the clutch 64A at points 1217 and 1218. These parts energize at points 1219 and 1220. The other circuit leg from ground at contact CC extends from contact 167D and through conductor J to one side of the shunting contact 58D so that during rotation of the number wheel 58 when driven from the shaft 50B by means of the energized clutch 64A, ground will be available at the contact 58D for shunting out stepping relay 168 (Fig. 12). Such shunting out of the stepping relay 168 first occurs shortly after the clutch 64A is energized and the wheel 58 takes reverse motion. That is, the shunting contact 58D is closed thereby applying ground to conductor 72D at point 58XX (Fig. 3) whereupon at point 1221 (Fig. 48) stepping relay 168 is depotentialized. Previously upon the energization of stepping relay 168 at point 1219 contact 168A thereof was opened thereby removing ground from and causing deenergization of relay 165 at point 1222. Relay 165 thus deenergized opened contact 165B leaving relay 166 energized and hence upon deenergization of stepping relay 168 at point 1223 and the opening of contact 168B relay 166 began deenergization at point 1224 concurrently with deenergization of its right-hand winding. Shortly prior to the number wheel 58 having been rotated backwardly one digital position contact 58D is opened removing the shunt from stepping relay 168 which then begins energization at point 1225. When relay 168 energizes at point 1226 contact 168A thereof opens and causes deenergization of cut-off relay 167 at point 1227. Thus deenergized cut-off relay 167 opens contacts 167C and 167D thereby removing the source of ground to the shunting contact 58D and to the stepping relay 168 and clutch 64A whereupon the stepping relay and the clutch are respectively depotentialized at points 1228 and 1229. Clutch 64A deenergizes at point 1230 at the time the number wheel 58 has been turned backwardly one digital position to stand at 4.

Deenergization of cut-off relay 167 also closes contacts AA and AAA. The closing of contact AAA extends ground from contact CC to contacts 171C and 171D. From contact 171C the circuit is extended through stepping relay 172, contact 173 A and conductor K. From contact 171D circuit grounded at CC is extended to conductor M. Conductors K and M extend their respective legs of the circuit through cable 159, contacts K4 and M4 of shift delay 154 (Fig. 9) cable 72 (Figs. 9 and 3), and conductors 72K and 72M respectively to the clutch 63A and the battery and ground associated therewith and to one side of the shunting contact 57D. With this establishment of the circuit through the stepping relay 172 and the clutch 63A these parts become potentialized at points 1231 and 1232.

When stepping relay 172 becomes energized at point 1233, contact 172A thereof opens and removes ground from relay 169 which then begins deenergization at point 1234. Shortly after the number wheel 57 takes motion from the shaft 50B through energized clutch 63A at the time indicated by point 1235, contact 57D is closed thereby shunting out stepping relay 172 which becomes deenergized at point 1236 thereby opening contact 172B and causing deenergization of relay 170 at point 1237. Shortly prior to the number wheel 57 having been rotated reversely to the next digital position the shunting contact 57D is opened to remove the shunt from stepping relay 172 which then becomes energized at point 1238. Upon this energization of relay 172 the consequent opening of contact 172A thereof removes ground from and causes depotentialization of cut-off relay 171 at point 1239. When cut-off relay 171 deenergizes at point 1240 contacts 171C and 171D thereof open. Contact 171D removes the ground from shunting contact 57D while contact 171C breaks the circuit through and causes depotentialization of stepping relay 172 and clutch 63A respectively at points 1241 and 1242. When clutch 63A deenergizes at point 1243 the number wheel 57 will have been rotated reversely one digital position to display the digit 1. The consumption quantity register 57—58—59 will now display the reading of 149 which is the difference between the last reading 028 (representative in this operation of 1028) and the previous reading 879.

When cut-off relay 171 deenergizes, contact BB thereof closes whereby ground is extended from contact CC through closed contacts AA and BB to sequence control relay 2 which then begins energization at point 1244 for initiating the succeeding operation of entering the amount for the consumption charge upon the consumption charge register 182—183—184 (Fig. 16). When energized at point 1245, the relay 2 opens contact 2B thereby freeing from ground the shift magnet control relay 123 which begins deenergization at point 1245' and when this deenergization is completed at point 1246, contact 123B is opened thereby removing ground from contact 10A and the conductor 10J and starting deenergization of the shift magnet 213 at point 1247. When the shift magnet 213 is deenergized at point 1248, the contacts of shift relay 154 are opened thus breaking the circuits used during the just described operation.

The operation of the apparatus now to be described will be presumed as taking place under control of a card (Fig. 1) perforated for a previous reading of 000 and a last reading of 026.

In the beginning of the operation when the starting key 1 is pressed downwardly ground is applied to contact 1A which potentializes sequence relay 8 at point 1250. The operation proceeds as before described, that is, relay 8 upon energization at point 1251 closes contact 8F thereby locking up through contact 2B of unenergized sequence control relay 2. Relay 8 also closes contact 8C thereby causing energization of relay 7 at point 1252. Relay 7 thus energized closes contact 7G thereby potentializing shift magnet control relay 122 at point 1253. Contact 7C of relay 7 upon closing causes energization of relay 10 at point 1254. Energized relay 10 closes contact 10C thereby causing relay 9 to start energization which is completed at point 1255. Contacts 9G and 9C of relay 9 close thereby respectively potentializing shift magnet control relay 123 at point 1256 and sequence relay 12 at point 1257. When sequence relay 12 becomes energized at point 1258 contact 12C thereof closes and potentializes relay 11 which is thus caused to become energized at point 1259. Relay 11 thus energized grounds contacts 11G and 11C which respectively potentialize and cause energization of shift magnet control relay 124 at point 1260 and sequence relay 18 at point 1261. Relay 18 thus energized closes contact 18C thereby potentializing sequence relay 17 at point 1262.

Manual depression of the starting key 1 in addition to the closing of contact 1A also closed contact 1B shortly after the closing of contact 1A and thereby extending ground through switch 101, contact 101A and conductors 101B and 101C to relays 228 and 229 which then potentialized and immediately thereafter became energized at points 1263 and 1264. This energization of relays 228 and 229, however, was without effect since the control card (Fig. 2) in this operation has no perforations which permit contact of the fingers as 221A and 222A (Fig. 6) with the contact bars 221 and 222. When the key 1 is manually released the ground is removed from contact 1B whereupon relays 228 and 229 are depotentialized and caused to deenergize at points 1265 and 1266, this operation being likewise without effect.

Upon energization of sequence relay 17 at point 1267 contact 17J closes to extend ground through the previously described circuit including sequence control relay 2 and contact CC of relay 173, (Fig. 12). Since the relay 173 is deenergized at this time contact CC is closed and hence with the closing of contact 17J sequence control relay 2 is potentialized at point 1268.

When relay 2 energizes at point 1269 contact 2B thereof is opened thereby removing ground from sequence relay 8 which then begins deenergization at point 1270. Sequence relay 8 upon deenergization at point 1271 opens contact 8C and closes contact 8B thereby extending ground through the latter named contact through contact 7A, conductor 7K and ultimately to relay 82 (Fig. 4) which then begins energization at point 1272. When relay 82 becomes energized at point 1273 the contacts thereof prepare a circuit beginning with ground at the last reading bars 77A, 77B and 77C and leading through certain of the contact fingers as 77G making contact with said bars through perforations in the control card (Fig. 1) arranged according to the code shown in Fig. 18 to represent 026, or the amount of the last meter reading. The circuit thus prepared is extended through cable 78 (Figs. 4 and 9) and the left-hand group of contacts on shift relay 153 to the translating relays (Fig. 10) upon the closing of the shift relay contacts in the manner now to be described.

Relay 8 at the time of its deenergization also closed contact 8A thereby extending ground from contact 122B of shift magnet control relay 122 to conductor 8J thus causing potentialization of shift magnet 212 (Fig. 9) at point 1274. The contacts upon shift relay 153 are closed when the shift magnet 212 becomes fully energized at point 1275. Thereupon the circuit is extended from ground at the last reading bars 77A, 77B and 77C (Fig. 4) through the left-hand set of contacts upon shift relay 153 to translating relays 139, 141, 144 and 147 which are thus potentialized and consequently become energized at points 1276, 1277, 1278 and 1279. Energized relay 139 is ineffective during this energization. Relay 141 however upon energization completes a circuit from ground starting with the grounded movable contact of sequence relay 140 and extending to the central winding of counting relay 32A in the tens order of counting relays (Fig. 11) whereupon said relay is potentialized and is caused to become energized at point 1280. The energization of translating relay 144 and 147 at points 1278 and 1279 establish a circuit leading from ground at the movable grounded contact of translating relay 144 to the central winding of counting relay 36 in the group of counting relays pertaining to the units order. Counting relay 36 then becomes potentialized and later energized at point 1281.

Counting relay 32A upon its energization at point 1280 locks up through its left-hand contact and conductor 35E which is grounded from contact 35A so long as stepping relay 35 remains unenergized. In the manner previously described the counting relays of lower numerical value than counting relay 32A are caused to successively lock up. When the last of the counting relays is locked up or energized cut-off relay 34 becomes potentialized at point 1282.

Likewise in the units order counting relay 36 which is the first energized locked up through its left-hand contact and ground at contact 42A of stepping relay 42 so long as this stepping relay remains unenergized. The counting relays of less numerical value than counting relay 36 successively lock up or energize and when the last of these relays is energized cut-off relay 41 becomes potentialized at point 1283.

The first of the cut-off relays to lock up or energize is cut-off relay 34, energization occurring at point 1284. Relay 34 thus energized closes contact 34G thereby grounding conductor 28X and causing energization of relay 173 at point 1285. Contact CC of relay 173 then opens at point 1286. When relay 2 deenergizes at point 1287, contact 2A thereof is opened removing ground from sequence relay 7 which is then depotentialized and becomes deenergized at point 1288. Sequence relay 7 thus deenergized opens contact 7A causing depotentialization of relay 82 at point 1289 and subsequent deenergization of said relay 82 at point 1290. Relay 82 thus deenergized opens its contacts and breaks the circuit starting with ground at the last reading bars 77A, 77B and 77C and extending through the left-hand contacts of shift relay 153 for holding the translating relays energized. Consequently upon the opening of the contacts of relay 82 at point 1290, the translating relays 139, 141, 144 and 147 are depotentialized and are thus caused to respectively deenergize at points 1291 to 1294. Translating relay 139 which had no effect while energized likewise has no effect upon becoming deenergized. Translating relay 141, however, upon its deenergization at point 1292 breaks the circuit leading from the grounded movable contact of translating relay 140 to the central winding of counting relay 32A whereupon said winding is depotentialized at point 1295. The left-hand winding of counting relay 32A was previously deenergized upon the energization of stepping relay 35 at point 1296 and the consequent opening of contact 35A; therefore counting relay 32A deenergizes concurrently with the central winding thereof at point 1297.

Deenergization of translating relays 144 and 147 at points 1293 and 1294 breaks the circuit leading from the grounded movable contact of translating relay 144 to the central winding of counting relay 36 so that said central winding then deenergizes and leaves the counting relay 36 energized under control of its left-hand winding which is impressed with ground from contact 42A of stepping relay 42 which is still unenergized at this time.

Cut-off relay 34 when energized at point 1284 closed contacts 34C and 34D. Conductor 34C then extends ground through conductor 35F and stepping relay 35 to conductor C. Contact 34D extends ground to conductor D. From conductors C and D (Figs. 11 and 12) the circuits are extended through cable 159 (Figs. 12 and 9) contacts C3 and D3 of shift relay 153, cable 71 (Figs. 9 and 3), conductors 71C and 71D and thence to clutches 52A and 61A are potentialized at points 1298, 1299 and 1300. The number wheels 52 and 58 take forward motion as previously described from the shaft 50A respectively through the clutches 52A and 61A upon their energization at points 1301 and 1302.

Since the number of counting relays locked up in the tens order are representative of the amount of 2 the number wheels 52 and 58 will be advanced through 2 digital positions to display the digits 2 while the shunting wheel 52C alternately opens and closes the shunting contact 52D which thus periodically shunts out stepping relay 35 which is thereby caused to alternately deenergize and energize to release the locked-up counting relays. And finally during that interval of time represented by the space between chart sections 3''' and 4''' shortly prior to the entry of the second digit upon the number wheels 52 and 58 the stepping relay 35 will be removed from shunt and allowed to energize and thus cause deenergization of cut-off relay 34. Such deenergization of the cut-off relay 34 is at such time that will result in the opening of contacts 34C and 34D for breaking the series circuits energizing the clutches 52A and 61A so that these clutches deenergize and release the number wheels 52 and 58 from the shaft 50A concurrently with the entry of the digit 2 upon these number wheels.

When cut-off relay 41 becomes energized at point 1303 contacts 41C and 41D thereof close. Contact 41C then extends ground through a circuit including stepping relay 42 and conductor A. Contact 41D extends ground to a circuit including conductor B. These circuits are extended from conductors A and B (Figs. 11 and 12) through cable 159 (Figs. 12 and 9), contacts A3 and B3 of shift relay 153, cable 71 (Figs. 9 and 3), conductors 71A and 71B and respectively to the clutches 53A and 62A and the batteries and ground associated therewith. These circuits thus closed by the closing of contacts 41C and 41D cause potentialization of stepping relay 42 and clutches 53A and 62A at points 1304, 1305 and 1306. When the clutches 53A and 62A become energized at points 1307 and 1308 the number wheels 53 and 59 take forward motion from the shaft 50A while the shunting wheel 53C is effective through its associated shunting contact 53D to cause alternate deenergization and energization of the stepping relay 42 which in turn causes successive deenergization of the locked-up counting relays. And finally shortly prior to the entry of the sixth digit 6 upon each of the number wheels 53 and 59 and after all of the locked-up counting relays have been deenergized, a lobe upon shunting wheel 53C which had been holding the shunting contact 53D closed is moved beyond its cooperative position with contact 53D which then opens removing the shunt from stepping relay 42 which then repotentializes and becomes energized at point 1309. When stepping relay 42 is thus energized contact 42A thereof opens removing ground from cut-off relay 41 which is then depotentialized at point 1310 and immediately thereafter deenergized at point 1311. Cut-off relay 41 thus deenergized opens its contacts 41C and 41D breaking the above traced circuits containing the stepping relay 42 and the clutches 53A and 62A in series therewith, whereupon said stepping relay and said clutches are depotentialized at points 1312, 1313 and 1314. Clutches 53A and 62A deenergize at points 1315 and 1316 thereby uncoupling the number wheels 53 and 59 from the constantly rotating shaft 50A at the time these wheels each display the digit 6.

Stepping relay 42 is the last of the stepping relays (Fig. 11) to deenergize and upon such deenergization at point 1311 contact 41G thereof removes ground from conductor 28X whereupon relay 173 is depotentialized at point 1317. Deenergization of relay 173 at point 1318 results in the closing of contact CC which then extends ground to sequence control relay 2, the latter then being potentialized at point 1319. Energization of sequence control relay 2 at point 1320 opens contact 2B thereby depotentializing shift magnet control relay 122 at point 1321 through its left-hand winding, the right-hand winding being already deenergized at this time since contact 7G of sequence relay 7 is open. When shift magnet control relay 122 deenergizes at point 1322, contact 122B thereof opens removing ground from contact 8A and conductor 8J thus causing depotentialization of shift magnet 212 at point 1323.

The contacts of shift relay 153 are opened concurrently with the deenergization of shift magnet 212 at point 1324.

The opening of contact 2B with the energization of sequence control relay 2 at point 1320 also removed ground from and caused deenergization of sequence relay 10 at point 1325. Thereupon ground was extended from contact 123B of shift magnet control relay 123 through contact 10A and conductor 10J to shift magnet 213 which then began energization at point 1326. At point 1327 shift magnet 213 becomes energized and the contacts of shift relay 154 are closed.

Deenergized sequence relay 10 closes contact 10B thereby extending ground through contact 9A, conductor 9K and ultimately through relay 81 (Fig. 4) which is thus potentialized at point 1328 and later becomes energized at point 1329. Relay 81 thus energized closes its contacts and thereby prepares a circuit from ground at the previous reading bars 76A, 76B and 76C and through card perforations to the fingers as 76G, the card perforations being arranged according to the code shown in Fig. 18 to represent 000. From the contact fingers which are permitted to engage the contact bars 76A, 76B and 76C through these perforations, the circuit is extended through the closed contacts of relay 81 and through cable 78 (Figs. 4 and 9) to contacts in the left-hand group upon shift relay 154. With the closing of these contacts at point 1327 upon the energization of shift magnet 213, the circuit is extended through cable 161 to the translating relays 139, 143 and 147 (Fig. 10). These translating relays are then potentialized and therefore become energized at points 1330, 1331 and 1332. Such energization of these translating relays fails to extend circuits for energization of any of the counting relays (Fig. 11) but instead sets up a circuit beginning with the grounded movable contact of translating relay 144, the left-hand contacts of relays 145 and 146, the zero contacts of relays 147 and 143, the left-hand contacts of relays 142, 141, 140, 136, 137, 138, the zero contact of relay 139, the conductors 149 and 149A (Figs. 10 and 9), contact 154X of energized shift relay 154, conductor 149C and conductor 28X (Fig. 11) thus potentializing relay 173 at point 1333 and causing the same to become energized at point 1334. Thus energized, relay 173 opens contact CC thereby freeing sequence control relay 2 from ground whereupon said relay 2 starts deenergization which is completed at point 1335.

Sequence control relay 2 when deenergized at point 1335 opens contact 2A thereby removing ground from sequence relay 9 and causing said relay to start deenergization which is completed at point 1336 whereupon contact 9A opens freeing ground from conductor 9K and ultimately from relay 81 (Fig. 4) which then begins deenergization at point 1337. The contacts of relay 81 open when said relay is deenergized at point 1338 thereby opening the circuit beginning at ground adjacent to the previous reading bars 76A, 76B and 76C (Fig. 4) for holding energized the translating relays 139, 143 and 147 (Fig. 10). Said translating relays therefore begin deenergization when the contacts of relay 81 are opened, such deenergization being completed at points 1339, 1340 and 1341 thereby opening their zero contacts and breaking the circuit originating at the grounded movable contact of translating relay 144 for holding relay 173 energized. Thereupon relay 173 begins deenergization at point 1342. When relay 173 is deenergized at point 1343, contact CC closes resulting in energization of sequence control relay 2 at point 1344, the opening of contact 2B and the consequent depotentialization of sequence relay 12 at point 1345. The opening of contact 2B also freed shift magnet control relay 123 from ground whereupon said relay was depotentialized at point 1346 concurrently with the depotentialization of sequence relay 12 at point 1345. When the relay 123 deenergized at point 1347 contact 123B opened thereby removing ground from contact 10A and conductor 10J, thus depotentializing shift magnet 213 at point 1348, preparatory to causing deenergization of said magnet 213 and the opening of the contacts of shift relay 154 at point 1349.

During the rotation of the number wheels 52, 58, 53 and 59 the amount of 026 was set up on the last reading register and upon the consumption quantity register. During the ensuing operation for sensing and reading out of the previous meter reading recorded upon the control card the counting relays of Fig. 11 were not energized (since the previous reading was zero) and consequently the number wheels in the previous reading register 54—55—56 were not advanced and the wheels of the consumption quantity register 57—58—59 were not rotated backwardly and therefore the consumption quantity register continues to read 026 after the entry of both the last meter reading and the previous meter reading amounts.

The relay 173 and the sequence control relay 2 are actuated through the circuit traced above passing through contact 154X on shift relay 154, for controlling the sequence relays so as to demobilize the circuits established for taking care of the previous reading amount and for establishing the circuits for carrying out the next operation of entering upon the consumption charge register 182—183—184 (Fig. 16) the monetary amount of the charge for the consumption quantity. While the next operation is not shown upon the chart in Fig. 49, the relay 12 upon its deenergization at point 1350 closes contact 12A thereby extending ground from contact 124B to shift magnet 214 (Fig. 9) for closing the shift relay 155 as an incident to carrying on with the succeeding operation. Contact 12B is also closed for extending ground through contact 11A and conductor 11K in the manner hereinabove described for setting up counting relays (Fig. 11) in accordance with the readings standing upon the consumption quantity register 57—58—59.

The operation now to be described is controlled from a card as that shown in Fig. 1 perforated for a last reading of 000 and a previous reading of 026, the operation being illustrated graphically in the chart shown in Figs. 50 and 51. The operation proceeds as before. Upon the depression of starting key 1 contact 1A is grounded whereupon at point 1360 relay 8 is potentialized. When relay 8 energizes at point 1361 sequence relay 7 is potentialized and therefore becomes energized at point 1362. Sequence relay 10 is potentialized at point 1363 with energization of sequence relay 7 and upon energization at point 1364 relay 10 results in energization of relay 9 at point 1365. Relay 9 thus energized causes potentialization of relay 12 at point 1366 which relay in turn when energized at point 1367 causes energization of relay 11 at point 1368. Energized relay 11 closes contacts for causing potentialization of relay 18 at point 1369 and hence energization thereof at point 1370. Relay 18 thus energized causes energization of relay 17 at point 1371.

Relays 7, 9 and 11 upon energizing at points 1362, 1365 and 1368 respectively cause potentialization of shift magnet control relays 122, 123 and 124 which relays then become energized at points 1372, 1373 and 1374.

The depression of starting key 1 also placed ground upon conductor 1B which extends the ground through switch 101, contact 101A and conductors 101B and 101C to relays 228 and 229 (Fig. 6) which are thus caused to energize at points 1375 and 1376 but without effect since no card perforations are provided for the fingers associated with the contact bars 221 and 222 (Fig. 6). Later when the starting key 1 is released and the grounded connection with contact 1B is broken the relays 228 and 229 deenergize at points 1377 and 1378, again without effect.

When relay 17 energized at point 1371 contact 17J thereof closed and extended circuit through the sequence control relay 2 to contact CC of relay 173 which is unenergized at this time. This relay 173 being thus established causes energization of sequence relay 2 at point 1379. Thus energized sequence relay 2 opened contact 2B and started deenergization of sequence relay 8 at point 1380. When sequence relay 8 deenergizes at point 1381, contact 8B thereof closes extending ground through contact 7A and conductor 7K in the manner previously described for causing energization of relay 82 (Fig. 4) at point 1382. Thereupon the contacts of relay 82 are closed and thus extend ground from the last reading bars 77A, 77B and 77C, the contact fingers engaging said bars in an arrangement representative of the reading 000, cable 78 (Figs. 4 and 9), and to the contacts upon the left-hand side of shift relay 153.

When the contacts of shift relay 153 are closed at point 1383 the circuits originating at the grounds adjacent to the last reading bar 77A, 77B and 77C are extended to translating relays 139, 143 and 147 (Fig. 10). When sequence relay 8 deenergized at point 1381 contact 8A thereof closed, extending ground from contact 122B of shift magnet control relay 122 through conductor 8J to shift magnet 212, (Fig. 9) potentializing said magnet at point 1384. Thereupon shift magnet 212 begins energization and when such energization is completed at point 1383 the contacts of shift relay 154 are closed for extending the circuit to translating relays 139, 143 and 147. Said translating relays 139, 143 and 147 are thus potentialized and upon their energization at point 1385, 1386 and 1387 are effective to close a circuit beginning with ground at the movable contact of translating relay 144 and continuing through the left-hand contacts of relays 145 and 146, the O contacts of relays 147 and 143, the left-hand contacts of relays 142, 141 and 140, conductor 140X, the left-hand contacts of relays 136, 137 and 138, the O contact of relay 139, conductor 149 (Figs. 10 and 9), conductor 162 closed contact 153X on shift relay 153, conductor 162A, conductor 149C and conductor 28X (Figs. 11 and 12) to relay 173 thereby causing energization of the latter at point 1388.

Since the reading of 000 requires no movement of the last reading wheels 51, 52 and 53 and of the consumption wheels 57, 58 and 59 to effect such reading in the last reading register and in the consumption quantity register, the counting relays (Fig. 11) are not energized during this phase of the operation. However, so that the sequence relays can be controlled for establishing circuits to provide for the next operation of entering the previous reading upon the previous reading register 54—55—56 and for rotating subtractively the number wheels of the consumption quantity register 57—58—59, the just described circuit traced from the grounded movable contact of translating relay 144 was set up for energizing relay 173 at point 1388 to institute the necessary action in the sequence relays for setting up these circuits.

Relay 173 thus energized opens contact CC thereby deenergizing sequence control relay 2 at point 1389. Relay 2 is thus caused to release contact 2A thereby depotentializing sequence relay 7 at point 1390. When sequence relay 7 deenergizes at point 1391, contact 7A opens removing the ground from conductor 7K and ultimately from relay 82 (Fig. 4) which is thereby caused to deenergize at point 1392. Circuit to the translating relays is broken by the opening of the contacts associated with relay 82 and hence the translating relays 139, 143 and 147 begin deenergization at points 1393, 1394 and 1395. When these translating relays deenergize at points 1396, 1397 and 1398 the heretofore described circuit originating at the grounded movable contact of translating relay 144 and for energizing relay 173 is broken whereupon said relay 173 at point 1389 is depotentialized. Deenergization of relay 173 at point 1400 causes contact CC to close thereby grounding and potentializing sequence control relay 2 at point 1401. Relay 2 is thus caused to energize at point 1402 opening contact 2B whereby the ground for sequence relay 10 is removed and the relay 10 begins deenergization at point 1403. Contact 2B when opened also removed ground from the left-hand winding of shift magnet control relay 122 whereupon said relay started deenergization which is completed at point 1404. Relay 122 thus deenergized opened contact 122B thereby removing it from ground and effecting depotentialization of shift relay 153 at point 1405.

Closed contact 10A of now deenergized sequence relay 10 extends ground from contact 123B of shift magnet control relay 123 thereby potentializing shift magnet 213 at point 1406 and subsequent energization of the shift magnet 213 and closing of the contacts upon shift relay 154 occurs at point 1407.

Deenergized relay 10 also closed contact 10B extending the ground through contact 9A and conductor 9K to relay 81 (Fig. 4) causing energization thereof at point 1408. Relay 81 thus energized closes circuits beginning with ground at the previous reading bars 76A, 76B and 76C, contact fingers as 76G engaging said bars through card perforations arranged to represent 026 according to the code (Fig. 18), hence through closed contacts of relay 81 and cable 78 (Figs. 4 and 9) contacts upon the left-hand section of shift relay 154 (which contacts were closed at point 1407) thence through cable 161 to translating relays 139, 141, 144 and 147 which are thus potentialized and caused to become energized at points 1409 to 1412 inclusive.

Eneregized relay 139 in the present phase of the operation is without effect. Energized relay 141 extends ground from the grounded movable contact of translating relay 140 to the central winding of counting relay 32A (Fig. 11) thereby causing its energization at point 1413. Translating relays 144 and 147 when thus energized extend ground from the grounded movable contact of translating relay 144 to the central winding of counting relay 36 (Fig. 11) whereupon said relay becomes energized at point 1414. Then in the regular manner the counting relays pertaining to the tens order and of the lower numerical values than counting relay 32A lock up successively and finally result in a locking up or energization of cut-off relay 34 at point 1415. Likewise, in the units order of counting relays, after the energization of counting relay 36, the relays of lower numerical value successively energize in a chain resulting in energization of cut-off relay 41 at point 1416.

Cut-off relay 34, which was the first of the cut-off relays to energize, and in doing so at point 1415 closed contact 34G placing ground on conductor 28X and causing energization of relay 173 at point 1417. Thus energized relay 173 opens contact CC which results in deenergization of sequence control relay 2 at point 1418. Thereupon contact 2A of relay 2 opens freeing sequence relay 9 from ground which sequence relay is then depotentialized at point 1419. When relay 9 deenergizes at point 1420 contact 9A is opened, removing ground from conductor 9K and ultimately from relay 81 (Fig. 4) causing deenergization thereof at point 1421. Hence the contacts of relay 81 are opened breaking the circuit from ground at the previos reading bars 76A, 76B and 76C to the energized translating relays which are then depotentialized and become deenergized at points 1422 to 1425 inclusive. When thus deenergized the translating relays 141, 144 and 147 remove the grounded movable contacts of translating relays 140 and 144, as a source of energization for the counting relays 32A and 36. Translating relay 139 was without effect upon its energization at point 1409 and likewise has no effect when deenergized at point 1422.

Cut-off relay 34 energizing at point 1415 closes contacts 34C and 34D thereby extending ground through stepping relay 35, shift relay 154 (Fig. 9), cable 72 (Figs. 9 and 3) and clutch 55A to the battery and ground associated therewith thereby potentializing stepping relay 35 at point 1426 and simultaneously potentializing the clutch 55A at point 1427. Closed contact 34D extends ground through the shift relay 154, the cable 72 (Figs. 9 and 3) and the clutch 64A to the battery and ground associated therewith whereupon said clutch becomes potentialized at point 1428. Clutches 55A and 64A becoming energized at points 1429 and 1430 respectively couple the number wheels 55 and 58 with the constantly rotating shaft 50B whereby the number wheel 55 is rotated forwardly while the number wheel 58 is rotated reversely but at the same speed through the gears 64 and 67. As the number wheels 55 and 58 rotate in this manner, the first digit 1 will be entered on the number wheel 55 at point 1431 indicated on the line pertaining to stepping relay 35 and at point 1432 indicated on the line pertaining to the clutch 55A. Simultaneously and at point 1433 indicated on the line pertaining to the clutch 64A, the number wheel 58 will have been moved backwardly one digital position from 0 to 9. At points 1434 and 1435 respectively on the lines pertaining to stepping relay 35 and the clutch 55A and the number wheel 55 will have been rotated through two digital positions to display the digit 2. Point 1436 on the line pertaining to the clutch 64A indicates the time when the number wheel 58 will have been rotated backwardly through two digital positions from 0 to display 8.

During rotation of the number wheels 55 and 58 the shunting wheel 55C is operative for opening and closing shunting contact 55D whereby stepping relay 35 is alternately deenergized and energized to cause successive deenergization of the locked-up counting relay. And finally, shortly prior to the rotation of the number wheels 55 and 58 to the second of the digital positions as indicated at points 1434, 1435 and 1436 contact 55D is opened whereupon stepping relay 35 energizes at point 1437 thereby opening contact 35A and causing cut-off relay 34 to become deenergized at point 1438. When thus deenergized cut-off relay 34 opens its contacts 34C and 34D, breaking the energizing circuits for stepping relay 35, clutch 55A and clutch 64A, which parts are then depotentialized at points 1439, 1440 and 1441. Clutches 55A and 64A thereafter deenergize at points 1435 and 1436 to uncouple the number wheels 55 and 58 from the constantly rotating shaft 50B concurrently with the entry of the second digit 2 upon the number wheel 55 and the entry of the second digit 8 upon the number wheel 58.

Cut-off relay 41 when energized at point 1416 closed contacts 41C and 41D thereby extending ground to clutches 56A and 65A (Fig. 3) and causing potentialization of said clutches at points 1442 and 1443. Stepping relay 42 which is in series with the potentialization circuit for clutch 56A is also potentialized as indicated at point 1444. Clutches 56A and 65A become energized at points 1445 and 1446 thereby coupling the number wheels 56 and 59 with the constantly rotating shaft 50B so that the number wheels 56 and 59 are driven synchronously but in opposite directions, the wheel 59 being driven backwardly. At points 1447 and 1448 indicated respectively upon the lines pertaining to the stepping relay 42 and the clutch 56A the number wheels 56 and 59 will have been rotated through one digital position so that the number wheel 56 will be at 1 while the number wheel 59 will be at 9 since it is rotating backwardly from zero. Therefore at point 1449 on the line pertaining to clutch 65A, which point is the same with regard to time as points 1447 and 1448, the number wheel 59 will be at 9.

In all, each of the number wheels 56 and 59 is rotated through six digital positions so that at the end of their rotation the number wheel 56 will have entered thereon the digit 6 at points 1450 and 1451 indicated respectively on the lines pertaining to the stepping relay 42 and the clutch 56A. Entry of the digits 2 to 5 inclusive occurs during that time represented by the space between the chart section titled Registration of last and previous reading of meter and the chart section titled Entry of negative carry-over. At point 1452 indicated on the line pertaining to the clutch 65A the number wheel 59 will have been rotated reversely through six digital positions and will display the digit 4. The intervening digits 8 to 5 were entered upon the number wheel 59 during the interval of time represented by the space between the aforementioned chart sections.

While the number wheels 56 and 59 are in motion the shunting wheel 56C is effective in the usual manner for alternately opening and closing shunting contact 56D which is thereby rendered effective to alternately cause deenergization and energization of stepping relay 42 and in this manner successively deenergize the counting relays locked up in the units order. Finally, shortly prior to the addition entry of the sixth digit 6 upon number wheel 56 and the subtractive entry of the sixth digit 4 upon the number wheel 59 and after all of the counting relays have been deenergized, shunting contact 56D opens, removing shunt from stepping relay 42 which is then potentialized at point 1453, opening contact 42A and causing cut-off relay 41 to become deenergized at point 1454. Thereupon cut-off relay 41 opens contacts 41C and 41D breaking the circuits which had held energized the stepping relay 42 and the clutches 56A and 65A thus causing said parts to be depotentialized at points 1455, 1456 and 1457. Clutches 56A and 65A deenergize at points 1451 and 1452 thereby releasing the number wheels 56 and 59 from the constantly rotating shaft 50B at the time these number wheels respectively register 6 and 4.

The consumption register 57—58—59 will now read 084. But since the previous reading of the meter was 026 and the last reading was 000, the consumption had been of such a quantity as to cause the meter to run to its capacity and stop. Obviously if the meter had a greater order capacity, the reading instead of being 000 would be 1000, the true consumption being 974 (1000 minus 026). Without adjustment of the entry 084 by a carry-over operation now to be explained such entry would be incorrect.

During rotation of the number wheeel 58 backwardly from 0 to 9, the carry-over wheel 58H was effective at point 1458, as indicated on the line pertaining to clutch 64A, to close contact 58K. Ground was thereby extended from the point adjacent to contact 58K to carry-over relay 169 (Fig. 12) which then became energized at point 1459 and resulted in the successive energization of relays 170 and 171 at points 1460 and 1461. Also during rotation of the number wheel 59 backwardly from 0 to 9 and at point 1462 indicated on the line pertaining to the clutch 65A the carry-over wheel 59H was operative to momentarily close carry-over contact 59K which at that time extended ground from the point adjacent thereto to carry-over relay 165 (Fig. 12) which was thus caused to energize at the point 1463 and in turn cause the successive energization of relays 166 and 167 at points 1464 and 1465.

The carry-over relays which were locked up in the manner just described remain quiescent until shortly after the last of the cut-off relays which in the present example is cut-off relay 41 (Fig. 11) deenergizes. Such deenergization of cut-off relay 41 occurs at point 1454 thereby removing ground from conductor 28X and relay 173, the latter then being depotentialized at point 1466. When relay 173 deenergizes at point 1467 contacts 173A, 173B and CC thereof close whereupon circuits starting with ground at contact CC are established, the ground being extended from contact CC to contacts 167C and 167D which at this time are closed. The circuit at contacts 156C and 167D divides, one circuit leg being extended from contact 167D through conductor J to one side of the shunting contact 58D (Fig. 3) while another circuit leg is extended from contact 167C through stepping relay 168, contact 173B, and conductor G to the clutch 64A (Fig. 3) and the battery and ground associated therewith. Therefore with the deenergization of relay 173 at point 1467 the stepping relay 168 and the clutch 64A which are thus connected in a completed series circuit are potentialized at points 1468 and 1469. When the clutch 64A becomes energized at point 1470, the number wheel 58 is coupled with and driven backwardly by the constantly rotating shaft 50B and during rotation of the number wheel 58 in this fashion the shunting wheel 58C operates to first close the shunting contact 58D for shunting out the stepping relay 168 and to later open the contact 58D removing this shunt and permitting the stepping relay to become energized at point 1471 after the alternately energized and deenergized stepping relay has effected deenergization of the locked-up relays 165 and 166, at points 1472 and 1473. This last energization of the relay 168 at point 1471 opens contact 168A thereby freeing cut-off relay 167 from ground and causing deenergization thereof at point 1474. When thus deenergized the cut-off relay 167 opens contact 167D to remove ground from shunting contact 58D (Fig. 3) and opens contact 167C to depotentialize stepping relay 168 at point 1475 and to depotentialize the clutch 64A at point 1476. Thereafter the clutch 64A becomes deenergized at point 1477 to release number wheel 58 from the shaft 50B after said number wheel has been rotated backwardly one digital position to display the digit 7.

Deenergization of cut-off relay 167 also closes contacts AA and AAA, the latter extending ground from contact CC to closed contacts 171C and 171D of cut-off relay 171. Thereupon the ground is extended from contact 171D through conductor M to one side of the shunting contact 57D (Fig. 3). Ground is extended from contact 171C through stepping relay 172, contact 173A and conductor K to clutch 63A (Fig. 3) and the battery and ground associated therewith. In this manner stepping relay 172 and the clutch 63A are potentialized at points 1478 and 1479. When clutch 63A energizes at point 1480 the number wheel 57 is connected to the shaft 50B and through the gears 63 and 66 so that said number wheel begins rotation backwardly. During such backward rotation of number wheel 57 the shunting wheel 57C closes and opens the shunting contact 57D thereby causing deenergization and energization of stepping relay 172 at points 1481 and 1482. When stepping relay 172 first became energized at point 1483 it caused deenergization of carry-over relay 169 at point 1484 and when deenergized at point 1481 caused deenergization of carry-over relay 170 at point 1485 and upon its energization at point 1482 caused deenergization of cut-off relay 171 at point 1486. This deenergization of cut-off relay 171 permits the opening of contacts 171C and 171D whereby through contact 171D ground is removed from shunting contact 57D (Fig. 3) and through contact 171C ground is removed from stepping relay 172 and the clutch 63A. Hence stepping relay 172 begins deenergization at point 1487 while clutch 63A begins deenergization at point 1488. When the clutch 63A is deenergized at point 1489 the number wheel 57 will be released from the shaft 50B after having been rotated backwardly one digital position from 0 to 9. Consumption register 57—58—59 will now display a reading of 974 which is the true difference between the last reading of 000 (which actually indicates a consumption of 1000) and the previous meter reading of 026.

The apparatus now prepares itself for the next operation for recording the amount of the consumption charge in the consumption charge register 182—183—184 and in the totalizer register 191—192—193 (Fig. 16). In making this preparation the carry-over cut-off relay 171 when deenergized at point 1486 closed contact BB thereby completing the circuit starting with ground at contact CC and including contact AA of carry-over cut-off relay 167 and the sequence control relay 2 which is thus caused to energize at point 1490. Energized relay 2 opens contact 75

2B freeing shift magnet control relay 123 which then begins deenergization at point 1491. When this relay 123 deenergizes at point 1492 contact 123B thereof opens removing ground from shift magnet 213 which then begins deenergization at point 1493. The opening of contact 2B also removed ground from sequence relay 12 depotentializing the same at point 1494 and when the relay 12 became deenergized at point 1495 it extended ground through its contact 12A to the shift magnet 214 (Fig. 9) for closing the contacts of shift relay 155. Contact 12B of deenergized relay 12 also closed and extended ground through contact 11A and conductor 11K to set up circuits passing through certain of the closed contacts of the shift relay 155 (Fig. 9) for energizing certain of the counting relays (Fig. 11) as an incident to the ensuing operation for entering the consumption charge in the proper registers.

*Operation with no consumption, merchandise, amount paid or balance due*

In the present example, it is assumed that the meter card shown in Fig. 1 is perforated for a last reading of 111 and a previous reading of 111 so that during the entry of the previous reading in the previous reading register 54—55—56, the number wheels in the consumption register 57—58—59 will be returned to 000.

The setting up of the sequence relays is instituted and proceeds as before described and as shown graphically in Fig. 50. That is, upon the depression of the starting key 1, contact 1A is grounded, thereby causing successive energization of sequence relays 8, 7, 10, 9, 12, 11, 18 and 17 in the order named respectively at points 1500 to 1507 inclusive. Sequence relays 7, 9 and 11 upon their energization at points 1501, 1503 and 1505 close their contacts as 7G thereby respectively potentializing shift magnet control relays 122, 123 and 124 which are thus caused to become energized at points 1508, 1509 and 1510.

The manual closing of starting key 1 also grounds contact 1B, thereby grounding relays 228 and 229 which then become energized at points 1511 and 1512 but without effect in this operation of the apparatus, and later when the starting key is released, these relays 228 and 229 are depotentialized at points 1513 and 1514 and immediately thereafter deenergize without effect.

When sequence relay 17 energized at point 1507, circuit was closed through sequence control relay 2 causing the same to become energized at point 1515, opening contact 2B and freeing relay 8 from ground, said relay 8 then becoming deenergized at point 1516. Closed contact 8B of deenergized sequence relay 8 extends ground through contact 7A and conductor 7K and ultimately to relay 82 (Fig. 4) which is thus potentialized and becomes energized at point 1517. Circuits are then prepared from ground at the last reading bars 77A, 77B, 77C (Fig. 4) to certain of the contact fingers as 77G which are permitted to engage the contact bars through card perforations arranged according to the code in Fig. 18 to represent the last meter reading of 111. The circuit is extended from these fingers through closed contacts of relay 82, cable 78 (Figs. 4 and 9) to contacts in the left-hand group of contacts upon shift relay 153. Sequence relay 8 deenergized as above described also closed contact 8A thereby extending ground from contact 122B through conductor 8J to cause potentialization of shift magnet 212 at point 1518. When this shift magnet 212 energizes at point 1519 shift relay 153 will close all of its contacts thereby extending the previously prepared circuit leading from ground at the last reading bars 77A, 77B and 77C (Fig. 4) to translating relays 136, 140 and 144 (Fig. 10). These translating relays are thus potentialized and become energized at points 1520, 1521 and 1522. Ground is then extended from the grounded movable contact of translating relay 136 to the central winding of counting relay 23, which counting relay is then potentialized and caused to energize at point 1523. Ground is extended from the grounded movable contact of translating relay 140 to the central winding of counting relay 32 while ground is extended from the grounded movable contact of translating relay 144 to the central winding of counting relay 39A whereupon the counting relays 32 and 39A are potentialized and caused to energize at points 1524 and 1525.

In the regular sequence, the counting relays of lower numerical value than counting relays 23, 32 and 39A are energized and cause energization of their associated cut-off relays 28, 34 and 41 at points 1526, 1527 and 1528. Since the shift relay 153 is the one having its contacts closed at this time, the contacts as 28C and 28D of the cut-off relays will be connected with the several clutches for causing rotation of the number wheels in the last reading register 51—52—53 and in the consumption charge register 57—58—59 (Fig. 3). Therefore, when cut-off relay 28 energizes at points 1526, the contacts 28C and 28D upon closing will extend ground to clutches 51A and 60A (Fig. 3), which thereby become potentialized at points 1529 and 1530. Contacts 34C and 34D of energized cut-off relay 34 establish the circuit for potentializing clutches 52A and 61A at points 1531 and 1532. Contacts 41C and 41D when closed by the energization of cut-off relay 41 extend circuit to clutches 53A and 62A (Fig. 3) causing said clutches to potentialize at points 1533 and 1534. Stepping relays 29, 35 and 42 which are respectively in series with clutches 51A, 52A and 53A become potentialized simultaneously therewith at points 1535, 1536 and 1537. Said stepping relays thereafter become energized at points 1538, 1539 and 1540.

When the cut-off relays 28, 34 and 41 were energized, their contacts as 28G were closed, impressing ground upon conductor 28X and causing energization of relay 173 and opening of contact CC thereof at point 1541, breaking the circuit for sequence control relay 2 which began deenergization at point 1541'. When sequence control relay 2 deenergized at point 1542, contact 2A thereof opened, causing deenergization of sequence relay 7 at point 1543 and the opening of contact 7A thereby breaking the energization circuit for relay 82 (Fig. 4) which then became deenergized at point 1544. Relay 82 thus deenergized opened its contacts, breaking the circuit from ground at the last reading bars 77A, 77B and 77C for holding energized the translating relays 136, 140 and 144. Therefore, these translating relays were depotentialized and caused to deenergize at points 1545, 1546 and 1547. This deenergization of translating relays 136, 140 and 144 removed the source of ground at their movable contacts for the respective energization of the central windings of counting relays 23, 32 and 39A, and since the left-hand windings of these three counting relays had been previously deenergized immediately after the energization of their associated stepping relays 29, 35 and 42, when said stepping relays opened their contacts as 29A, these counting relays 23, 32 and 39A deenergize concurrently with the deenergization of their central windings at points 1548, 1549 and 1550.

When the clutches associated with the number wheels in the last reading register 51—52—53 and the consumption quantity register 57—58—59 (Fig. 3) become energized at points 1551 to 1556 inclusive, the number wheels 51, 52 and 53 are connected by the clutches 51A, 52A and 53A to the constantly rotating shaft 50A for rotation therewith. Energized clutches 60A, 61A and 62A are effective for connecting the number wheels 57, 58 and 59 with the shaft 50A through the gear trains previously described. The number wheels in both of these registers are caused to rotate forwardly. During this rotation, lobes upon the shunting wheels 51C, 52C and 53C are effective for closing the shunting contacts 51D, 52D and 53D shortly after the number wheels move off zero whereby shunt is applied to the stepping relays 29, 35 and 42 which then become deenergized at points 1557, 1558 and 1559. The contacts, as 29B, of these three stepping relays, are then opened to remove ground from and cause deenergization of the counting relays 27, 43 and 39B at points 1560, 1561 and 1562.

Shortly prior to the entry of the first digit on the number wheels the several shunting wheels as 51C move their lobes from the position where they were effective for closing the shunting contacts as 51D whereupon the stepping relays as 29 energize at points 1563, 1564 and 1565. The contacts, as 29A, of stepping relays are thus opened, freeing from ground the cut-off relays 28, 35 and 42 which relays then deenergize at points 1566, 1567 and 1568, and open their contacts as 28C and 28D thereby breaking the energization circuits for clutches 51A, 60A, 52A, 61A, 53A and 62A. These clutches then become depotentialized and later respectively deenergized at points 1569 to 1574 inclusive. These clutches are deenergized and thereby disconnect the number wheels of the last reading register 51—52—53 and the consumption quantity register 57—58—59 from the shaft 50A at the time these number wheels each displays the digit 1. Therefore, the last reading register now reads 111 as does the consumption quantity register. Stepping relays 29, 35 and 42 which are in series with the clutches 51A, 52A and 53A were depotentialized at the same time as these clutches and became deenergized at points 1575, 1576 and 1577.

When the cut-off relays 28, 34 and 41 deenergized at points 1566, 1567 and 1568, their contacts as 28G opened, removing ground from conductor 28X and causing deenergization of relay 173 and the closing of its contact CC at point 1578. Stepping relay 2 is thus grounded and caused to energize at point 1579, opening contact 2B and freeing shift magnet control relay 122 from ground through its left-hand winding, the right-hand winding having been previously deenergized upon the deenergization of relay 7 and the opening of contact 7G. Deenergization of the relay 122 at point 1580 opens contact 122B removing ground from contact 8A and conductor 8J whereby shift magnet 212 is depotentialized at point 1581 and deenergizes at point 1582 at which time the shift relay 153 is freed for opening its contacts.

Contact 2B of relay 2 upon opening also depotentializes sequence relay 10 at point 1583 and when this relay deenergizes at point 1584 its contact 10B closes extending ground through contact 9A, conductor 9K and ultimately to relay 81 (Fig. 4) which energizes at point 1585. Thus energized, relay 81 closes its contacts and prepares a circuit beginning with ground at the previous reading bars 76A, 76B and 76C, the circuit extending through contact fingers as 76G which are permitted to contact the bars 76A, 76B and 76C through card perforations arranged according to the code illustrated in Fig. 18 to represent the digits 111. From these contact fingers, the circuit extends through closed contacts of relay 81 and through cable 78 (Figs. 4 and 9) to contacts in the left-hand group of contacts upon shift relay 154. Deenergized relay 10 is now effective through its contact 10A to extend ground from contact 123B to shift magnet 213 (Fig. 9) thereby causing said shift magnet to potentialize and to become energized at point 1586 incident to closing the contacts upon shift relay 154. In this manner, the previously prepared circuit originating at ground adjacent to the previous reading bars 76A, 76B and 76C is extended through contacts in the left-hand group of contacts on shift relay 154 and through cable 161 (Figs. 9 and 10) to translating relays 136, 140 and 144 which are thus caused to energize at points 1587, 1588 and 1589. As in the previous stage of this operation, the grounded movable contacts of energized relays 136, 140 and 144 are connected for extending ground to the central windings of counting relays 23, 32 and 39A (Fig. 11) whereupon said relays are potentialized and become energized at points 1590, 1591, and 1592. Eventually, as before, the cut-off relays 28, 34 and 41 are caused to energize at points 1593, 1594 and 1595.

Now that shift relay 154 is operated to close its several contacts, the closed contacts 28C and 28D of energized cut-off relay 28 respectively extend ground to clutches 54A and 63A (Fig. 3) and their associated batteries and ground. Grounded and closed contacts 34C and 34D respectively extend such ground to clutches 55A and 64A (Fig. 3) and their associated batteries and ground. And the grounded and closed contacts 41C and 41D of cut-off relay 41 extend such ground respectively to clutches 56A and 65A (Fig. 3) and their associated batteries and ground. Therefore the closing of the contacts as 28C and 28D of the cut-off relays 28, 34 and 41, when said relays become energized, potentialize the clutches 54A, 63A, 55A, 64A, 56A and 65A respectively at points 1596 to 1601 inclusive. Stepping relays 29, 35 and 42, which are in series with the energizing circuits respectively for the clutches 54A, 55A and 56A are potentialized at the same time as these clutches and as indicated at points 1602, 1603 and 1604.

Energization of the cut-off relays 28, 34 and 41 also closes contacts as 28G thereby impressing ground upon conductor 28X and causing energization of relay 173 and the opening of its contact CC at point 1605. The energizing circuit for sequence control relay 2 is thus broken causing said relay 2 to deenergize at point 1606. Relay 2 when deenergized opens contact 2A freeing relay 9 from ground which relay then becomes deenergized at points 1607 opening contact 9A and breaking the energization circuit for relay 81 (Fig. 4), which then deenergizes at point 1608. When the contacts of relay 81 are thus opened, the source of ground at the previous reading bars 76A, 76B and 76C for the translating relays 136, 140 and 144 (Fig. 10) is interrupted so that said translating relays are depotentialized and are caused to deenergize at points 1609, 1610 and 1611. Ground at the grounded movable contacts of translating relays 136, 140 and 144 is thereby removed as a source of energization for the central windings of counting relays 23, 32 and 39A, and since the left-hand windings of said counting relays were previously deenergized upon the energization of stepping relays 29, 35 and 42 at points 1612, 1613 and 1614, said counting relays begin deenergization concurrently with the depotentialization of their central windings and, therefore, become deenergized at points 1615, 1616 and 1617.

Energization of clutches 54A and 63A at points 1618 and 1619 results in the number wheels 54 and 57 being connected with the shaft 50B for rotation thereby, the number wheel 54 being rotated forwardly while the number wheel 57 is rotated backwardly through the gears 63 and 66. When clutches 55A and 64A are energized at points 1620 and 1621, the number wheels 55 and 58 are connected for rotation with the shaft 50B, the number wheel 55 being rotated forwardly and the number wheel 58 backwardly through the gears 64 and 67. Energization of the clutches 56A and 65A at points 1622 and 1623 results in number wheels 56 and 59 being connected for rotation with the shaft 50B, the number wheel 56 being rotated forwardly and the number wheel 59 being rotated backwardly through gears 65 and 68. During the rotation of these various number wheels the shunting contacts 54D, 55D and 56D are effective for shunting out the stepping relays 29, 35 and 42 shortly after said wheels take motion thereby causing deenergization of said stepping relays at points 1624, 1625 and 1626 and consequent deenergization of counting relays 27, 43 and 39B at points 1627, 1628 and 1629. Shortly prior to the number wheels having been rotated to the next digital position, the several shunting contacts 54D, 55D and 56D are permitted to open and remove the shunt from the stepping relays 29, 35 and 42 which then become energized at points 1630, 1631 and 1632. This energization of the stepping relays causes deenergization of the cut-off relays 28, 34 and 41 at points 1633, 1634 and 1635, which cut-off relays then open their contacts, as 28C and 28D, thereby breaking the energization circuits for the clutches 54A, 63A, 55A, 64A, 56A and 65A, which clutches then become depotentialized and later deenergized at points 1636 to 1641 inclusive. These clutches thus deenergized disconnect the number wheels 54, 55 and 56 from the shaft 50B after they have rotated forwardly one digital position to display the reading of 111. Deenergization of the clutches 63A, 64A and 65A releases the number wheels 57, 58 and 59 from the shaft 50B after they have moved backwardly one digital position from 111 to 000. Consequently, after the entry of these identical readings of 111 in the last reading register 51—52—53 and in the previous reading register 54—55—56, the consumption quantity register 57—58—59 will stand at zero.

The present apparatus is so constructed that when the customer has used no power between the times of the last and previous readings so that when the meter card (Fig. 1) is sensed by the apparatus the consumption quantity register will be turned eventually to 000, no minimum charge will be made to the customer. However, the apparatus to avoid stalling must provide a means for operating the sequence control relay 2 and the sequence relays so the apparatus will either condition itself for entering charges for payments due upon articles of merchandise, if any such payments are due, or for resetting to zero any number wheels which may have been removed from that position. Therefore, when the cut-off relays 28, 34 and 41 deenergize at points 1633, 1634 and 1635, ground is removed from conductor 28X thereby causing deenergization of relay 173 at points 1642 and the closing of contact CC which thereby extends ground to and causes energization of sequence control relay 2 at point 1643. Relay 2 thus energized opens contact 2B, deenergizing relays 123 and 12 at points 1644 and 1645. This deenergization of shift magnet control relay 123 opens contact 123B thereof, removing ground from contact 10A and conductor 10J and ultimately from shift relay 213 which is thus depotentialized at point 1646 and later deenergized at points 1647 concurrently with the opening of the contacts of shift relay 154.

Deenergized relay 12 closes contact 12A thereby extending ground from contact 124B through conductor 12J to shift relay 214 for energizing the same and closing the contacts of shift relay 155 at point 1648. Deenergized relay 12 also closes contact 12B thereby extending ground through contact 11A and conductor 11K (Figs. 8, 15, 14 and 13), but since the number wheels 57, 58 and 59 stand at 000, the contact closing wheels 57J, 58J and 59J, shown schematically in Fig. 13, close no circuits through switch contacts for extending ground from conductor 11K and therefore conductor 11K is simply deadened. The number wheels 57, 58 and 59 when standing at zero do, however, have their associated contact closing wheels 57J, 58J and 59J in position for closing the switches in the upper or zero row of switches in Fig. 13 whereby contacts 243, 243A and 243B pertaining respectively to the units tens and hundreds orders are closed and extend the ground from a point adjacent to contact 243 through such contact, through contact 243A, contact 243B, conductor 243C, (Figs. 13, 14 and 9) closed contacts 153X and 153XX on the shift relay 155, conductors 243D and 129B, conductor 243D being connected by conductor 149C with conductor 28X (Fig. 12) and hence with relay 173 to cause energization of the same at point 1650, while conductor 129B extends to relay 128 (Fig. 7) to cause energization thereof at point 1651.

Relay 173 energizing opens contact CC, effecting deenergization of sequence control relay 2, at point 1650', freeing sequence relay 11 from ground whereupon said relay becomes deenergized at point 1652. Relay 128 when energizing at point 1651 opens contact 128A, deenergizing relay 124 through contact 124A at point 1653, breaking the energization circuit for shift magnet 214 (Fig. 9) which then starts deenergization at point 1654. When shift magnet 214 deenergizes at point 1655 the contacts 153X and 153XX of shift relay 155 are opened breaking the energization circuit for relays 173 and 128. Thereupon relay 173 becomes deenergized at point 1656. Contact CC is closed reestablishing the circuit for relay 2 which then energizes at point 1657. Relay 128 started deenergization concurrently with the starting of deenergization of relay 173 and became deenergized at point 1659.

Since, in the present operation, no charges were to be made for articles of merchandise, the sequence relays 14, 13, 16 and 15 were not locked up so that when relay 2 energized at point 1657 and opened contact 2B, relay 18 began deenergization at point 1658 and upon its deenergization at point 1660 set up a circuit from ground at contact 18B through contact 17A and the timed control solenoid 119 which then became energized at point 1661 starting the plunger 119A thereof downwardly to open the contact 127A and break the circuit for and cause deenergization of the sequence control relay 2 at point 1662. When thus deenergized, relay 2 opens contact 2A freeing sequence relay 17 from ground, which relay then becomes deenergized at point 1663, opening contact 17A and breaking the energization circuit for solenoid 119 which then begins deenergization at point 1664.

While the plunger 119A of the timed delay solenoid 119 was in its lower-most position after having opened contact 127A, contact 127C was closed, extending ground through contact 127C and the conductor 127D to reset control relay 70 (Fig. 3) which relay began energization at point 1665. When energized at point 1666, relay 70 closed contact 70B, thereby causing energization of reset relays 69, 194, 195 and 196 at points 1667, 1668, 1669 and 1670. The operation for resetting the number wheels to zero is now initiated and proceeds as explained hereinabove.

I claim:

1. In a card-controlled calculating machine responsive to data perforated in cards, a plurality of charge selector conductors, sets of electrical sensing devices cooperating therewith, an electrical selecting switch associated with said sets of electrical sensing devices, a plurality of pairs of sequence relays and circuits, a plurality of sets of selective electrical sensing devices for connecting said conductors with said pairs of sequence relays and circuit, a plurality of nullifying relays, a plurality of circuits through said selecting switch, one of said first sets of sensing devices, one of said conductors, one of said second sets of sensing devices, contacts of one of said nullifying relays and one of said sequence relays pairs to electrify one of said pairs of sequence relays under control of sensing devices in said sets, a plurality of groups of amount indicating sensing devices, a plurality of further circuit paths and apparatus connecting one of said amount indicating groups of sensing devices to said electrified pairs of said sequence relays and controlled by said sequence relay pairs to electrify said groups of sensing devices, and a further set of electrical sensing devices, nullifying circuits connecting said further set of sensing devices to said nullifying relays and controlled by said further sensing devices to electrify said nullifying relays selectively to operate their contacts to render inoperative their associated ones of said first circuits respectively, and an amount register under control of electrified ones of said amount indicating groups of sensing devices jointly with said electrified sequence relays.

2. In a card-controlled calculating machine responsive to data perforated in cards, a charge selector conductor, sets of electrical sensing devices cooperating therewith, an electrical selecting switch associated with said sets of electrical sensing devices, a pair of sequence relays and circuits, a set of electrical sensing devices for connecting said conductor with said pair of sequence relays and circuits, a nullifying relay, a circuit through said selecting switch, said first mentioned sets of sensing devices, said conductor, said second mentioned set of sensing devices, contacts of said nullifying relay and said sequence relays pair to electrify said pair of sequence relays under control of sensing devices in said first mentioned set, a plurality of groups of amount indicating sensing devices, a further circuit path and apparatus connecting one of said amount indicating groups of sensing devices to said electrified pair of said sequence relays and controlled by said sequence relay pair to electrify said connected group of sensing devices, and a further electrical sensing device, a nullifying circuit connecting said further sensing devices to said nullifying relay and controlled by said further sensing device to electrify said nullifying relay to operate its contacts to render inoperative said first mentioned circuit, and an amount register under control of said connecting amount indicating group of sensing devices if not nullified.

3. In a card-controlled calculating machine responsive to data perforated in cards, a plurality of charge selector conductors, sets of electrical sensing devices cooperating therewith, sequence controlling means, means forming a circuit through one of said conductors and one of said sensing devices to said sequence means to electrify said sequence means under control of sensing devices in said sets, a plurality of groups of amount indicating sensing devices, further circuit means forming a circuit connecting one of said amount indicating groups of sensing devices to said electrified sequence means and controlled by said sequence means to electrify one of said groups of sensing devices, and a further means including electrical sensing devices, nullifying circuits and nullifying relays, said nullifying relays being controlled by said last-mentioned sensing devices, and controlling the first-mentioned circuit means, said further means under control of the sensing devices thereof operating to electrify its relays selectively to render inoperative ones of said first mentioned circuits respectively, and an amount register under control of electrified ones of said amount indicating groups of sensing devices, the electrification of said amount indicating groups being under control of said electrified sequence means.

4. In a card-controlled calculating machine responsive to data perforated in cards, a charge selector conductor, sets of electrical sensing devices cooperating therewith, sequence means, circuits including one of said sets of sensing devices and said conductor to electrify said sequence means, a plurality of groups of amount indication sensing devices, further circuit means connecting one of said amount indication sensing device groups to said electrified sequence means and controlled by said sequence means to electrify said group of sensing devices, and a further set of electrical sensing devices and nullifying means controlled thereby, said nullifying means including means for controlling the first mentioned circuit whereby the first mentioned circuit may be rendered inoperative under the control of the last mentioned electrical sensing devices, and an amount register under control of the selected one of said amount indicating group of sensing devices.

5. In a card-controlled calculating machine, a plurality of sequence relays, circuits connecting said sequence relays in chain arrangement in which each relay controls at least one other relay, a set of selecting relays in circuit with certain of the sequence relays and operable to close a circuit to and thereby select one of the sequence relays for operation, a plurality of electrifiable sensing devices in circuit with the selecting relays, and manually settable means for selectively closing circuit between the selecting relays and the sensing devices whereby electrification of only predetermined of the sensing devices will effect operation of the selecting relays.

6. In a card-controlled calculating machine, a plurality of sets of detector sensing devices operatively responsive to perforations in a card, a plurality of groups of amount sensing devices operatively responsive to perforations in a card, circuit means interconnecting said sets of sensing devices and having control means therein for regulating electrification of said sensing devices and circuit means, a plurality of sets of selecting sensing devices interconnected by said circuit means with the sets of detector and amount sensing devices and operatively responsive to perforations in a card for determining connection of said circuit means with said sets of detector and amount sensing devices, a further set of sensing devices operatively responsive to perforations in a card, nullifying means including parts for controlling current flow through said circuit means and under control of said further set of sensing devices, said nullifying means being operative to nullify operation of selected of said sets of detector and amount sensing devices, a register, and means operative to enter an amount in said register under control of unnullified of said amount sensing devices.

7. In a card-controlled calculating machine, a plurality of sets of detector sensing devices operatively responsive to perforations in a card, a plurality of groups of amount sensing devices operatively responsive to perforations in a card, circuit means interconnecting said sets of sensing devices and providing a predetermined circuit having control means therein for regulating electrification of said circuit, a plurality of sets of selecting devices interconnected by said circuit means with the detector and amount sensing devices and operatively responsive to perforations in a card for connecting selected of said detector and amount sensing devices in said circuit, a further set of sensing devices operatively responsive to perforations in a card, nullifying means including parts for controlling current flow through said circuit and under control of said further set of sensing devices, said nullifying means being operative to open said circuit and nullify operation of the selected of the detector and amount sensing devices, a register, and means operative to enter an amount in said register under control of the selected of said amount sensing devices when said amount sensing devices are unnullified.

8. In a card-controlled calculating machine, a plurality of sets of detector sensing devices operatively responsive to perforations in a card, a plurality of groups of amount sensing devices operatively responsive to perforations in a card, circuit means interconnecting said sets of sensing devices and providing independent circuits each having control means therein for regulating electrification thereof, a plurality of sets of selecting sensing devices interconnected by said circuit means with the sets of detector and amount sensing devices and operatively responsive to perforations in a card for connecting the detector and amount sensing devices selectively in said circuits, a further set of sensing devices operatively responsive to perforations in a card, nullifying means including parts for respectively controlling current flow through said circuits, said nullifying means being under control of said further set of sensing devices and being operative to nullify operation of one or another of said circuits and the detector and amount sensing devices included therein, a register, and means operative to enter an amount in said register under control of unnullified of said amount sensing devices.

9. In a card-controlled calculating machine, a plurality of sets of detector sensing devices operatively responsive to perforations in a card, a plurality of sets of selecting sensing devices operatively responsive to perforations in a card, circuit means interconnecting said detector and selecting sets of sensing devices and having control means therein electrifiable from said sets of detector sensing devices selectively under control of said selector sets of sensing devices, a plurality of amount sensing devices operatively responsive to perforations in a card, a further set of selecting sensing devices operatively responsive to perforations in a card, other circuit means interconnecting said control means, said other set of selecting sensing devices and said amount sensing devices and electrifiable under control of said control means, a further set of sensing devices, nullifying means including parts for controlling current flow through the first-named circuit means and under control of said further set of sensing devices, said nullifying means being operative to nullify operation of selected of said detector and amount sensing devices, a register, and means operative to enter an amount in said register under control of unnullified of said amount sensing devices.

10. In a card-controlled calculating machine, a plurality of sets of detector sensing devices operatively responsive to perforations in a card, a plurality of sets of selecting sensing devices operatively responsive to perforations in a card, circuit means interconnecting said detector and selecting sets of sensing devices and including a plurality of circuits each having a control means therein, said circuits and the control means therein being electrifiable from said sets of detector sensing devices selectively under control of said selector sets of sensing devices, a plurality of amount sensing devices operatively responsive to perforations in a card, a further set of selecting sensing devices operatively responsive to perforations in a card, other circuit means including circuits interconnecting said control means, said other set of selecting devices and said amount sensing devices and electrifiable under control of said control means, said other set of selecting sensing devices connecting said circuits selectively with said amount sensing devices, a further set of sensing devices, nullifying means including parts in each of the first-named circuits for controlling current flow through said circuits and under control of said further set of sensing devices, said nullifying means being operative to nullify operation of selected of said detector and amount sensing devices, a register, and means operative to enter an amount in said register under control of unnullified of said amount sensing devices.

11. In a card-controlled calculating machine, selectable groups of sensing devices, relays having the contacts thereof arranged and interconnected to provide a code set, circuit controlling means connected to said code set and selectively electrifiable under control of said code set, means connecting said circuit controlling means respectively to said groups of sensing devices whereby selective electrification of said circuit controlling means selects at least one of said groups of sensing devices for operation, a further set of sensing devices, and circuit means connecting the last-named set of sensing devices with said relay to thereby place said relays under control of this set of sensing devices whereby selection of a group of said selectable sensing devices is under control of the further set of sensing devices.

12. In a card-controlled calculating machine, selectable groups of sensing devices, relays having the contacts thereof arranged and interconnected to provide a code set, circuit controlling means connected to said code set and selectively electrifiable under control of said code set, means connecting said circuit controlling means respectively to said groups of sensing devices whereby selective electrification of said circuit controlling means selects at least one of said groups of sensing devices for operation, further sets of sensing devices, means connecting said further set of sensing devices to said relays whereby said relays are selectively under control of at least one of said further sets of sensing devices, and manually settable means for selectively rendering said further sets of sensing devices operative.

13. In a card-controlled calculating machine, a plurality of groups of selectable sensing devices, a plurality of groups of selecting sensing devices, a plurality of circuit controlling means, circuit means interconnecting each of said groups of selectable sensing devices with a different one of said circuit controlling means, second circuit means for interconnecting each of said groups of selecting sensing devices with all of said circuit controlling means, and further sensing means in said second circuit means under control of said groups of selecting sensing devices and operable to render said circuit controlling means effective selectively whereby the effective circuit controlling means selects one of said groups of selectable sensing devices for operation.

14. In a perforated card-controlled calculating machine, a plurality of sets of detector sensing devices responsive to perforations in given fields of a card, a plurality of groups of amount sensing devices responsive to perforations in other fields of a card, a plurality of circuit completing means selectively controlled by said detector sensing devices, circuits controlled by said completing means and including said amount sensing devices, and a plurality of sets of selecting sensing devices in said circuits, said selecting sensing devices being responsive to perforations in a card for selectively establishing a circuit from one of said completing means through one of said amount sensing devices.

15. In a perforated card-controlled calculating machine, a plurality of sets of detector sensing devices responsive to perforations in given fields of a card, manual variable settable means for controlling said detector sensing devices whereby said detector sensing devices are rendered responsive only to perforations in predetermined zones in said card fields, a plurality of groups of amount sensing devices responsive to perforations in other fields of a card, a plurality of circuit completing means selectively controlled by said detector sensing devices, circuits controlled by said completing means and including said amount sensing devices, and a plurality of sets of selecting sensing devices in said circuits, said selecting sensing devices being responsive to perforations in a card for selectively establishing a circuit from one of said completing means through one of said amount sensing devices.

16. In a machine according to claim 15, nullifying perforation sensing means responsive to perforations in a given field of the card, and means controlled by said last sensing means for preventing control of said circuit completing means by said detector sensing devices.

17. In a perforated card controlled machine wherein the cards have perforations in a plurality of amount fields, and further perforations in a plurality of control fields, a plurality of means for sensing said amount fields, a register, means for actuating said register according to the perforations in any one of said amount fields, means for selecting one of said amount sensing means to control actuation of said register in accordance with perforations in a corresponding amount field, said means comprising one group of sensing means cooperating with fields of control perforation on the card, a second group of sensing means cooperating with further fields of control perforations in said card in series with said first group, a plurality of circuit completing means selectively controlled by said groups of sensing means, each adapted to complete circuits to the amount sensing means, and a further group of sensing means cooperating with further control fields of the card and arranged in the circuits adapted to be completed by said circuit completing means, each of said last sensing means being in series with a corresponding amount sensing means.

18. The combination set out in claim 17 and wherein there is provided cancellation sensing means cooperating with an additional control field of the card and being interposed in circuit between said circuit completing means and said groups of sensing means selectively in control thereof, and said cancellation sensing means being controllable through such additional control field to selectively control said circuit between said circuit completing means and said groups of sensing means and for rendering selected of said circuit completing means ineffective.

19. In a machine under control of a card having an amount field wherein an amount record may be represented by perforations in the card and a control field wherein a control record may be represented by perforations in the card, an amount manifesting device, electrical means for effecting entry in said device of an amount represented in the amount field, a plurality of amount sensing means for cooperation with the perforations representing the record in the amount field, each of said amount sensing means including first contact means each comprising a plurality of individual contacts electrically connected with said electrical entry means, said amount sensing means also including second contact means each selectively engageable with the individual contacts of the first contact means through perforations in the amount field of the card whereby said operation of said electrical entry means is controlled by the perforations in the amount field of the card, a plurality of control sensing means, each of said control sensing means including first contact means, each of which is connected to one of said second contact means of the amount sensing means, each of said control sensing means also including second contact means each comprising a plurality of individual contacts selectively engageable with one of the first contact means of the control sensing means through perforations in the control field of the card, and means for selectively energizing the individual contacts of the second contact means of the control sensing means and cooperating with the perforations sensed by the control sensing means to selectively establish a circuit through one or another of the amount sensing means.

20. In a machine under control of a card having an amount field wherein an amount record may be represented by perforations in the card and a control field wherein a control record may be represented by perforations in the card, an amount manifesting device, electrical means for effecting entry in said device of an amount represented in the amount field, a plurality of amount sensing means for cooperation with the perforations representing the record in the amount field, each of said amount sensing means including first contact means each comprising a plurality of individual contacts electrically connected with said electrical entry means, said amount sensing means also including second contact means each selectively engageable with the individual contacts of the first contact means through perforations in the amount field of the card whereby said operation of said electrical entry means is controlled by the perforations in the amount field of the card, a plurality of control sensing means, each of said control sensing means including first contact means, each of which is connected to one of said second contact means of the amount sensing means, each of said control sensing means also including second contact means each comprising a plurality of individual contacts selectively engageable with one of the first contact means of the control sensing means through perforations in the control field of the card, a plurality of second control sensing means, each of which includes first contact means each comprising a plurality of individual contacts, circuit means under control of said last individual contacts and including circuit closing means for selectively establishing a circuit to the individual contacts of the first control sensing means, each of said second control sensing means also including second contact means each selectively engageable with individual contacts of the second control sensing means through perforations in the control field of the card, and means for selectively energizing the second contact means of the second control sensing means and cooperating with the second control sensing means, the first control sensing means and said circuit means including circuit closing means therein to selectively establish a circuit through one or another of the amount sensing means.

21. In a machine under control of a card bearing a record representative of a plurality of amounts manifesting devices, means common to all of said amount manifesting devices for effecting entry in said devices of amounts represented on the card, a plurality of independent sensing means for respectively ascertaining the amounts and selectable to control operation of said entry effecting means, each of said independent sensing means being utilized for cooperation with a different one of said manifesting devices through said entry effecting means, and means for selectively controlling operative connection of said independent means with said entry effecting means and of said entry effecting means with said manifesting devices and operable to render said independent sensing means operative one after the other to thereby enter the different amounts in the different amount manifesting devices one after the other.

22. In a machine under control of a card bearing a record representative of a plurality of amounts and selecting indicia, a plurality of amount manifesting devices, means common to all of said amount manifesting devices for effecting entry in said devices of amounts represented on the card, a plurality of independent sensing means for respectively ascertaining the amounts and selectable to control operation of said entry effecting means, each of said independent sensing means being utilized for cooperation with a different one of said manifesting devices through said entry effecting means, and means under control of the selecting indicia for selectively controlling operative connection of said independent sensing means with said entry effecting means and of said entry effecting means with said manifesting devices and operable to selectively render said independent sensing means operative to thereby enter the different amounts in the different manifesting devices, the last-named means operating to render the selected independent sensing means operative one after the other to thereby effect entry in the different amount manifesting devices one after the other.

23. In a machine under control of a card bearing a record of a plurality of amounts, a plurality of amount manifesting devices, a total manifesting device, means common to all of said manifesting devices for effecting enry in said devices of the amounts represented on the card, a plurality of independent sensing means for respectively ascertaining the amounts and selectable to control operation of said entry effecting means, switching means for connecting each of said independent sensing means with a different one of said amount manifesting devices and said total manifesting device through said entry effecting means, and means controlling operation of said independent means and said entry effecting means and operable to render said independent sensing means operative one after the other to thereby enter the different amounts in the different amount manifesting devices one after the other and also in said total manifesting device.

24. In a machine under control of a card bearing a record representative of a plurality of amounts and selecting indicia, a plurality of amount manifesting devices, a total manifesting device, means common to all of said manifesting devices for effecting entry in said devices of the amounts represented on the card, a plurality of independent sensing means for respectively ascertaining the amounts and selectable to control operation of said entry effecting means, switching means for connecting each of said independent sensing means with a different one of said amount manifesting devices and said total manifesting device through said entry effecting means, and means under control of the selecting indicia for selectively controlling operative connection of said independent sensing means with said entry effecting means and of said entry effecting means with said manifesting devices and said total manifesting device and operable to selectively render said independent sensing means operative to thereby enter the different amounts in the different amount manifesting devices and in said total manifesting device, the last-named means operating to render the independent sensing means operative one after the other to thereby effect entry in the different amount manifesting devices one after the other.

CLYDE SMITH.

CERTIFICATE OF CORRECTION.

Patent No. 2,176,933.                                           October 24, 1939.

CLYDE SMITH.

It is hereby certified that error appears in the printed specification of the above numbered patent requiring correction as follows: Page 51, first column, line 24, after the word and period "hereinabove." insert the following paragraphs -

In practice for many companies furnishing electricity and gas, the operation due would be for a minimum charge, such as has been described in previous application above referred to, and obviously adaptable to inclusion among the sequences of operation herein described.

Sundry varieties and equivalents of apparatus and circuits would serve for different features of the invention, and it is adaptable to other uses than those herein mentioned. It is not to be understood that the invention is confined to the particular forms and uses herein described.

page 54, first column, line 54, claim 21, after "amounts" insert the comma and words , a plurality of amount; and second column, line 28, claim 23, for "enry" read entry; and that the said Letters Patent should be read with this correction therein that the same may conform to the record of the case in the Patent Office.

Signed and sealed this 26th day of December, A. D. 1939.

Henry Van Arsdale,
                                        Acting Commissioner of Patents.

(Seal)